United States Patent
Park et al.

(10) Patent No.: US 10,708,743 B2
(45) Date of Patent: Jul. 7, 2020

(54) SERVICE SHARING DEVICE AND METHOD

(71) Applicant: Samsung Electronics Co., Ltd., Suwon-si, Gyeonggi-do (KR)

(72) Inventors: Seong-Hee Park, Seoul (KR); Heesu Kim, Seoul (KR); Myounghwan Lee, Suwon-si (KR); Chilyoul Yang, Anyang-si (KR); Janghee Lee, Seongnam-si (KR); Sungmin Jo, Suwon-si (KR); Kwanghoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 15/144,229

(22) Filed: May 2, 2016

(65) Prior Publication Data
US 2016/0323863 A1    Nov. 3, 2016

(30) Foreign Application Priority Data

Apr. 30, 2015    (KR) .................. 10-2015-0062130

(51) Int. Cl.
*H04W 72/04*    (2009.01)
*H04W 4/02*    (2018.01)
(Continued)

(52) U.S. Cl.
CPC .......... *H04W 4/80* (2018.02); *H04W 4/023* (2013.01); *H04W 4/70* (2018.02); *H04L 67/06* (2013.01); *H04W 8/005* (2013.01)

(58) Field of Classification Search
None
See application file for complete search history.

(56) References Cited

U.S. PATENT DOCUMENTS

| | | | |
|---|---|---|---|
| 7,978,674 B1 * | 7/2011 | Oroskar | H04W 72/044 370/335 |
| 9,304,187 B2 | 4/2016 | Jang et al. | |

(Continued)

FOREIGN PATENT DOCUMENTS

| | | |
|---|---|---|
| CN | 102624893 A | 8/2012 |
| CN | 102667762 A | 9/2012 |

(Continued)

OTHER PUBLICATIONS

European Office Action dated Aug. 22, 2018, issued in a counterpart European application No. 16786814.0-1213.

(Continued)

*Primary Examiner* — Steve R Young
(74) *Attorney, Agent, or Firm* — Jefferson IP Law, LLP

(57) ABSTRACT

The present disclosure relates to a technology for a sensor network, a machine to machine (M2M), a machine type communication (MTC), and internet of things (IoT). The present disclosure may be used for an intelligence service (smart home, smart building, smart city, smart car or connected car, health care, digital education, retail business, and security and safety-related service). An electronic device and an operation method for sharing a service or contents between electronic devices through a user's simple motion are provided. The method includes, displaying a user interface (UI) for contents, the UI comprising a object for sharing the contents, transmitting a signal for determining a distance between each of the at least another electronic device and the electronic device to at least another electronic device in response to an input for the object, and transmitting information for the contents to the first electronic device via a peer-to-peer (P2P) communication in response to receiving a first signal from a first electronic device.

23 Claims, 101 Drawing Sheets

(51) Int. Cl.
  *H04W 4/00* (2018.01)
  *H04W 4/80* (2018.01)
  *H04W 4/70* (2018.01)
  *H04W 8/00* (2009.01)
  *H04L 29/08* (2006.01)

(56) References Cited

U.S. PATENT DOCUMENTS

| | | |
|---|---|---|
| 2006/0160544 A1 | 7/2006 | Sun et al. |
| 2006/0267841 A1* | 11/2006 | Lee ................... G01S 5/0081 342/463 |
| 2007/0297426 A1 | 12/2007 | Haveson et al. |
| 2008/0112355 A1* | 5/2008 | Krishnakumar ...... H04W 84/22 370/328 |
| 2011/0081923 A1 | 4/2011 | Forutanpour et al. |
| 2013/0128778 A1* | 5/2013 | Bennett ................ H04W 36/08 370/277 |
| 2013/0223257 A1* | 8/2013 | Balercia ............. H04B 7/15557 370/252 |
| 2013/0316727 A1* | 11/2013 | Edge ................... H04L 65/1016 455/456.1 |
| 2014/0065960 A1 | 3/2014 | Gang et al. |
| 2014/0187257 A1* | 7/2014 | Emadzadeh .......... G01S 5/0242 455/456.1 |
| 2014/0199969 A1 | 7/2014 | Johnsson et al. |
| 2014/0282751 A1 | 9/2014 | Lee et al. |
| 2015/0018017 A1 | 1/2015 | Jang et al. |
| 2015/0065160 A1* | 3/2015 | Meredith .............. H04W 64/00 455/456.1 |
| 2015/0351110 A1* | 12/2015 | Bai ................... H04W 28/0247 370/329 |
| 2016/0142874 A1* | 5/2016 | Jung ..................... H04W 4/023 455/456.1 |
| 2017/0171690 A1* | 6/2017 | Kim ..................... H04L 67/125 |

FOREIGN PATENT DOCUMENTS

| | | |
|---|---|---|
| KR | 10-2009-0040967 A | 4/2009 |
| WO | 2013/119077 A1 | 8/2013 |

OTHER PUBLICATIONS

European Office Action dated Sep. 24, 2019, issued in European Application No. 16786814.0.
European Office Action dated Feb. 14, 2020, issued in European Application No. 16786814.0.
Chinese Office Action dated May 8, 2020, issued in Chinese Application No. 201680024812.7.

* cited by examiner

| Element ID (10) | Length (20) | Range Capability Information (30) |
|---|---|---|
| 1 | 1 | 2 |

Octets:

DMG RANGE ELEMENT

FIG.21A

REQUEST RANGE PACKET

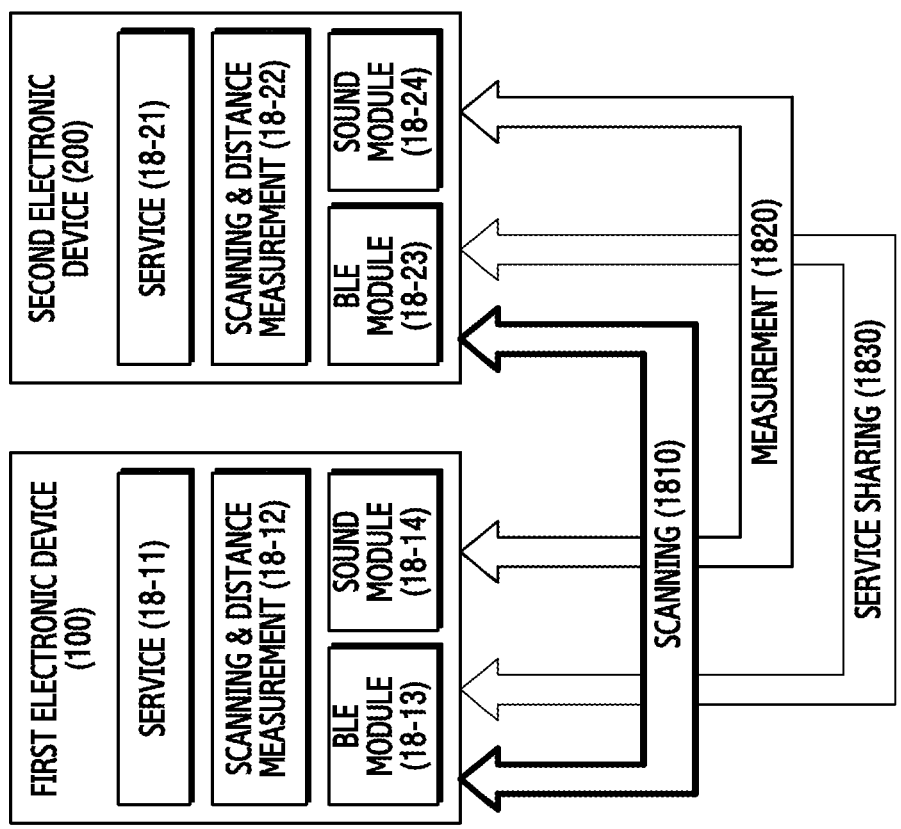

SERVICE SHARING DEVICE AND METHOD

CROSS-REFERENCE TO RELATED APPLICATION(S)

This application claims the benefit under 35 U.S.C. § 119(a) of a Korean patent application filed on Apr. 30, 2015 in the Korean Intellectual Property Office and assigned Serial number 10-2015-0062130, the entire disclosure of which is hereby incorporated by reference.

TECHNICAL FIELD

The present disclosure relates to signal transmission and reception between electronic devices.

BACKGROUND

The internet is evolving from a human-oriented connection network in which humans generate and consume information, to the internet of things (IoT) network in which distributed elements, such as things and the like, exchange and process information. Also, the internet of everything (IoE) technology in which a big data processing technology through a connection with a cloud server or the like is combined with the IoT technology has emerged. In order to implement the IoT, technical factors such as a sensing technique, wired/wireless communication, network infrastructure, service interface technology, and security technology are required, and thus technologies such as a sensor network, machine to machine (M2M), machine type communication (MTC), and the like for a connection between things are recently researched.

In an IoT environment, through collection and analysis of data generated in connected objects, an intelligent internet technology (IT) service to create a new value for people's life may be provided. The IoT may be applied to fields, such as a smart home, smart building, smart city, smart car, connected car, smart grid, health care, smart home appliance, or high-tech medical service, through the convergence of the IT of the related art and various industries.

Recently, with the development of wireless communication technologies, transmission or reception of signals through a wireless device or an electronic device is increasing. For example, users can use various services by transmitting and receiving various contents, such as a video, music, a photograph, or a document, through a wireless device, such as a smart phone, which is wirelessly accessible.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and method for service sharing between wireless devices.

Another aspect of the present disclosure is to provide a device and method for sharing contents with another electronic device through a user's simple motion.

Another aspect of the present disclosure is to provide a device and method by which, when a user inputs a sharing intention for a particular service, devices automatically share the service.

Another aspect of the present disclosure is to provide a device and method by which, when a user inputs a sharing intention for a particular service, devices automatically connect to each other by wireless and share the service.

Another aspect of the present disclosure is to provide a device and method by which, when a user inputs a sharing intention for a particular service and makes a proximity motion, devices automatically connect to each other by wireless and share the service.

In accordance with an aspect of the present disclosure, an operation method of an electronic device is provided. The operation method includes, when sharing of a particular service is determined by a user, scanning for at least one target electronic device among target electronic devices, and transmitting the particular service to the at least one target electronic device.

In accordance with another aspect of the present disclosure, a method of an electronic device comprises displaying a user interface (UI) for contents, the UI comprising a object for sharing the contents, transmitting a signal for determining a distance between each of at least another electronic device and the electronic device to the at least another electronic device in response to an input for the object, and transmitting information for the contents to the first electronic device via a peer-to-peer (P2P) communication in response to receiving a first signal from a first electronic device.

In accordance with another aspect of the present disclosure, an electronic device is provided. The electronic device includes a scanning unit configured to, when sharing of a particular service is determined by a user, scan for at least one target electronic device among target electronic devices, and a transmitter configured to transmit the particular service to the at least one target electronic device.

In accordance with another aspect of the present disclosure, an electronic device comprises a controller, a communication module operatively coupled to the controller, wherein the controller is configured to display a user interface (UI) for contents, the UI comprising a object for sharing the contents, to transmit a signal for determining a distance between each of at least another electronic device and the electronic device to the at least another electronic device in response to an input for the object, and to transmit information for the contents to the first electronic device via a peer-to-peer (P2P) communication in response to receiving a first signal from a first electronic device.

According to various embodiments of the present disclosure, when a user just inputs a sharing intention for a particular service in an electronic device, the service is automatically shared with another electronic device. In these embodiments, even when a user inputs only a sharing intention, an application (App) for sharing of a service is automatically selected and a target device, which can provide the service while being located adjacent thereto, is automatically selected. Therefore, various embodiments of the present disclosure provide convenience which enables a user to transfer a service while viewing only the service (through an App or user interface (UI)) without recognizing a process of connection between devices. That is, various embodiments of the present disclosure enable wireless connection or service transfer without selection of a shared App or a device to be shared.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 21A illustrates the configuration of a directional multigigabit (DMG) range element for a scanning operation according to an embodiment of the present disclosure;

FIGS. 28A and 28B illustrate system block diagrams for a service sharing operation according to various embodiments of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1A to 51 used to describe the principles of the present disclosure in the present specification are used for only illustration of examples and should not be construed as anything that limits the scope of the present disclosure.

Hereinafter, various embodiments for sharing of a service between electronic devices or wireless devices, which are accessible by wireless, are described. According to various embodiments of the present disclosure, when a user performs a simple motion, for example, when a user inputs a sharing intention for a service being executed, devices automatically connect with each other by wireless and share the service. These embodiments can solve the problems of the difficulty in determining an application (APP) for service sharing (e.g., file transmission) in a wireless device, the difficulty for a user to find a target device, and the requirement for multiple times of a selecting process in order to share a service. Hereinafter, for the convenience of description, a service sharing operation between two electronic devices will be representatively described, and examples of some possible service sharing operations will be described. However, it should be noted that the scope of the present disclosure is not limited to the described examples and includes various changes and modifications thereof.

Figure 1A:
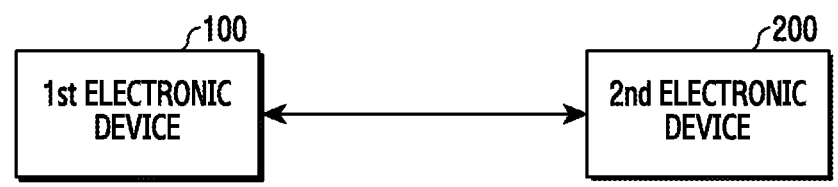
FIGS. 1A and 1B are views describing the concept of service sharing between electronic devices according to various embodiments of the present disclosure.
Figure 1B:
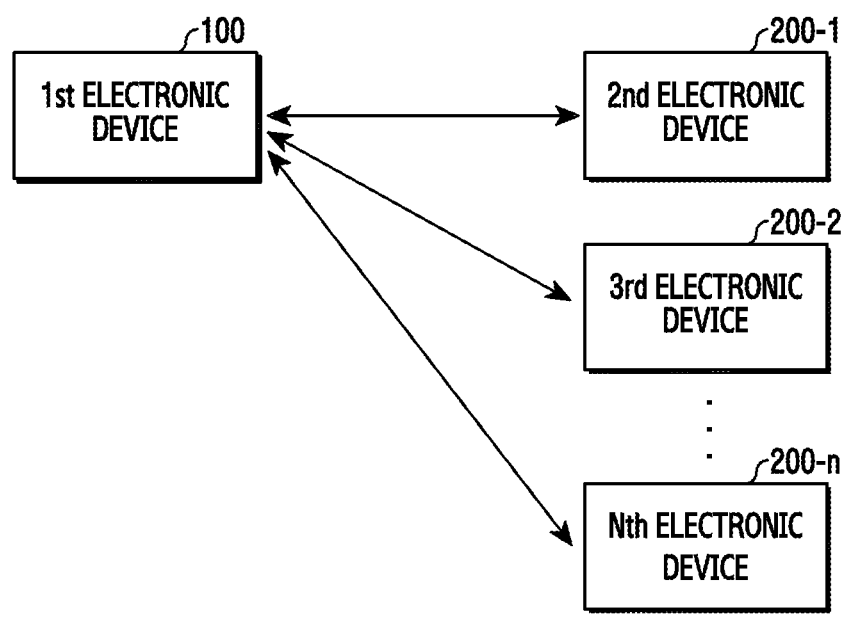

FIGS. 1A and 1B are views describing the concept of service sharing between electronic devices according to various embodiments of the present disclosure.

Referring to FIG. 1A, a first electronic device 100 shares a service with a second electronic device 200. The first electronic device 100 is a controller device which performs an operation of providing a service to be shared. The second electronic device 200 is a target device, which receives a service provided by the first electronic device 100.

The first electronic device 100 includes a communication means for performing communication with the second electronic device 200. The first electronic device 100 is an electronic device that can be carried by a user. For example, the first electronic device 100 may be one of a smart phone, a portable terminal, a mobile phone, a mobile pad, a media player, a tablet computer, a handheld computer, a personal digital assistant (PDA), a wireless controller, and a wearable device, and may be a device having a combination of two or more functions of the devices listed above.

The second electronic device 200 has a communication function which enables the second electronic device to communicate with the first electronic device 100. The second electronic device 200 is an electronic device, which can receive a service (or contents) from the first electronic device 100 and output the received contents. For example, the second electronic device 200 may be one of a smart television (TV), a monitor, a speaker, a woofer, a black box, a wrist watch-type terminal, an eyeglass-type terminal, an electronic device attachable to clothes having a communication function, a camera, a beam projector, a closed circuit TV (CCTV), a printer, fax, a 3-dimensional (3D) printer, a smart phone, a portable terminal, a mobile phone, a mobile pad, a media player, a tablet computer, a handheld computer, and a PDA, and may be a device having a combination of two or more functions of the devices listed above.

The communication connection between the first electronic device 100 and the second electronic device 200 may be established based on at least one communication scheme among communication schemes of Bluetooth, Bluetooth low energy (BLE), near field communication (NFC), Wi-Fi, wireless gigabit (WiGig), ZigBee, ultra wideband (UWB), infrared data association (IrDA), visible light communication (VLC), global system for mobile communication (GSM), enhanced data GSM environment (EDGE), code division multiple access (CDMA), and long term evolution (LTE).

Referring to FIG. 1B, a first electronic device 100 shares a service with a plurality of other electronic devices including a second electronic device 200-1, a third electronic device 200-2, . . . , and an n-th electronic device 200-n. The first electronic device 100 is a controller device which performs an operation of providing a service to be shared. The plurality of other electronic devices 200-1 to 200-n are target devices, which receive a service provided by the first electronic device 100.

Figure 2A:
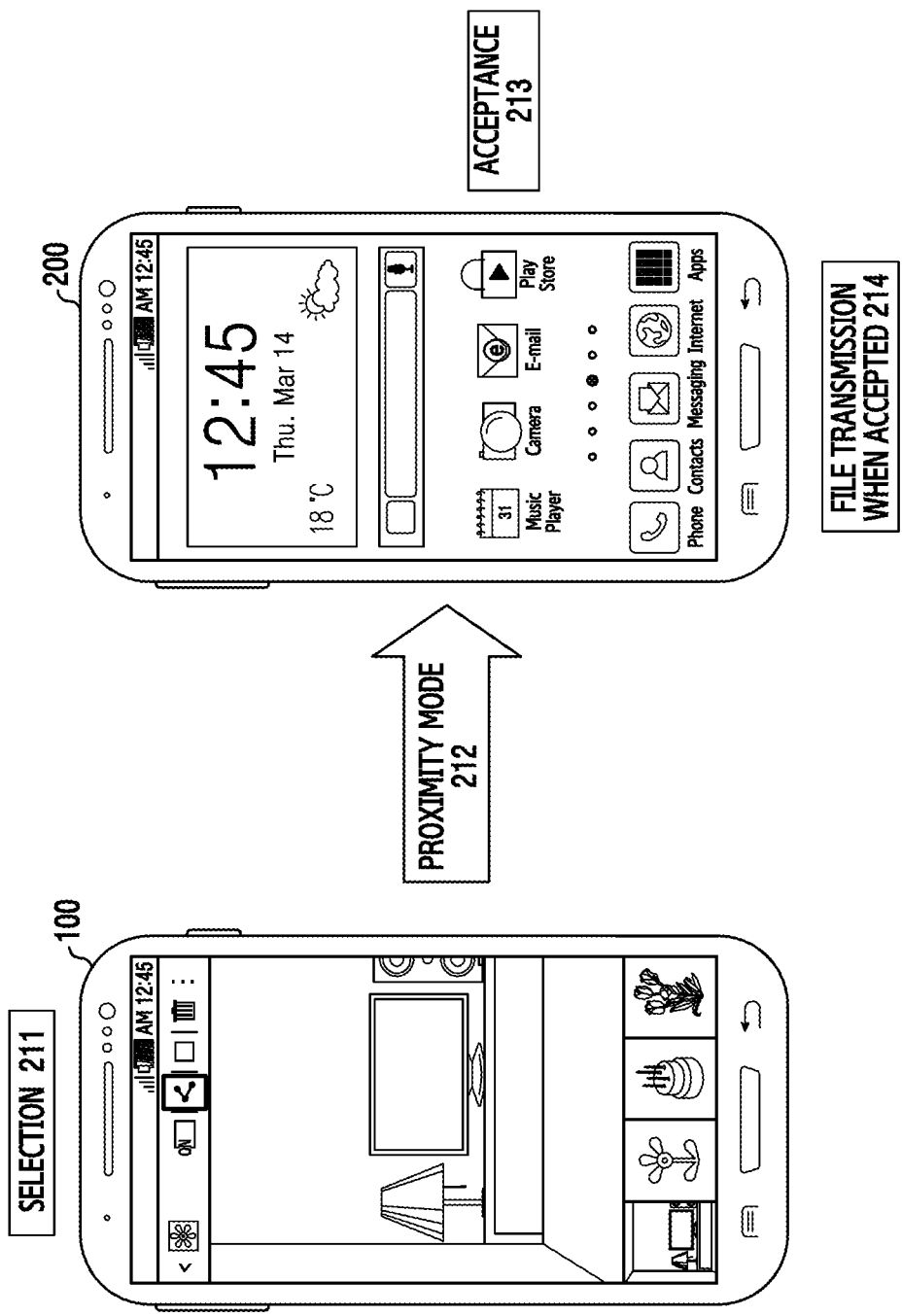
FIGS. 2A to 2C illustrate examples of a service sharing operation according to various embodiments of the present disclosure.
Figure 2B:
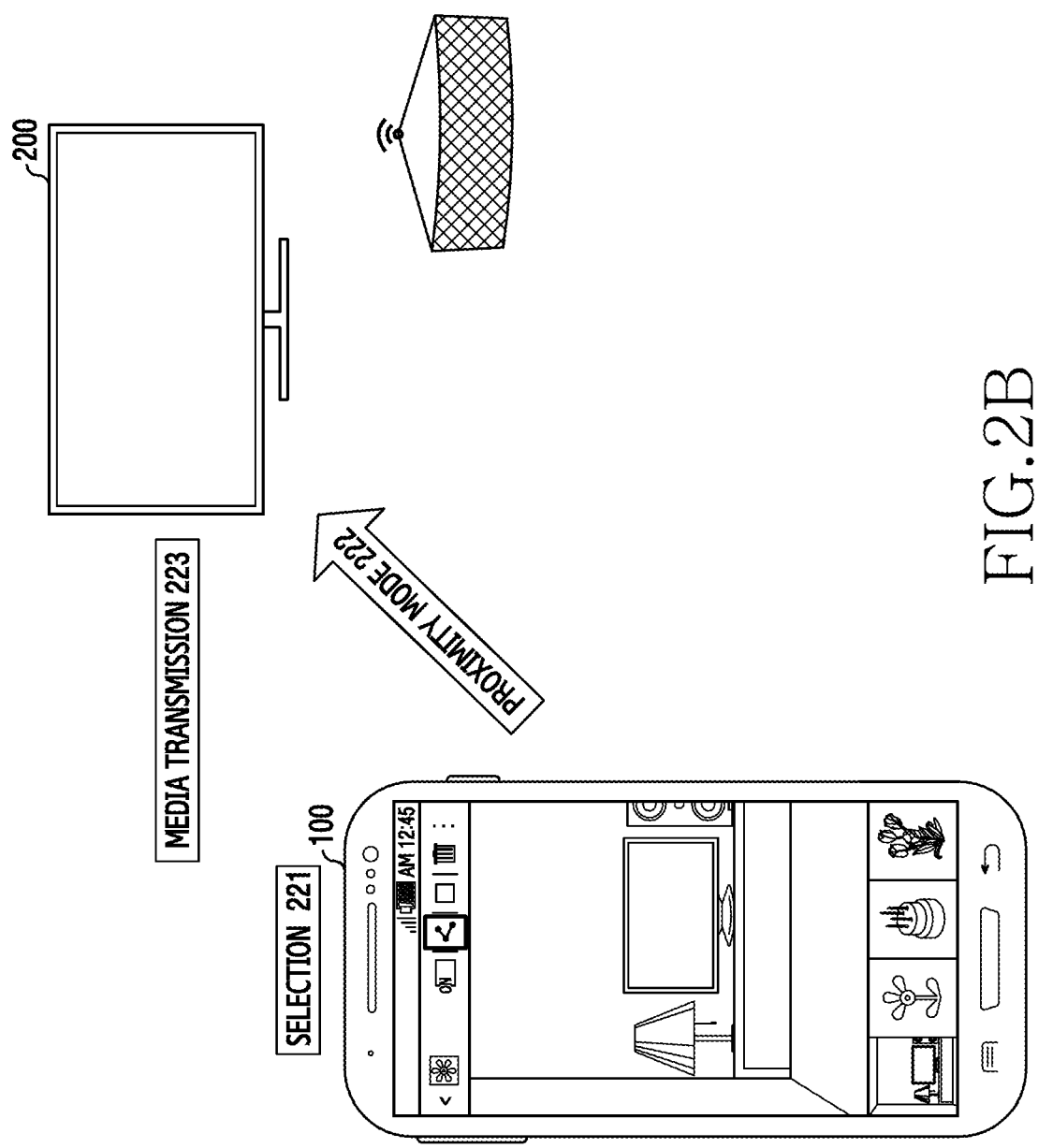
Figure 2C:
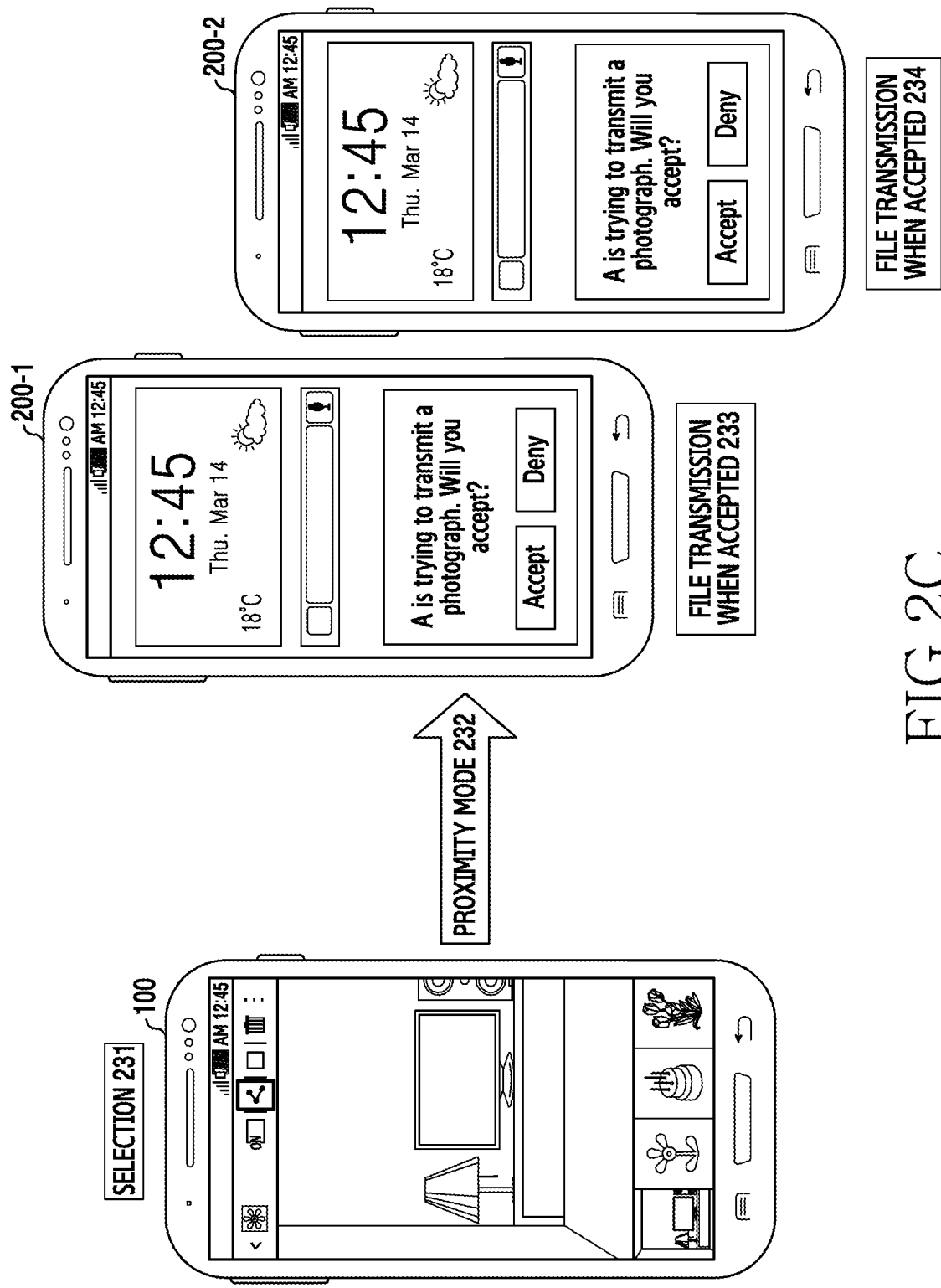

FIGS. 2A to 2C illustrate examples of a service sharing operation according to various embodiments of the present disclosure.

Referring to FIG. 2A, the first electronic device 100 and the second electronic device 200 may be smart phones. The electronic device 100 and the second electronic device 200 may share a file. When a service sharing intention is input by a user, for example, when so-called "Share via" is selected in operation 211, the first electronic device 100 performs a proximity mode operation in operation 212. As a result of execution of the proximity mode operation, the first electronic device 100 scans for the second electronic device 200. When the service is accepted by the second electronic device 200 in operation 213, the first electronic device 100 transmits a file to the electronic devices 200-1 and 200-2. Then, the first electronic device 100 and the second electronic device 200 share the file in operation 214.

Referring to FIG. 2B, the first electronic device 100 may be a smart phone, and the second electronic device 200 may be smart TV or a speaker. The electronic device 100 and the second electronic device 200 may share a media content (video or sound source). When a service sharing intention is input by a user, for example, when so-called "Share via" is selected in operation 221, the first electronic device 100 performs a proximity mode operation in operation 222. As a result of execution of the proximity mode operation, the first electronic device 100 scans for and discovers the second electronic device 200. The electronic device 100 transmits a media content to the discovered electronic device 200 in operation 223.

Referring to FIG. 2C, the first electronic device 100 and the electronic devices 200-1 and 200-2 may be smart phones. The electronic device 100 and the electronic devices 200-1 and 200-2 may share a file. When a service sharing intention is input by a user, for example, when so-called "Share via" is selected in operation 231, the first electronic device 100 performs a proximity mode operation in operation 232. As a result of execution of the proximity mode operation, the first electronic device 100 scans for the electronic devices 200-1 and 200-2. When the service is accepted by the electronic devices 200-1 and 200-2 in operations 233 and 234, the first electronic device 100 transmits a file to the electronic devices 200-1 and 200-2. Then, the first electronic device 100 and the electronic devices 200-1 and 200-2 share the file.

Figure 3:
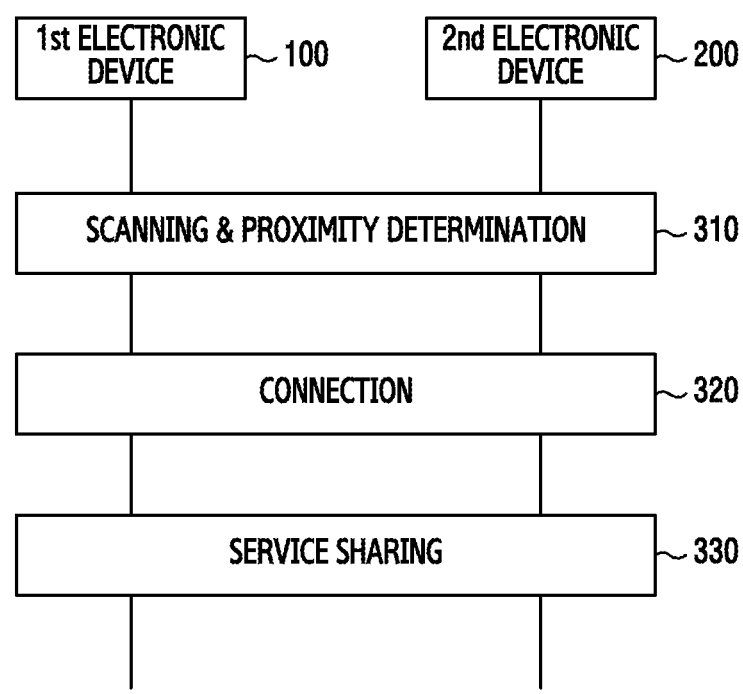
FIG. 3 illustrates a flow of a service sharing operation according to various embodiments of the present disclosure.

FIG. 3 illustrates a flow of a service sharing operation according to various embodiments of the present disclosure.

Referring to FIG. 3, in operation 310, the first electronic device 100 scans for the second electronic device 200 for service sharing and determines the proximity of the discovered second electronic device 200. The scanning operation may be performed according to at least one scheme selected from among a plurality of schemes (e.g., BLE, Bluetooth, Wi-Fi, and WiGig), without being limited thereto. According to an embodiment, the first electronic device 100 scans for a target electronic device, using a signal of a low-power wireless communication scheme (e.g., BLE) (see FIGS. 6 to 7C). According to an embodiment, the first electronic device 100 scans for a target electronic device, using a signal of a low-power wireless communication scheme (e.g., BLE) and a voice (sound) signal (see FIGS. 8 to 16C). According to an embodiment, the first electronic device 100 scans for a target electronic device, using a signal of an ultra-high frequency band (e.g., 60 gigahertz (GHz) according to WiGig scheme) (see FIGS. 17 to 26).

For convenience of description, an example of an operation of scanning for a target electronic device by one electronic device is representatively described below. However, it should be noted that the scanning operation according to embodiments of the present disclosure may be also applied to an operation of scanning for a plurality of target electronic devices by one electronic device.

Figure 27A:
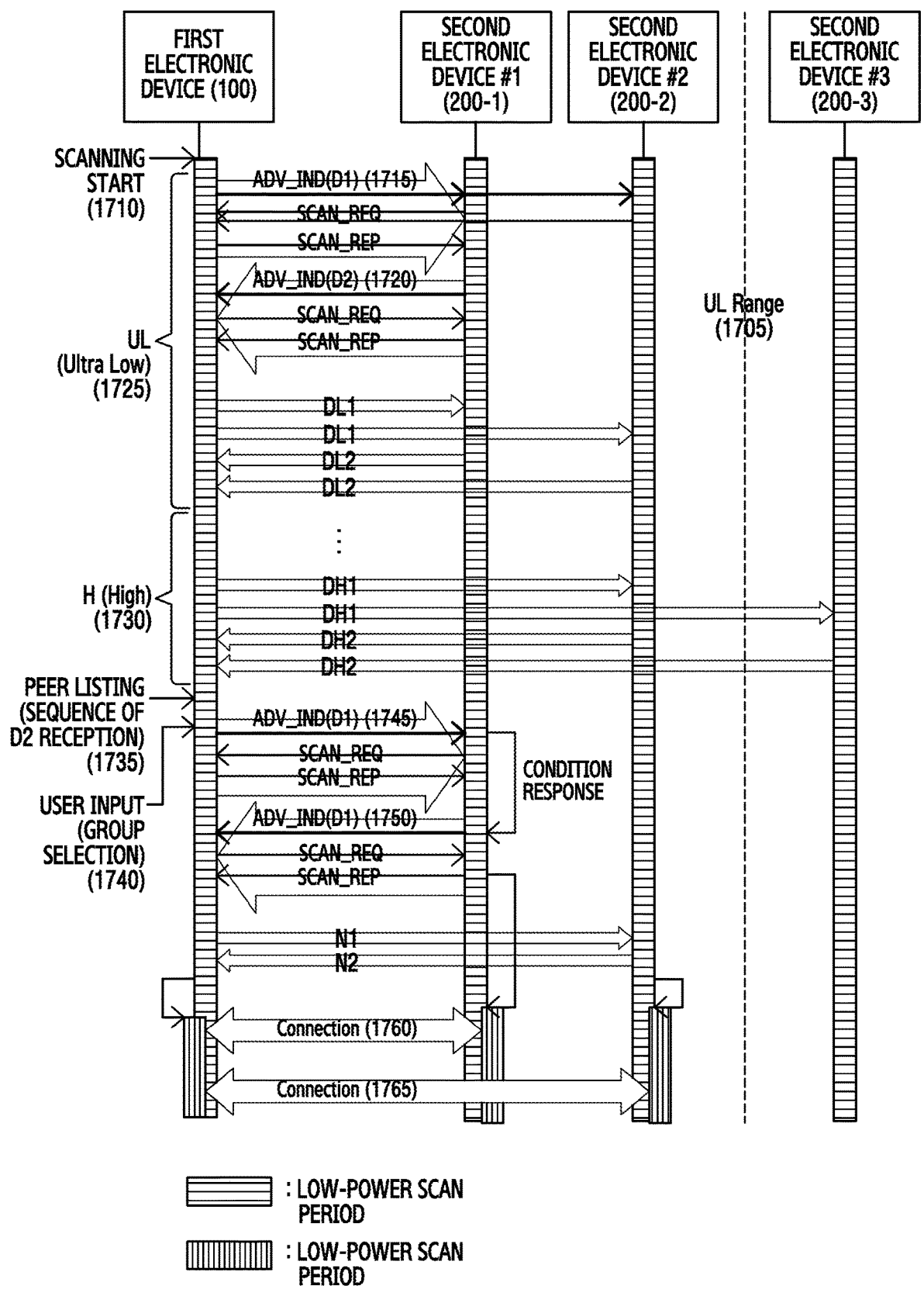
FIGS. 27A to 27C illustrate a specific flow of signals transmitted or received between electronic devices for a scanning operation according to an embodiment of the present disclosure.
Figure 27B:
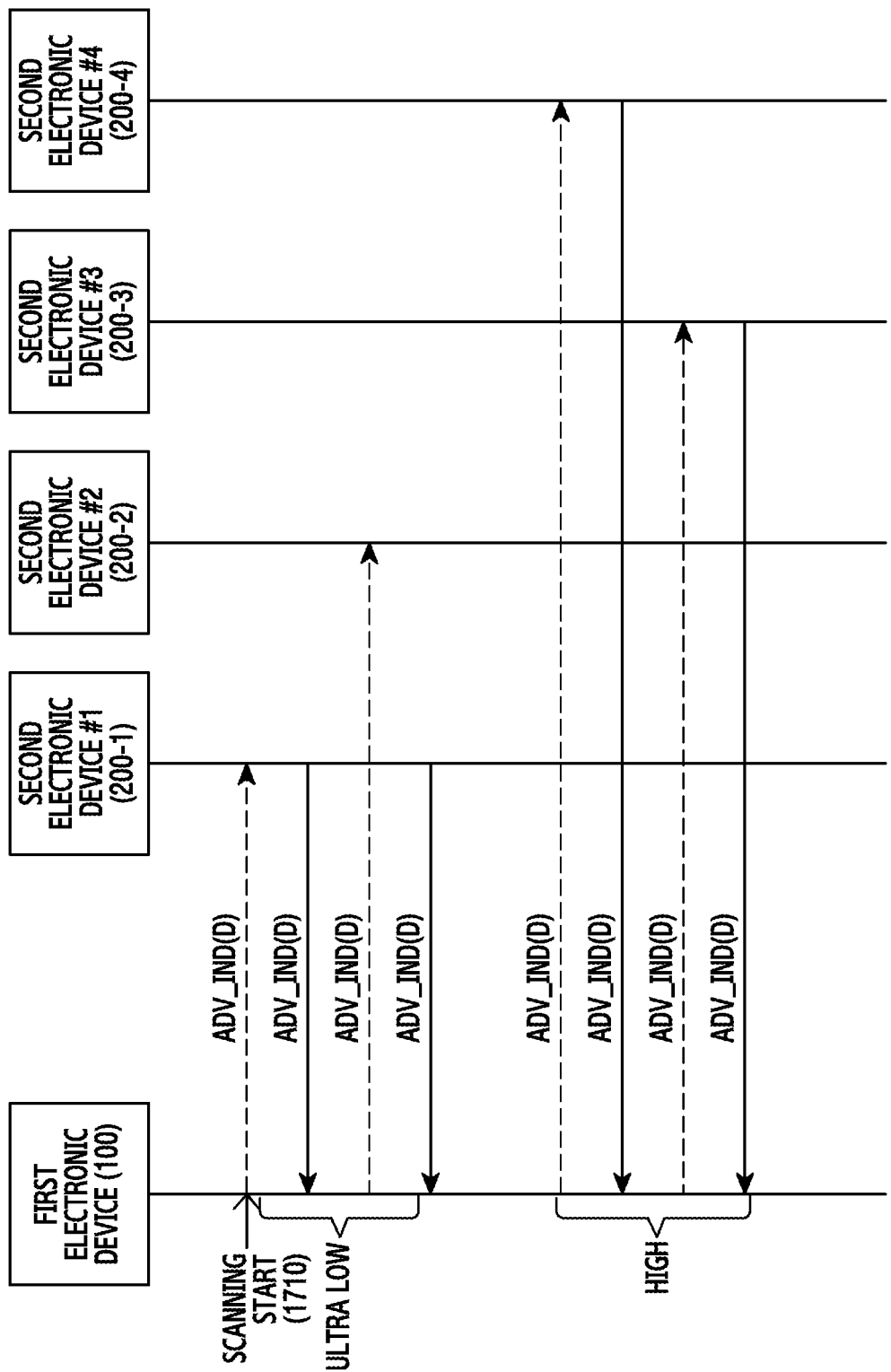
Figure 27C:
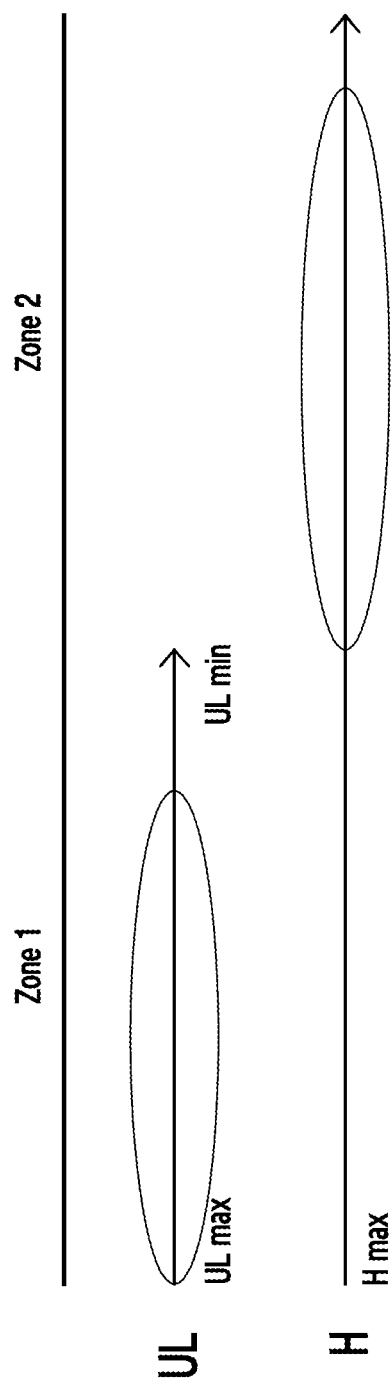

According to an embodiment, the first electronic device 100 scans for a plurality of target electronic devices, using a signal of a low-power wireless communication scheme (e.g., BLE) (see FIGS. 27A to 27C). When a plurality of target electronic devices are scanned, the first electronic device 100 may select only particular electronic devices from the discovered electronic devices. For example, the first electronic device may select one or more electronic devices having a signal intensity higher than or equal to a particular reference value. As another example, one or more electronic devices may be selected by a user from the plurality of electronic devices. As another example, one or more electronic devices may be selected by the user from one or more electronic devices having a signal intensity higher than or equal to a particular reference value among the plurality of electronic devices. For the selection by the user, information of the plurality of scanned electronic devices may be externally displayed. For example, the information of the plurality of electronic devices may be externally displayed as visual or auditory information. When the information of the plurality of electronic devices is displayed as visual information, the information of the plurality of electronic devices may have a form of a list or map. Further, when the plurality of electronic devices are formed into a group, electronic devices of the group may be selected. In operation 320, the first electronic device 100 connects to the second electronic device 200 based on a result of a determination of the proximity. The connection between the first electronic device 100 and the second electronic device 200 may be established according to at least one scheme selected from among a plurality of schemes (e.g., BLE, Bluetooth, Wi-Fi, WiGig and cellular (e.g., LTE or third generation (3G))), without being limited thereto. In an embodiment, the connection between the first electronic device 100 and the second electronic device 200 may be established in consideration of the attribute and/or capacity of the service to be shared. For example, in the case of requiring a wide bandwidth, like a video, the Wi-Fi direct may be selected while the Bluetooth is selected for the sound source. In an embodiment, the connection between the first electronic device 100 and the second electronic device 200 may be established in consideration of the distance (or the degree of proximity) between the first electronic device 100 and the second electronic device 200. For example, the Wi-Fi direct may be selected when the distance between the first electronic device 100 and the second electronic device 200 is a short distance, and the Wi-Fi or cellular (e.g., 3G or LTE) may be selected when the distance is a long distance.

In operation 330, the first electronic device 100 shares a service with the second electronic device 200. The service may include at least one content among a video, music, a file, a photograph, and an address book, without being limited thereto.

Figure 4:
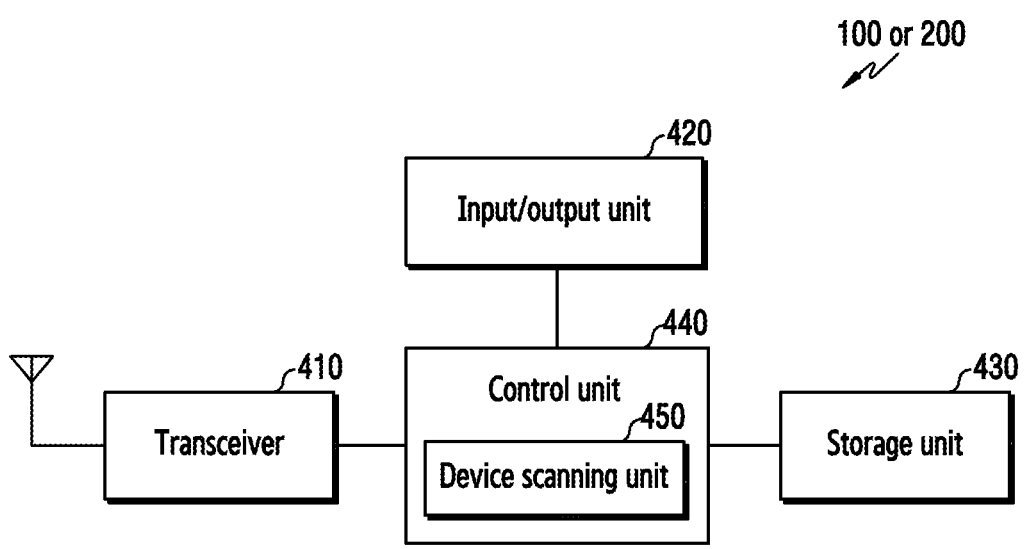
FIG. 4 illustrates a configuration of an electronic device for a service sharing operation according to various embodiments of the present disclosure.

FIG. 4 illustrates a configuration of an electronic device for a service sharing operation according to various embodiments of the present disclosure.

This figure is a view made by simplifying the configurations of the first electronic device 100 or the second electronic device 200 illustrated in FIGS. 1A and 1B in association with various embodiments of the present disclosure. The illustrated substance is just an example for describing the present disclosure and allows modified embodiments thereof, and thus should not be construed to limit the scope of the present disclosure.

Referring to FIG. 4, the electronic device includes a transceiver 410, an input/output unit 420, a storage unit 430, and a control unit 440, and the control unit 440 includes a device scanning unit 450.

The transceiver 410 generates a wireless signal and transmits the wireless signal to the outside through an antenna, and processes a wireless signal received from the outside. The transceiver 410 may support various communication schemes. For example, the transceiver 410 may support various communication schemes, such as BLE, Bluetooth, Wi-Fi, WiGig, and cellular (e.g., LTE). The transceiver 410 may be also referred to as a communication unit and, in some cases, may be illustrated in a form which includes a transmitter (or transmission unit or transmission processing circuit) and a receiver (or reception unit or reception processing circuit) separated from each other.

The input/output unit 420 provides an interface between the electronic device and a user. The input/output unit 420 may include elements for input of a touch, key, pen, voice (or audio), etc. The input/output unit 420 may include an element (e.g., display) for visual output and an element (e.g., speaker) for auditory output. The input/output unit 420 may provide an interface for a user's touch input/output. In detail, the input/output unit 420 may serve as a medium that transfers a user's touch input to the electronic device and shows an output of the electronic device to the user. The input/output unit 420 may provide a visual output to the user. The visual output may appear in the form of a text, a graphic, a video, or a combination thereof. The input/output unit 420 may employ various display techniques. For example, the input/output unit 420 may use a liquid crystal display (LDC), a light emitting diode (LED), a light emitting polymer display (LPD), an organic LED (OLED), an active matrix OLED (AMOLED), or a flexible LED (FLED).

The storage unit 430 includes a memory for storing information. The storage unit 430 stores information relating to operations of the electronic device. The storage unit 430 stores a program for a process flow for a service sharing operation according to an embodiment of the present disclosure and information according to the service sharing operation process.

The control unit 440 controls the operation of each element included in the electronic devices 100 and 200. The control unit 440 controls the device scanning unit 450 to scan for an electronic device for service sharing, and achieves sharing of a service by providing the service to at least one electronic device selected based on a result of the scanning. The control unit 440 controls service sharing operations according to the flow illustrated in FIG. 3 described above, the flows described below and illustrated in FIGS. 28A to 28B, 30A and 30B, 31A to 41, and 42 to 51, or described examples. The control unit 440 may be implemented by at least one processor.

The device scanning unit 450 scans for a target electronic device to share a service. For example, the device scanning unit 450 performs scanning operations according to the embodiment illustrated in FIGS. 6 to 7C, the embodiment illustrated in FIGS. 8 to 16C, the embodiment illustrated in FIGS. 17 to 26, or the embodiment illustrated in FIGS. 27A to 27C, which are described below. According to an embodiment, the device scanning unit 450 scans for a target electronic device, using a signal of a low-power wireless communication scheme (e.g., BLE) (see FIGS. 6 to 7C). According to an embodiment, the device scanning unit 450 scans for a target electronic device, using a signal of a low-power wireless communication scheme (e.g., BLE) and a voice (sound) signal (see FIGS. 8 to 16C). According to an embodiment, the device scanning unit 450 scans for a target electronic device, using a signal of an ultra-high frequency band (e.g., 60 GHz according to WiGig scheme) (see FIGS. 17 to 26). According to an embodiment, the device scanning unit 450 scans for a plurality of target electronic devices, using a signal of a low-power wireless communication scheme (e.g., BLE) (see FIGS. 27A to 27C).

According to an embodiment, a controller electronic device for a service sharing operation as described above includes a scanning unit 450 configured to, when sharing of a particular service is determined by a user, scan for at least one target electronic device among target electronic devices, and a transceiver 410 configured to transmit the particular service to the at least one electronic device.

In an embodiment, the particular service includes at least one content among a video, music, a file, a photograph, a web page, and an address book.

In an embodiment, the control unit 440 performs at least one operation among an operation of determining whether at least one of predetermined icons and buttons is input, an operation of recognizing whether a voice corresponding to a pre-stored voice is input, and an operation of recognizing whether a pre-designated gesture is input. In an embodiment, the scanning unit 450 determines, based on the at least one operation, whether sharing of the particular service is determined by the user. When sharing of the particular service is determined by the user, the scanning unit scans for the at least one target electronic device from the target electronic devices.

In an embodiment, the scanning unit 450 scans for the at least one target electronic device among the target electronic devices by at least one scheme selected from among a plurality of schemes (e.g., schemes of BLE, Bluetooth, Wi-Fi, and WiGig). The scanning unit 450 selects at least one connection scheme among the connection schemes of the BLE, Bluetooth, Wi-Fi, and WiGig, and scans for at least one target electronic device among the target electronic devices by the at least one connection scheme.

The scanning unit 450 selects, as the at least one connection scheme, a pre-configured connection scheme or a connection scheme of an activated state from among the connection schemes of the BLE, Bluetooth, Wi-Fi, and WiGig. When the configured connection scheme is a connection scheme of a deactivated state, the connection scheme of the deactivated state is activated before the connection.

When the BLE scheme is selected from the connection schemes of the BLE, the Bluetooth, the Wi-Fi, and the WiGig, the scanning unit 450 scans for the at least one target electronic device among the target electronic devices, using a low-power wireless signal or using a combination of the low-power wireless signal and a voice signal.

The scanning unit 450 transmits a scanning signal in order to scan for the at least one target electronic device. The scanning signal includes a reference threshold value for determining proximity-or-not. The reference threshold value may change according to the type of the service and the electronic device.

In an embodiment, the scanning unit 450 selects the at least one target electronic device existing in a pre-configured range from among target electronic devices. The at least one target electronic device includes a pre-configured target electronic device.

When the discovered target electronic devices are a plurality of target devices, the scanning unit 450 selects at least one target device among the plurality of target devices.

When the distance between the controller electronic device and a first target device among the plurality of target devices and the distance between the controller electronic device and a second target device among the plurality of target devices have a difference therebetween, which is larger than or equal to a reference value, the scanning unit 450 selects the first target device as the at least one target electronic device.

When the discovered target electronic devices are a plurality of target devices, the scanning unit 450 selects two or more target devices among the plurality of target devices. The input/output unit 420 displays information of the plurality of target devices to the outside of the controller electronic device. The control unit 440 selects two or more target devices from among the plurality of target devices in response to the displaying.

The input/output unit 420 visually displays information of the plurality of target devices on a display of the controller electronic device.

When the discovered target electronic devices are a plurality of target devices in units of groups, the scanning unit 450 selects target devices of a selected group.

In an embodiment, the input/output unit 420 externally displays execution of a proximity mode operation of scanning for the at least one target electronic device.

The input/output unit 420 displays an optical notification message or an auditory notification message, which indicates execution of the proximity mode operation, to the outside of the controller electronic device.

In an embodiment, the transceiver 410 establishes a wireless connection between the controller electronic device and the at least one target electronic device, and transmits the service to the wirelessly connected at least one target electronic device.

The transceiver 410 connects by wireless the controller electronic device and the at least one target electronic device through at least one connection scheme selected from a plurality of connection schemes.

When the at least one connection scheme is in a deactivated state, the transceiver 410 activates the at least one connection scheme.

The plurality of connection schemes include connection schemes of BLE, Bluetooth, Wi-Fi, WiGig, and cellular.

The transceiver 410 selects at least one connection scheme from the plurality of connection schemes, based on the type of the service or based on the distance between the at least one target electronic device and the controller electronic device according to a result of the scanning, and connects by wireless the controller electronic device and the at least one target electronic device through the at least one connection scheme.

In an embodiment, the input/output unit 420 externally displays notification information, which notifies of the wireless connection between the controller electronic device and the at least one target electronic device, to the at least one target electronic device among the controller electronic device and the at least one target electronic device.

Upon receiving a service sharing acceptance signal from the at least one target electronic device in response to the notification information, the transceiver 410 transmits the service to the at least one target electronic device.

When the at least one target electronic device is a pre-configured electronic device, the transceiver 410 transmits the service to the at least one target electronic device.

In an embodiment, the input/output unit 420 displays information relating to the provision of the service to the outside.

Figure 5:
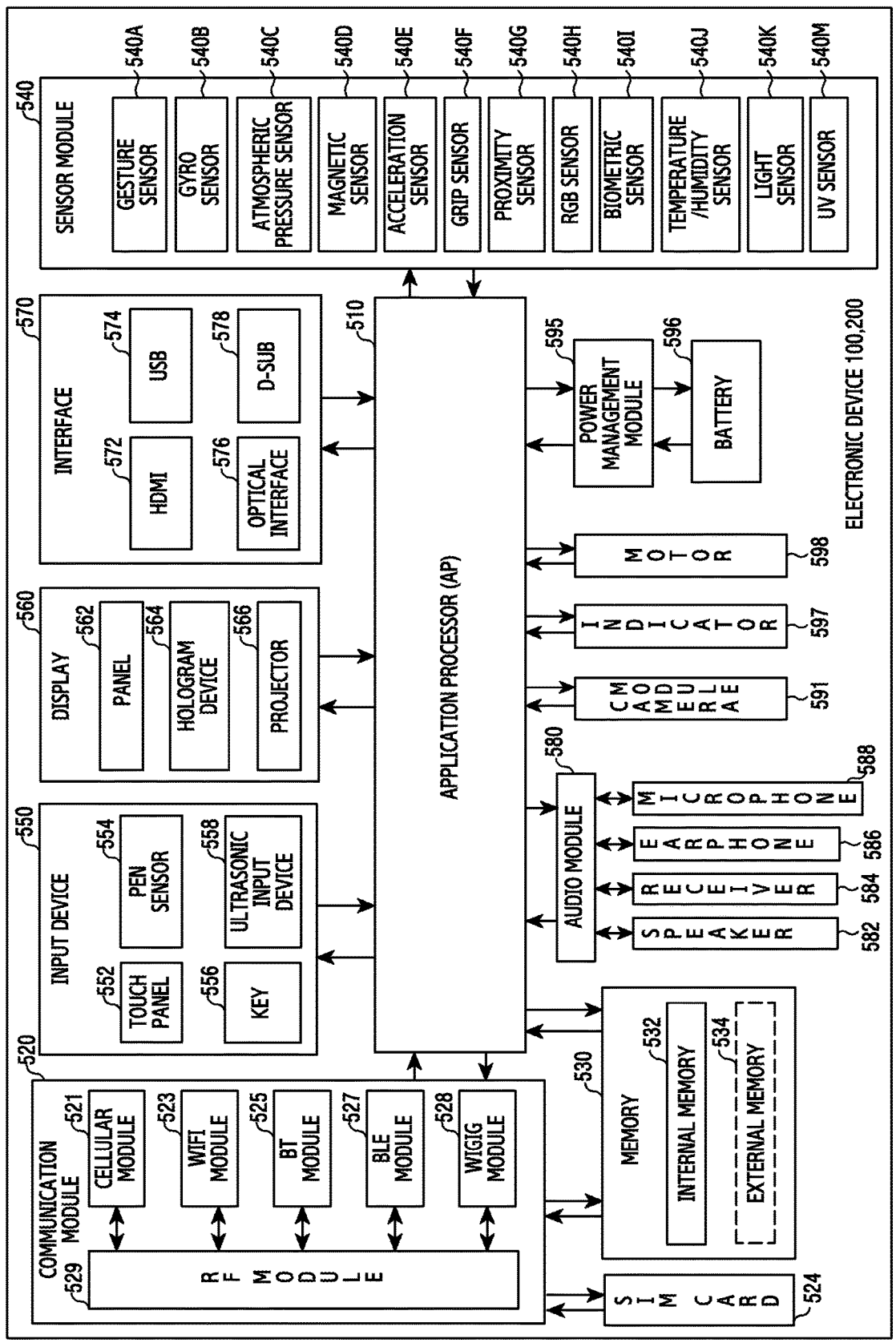
FIG. 5 illustrates elements of an electronic device for a service sharing operation according to various embodiments of the present disclosure.

FIG. 5 illustrates elements of an electronic device for a service sharing operation according to various embodiments of the present disclosure.

This figure illustrates in detail the configuration of the first electronic device 100 or the second electronic device 200 illustrated in FIGS. 1A and 1B. The illustrated substance is just an example for describing the present disclosure and allows modified embodiments thereof, and thus should not be construed to limit the scope of the present disclosure.

Referring to FIG. 5, the electronic device may include at least one application processor (AP) 510, a communication module 520, a subscriber identification module (SIM) card 524, a memory 530, a sensor module 540, an input device 550, a display 560, an interface 570, an audio module 580, a camera module 591, a power management module 595, a battery 596, an indicator 597, and a motor 598.

The AP 510 may control a plurality of hardware or software component elements connected to the AP 510 by driving an operating system or an application program, and perform processing of various pieces of data including multimedia data and calculations. The AP 510 may be implemented by, for example, a system on chip (SoC). According to an embodiment, the AP 510 may further include a graphics processing unit (GPU) (not shown).

The communication module 520 may perform data transmission/reception in communication with other electronic devices connected to the electronic device through a network. According to an embodiment, the communication module 520 may include a cellular module 521, a Wi-Fi module 523, a Bluetooth module 525, a BLE module 527, a 60 GHz or WiGig module 528, and a radio frequency (RF) module 529.

The cellular module 521 may provide a voice call, a video call, a text service, an Internet service, and the like through a communication network (for example, LTE, LTE-advanced (LTE-A), CDMA, wideband CDMA (WCDMA), universal mobile telecommunications system (UMTS), wireless broadband (WiBro), GSM, or the like). Further, the cellular module 521 may distinguish and authenticate an electronic device within a communication network using, for example, a subscriber identification module. According to an embodiment, the cellular module 521 may perform at least a part of functions that may be provided by the AP 510. For example, the cellular module 521 may perform at least a part of a multimedia control function.

According to an embodiment, the cellular module 521 may include a communications processor (CP). Also, the cellular module 521 may be implemented by, for example, an SoC. According to an embodiment, the AP 510 may be implemented to include at least a part (e.g., cellular module 521) of the elements described above.

According to an embodiment, the AP 510 or the cellular module 521 (for example, a CP) may load instructions or data received from at least one of a non-volatile memory and other components connected thereto into a volatile memory and process the loaded instructions or data. Further, the AP 510 or the cellular module 521 may store data received from or generated by at least one of the other component elements in a non-volatile memory.

Each of the Wi-Fi module 523, the Bluetooth module 525, the BLE module 527, and the WiGig module 528 may include, for example, a processor for processing data transmitted/received through a corresponding module. According to an embodiment, at least some (e.g., two or more) of the cellular module 521, the Wi-Fi module 523, the Bluetooth module 525, the BLE module 527, and the WiGig module 528 may be included in one integrated chip (IC) or IC package. For example, at least some (e.g., a CP corresponding to the cellular module 521 and a Wi-Fi processor corresponding to the Wi-Fi module 523) of the processors corresponding to the cellular module 521, the Wi-Fi module 523, the Bluetooth module 525, the BLE module 527, and the WiGig module 528 may be implemented by one SoC.

The RF module 529 may transmit or receive data, for example, an RF signal. Although not illustrated, the RF module 529 may include, for example, a transceiver, a power amp module (PAM), a frequency filter, a low noise amplifier (LNA) or the like. Furthermore, the RF module 529 may further include a component for transmitting/receiving electronic waves over a free air space in wireless communication, for example, a conductor, a conducting wire or the like. According to an embodiment, at least one of the cellular module 521, the Wi-Fi module 523, the Bluetooth module 525, the BLE module 527, and the WiGig module 528 may transmit/receive an RF signal through a separate RF module.

The SIM card 524 may be a card including a SIM, and may be inserted into a slot formed at a particular position of the electronic device. The SIM card 524 may include unique identification information (for example, an integrated circuit card identifier (ICCID)) or subscriber information (for example, an international mobile subscriber identity (IMSI)).

The memory 530 may include an internal memory 532 or an external memory 534. The internal memory 532 may include at least one of a volatile memory (for example, a dynamic random access memory (DRAM), a static RAM (SRAM), a synchronous DRAM (SDRAM), and the like) and a non-volatile memory (for example, a one time programmable read only memory (OTPROM), a PROM, an erasable and programmable ROM (EPROM), an electrically erasable and programmable ROM (EEPROM), a mask ROM, a flash ROM, a NAND flash memory, a NOR flash memory, and the like).

According to an embodiment, the internal memory 532 may be a solid state drive (SSD). The external memory 534 may further include a flash drive, for example, a compact flash (CF), a secure digital (SD), a micro-SD, a mini-SD, an extreme digital (xD), a memory stick or the like. The external memory 534 may be functionally connected with the electronic device through various interfaces. According to an embodiment, the electronic device may further include a storage device (or storage medium) such as a hard drive.

The sensor module 540 may measure physical quantities or sense an operation state of the electronic device, and convert the measured or sensed information to electric signals. The sensor module 540 may include, for example, at least one of a gesture sensor 540A, a gyro sensor 540B, an atmospheric pressure sensor 540C, a magnetic sensor 540D, an acceleration sensor 540E, a grip sensor 540F, a proximity sensor 540G, a color sensor 540H (for example, a red, green, blue (RGB) sensor), a biometric sensor 540I, a temperature/humidity sensor 540J, a light sensor 540K, and a ultraviolet (UV) sensor 540M. Additionally or alternatively, the sensor module 540 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 540 may further include a control circuit for controlling at least one sensor included therein.

The input device 550 may include a touch panel 552, a (digital) pen sensor 554, a key 556, or an ultrasonic input device 558. The touch panel 552 may recognize a touch input through at least one of, for example, a capacitive scheme, a resistive scheme, an infrared scheme, and an ultrasonic scheme. Further, the touch panel 552 may further include a control circuit. A capacitive touch panel may recognize a physical contact or proximity. The touch panel 552 may further include a tactile layer. In this event, the touch panel 552 may provide a tactile response to the user.

The (digital) pen sensor 554 may be embodied, for example, using a method identical or similar to a method of receiving a touch input of a user, or using a separate recognition sheet. The key 556 may include, for example, a physical button, an optical key, or a keypad. The ultrasonic input device 558 may identify data by detecting an acoustic wave by a microphone (for example, the microphone 588) in the electronic device, through an input unit generating an ultrasonic signal, and may perform wireless recognition. According to an embodiment, the electronic device may also receive a user input from an external device (e.g., computer or server) connected thereto, using the communication module 520.

The display 560 may include a panel 562, a hologram 564, or a projector 566. The panel 562 may be, for example, an LCD and an AM-OLED display, and the like. The panel 562 may be implemented so as to be, for example, flexible, transparent, or wearable. The panel 562 may include the touch panel 552 and one module. The hologram device 564 may show a stereoscopic image in the air by using interference of light. The projector 566 may project light onto a screen to display an image. For example, the screen may be located inside or outside the electronic device. According to an embodiment, the display 560 may further include a control circuit for controlling the panel 562, the hologram device 564, or the projector 566.

The interface 570 may include, for example, a high-definition multimedia interface (HDMI) 572, a universal serial bus (USB) 574, an optical interface 576, or a D-sub-miniature (D-sub) 578. Additionally or alternatively, the interface 570 may include, for example, a mobile high-definition link (MI-IL) interface, an SD card/multimedia card (MMC) interface, or an IrDA standard interface.

The audio module 580 may bidirectionally convert a sound and an electric signal. The audio module 580 may process sound information input or output through, for example, a speaker 582, a receiver 584, an earphone 586, the microphone 588, or the like.

The camera module 591 is a device for photographing a still image and video, and according to an embodiment, may include one or more image sensors (for example, a front sensor or a rear sensor), a lens (not illustrated), an image signal processor (ISP) (not illustrated), or a flash (for example, an LED or a xenon lamp, not illustrated).

The power management module 595 may manage power of the electronic device. Although not illustrated, the power management module 595 may include, for example, a power management IC (PMIC), a charger IC, or a battery or fuel gauge.

The PMIC may be mounted to, for example, an integrated circuit or an SoC semiconductor. Charging methods may be classified into a wired charging method and a wireless charging method. The charger IC may charge a battery and prevent over voltage or over current from a charger. According to an embodiment, the charger IC may include a charger IC for at least one of the wired charging and the wireless charging. Examples of the wireless charging may include magnetic resonance charging, magnetic induction charging, and electromagnetic wave charging, and an additional circuit such as a coil loop, a resonance circuit, and a rectifier may be added for the wireless charging.

The battery gauge may measure, for example, the remaining amount of the battery 596, a charging voltage and current, or temperature. The battery 596 may store or generate electricity, and may supply power to the electronic device by using the stored or generated electricity. The battery 696 may include, for example, a rechargeable battery or a solar battery.

The indicator 597 may display a specific status of the electronic device or a part (e.g. The AP 510) thereof, for example, a booting status, a message status, a charging status, and the like. The motor 598 may convert an electrical signal into a mechanical vibration. Although not illustrated, the electronic device may include a processing unit (for example, a GPU) for supporting a mobile TV. The processing device for supporting a mobile TV may process media data according to a standard of digital multimedia broadcasting (DMB), digital video broadcasting (DVB), media flow or the like.

Each of the above described elements of the electronic device according to various embodiments of the present disclosure may be formed of one or more components, and the name of a corresponding element may vary according to the type of an electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

Figure 6:
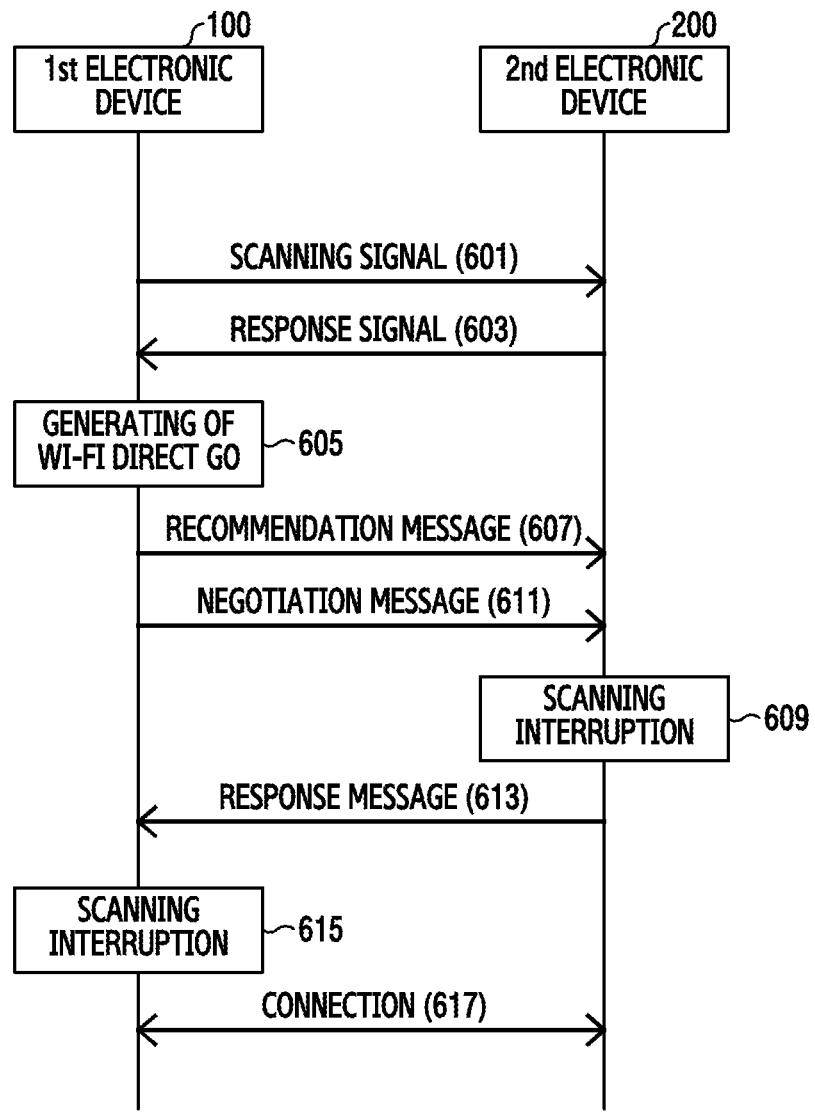
FIG. 6 illustrates a flow of signals transmitted or received between electronic devices for a scanning operation according to an embodiment of the present disclosure.

FIG. 6 illustrates a flow of signals transmitted or received between electronic devices for a scanning operation according to an embodiment of the present disclosure.

Referring to FIG. 6, the second electronic device 200 receives a scanning signal 601 transmitted by the first electronic device 100 in order to scan for one or more other electronic devices. The first electronic device 100 may periodically transmit a scanning signal 601 for scanning for the at least one electronic device on a background.

The scanning signal 601 is transmitted according to a predetermined cycle and may be at least one of a communication signal and a sound signal of a frequency band other than the audio frequency band. The scanning signal 601 may include at least one among the type of the first electronic device, a communication scheme supportable by the first electronic device, a function of the first electronic device, a reception signal intensity threshold value for the scanning signal, a cycle for transmission of the scanning signal, an interval in which the first electronic device receives a response signal to the scanning signal after transmitting the scanning signal, a cycle of occurrence of the interval for receiving the response signal, information on a content which is being reproduced by the first electronic device, a threshold value of the reception signal intensity according to the content, an identifier (ID) of the first electronic device, a phone number of the first electronic device, a list of one or more contents transmissible by the first electronic device; the kind of each of the one or more contents, a volume of each of the one or more contents, a predicted transmission time of each of the one or more contents, the amount of battery consumption by transmission of each of the one or more contents, the amount of resources consumed by transmission of each of the one or more contents, and information notifying that the first electronic device has an authority for configuration of a communication scheme of the second communication unit.

The second electronic device 200 transmits, to the first electronic device 100, a response signal 603 to the scanning signal 601 received from the first electronic device 100.

The response signal 603 may be transmitted based on an interval in which the first electronic device 100 receives the response signal 603. The response signal 603 may be at least one of a communication signal and a sound signal of a frequency band other than the audio frequency band. The response signal 603 may include at least one among the type of the second electronic device 200, a communication scheme supportable by the second electronic device 200, a function of the second electronic device 200, a reception signal intensity threshold value for the response signal 603, information on a content which is being reproduced by the second electronic device 200, a threshold value of a reception signal intensity according to the content, an ID of the second electronic device 200, a phone number of the second electronic device 200, a list of one or more contents transmissible by the second electronic device 200, the kind of each of the one or more contents, the capacity of each of the one or more contents, a predicted transmission time of each of the one or more contents, the amount of battery consumption by transmission of each of the one or more contents, and the amount of resources consumed by transmission of each of the one or more contents.

The first electronic device 100 generates group owner (GO) configuration information for configuring a GO for Wi-Fi direct connection based on the response signal 603. For example, when the first electronic device 100 and the second electronic device 200 support the Wi-Fi communication scheme, the first electronic device may generate GO configuration information for configuring a GO for Wi-Fi direct connection in operation 605. The Wi-Fi direct GO refers to an electronic device, which has an authority relating to configuration of the Wi-Fi direct, among a plurality of electronic devices connected through the Wi-Fi direct. The first electronic device 100 transmits, to the second electronic device 200, a recommendation message 607 requesting connection to the second electronic device 200. The recommendation message 607 includes the GO configuration information. For example, the recommendation message 607 may include GO configuration information indicating that the first electronic device 100 is the GO.

According to an embodiment of the present disclosure, the scanning signal 601 may include a signal threshold value for determining, by the second electronic device 200, whether the first electronic device 100 is in the proximity thereof. For example, based on the signal threshold value included in the scanning signal 601 transmitted by the first electronic device 100, the second electronic device may determine whether the first electronic device 100 is located within a distance corresponding to the signal threshold value.

After transmitting the recommendation message 607, the first electronic device 100 transmits a negotiation message 611 for communication connection with the second electronic device 200 to the second electronic device 200. The scanning signal 601, the response signal 603, the recommendation message 607, and the negotiation message 611 may be transmitted or received through low-power communication units of the first electronic device 100 and the second electronic device 200. When the recommended message 607 is received from the first electronic device 100, the second electronic device 200 interrupts the scanning signal transmission through the low-power communication unit in operation 609.

The second electronic device 200 transmits, to the first electronic device 100, a response message 613 as a response to the negotiation message 611. Upon receiving the response message 613, the first electronic device 100 interrupts the periodic transmission of the scanning signal in operation 615. After exchanging the negotiation messages 611 and 613, the first electronic device 100 and the second electronic device 200 are connected to each other through a wireless local area network (LAN) in operation 617.

According to an embodiment of the present disclosure, the first electronic device 100 may generate the GO configuration information at the time of or before transmitting the negotiation message 611. Therefore, by generating the GO configuration information after transmitting the negotiation message 611, the first electronic device 100 can avoid a delay in the connection with the second electronic device 200. That is, by generating the GO configuration information at the time of or before transmitting the negotiation message 611, the first electronic device 100 can call a function for removal of a pop-up after securing a sufficient time during the transmission of the negotiation message 611 even when the generation of the GO configuration information is delayed, and thus can be connected with the second electronic device 200 through a wireless LAN without a delay.

Figure 7A:
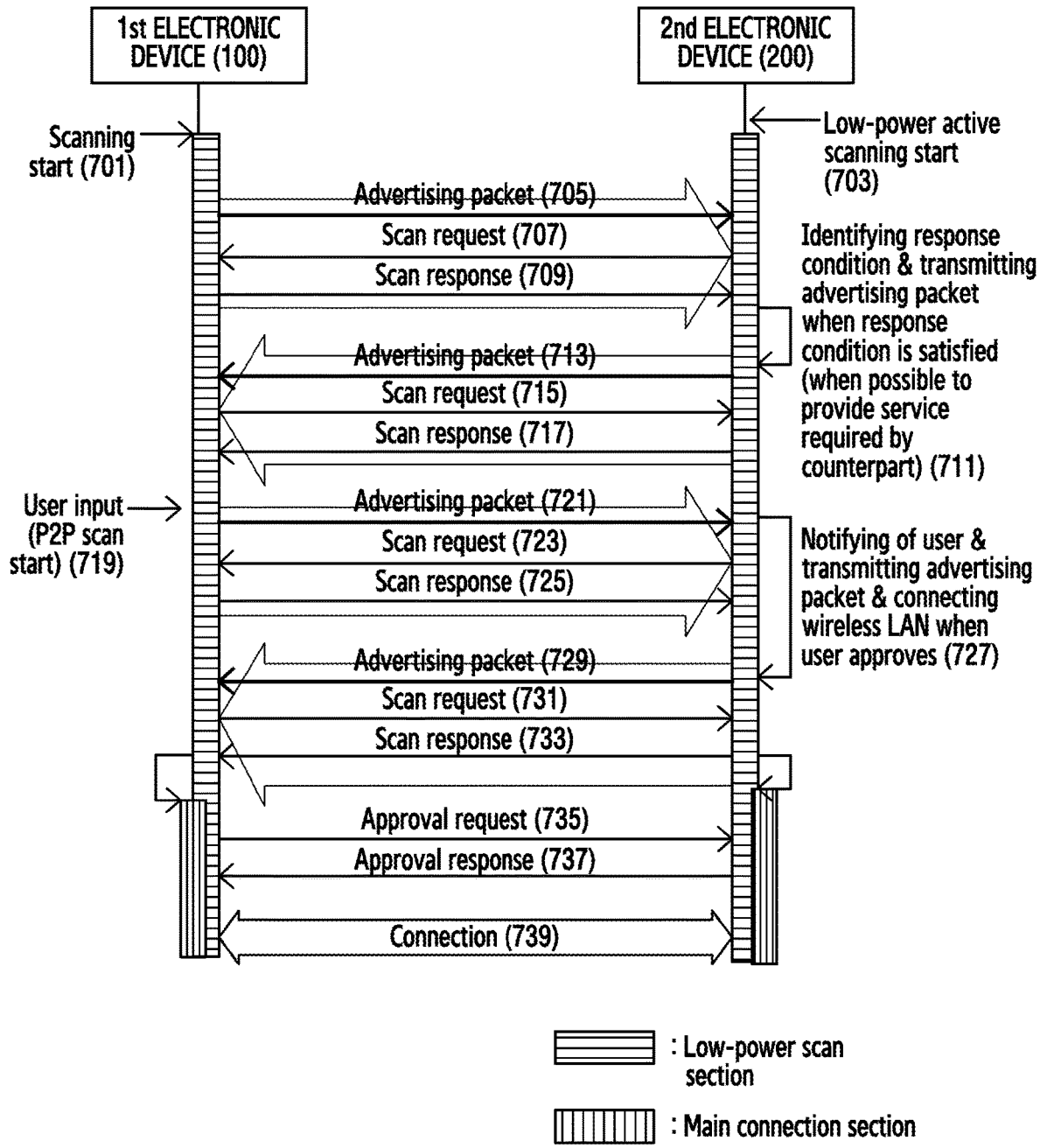
FIGS. 7A to 7C illustrate a specific flow of signals transmitted or received between electronic devices for a scanning operation according to an embodiment of the present disclosure.
Figure 7B:
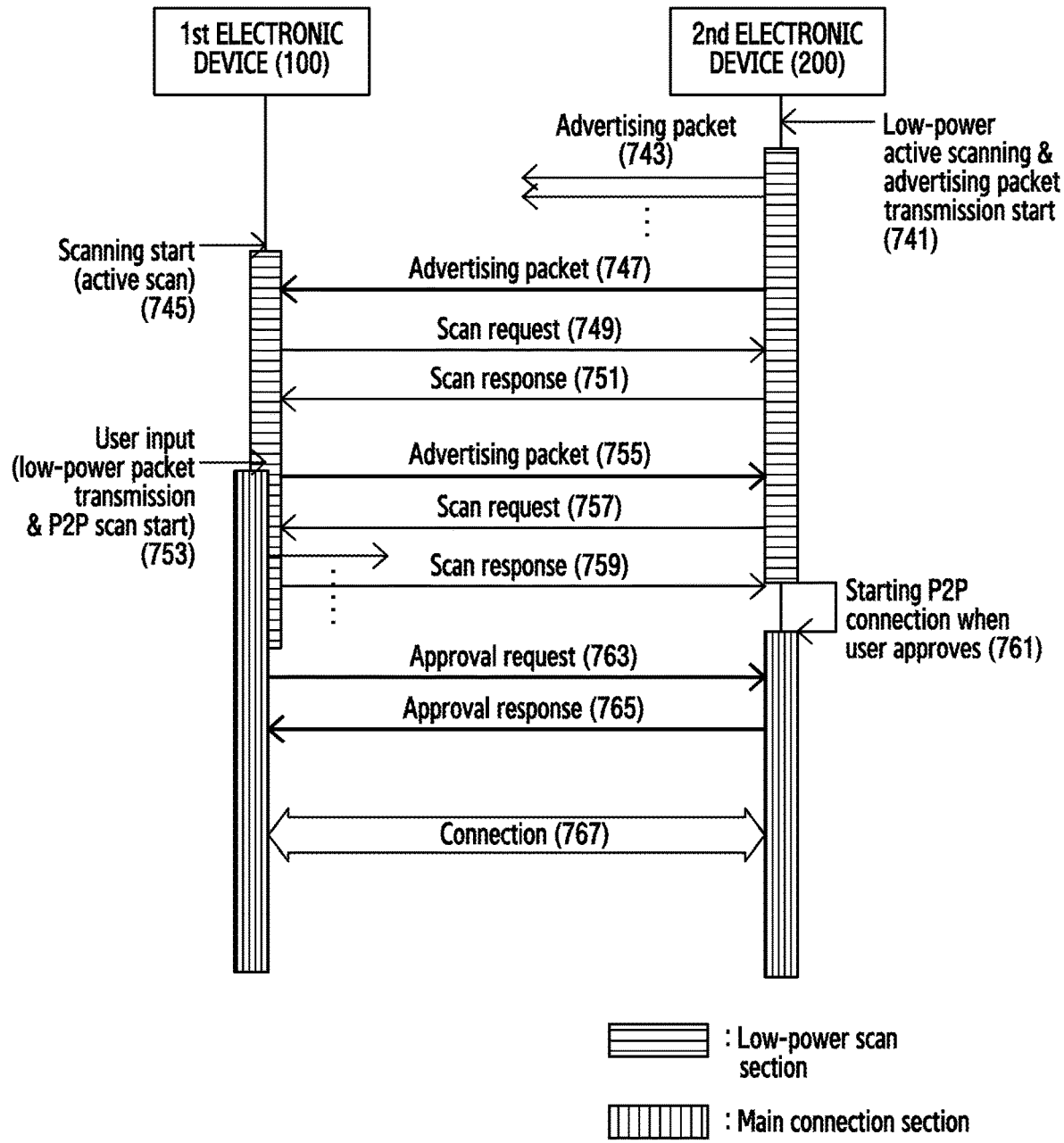
Figure 7C:
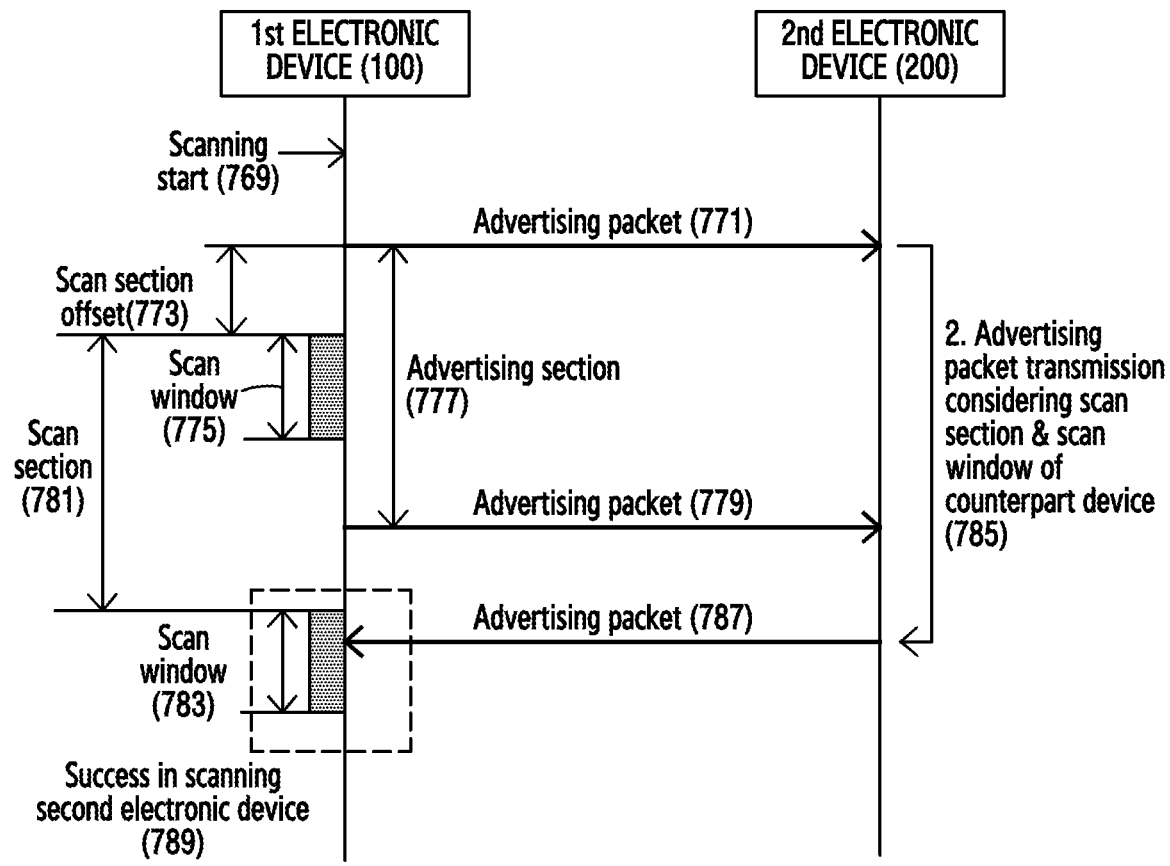

FIGS. 7A to 7C illustrate a specific flow of signals transmitted or received between electronic devices for a scanning operation according to an embodiment of the present disclosure.

Referring to FIG. 7A, the first electronic device 100 starts scanning of at least one different electronic device in operation 701. The first electronic device 100 may start the scanning in operation 701 when an application, which requires inter-working with the at least one different electronic device, is executed. According to an embodiment of the present disclosure, the first electronic device 100 may activate a low-power communication unit thereof when starting the scanning in operation 701. For example, the first electronic device 100 may activate a BLE module. The second electronic device 200 may start low-power active scanning by activating the low-power communication unit in operation 703. For example, the second electronic device 200 may activate a BLE module.

The first electronic device 100 transmits an advertising packet 705 to the second electronic device 200 through the low-power communication unit. According to an embodiment of the present disclosure, the advertising packet 705 may include information by which it is possible to determine whether the second electronic device 200 can inter-work with the first electronic device 100. For example, the advertising packet 705 may include information on functions of the first electronic device 100. When the second electronic device 200 can inter-work with the first electronic device 100, the advertising packet 705 may include a message requesting transmission of the advertising packet to the first electronic device 100.

After receiving the advertising packet 705, the second electronic device 200 transmits a scan request message 707 to the first electronic device 100 through the low-power communication unit. The first electronic device 100 transmits a scan response message 709 to the second electronic device 200 as a response to the scan request message 707.

The second electronic device 200 identifies a response condition included in the advertising packet 705 in operation 711. For example, the second electronic device 200 may identify the function information of the first electronic device 100 included in the advertising packet 705. Through the function information, the second electronic device 200 may determine whether the second electronic device can inter-work with the first electronic device 100. Through the function information, the second electronic device 200 may determine whether the second electronic device can mirror a content reproduced by the first electronic device 100.

When the second electronic device 200 can inter-work with the first electronic device 100, the second electronic device 200 transmits an advertising packet 713 to the first electronic device 100. The first electronic device 100 receives the advertising packet 713 from the second electronic device 200 and transmits a scan request message 715 to the second electronic device 200. The second electronic device 200 transmits, to the first electronic device 100, a scan response message 717 as a response to the scan request message 715. The first electronic device 100 may display a user interface (UI) notifying that the second electronic device 200 can inter-work with the first electronic device 100.

When there is a user input in operation 719, the first electronic device 100 starts a peer-to-peer (P2P) scan. For example, when a user's touch input onto a touch screen of the first electronic device 100 is recognized, the first electronic device 100 transmits an advertising packet 721 to the second electronic device 200. According to an embodiment of the present disclosure, the advertising packet 721 may include a message requesting connection through a main connection scheme (e.g., wireless LAN or Wi-Fi). For example, the advertising packet 721 may include a message requesting connection with the first electronic device 100 through the Wi-Fi scheme. The second electronic device 200 receives the advertising packet 721 and transmits a scan request message 723 to the first electronic device 100. The first electronic device 100 transmits a scan response message 725 to the second electronic device 200 as a response to the scan request message 723.

After receiving the advertising packet 721, the second electronic device 200 notifies the user of the request for the connection through a wireless LAN from the first electronic device 100 in operation 727. For example, the second electronic device 200 may display a UI which inquires of the user whether to connect with the first electronic device 100 through the wireless LAN. When there is an input from the user, which approves the connection with the first electronic device 100 through the wireless LAN, the second electronic device 200 transmits an advertising packet 729 to the first electronic device 100. The advertising packet 729 may include a message notifying that the second electronic device 200 has approved the connection with the first electronic device 100 through the wireless LAN. The first electronic device 100 receives the advertising packet 729 and transmits a scan request message 731 to the second electronic device 200. The second electronic device 200 transmits a scan response message 733 to the first electronic device 100 as a response to the scan request message 731.

The first electronic device 100 transmits an approval request message 735 to the second electronic device 200 through the wireless LAN. The second electronic device 200 transmits an approval response message 737 to the first electronic device 100 as a response to the approval request message 735. Here, the first electronic device 100 and the second electronic device 200 are connected to each other through a wireless LAN in operation 739.

Referring to FIG. 7B, when the low-power communication unit is activated by a user's input, the second electronic device 200 according to an embodiment of the present disclosure starts low-power active scanning and advertising packet transmission in operation 741. For example, when the user activates the BLE module of the second electronic device 200, the second electronic device 200 transmits the advertising packet 743 according to a predetermined cycle.

When an application requiring a P2P communication is executed, the first electronic device 100 according to an embodiment of the present disclosure starts to scan for at least one another electronic device in operation 745. Here, the first electronic device 100 receives an advertising packet 747 transmitted by the second electronic device 200. According to an embodiment of the present disclosure, the advertising packet 747 may include information on functions of the second electronic device 200 and information on communication schemes supportable by the second electronic device 200. For example, when the second electronic device 200 is a smart phone capable of supporting a Wi-Fi communication, the advertising packet 747 may include information notifying that the second electronic device 200 can support a Wi-Fi communication and has a function of outputting an image and voice. The first electronic device 100 transmits a scan request message 749 to the second electronic device 200. The second electronic device 200 transmits a scan response message 751 to the first electronic device 100 as a response to the scan request message 749.

The first electronic device 100 may determine, through the advertising packet 747 received from the second electronic device 200, whether the second electronic device 200 can inter-work with the first electronic device 100. For example, the first electronic device 100 may determine whether the second electronic device 200 can mirror a content reproduced by the first electronic device 100. Further, the first electronic device 100 may determine a communication scheme which enables a connection with the second electronic device 200.

According to an embodiment of the present disclosure, the first electronic device 100 may display a UI for notifying a user that the second electronic device 200 can inter-work with the first electronic device 100.

When an input from the user is detected, the first electronic device 100 starts low-power advertising packet transmission and P2P scan in operation 753. For example, when the user's touch input onto a touch screen of the first electronic device 100 is recognized, the first electronic device 100 transmits an advertising packet 755 to the second electronic device 200. According to an embodiment of the present disclosure, the advertising packet 755 may include a message requesting the second electronic device 200 to establish a connection through the Wi-Fi scheme. Then, the first electronic device 100 may activate a wireless LAN module. The second electronic device 200 transmits a scan request message 757 to the first electronic device 100. The first electronic device 100 transmits a scan response message 759 to the second electronic device 200 as a response to the scan request message 757.

The second electronic device 200 may display a UI, which inquires of the user whether to connect with the first electronic device 100 through the wireless LAN. When there is an input from the user, which approves the connection with the first electronic device 100 through the wireless LAN, the second electronic device 200 starts a P2P connection in operation 761. For example, the second electronic device 200 may activate a wireless LAN module. The first electronic device 100 may transmit an approval request message through the wireless LAN module according to a predetermined period.

The second electronic device 200 receives the approval request message 763 transmitted by the first electronic device 100. The second electronic device 200 transmits an approval response message 765 to the first electronic device 100 as a response to the approval request message 763. When the signal exchange as described above is completed, the first electronic device 100 and the second electronic device 200 are connected to each other through a wireless LAN in operation 767.

Referring to FIG. 7C, the first electronic device 100 according to an embodiment of the present disclosure starts scanning of at least one different electronic device in operation 769. For example, when executing an application capable of inter-working with the at least one different electronic device, the first electronic device 100 may start to scan for the at least one different electronic device. The first electronic device 100 transmits an advertising packet 771 to the second electronic device 200 through a low-power communication unit. The advertising packet 771 according to an embodiment of the present disclosure may include information on a scan offset section 773, a scan window period 775, an advertising packet transmission section 777, and a scan section 781 of the first electronic device 100.

The second electronic device 200 may identify, through the advertising packet 771, the information on the scan offset section 773, the scan window period 775, the advertising packet transmission section 777, and the scan section 781 of the first electronic device 100. The second electronic device 200 may transmit an advertising packet, based on the scan window periods 775 and 783 and the scan section 781 of the first electronic device 100. For example, the second electronic device 200 transmits an advertising packet 787 in the scan window period 783 of the first electronic device 100, based on the scan window periods 775 and 783 and the scan section 781 of the first electronic device 100. The first electronic device 100 transmits the advertising packet 787 in the scan window period 783 to scan for the second electronic device 200 in operation 789.

According to an embodiment of the present disclosure, the advertising packet 771 may not include the information on the scan offset section 773, the scan window period 775, the advertising packet transmission section 777, and the scan section 781 of the first electronic device 100. Then, the second electronic device 200 may infer the scan window period 783 of the first electronic device 100 based on the cycle by which the advertising packets 771 and 787 are transmitted from the first electronic device 100. The first electronic device 100 and the second electronic device 200 may previously obtain related information in order to infer the scan window period 783. For example, information pre-configured at the time of product manufacturing may be used or the information may be provided and used through software updating. Otherwise, an existing history of connection between devices may be stored and reused. The second electronic device 200 may transmit the advertising packet 787 to the first electronic device 100 in accordance with the inferred scan window period 783 of the first electronic device 100.

Figure 8:
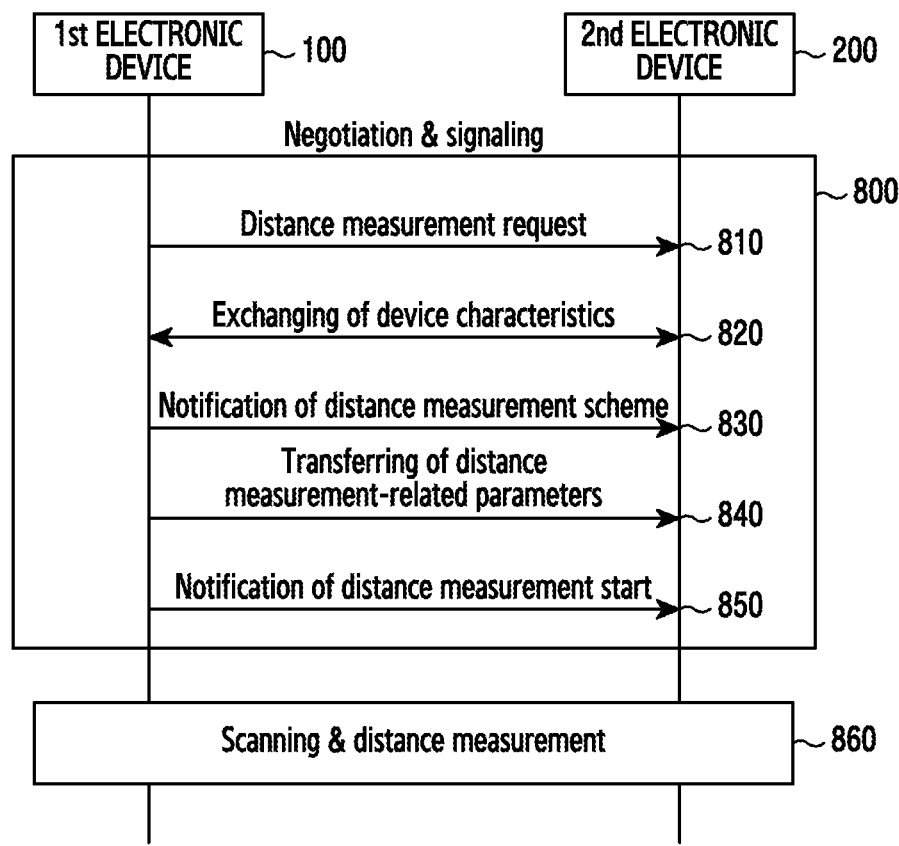
FIG. 8 illustrates a flow of signals transmitted or received between electronic devices for a scanning operation according to an embodiment of the present disclosure.

FIG. 8 illustrates a flow of signals transmitted or received between electronic devices for a scanning operation according to an embodiment of the present disclosure.

This scanning operation or distance measurement operation may be performed between the first electronic device 100 and the second electronic device 200 illustrated in FIGS. 1A and 1B.

Referring to FIG. 8, the first electronic device 100 and the second electronic device 200 perform negotiation and signaling operations in operation 800 and perform scanning and distance measurement operations in operation 860. Operation 800 includes operations 810 to 850.

In operation 810, the first electronic device 100 transmits a distance measurement request (or scanning request) to the second electronic device 200. In operation 820, the first electronic device 100 and the second electronic device 200 exchange device characteristics. In an embodiment, the device characteristics include at least one piece of information among a type of an electronic device, existence or nonexistence and number of microphones/speakers, a kind of wireless connectivity, and existence or nonexistence of a power source. The kind of an electronic device may include at least one among a portable electronic device, a media device, a wearable electronic device, a point of sales (POS) device, and a beacon device. The existence or nonexistence and number of microphones/speakers refer to information on whether an electronic device has a microphone or speaker installed therein, and the number of microphones or speakers installed in the electronic device if equipped therein. The kind of wireless connectivity may include a scheme supporting transmission or reception of a low-power wireless signal, such as Bluetooth. The existence or nonexistence of a power source indicates whether an electronic device has a power source enabling continuous transmission of a wireless signal.

Next, the first electronic device 100 selects an optimal distance measurement scheme from a plurality of distance measurement or scanning schemes. The plurality of distance measurement schemes are described below with reference to FIGS. 9A to 9E.

In an embodiment, the distance measurement scheme is selected based on at least one among the characteristics of the first and second electronic devices 100 and 200, the distance measurement type, and the distance measurement scenario. In an embodiment, the distance measurement type includes at least one type among 1:1 distance measurement, 1:n distance measurement, one-time distance measurement, and periodic distance measurement.

In an embodiment, the distance measurement scenario includes at least one scenario among TV screen mirroring, speaker music streaming, room speaker installation, TV/home theater configuration, a payment trigger service, and a location-based service.

In operation 830, the first electronic device 100 notifies the second electronic device 200 of the selected distance measurement scheme.

In operation 840, the first electronic device 100 transfers a parameter related to distance measurement to the second electronic device 200. In an embodiment, the parameter related to distance measurement includes at least one parameter among a distance measurement period, a distance measurement start offset, the number of available speakers/microphones, a required degree of measurement precision, a required distance measurement time, a voice signal recording time, identifier information of the first electronic device, and a scheme for generation of the voice signal. The distance measurement period indicates whether the distance measurement is periodical (one-shot or periodic), and a value of the period when it is periodical. The distance measurement period may be determined according to the distance measurement scenario. The distance measurement start offset indicates an actual distance measurement start offset reflecting time for preparation of measurement required by an electronic device, such as on/off time of a microphone/speaker. The number of speakers/microphones indicates how many speakers and microphones are available in an electronic device. The required degree of measurement precision indicates the degree of precision in measurement required by a distance measurement scenario and has an influence on the complexity. The required distance measurement time indicates a time required for distance measurement. The required distance measurement time may be changeable according to the distance measurement scenario and may have an influence on the complexity, the required degree of precision, etc. A performance of an electronic device indicates a performance of an electronic device for distance measurement. This performance may determine a calculation time required for calculation for distance measurement, which may have an influence on the required degree of measurement precision, the required distance measurement time, etc. The voice signal recording time indicates a time for recording a voice signal. This recording time can be configured in consideration of deviation in the time for which a speaker/microphone of an electronic device can be turned on. The identifier information of an electronic device indicates a user ID value for identifying a plurality of electronic devices. The scheme for generation of the voice signal according to ID indicates a scheme of determining a voice signal through a user identification value.

In operation 850, the first electronic device 100 notifies the second electronic device 200 of the starting of the distance measurement.

Hereinafter, an example of a negotiation and signaling process performed by the first electronic device 100 and the second electronic device 200 according to the illustrated flow will be described.

An embodiment is based on an assumption that both the first electronic 100 device and the second electronic device 200 are portable electronic devices (e.g., smart phones).

First, the first electronic device 100, as an initiator of distance measurement, starts a negotiation process by showing an intention of distance measurement to the second electronic device 200.

Second, the first electronic device 100 and the second electronic device 200 exchange information, or the second electronic device 200 transmits information to the first electronic device 100. For example, information on existence or absence of a speaker/microphone and information of available wireless connectivity may be exchanged. As another example, signal processing speed and capability information may be exchanged.

Third, the first electronic device 100 transfers the intention of distance measurement once to the second electronic device 200 based on the exchanging of the information. For example, the first electronic device 100 transfers the required degree of precision, and determines and notifies of a DualSync scheme, which is described below through FIG. 9A.

An embodiment is based on an assumption that the first electronic device 100 is a portable electronic device (e.g., smart phone) and the second electronic device 200 is a media device (e.g., TV).

First, the first electronic device 100 starts a negotiation process by showing an intention of distance measurement to the second electronic device 200.

Second, the first electronic device 100 and the second electronic device 200 exchange information, or the second electronic device 200 transmits information to the first electronic device 100. For example, information on existence or absence of a speaker/microphone and information of available wireless connectivity may be exchanged. As another example, signal processing speed and capability information may be exchanged.

Third, the first electronic device 100 transfers, to the second electronic device 200, an intention of distance change measurement through periodic distance measurement based on the exchanging of the information. For example, the first electronic device 100 transfers a sound recording time value, a required degree of precision, and a measurement period value calculated based on a capability of the TV, to the TV, and determines and notifies of a SyncSound scheme, which is described below through FIG. 9B.

FIG. 8 described above is based on an example in which the first electronic device 100 and the second electronic device 200 exchange characteristics of the devices, the first electronic device 100 determines a distance measurement scheme based on the characteristics of the devices and notifies the second electronic device 200 of the determined scheme, and the first electronic device 100 transfers distance measurement-related parameters to the second electronic device 200. However, this example is just an example and may be modified within the scope of the present disclosure. As an alternative example, the distance measurement-related parameters may be exchanged together in the process where the characteristics of the devices are exchanged.

FIGS. 9A to 9E are views for describing scanning operations according to an embodiment of the present disclosure.

This scanning or distance measurement operation may be performed between the first electronic device 100 and the second electronic device 200 illustrated in FIGS. 1A and 1B.

Figure 9A:
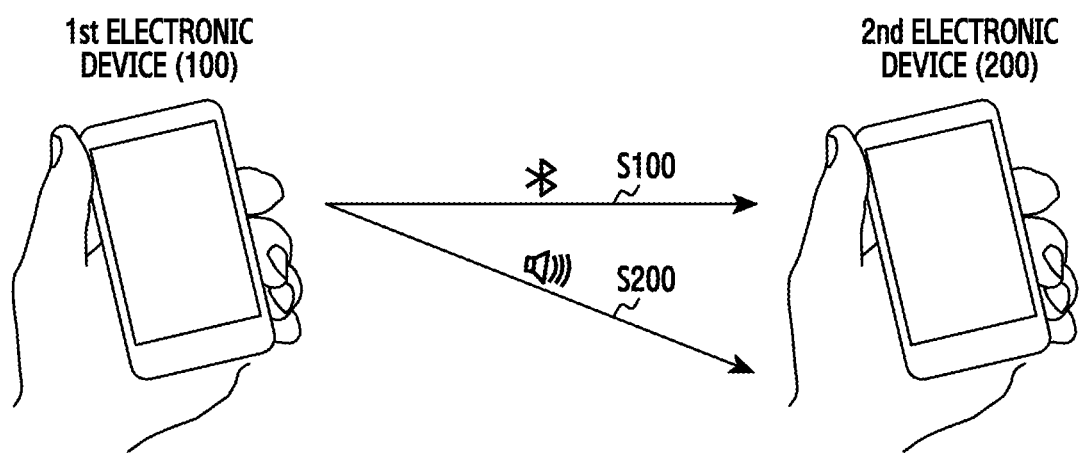
FIGS. 9A to 9E are views for describing scanning operations according to an embodiment of the present disclosure.

Referring to FIG. 9A, the first electronic device 100, as a transmitter side, transmits a wireless signal in operation S100 and transmits a voice signal in operation S200. As a receiver side, the second electronic device 200 may receive the voice signal and the wireless signal transmitted from the first electronic device 100, and measure the distance between the first electronic device 100 and the second electronic device 200.

Figure 9B:
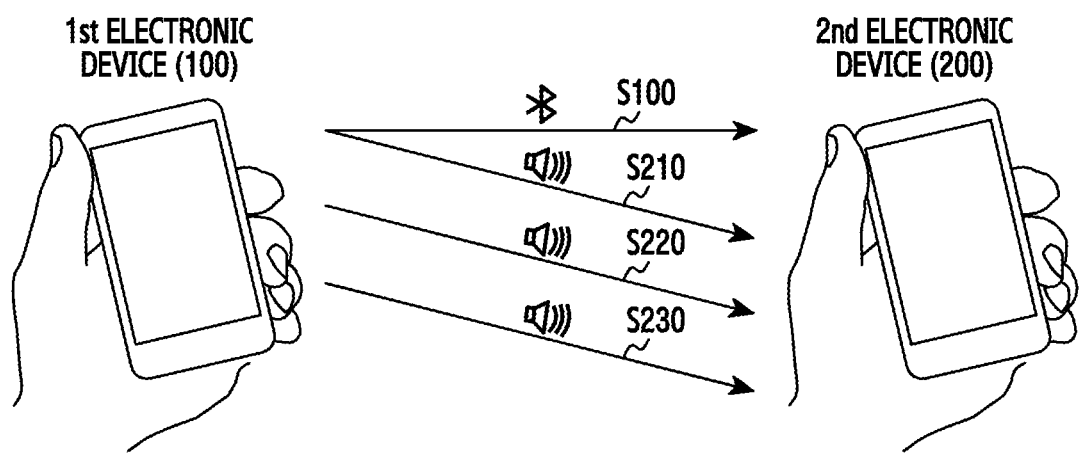

Referring to FIG. 9B, the first electronic device 100 transmits a wireless signal in operation S100. The second electronic device 200 receives the wireless signal transmitted from the first electronic device 100. Through the transmission and reception of the wireless signal, the first electronic device 100 and the second electronic device 200 are synchronized with each other.

Next, the first electronic device 100 periodically transmits a voice signal in operations S210, S220, and S230. The second electronic device 200 receives the voice signal periodically transmitted from the first electronic device 100. By receiving the wireless signal and the voice signal, the second electronic device 200 can measure the distance between the first electronic device 100 and the second electronic device 200. Thereafter, by periodically receiving the voice signal, the second electronic device 200 can measure a variance in the absolute distance from the first electronic device 100.

Figure 9C:
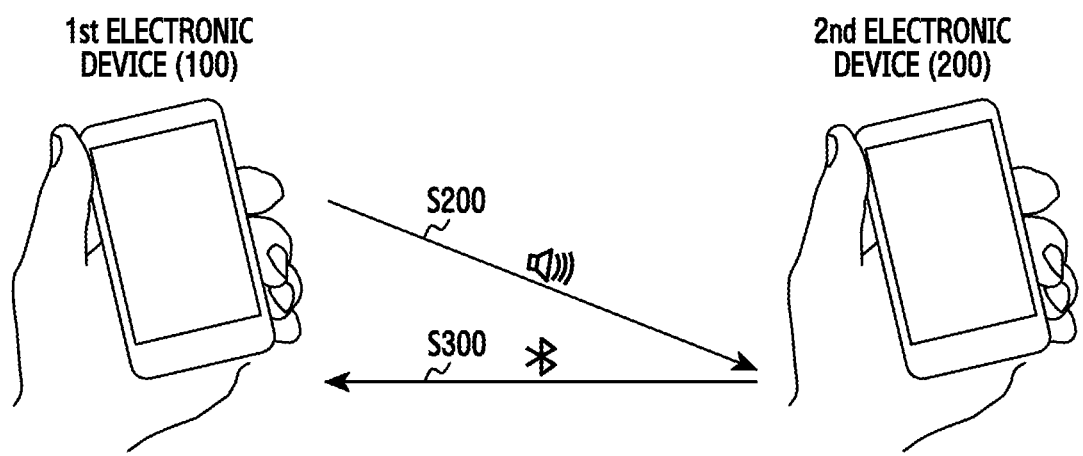

Referring to FIG. 9C, the first electronic device 100 transmits a voice signal in operation S200. The second electronic device 200 receives the voice signal transmitted from the first electronic device 100 and transmits a wireless signal as a response to the received voice signal in operation S300. By transmitting the voice signal and receiving the wireless signal, the first electronic device 100 can measure the distance between the first electronic device 100 and the second electronic device 200.

Figure 9D:
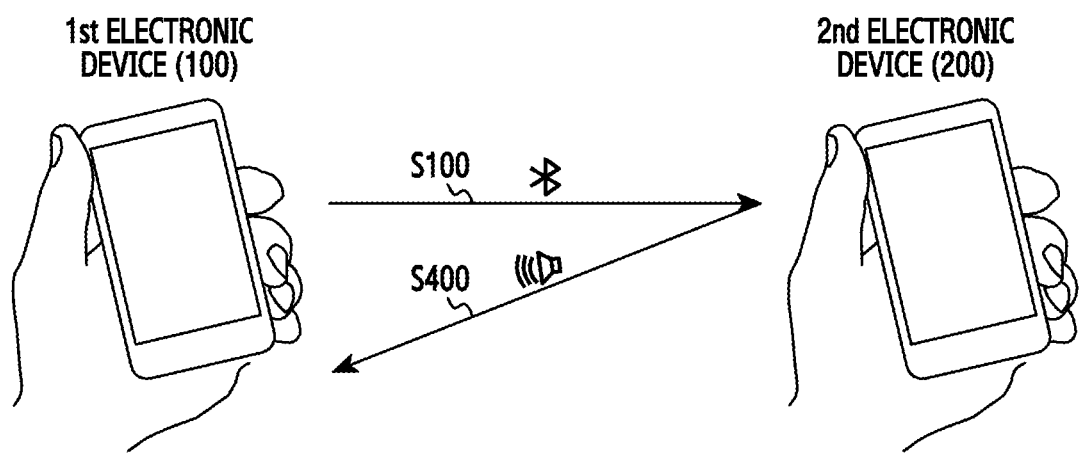

Referring to FIG. 9D, the first electronic device 100 transmits a wireless signal in operation S100. The second electronic device 200 receives the wireless signal transmitted from the first electronic device 100 and transmits a voice signal as a response to the received wireless signal in operation S400. By transmitting the wireless signal and receiving the voice signal, the first electronic device 100 can measure the distance between the first electronic device 100 and the second electronic device 200.

Figure 9E:
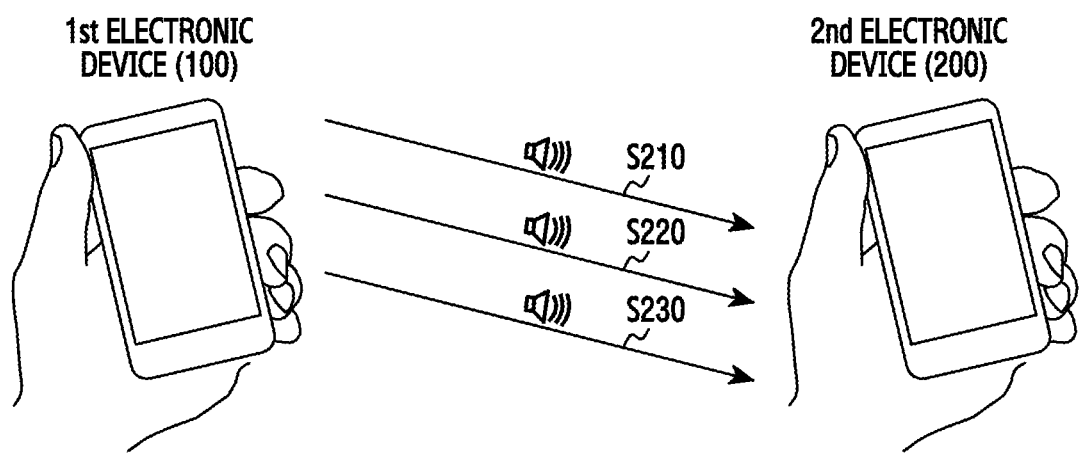

Referring to FIG. 9E, the first electronic device 100 periodically transmits a voice signal in operations S210, S220, and S230. The second electronic device 200 receives the voice signal periodically transmitted from the first electronic device 100. By periodically receiving the voice signal, the second electronic device 200 can measure the relative distance change between the first electronic device 100 and the second electronic device 200.

Figure 10A:
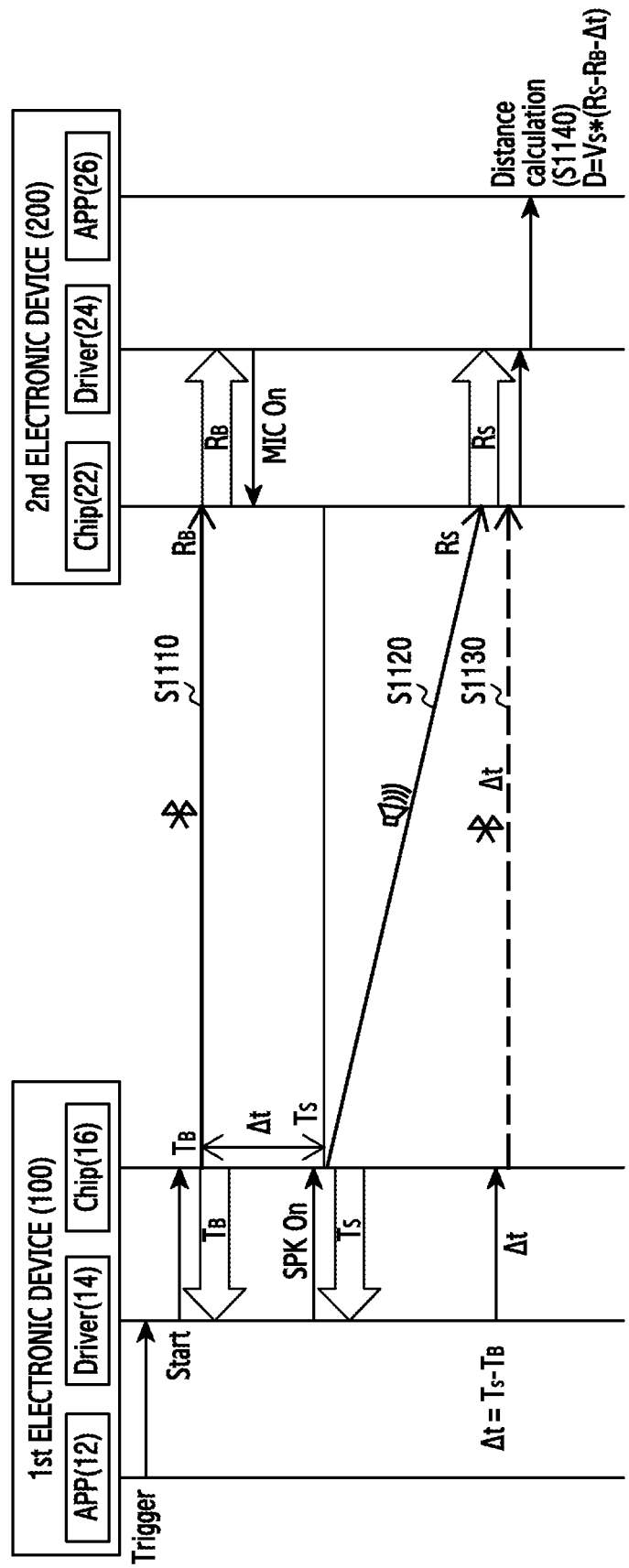
FIG. 10A illustrates a first example of a processing flow for a scanning operation according to an embodiment of the present disclosure.

FIG. 10A illustrates a first example of a processing flow for a scanning operation according to an embodiment of the present disclosure.

This processing flow corresponds to a processing flow of a wireless distance measurement scheme according to the DualSync scheme. The illustrated substance is just an example for describing the present disclosure and allows modified embodiments thereof, and thus should not be construed to limit the scope of the present disclosure.

Referring to FIG. 10A, the first electronic device 100 includes an application 12, a driver 14, and a chip 16. The second electronic device 200 includes a chip 22, a driver 24, and an application 26. The chips 16 and 22 are elements for generation of a wireless signal or voice signal. For example, the chip 16 or 22 includes a module (e.g., communication module 520 or BLE module 527 of FIG. 5) for generation of a wireless signal, such as a BLE signal. As another example, the chip 16 or 22 includes a module (e.g., audio module 580 of FIG. 5) for generation of a voice signal. The applications 12 and 22 are elements for execution of a service by the electronic device. The drivers 14 and 24 are elements for controlling the driving of the chips 16 and 26. The first electronic device 100 has a speaker and the second electronic device 200 has a microphone.

The application 12 of the first electronic device 100 generates a trigger signal for distance measurement and the driver 14 thereof generates a distance measurement start signal in response to the trigger signal. At time point $T_B$, the chip 16 generates a wireless signal (e.g., BLE signal) in response to the distance measurement start signal in operation S1110. In an embodiment, a negotiation process may be performed in response to the trigger signal, and the distance measurement start signal may be generated after the negotiation process is completed.

The second electronic device 200 receives the wireless signal from the first electronic device 100 at time point $R_B$, and activates the microphone in response thereto. The driver 24 of the second electronic device 200 activates the microphone after passage of a predetermined time interval (e.g., ΔT) from time point $R_B$. Then, the microphone connected to the chip 22 starts to record sound. Thereafter, since the second electronic device 200 does not know when the voice signal transmitted from the first electronic device 100 is received, the recording of the sound by the microphone is performed for a predetermined time interval from time point ($R_B$+ΔT). The predetermined time interval may be configured as a sufficient and proper time interval after the time point at which the voice signal is expected to be received. For example, the predetermined time interval may be determined in consideration of the time gap (Δt=$T_S$-$T_B$) from time point $T_B$ to time point $T_S$ and a time interval taken while the voice signal transmitted from the first electronic device 100 arrives at the second electronic device 200.

The driver 14 of the first electronic device 100 activates a speaker at time point $T_S$ after time point $T_B$ to generate a voice signal through the speaker connected to the chip 16 in operation S1200.

The second electronic device 200 receives the voice signal from the first electronic device 100 through the microphone at time point $R_S$. The microphone of the second electronic device 200 performs sound recording for a predetermined time interval from time point ($R_B$+ΔT), and receives the voice signal from the first electronic device 100 during the sound recording.

The first electronic device 100 transfers information on the time gap (Δt=$T_S$-$T_B$) from time point $T_B$ to time point $T_S$ to the second electronic device 200 in operation S1130.

The second electronic device 200 calculates the distance D between the first electronic device 100 and the second electronic device 200 based on the information on the time gap (Δt=$T_S$-$T_B$) from time point $T_B$ to time point $T_S$ received from the first electronic device 100 and the time gap from the reception time point $R_B$ of the wireless signal to the reception time point $R_S$ of the voice signal in operation S1140. The distance D between the first electronic device 100 and the second electronic device 200 is calculated by Equation 1 below. The application 26 of the second electronic device 200 derives the reception time point $R_S$ of the voice signal, using substance obtained as a result of recording through the microphone. That is, since the application 26 knows time point $R_B$ at which the wireless signal is received from the first electronic device 100, time point ($R_B$+ΔT) at which recording through the microphone is started, and a time interval for which the recording is performed from time point ($R_B$+ΔT), the application 26 can derive time point $R_S$ at which the voice signal is received.

$$D=V_S*(R_S-R_B-\Delta t) \quad \text{Equation 1}$$

In Equation 1, $V_S$ indicates the transmission speed (340 m/s) of the voice signal, $R_S$ indicates the time point at which the second electronic device 200 receives the voice signal, $R_B$ indicates the time point at which the second electronic device 200 receives the wireless signal, Δt indicates the time gap from time point $T_B$ at which the first electronic device 100 transmits the wireless signal to time point $T_S$ at which the first electronic device 100 transmits the voice signal.

In an embodiment, if the first electronic device 100 simultaneously transmits the wireless signal and the voice signal, the first electronic device 100 need not transfer the information on the time gap (Δt=$T_S$-$T_B$) from time point $T_B$ to time point $T_S$ to the second electronic device 200. In this case, by applying (Δt=0) to Equation 1, the second electronic device 200 can measure the distance D between the first electronic device 100 and the second electronic device 200.

The information on the distance D change between the first electronic device 100 and the second electronic device 200 measured by the second electronic device 200 may be fed back to the first electronic device 100.

Figure 10B:
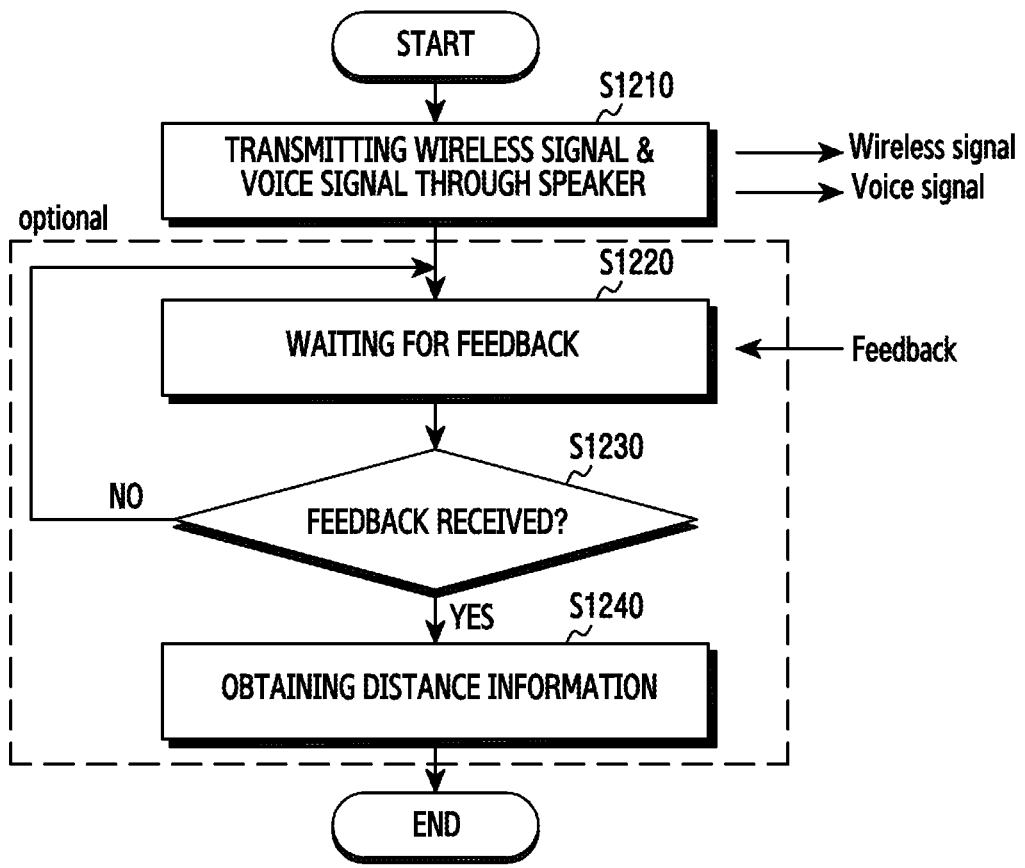
FIG. 10B illustrates a processing flow of a first electronic device for a first example of a scanning operation according to an embodiment of the present disclosure.

FIG. 10B illustrates a processing flow of a first electronic device for a first example of a scanning operation according to an embodiment of the present disclosure.

This processing flow may be performed by the first electronic device 100 illustrated in FIG. 10A. The illustrated substance is just an example for describing the present disclosure and allows modified embodiments thereof, and thus should not be construed to limit the scope of the present disclosure.

Referring to FIG. 10B, in operation S1210, the first electronic device 100 transmits a wireless signal and transmits a voice signal through a speaker.

In operation S1220, the first electronic device 100 waits for a feedback from the second electronic device 200. In operation S1230, the first electronic device 100 determines whether a feedback is received from the second electronic device 200.

When a feedback is received from the second electronic device 200, the first electronic device 100 acquires information on the distance between the first electronic device 100 and the second electronic device 200 from the received feedback information in operation S1240.

The operations in operations S1220 to S1240 may be selectively performed.

As an embodiment, the first electronic device 100 determines, in operation S1230, whether a pre-configured timer expires, and may proceed to operation S1240 when the timer expires.

Figure 10C:
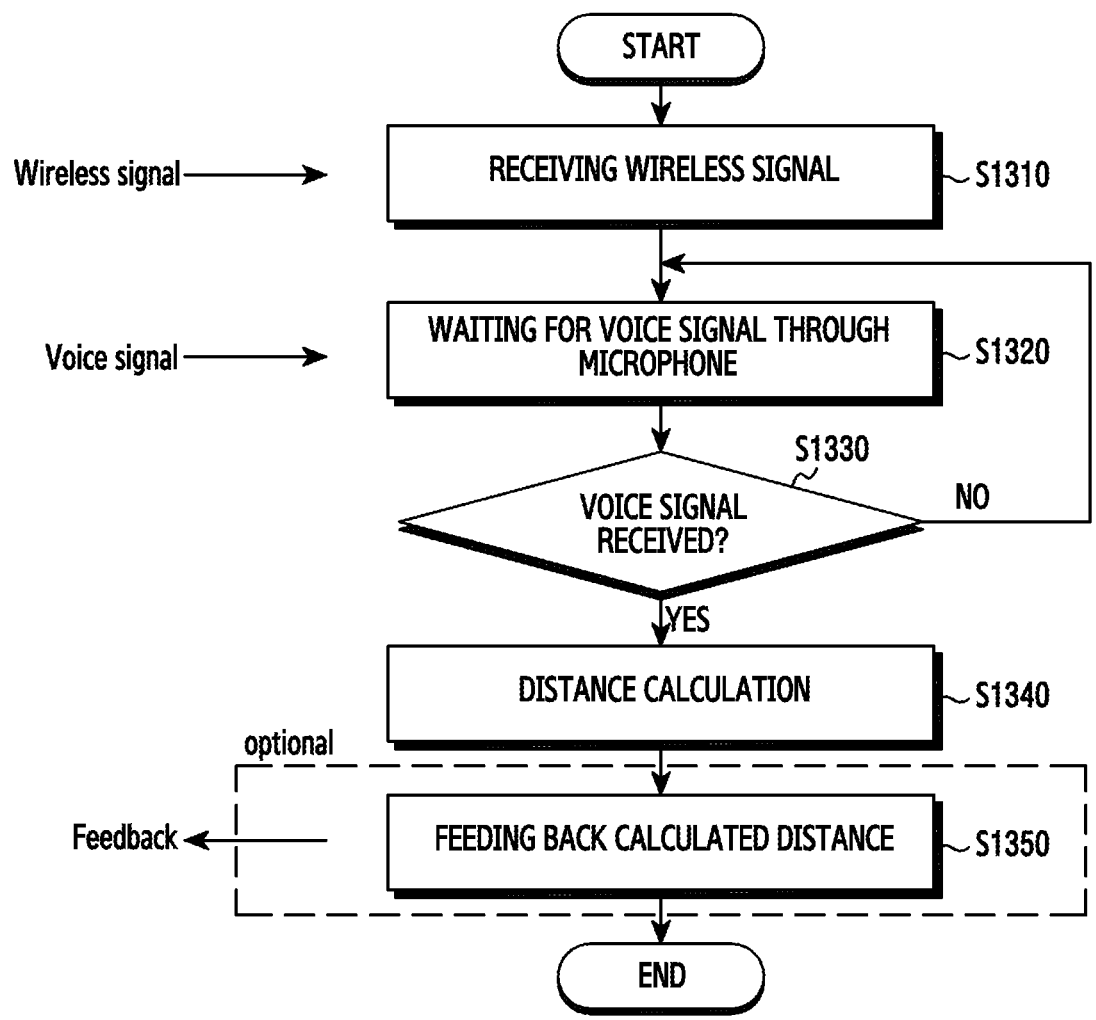
FIG. 10C illustrates a processing flow of a second electronic device for the first example of a scanning operation according to an embodiment of the present disclosure.

FIG. 10C illustrates a processing flow of a second electronic device for the first example of a scanning operation according to an embodiment of the present disclosure.

This processing flow may be performed by the second electronic device 200 illustrated in FIG. 10A. The illustrated substance is just an example for describing the present disclosure and allows modified embodiments thereof, and thus should not be construed to limit the scope of the present disclosure.

Referring to FIG. 10C, in operation S1310, the second electronic device 200 receives a wireless signal transmitted from the first electronic device 100. In operation S1320, the second electronic device 200 waits to receive a voice signal from the first electronic device 100 through a microphone. In operation S1330, the second electronic device 200 determines whether a voice signal is received from the first electronic device 100 through a microphone.

When a voice signal is received through the microphone, the second electronic device 200 calculates the distance between the first electronic device 100 and the second electronic device 200 based on the reception time point of the wireless signal and the reception time point of the voice signal in operation S1340. The second electronic device 200 measures the distance between the first electronic device 100 and the second electronic device 200 according to Equation 1.

In operation S1350, the second electronic device 200 feeds back, to the first electronic device 100, the calculated distance between the first electronic device 100 and the second electronic device 200. The operation of operation S1350 may be selectively performed.

As an embodiment, the second electronic device 200 may determine, in operation S1330, whether a pre-configured timer expires, and may feedback, in operation S1350, a failure in the distance measurement when the timer expires.

Figure 11A:
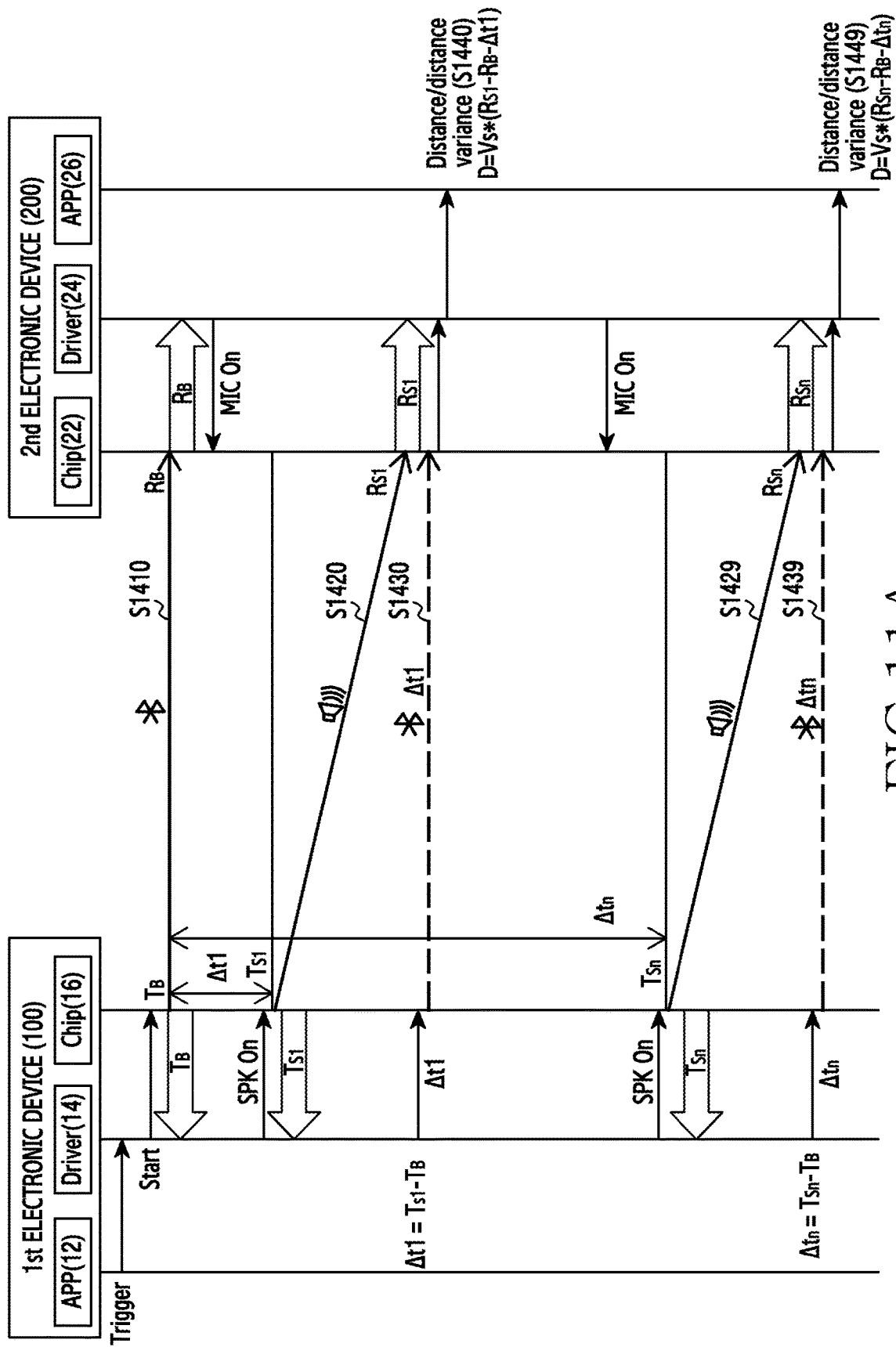
FIG. 11A illustrates a second example of a processing flow for a scanning operation according to an embodiment of the present disclosure.

FIG. 11A illustrates a second example of a processing flow for a scanning operation according to an embodiment of the present disclosure.

This processing flow corresponds to a processing flow of a wireless distance measurement scheme according to the SyncSound scheme. The illustrated substance is just an example for describing the present disclosure and allows modified embodiments thereof, and thus should not be construed to limit the scope of the present disclosure.

Referring to FIG. 11A, the first electronic device 100 includes an application 12, a driver 14, and a chip 16. The second electronic device 200 includes a chip 22, a driver 24, and an application 26. The chips 16 and 22 are elements for generation of a wireless signal or voice signal. For example, the chip 16 or 22 includes a module (e.g., communication module 520 or BLE module 527 of FIG. 5) for generation of a wireless signal, such as a BLE signal. As another example, the chip 16 or 22 includes a module (e.g., audio module 580 of FIG. 5) for generation of a voice signal. The applications 12 and 22 are elements for execution of a service by the electronic device. The drivers 14 and 24 are elements for controlling the driving of the chips 16 and 26. The first electronic device 100 has a speaker and the second electronic device 200 has a microphone.

The application 12 of the first electronic device 100 generates a trigger signal for distance measurement and the driver 14 thereof generates a distance measurement start signal in response to the trigger signal. At time point $T_B$, the chip 16 generates a wireless signal (e.g., BLE signal) in response to the distance measurement start signal in operation S1410. In an embodiment, a negotiation process may be performed in response to the trigger signal, and the distance measurement start signal may be generated after the negotiation process is completed.

The second electronic device 200 receives the wireless signal from the first electronic device 100 at time point $R_B$, and activates the microphone in response thereto. The driver 24 of the second electronic device 200 activates the microphone after passage of a predetermined time interval (e.g., $\Delta T$) from time point $R_B$. Then, the microphone connected to the chip 22 starts to record sound. Thereafter, since the second electronic device 200 does not know when the voice signal transmitted from the first electronic device 100 is received, the recording of the sound by the microphone is performed for a predetermined time interval from time point $(R_B+\Delta T)$. The predetermined time interval may be configured as a sufficient and proper time interval after the time point at which the voice signal is expected to be received. For example, the predetermined time interval may be determined in consideration of the time gap $(\Delta t1=T_S-T_B)$ from time point $T_B$ to time point $T_S$ and a time interval taken while the voice signal transmitted from the first electronic device 100 arrives at the second electronic device 200.

The driver 14 of the first electronic device 100 activates a speaker at one or more time points after time point $T_B$ to make a voice signal be generated through the speaker connected to the chip 16 in operations S1420 to S1429.

Specifically, the first electronic device 100 activates the speaker at time point $T_{S1}$ after time point $T_B$ to make a voice signal be generated through the speaker connected to the chip 16 in operation S1420.

The second electronic device 200 receives the voice signal from the first electronic device 100 through the microphone at time point $R_{S1}$. The microphone of the second electronic device 200 performs sound recording for a predetermined time interval from time point $(R_B+\Delta T)$, and receives the voice signal from the first electronic device 100 during the sound recording.

The first electronic device 100 transfers information on the time gap $(\Delta t1=T_{S1}-T_B)$ from time point $T_B$ to time point $T_{S1}$ to the second electronic device 200 in operation S1430.

The second electronic device 200 calculates the distance D between the first electronic device 100 and the second electronic device 200 based on the information on the time gap $(\Delta t1=T_{S1}-T_B)$ from time point $T_B$ to time point $T_{S1}$ received from the first electronic device 100 and the time gap from the reception time point $R_B$ of the wireless signal to the reception time point $R_{S1}$ of the voice signal in operation S1440. The distance D between the first electronic device 100 and the second electronic device 200 is calculated by Equation 2 below. The application 26 of the second electronic device 200 derives the reception time point $R_{S1}$ of the voice signal, using substance obtained as a result of recording through the microphone. That is, since the application 26 knows time point $R_B$ at which the wireless signal is received from the first electronic device 100, time point $(R_B+\Delta T)$ at which recording through the microphone is started, and a time interval for which the recording is performed from time point $(R_B+\Delta T)$, the application 26 can derive time point $R_{S1}$ at which the voice signal is received.

$$D=V_S*(R_{S1}-R_B-\Delta t1) \qquad \text{Equation 2}$$

In Equation 2, $V_S$ indicates the transmission speed (340 m/s) of the voice signal, $R_{S1}$ indicates the time point at which the second electronic device 200 receives the voice signal, $R_B$ indicates the time point at which the second electronic device 200 receives the wireless signal, $\Delta t1$ indicates the time gap from time point $T_B$ at which the first electronic device 100 transmits the wireless signal to time point $T_{S1}$ at which the first electronic device 100 transmits the voice signal.

In an embodiment, if the first electronic device 100 simultaneously transmits the wireless signal and the voice signal, the first electronic device 100 need not transfer the information on the time gap $(\Delta t1=T_{S1}-T_B)$ from time point $T_B$ to time point $T_{S1}$ to the second electronic device 200. In this case, by applying $(\Delta t1=0)$ to Equation 2, the second electronic device 200 can measure the distance D between the first electronic device 100 and the second electronic device 200.

The driver 14 of the first electronic device 100 activates a speaker at time point $T_{Sn}$ after time point $T_B$ to make a voice signal be generated through the speaker connected to the chip 16 in operation S1429.

The second electronic device 200 receives the voice signal from the first electronic device 100 through the microphone at time point $R_{Sn}$. The microphone of the second electronic device 200 performs sound recording for a predetermined time interval from the time point at which the microphone is turned on, and receives the voice signal from the first electronic device 100 during the sound recording.

The first electronic device 100 transfers information on the time gap $(\Delta tn=T_{Sn}-T_B)$ from time point $T_B$ to time point $T_{Sn}$ to the second electronic device 200 in operation S1439.

The second electronic device 200 calculates the distance D between the first electronic device 100 and the second electronic device 200 based on the information on the time gap $(\Delta tn=T_{Sn}-T_B)$ from time point $T_B$ to time point $T_{Sn}$ received from the first electronic device 100 and the time gap from the microphone-on time point to the reception time point $R_{Sn}$ of the voice signal in operation S1449. The distance D between the first electronic device 100 and the second electronic device 200 is calculated by Equation 3 below. The application 26 of the second electronic device 200 derives the reception time point $R_{Sn}$ of the voice signal, using substance obtained as a result of recording through the microphone. That is, since the application 26 knows the time point of microphone-on at which the recording through the microphone is started, and the time interval for which the recording is performed from the time point of microphone-on, the application 26 can derive the reception time point $R_{Sn}$ of the voice signal.

$$D=V_S*(R_{Sn}-R_B-\Delta t) \qquad \text{Equation 3}$$

In Equation 3, $V_S$ indicates the transmission speed (340 m/s) of the voice signal, $R_{Sn}$ indicates the time point at which the second electronic device 200 receives the voice signal, $R_B$ indicates the time point at which the second electronic device 200 receives the wireless signal, $\Delta$tn indicates the time gap from time point $T_B$ at which the first electronic device 100 transmits the wireless signal to time point $T_{Sn}$ at which the first electronic device 100 transmits the voice signal.

In an embodiment, if the first electronic device 100 simultaneously transmits the wireless signal and the voice signal, the first electronic device 100 need not transfer the information on the time gap ($\Delta$tn=$T_{Sn}-T_B$) from time point $T_B$ to time point $T_{Sn}$ to the second electronic device 200. In this case, by applying ($\Delta$tn=0) to Equation 2, the second electronic device 200 can measure the distance D between the first electronic device 100 and the second electronic device 200.

Further, using a result of distance measurement in operation S1440 and a result of distance measurement in operation S1449, the second electronic device 200 can measure an absolute variance in the distance D between the first electronic device 100 and the second electronic device 200.

The information on the distance D between the first electronic device 100 and the second electronic device 200 and the information on the absolute variance of the distance may be fed back to the first electronic device 100.

Figure 11B:
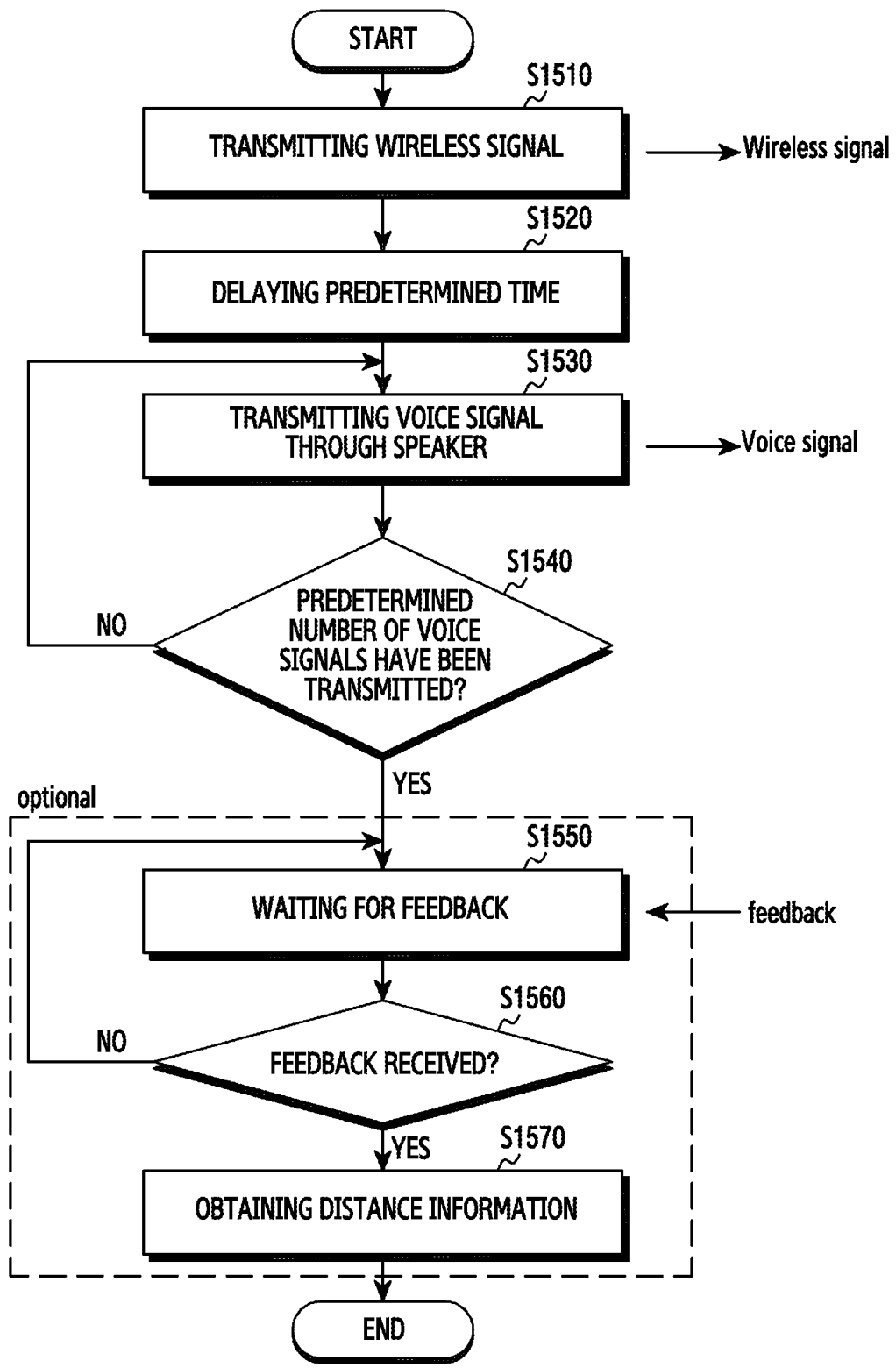
FIG. 11B illustrates a processing flow of a first electronic device for a second example of a scanning operation according to an embodiment of the present disclosure.

FIG. 11B illustrates a processing flow of a first electronic device for a second example of a scanning operation according to an embodiment of the present disclosure.

This processing flow may be performed by the first electronic device 100 illustrated in FIG. 11A. The illustrated substance is just an example for describing the present disclosure and allows modified embodiments thereof, and thus should not be construed to limit the scope of the present disclosure.

Referring to FIG. 11B, the first electronic device 100 transmits a wireless signal in operation S1510, delays a predetermined time in operation S1520, and transmits a voice signal through a speaker in operation S1530. The transmission of the voice signal through the speaker continues until it is determined in operation S1540 that a predetermined number of voice signals have been transmitted.

In operation S1550, the first electronic device 100 waits for a feedback from the second electronic device 200. In operation S1560, the first electronic device 100 determines whether a feedback is received from the second electronic device 200.

When a feedback is received from the second electronic device 200, the first electronic device 100 acquires information on the distance between the first electronic device 100 and the second electronic device 200 from the received feedback information in operation S1570. Further, from the received feedback information, the first electronic device 100 may acquire information on a variance in the absolute distance change between the first electronic device 100 and the second electronic device 200.

The operations in operations S1550 to S1570 may be selectively performed.

As an embodiment, the first electronic device 100 determines, in operation S1540, whether a pre-configured timer expires, and may proceed to operation S1530 when the timer expires. Further, the first electronic device 100 may determine, in operation S1560, whether a pre-configured timer expires, and may proceed to operation S1550 when the timer expires.

Figure 11C:
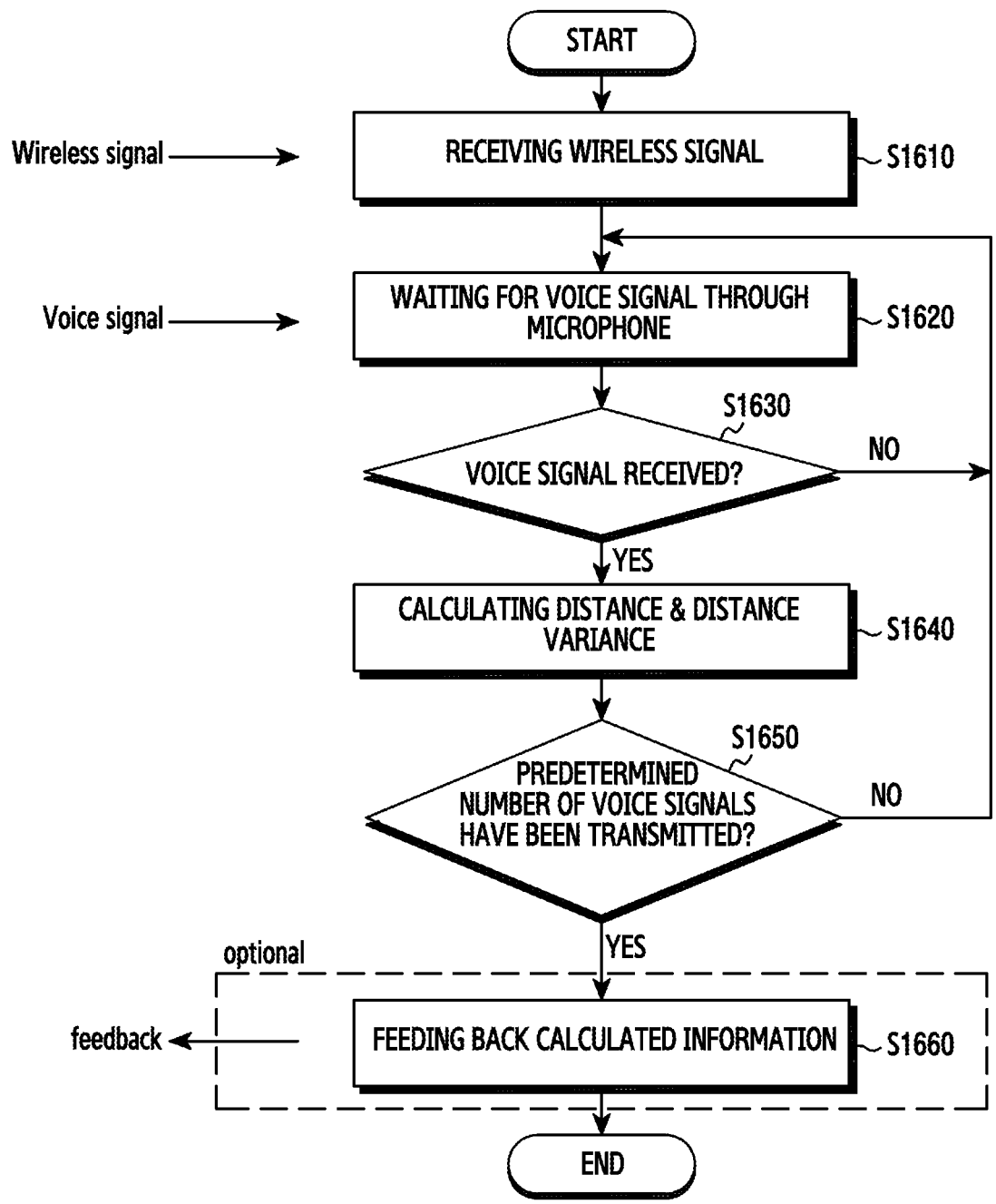
FIG. 11C illustrates a processing flow of a second electronic device for a second example of a scanning operation according to an embodiment of the present disclosure.

FIG. 11C illustrates a processing flow of a second electronic device for a second example of a scanning operation according to an embodiment of the present disclosure.

This processing flow may be performed by the second electronic device 200 illustrated in FIG. 11A. The illustrated substance is just an example for describing the present disclosure and allows modified embodiments thereof, and thus should not be construed to limit the scope of the present disclosure.

Referring to FIG. 11C, in operation S1610, the second electronic device 200 receives a wireless signal from the first electronic device 100. In operation S1620, the second electronic device 200 waits to receive a voice signal from the first electronic device 100 through a microphone. In operation S1630, the second electronic device 200 determines whether a voice signal is received from the first electronic device 100 through a microphone.

When a voice signal is received through the microphone, the second electronic device 200 calculates the distance between the first electronic device 100 and the second electronic device 200 based on the reception time point of the wireless signal and the reception time point of the voice signal in operation S1640. The second electronic device 200 calculates the distance between the first electronic device 100 and the second electronic device 200 according to Equations 2 and 3.

The operation of calculating the distances between the first electronic device 100 and the second electronic device 200 may be repeatedly performed until it is determined in operation S1650 that a predetermined number of voice signals have been received. In response to the repetitive reception of the voice signal through the microphone, the second electronic device 200 can measure a variance in the absolute distance between the first electronic device 100 and the second electronic device 200.

In operation S1660, the second electronic device 200 feeds back, to the first electronic device 100, the distance and the calculated variance in the absolute distance between the first electronic device 100 and the second electronic device 200. The operation of operation S1660 may be selectively performed.

As an embodiment, the second electronic device 200 determines, in operation S1630, whether a pre-configured timer expires, and may proceed to operation S1640 when the timer expires. Further, the second electronic device 200 may determine, in operation S1650, whether a pre-configured timer expires, and may proceed to operation S1660 when the timer expires.

Figure 12A:
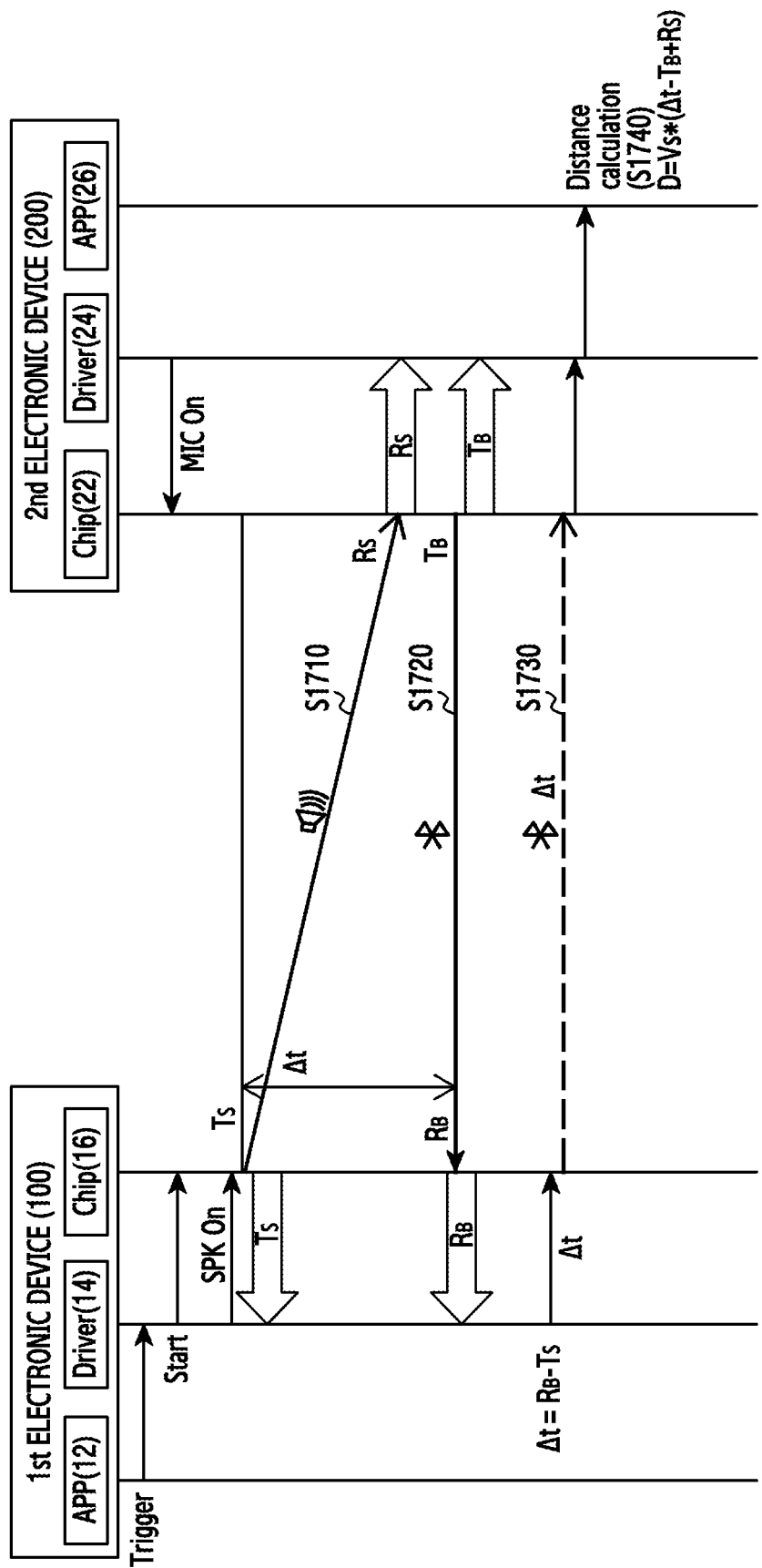
FIG. 12A illustrates a third example of a processing flow for a scanning operation according to an embodiment of the present disclosure.

FIG. 12A illustrates a third example of a processing flow for a scanning operation according to an embodiment of the present disclosure.

This processing flow corresponds to a processing flow of a wireless distance measurement scheme according to the dual sequence (DualSeq SE) scheme. The illustrated substance is just an example for describing the present disclo- Referring to FIG. 12A, the first electronic device 100 includes an application 12, a driver 14, and a chip 16. The second electronic device 200 includes a chip 22, a driver 24, and an application 26. The chips 16 and 22 are elements for generation of a wireless signal or voice signal. For example, the chip 16 or 22 includes a module (e.g., communication module 520 or BLE module 527 of FIG. 5) for generation of a wireless signal, such as a BLE signal. As another example, the chip 16 or 22 includes a module (e.g., audio module 580 of FIG. 5) for generation of a voice signal. The applications 12 and 22 are elements for execution of a service by the electronic device. The drivers 14 and 24 are elements for controlling the driving of the chips 16 and 26. The first electronic device 100 has a speaker and the second electronic device 200 has a microphone.

The application 12 of the first electronic device 100 generates a trigger signal for distance measurement and the driver 14 thereof generates a distance measurement start signal in response to the trigger signal. In response to the distance measurement start signal, the chip 16 activates the speaker and generates a voice signal at time point $T_S$ in operation S1710. In an embodiment, a negotiation process may be performed in response to the trigger signal, and the distance measurement start signal may be generated after the negotiation process is completed.

The second electronic device 200 activates a microphone at a predetermined time point after the negotiation with the first electronic device 100. Then, the microphone connected to the chip 22 starts to record sound. Thereafter, since the second electronic device 200 does not know when the voice signal transmitted from the first electronic device 100 is received, the recording of the sound by the microphone is performed for a predetermined time interval from the time point when the microphone is activated. The predetermined time interval may be configured as a sufficient and proper time interval after the time point at which the voice signal is expected to be received. For example, the predetermined time interval may be determined in consideration of the time point at which the distance measurement start signal is generated in the first electronic device 100 or time point $T_S$ at which the speaker is activated and a voice signal is transmitted in response to the distance measurement start signal, and a time period for which a voice signal transmitted from the first electronic device 100 reaches the second electronic device 200. The second electronic device 200 receives the voice signal from the first electronic device 100 at time point $R_S$ through the microphone at time point $R_S$ in the middle of a recording operation through a microphone performed by the second electronic device 200.

In response to reception of the voice signal, the second electronic device 200 generates a wireless signal (e.g., BLE signal) at time point $T_B$ in operation S1720.

The first electronic device 100 receives the wireless signal transmitted from the second electronic device 200 at time point $R_B$ in operation S1720.

The first electronic device 100 transfers information on the time gap ($\Delta t = R_B - T_S$) from time point $R_B$ to time point $T_S$ to the second electronic device 200 in operation S1730.

The second electronic device 200 calculates the distance D between the first electronic device 100 and the second electronic device 200 based on the information on the time gap ($\Delta t = R_B - T_S$) from time point $R_B$ to time point $T_S$ received from the first electronic device 100 and the time gap from the reception time point $R_S$ of the voice signal to the transmission time point $T_B$ of the wireless signal in operation S1740. The distance D between the first electronic device 100 and the second electronic device 200 is calculated by Equation 4 below. The application 26 of the second electronic device 200 derives the reception time point $R_S$ of the voice signal, using substance obtained as a result of recording through the microphone. That is, since the application 26 knows the time point at which the microphone is activated to start the recording and the time interval for which the recording is performed from the time point at which the recording is started, the application 26 can derive the reception time point $R_S$ of the voice signal.

$$D = V_S * (\Delta t - T_B + R_S) \qquad \text{Equation 4}$$

In Equation 4, $V_S$ indicates the transmission speed (340 m/s) of the voice signal, $R_S$ indicates the time point at which the second electronic device 200 receives the voice signal, $T_B$ indicates the time point at which the second electronic device 200 transmits the wireless signal, and $\Delta t$ indicates the time gap from time point $R_B$ at which the first electronic device 100 receives the wireless signal to time point $T_S$ at which the first electronic device 100 transmits the voice signal.

The information on the distance D between the first electronic device 100 and the second electronic device 100, which has been measured by the first electronic device 100, may be fed back to the second electronic device 200.

As an embodiment, in place of the second electronic device 200, the first electronic device 100 may calculate the distance D between the first electronic device 100 and the second electronic device 200. In this instance, the first electronic device 100 calculates the distance D by receiving, from the second electronic device 200, information on the time gap from time point $R_S$ at which the voice signal is received to time point $T_B$ at which the wireless signal is transmitted. Processing flows illustrated in FIGS. 12B and 12C described below correspond to an embodiment in which the first electronic device 100 calculates the distance D between the first electronic device 100 and the second electronic device 200.

Figure 12B:
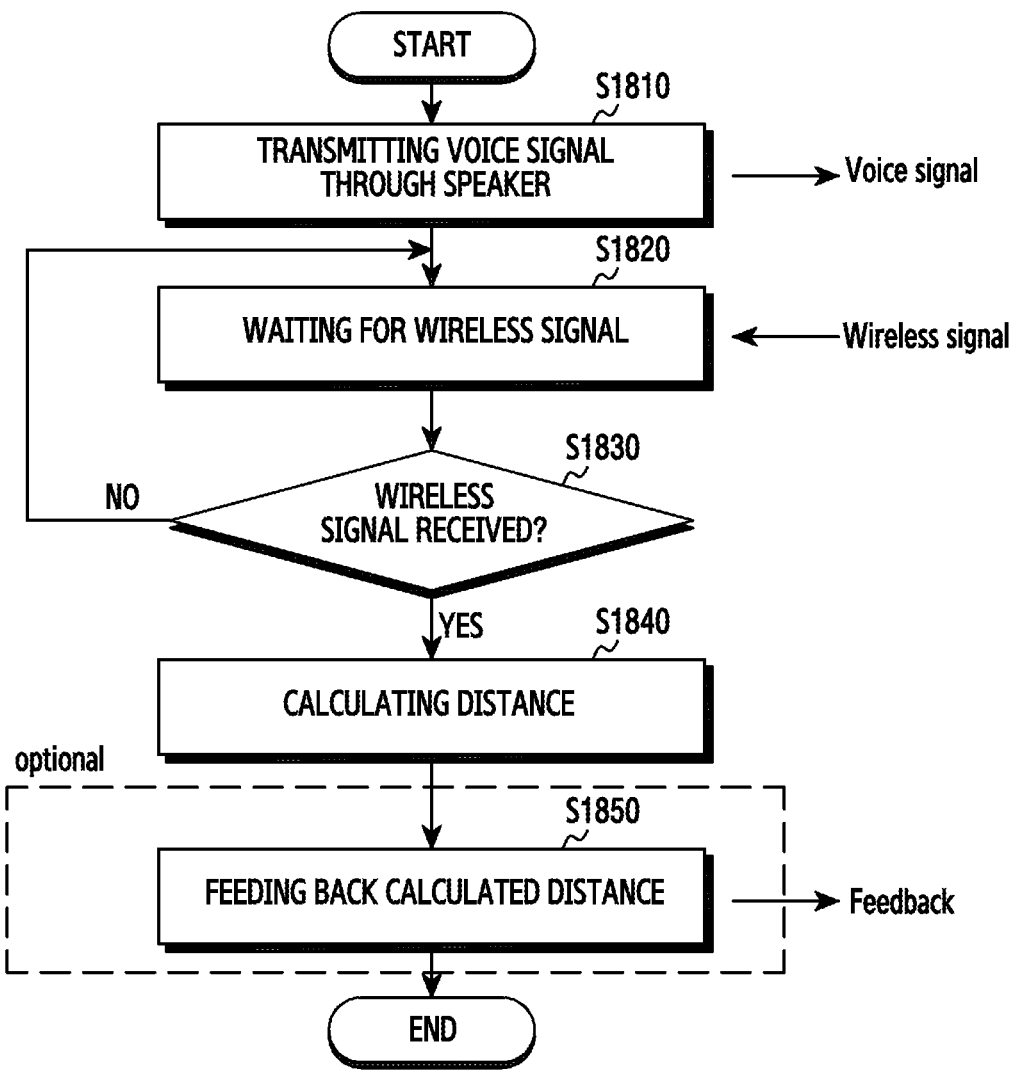
FIG. 12B illustrates a processing flow of a first electronic device for a third example of a scanning operation according to an embodiment of the present disclosure.

FIG. 12B illustrates a processing flow of a first electronic device for a third example of a scanning operation according to an embodiment of the present disclosure.

This processing flow may be performed by the first electronic device 100 illustrated in FIG. 12A. However, in this example, the distance calculating operation is performed by the first electronic device 100. The illustrated substance is just an example for describing the present disclosure and allows modified embodiments thereof, and thus should not be construed to limit the scope of the present disclosure.

Referring to FIG. 12B, in operation S1810, the first electronic device 100 transmits a voice signal through a speaker.

In operation S1820, the first electronic device 100 waits to receive a wireless signal. In operation S1830, the first electronic device 100 determines whether a wireless signal is received.

When it is determined that a wireless signal has been received, the first electronic device 100 calculates the distance between the first electronic device 100 and the second electronic device 200 in operation S1840. The first electronic device 100 calculates the distance D between the first electronic device 100 and the second electronic device 200 based on the information on the time gap ($\Delta t = R_B - T_S$) from time point $R_B$ at which a wireless signal is received to time point $T_S$ at which a voice signal is transmitted and the time gap from the reception time point $R_S$ of the voice signal from the second electronic device 200 to the transmission time point $T_B$ of the wireless signal.

In operation S1850, the first electronic device 100 feeds back, to the second electronic device 200, the calculated distance between the first electronic device 100 and the second electronic device 200. The operation of operation S1850 may be selectively performed.

As an embodiment, the first electronic device 100 may determine, in operation S1830, whether a pre-configured timer expires, and may proceed to operation S1840 when the timer expires.

Figure 12C:
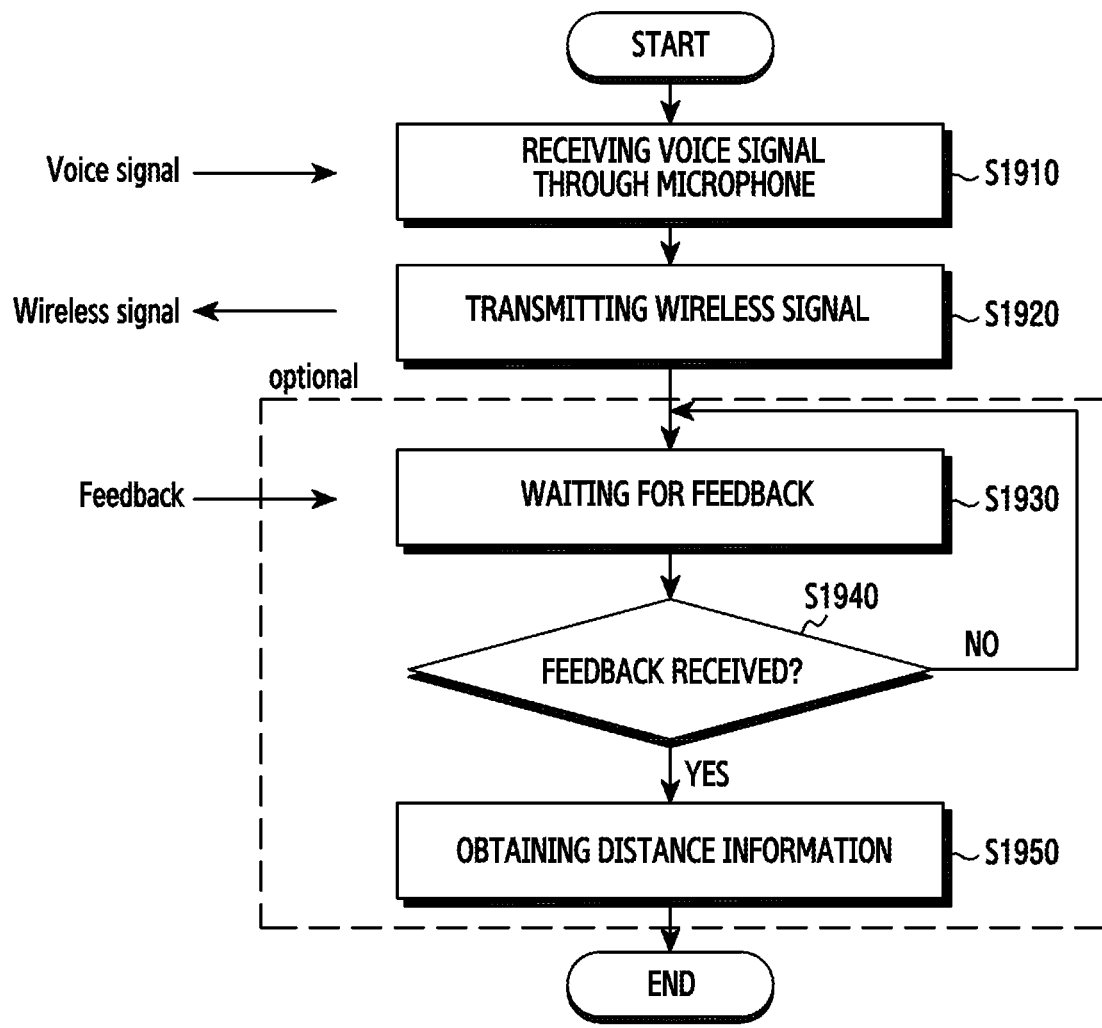
FIG. 12C illustrates a processing flow of a second electronic device for a third example of a scanning operation according to an embodiment of the present disclosure.

FIG. 12C illustrates a processing flow of a second electronic device for a third example of a scanning operation according to an embodiment of the present disclosure.

This processing flow may be performed by the second electronic device 200 illustrated in FIG. 12A. However, in this example, the distance calculating operation is performed by the first electronic device 100. The illustrated substance is just an example for describing the present disclosure and allows modified embodiments thereof, and thus should not be construed to limit the scope of the present disclosure.

Referring to FIG. 12C, in operation S1910, the second electronic device 200 receives a voice signal from the first electronic device 100 through a microphone.

When a voice signal is received through a microphone, the second electronic device 200 transmits a wireless signal in operation S1920.

In operation S1930, the second electronic device 200 waits for a feedback from the first electronic device 100. In operation S1940, the second electronic device 200 determines whether a feedback is received from the first electronic device 100.

When a feedback is received from the first electronic device 100, the second electronic device 200 acquires information on the distance between the first electronic device 100 and the second electronic device 200 from the received feedback information in operation S1950.

The operations in operation S1930 to S1950 may be selectively performed.

As an embodiment, the second electronic device 200 may determine, in operation S1940, whether a pre-configured timer expires, and may proceed to operation S1950 when the timer expires.

Figure 13A:
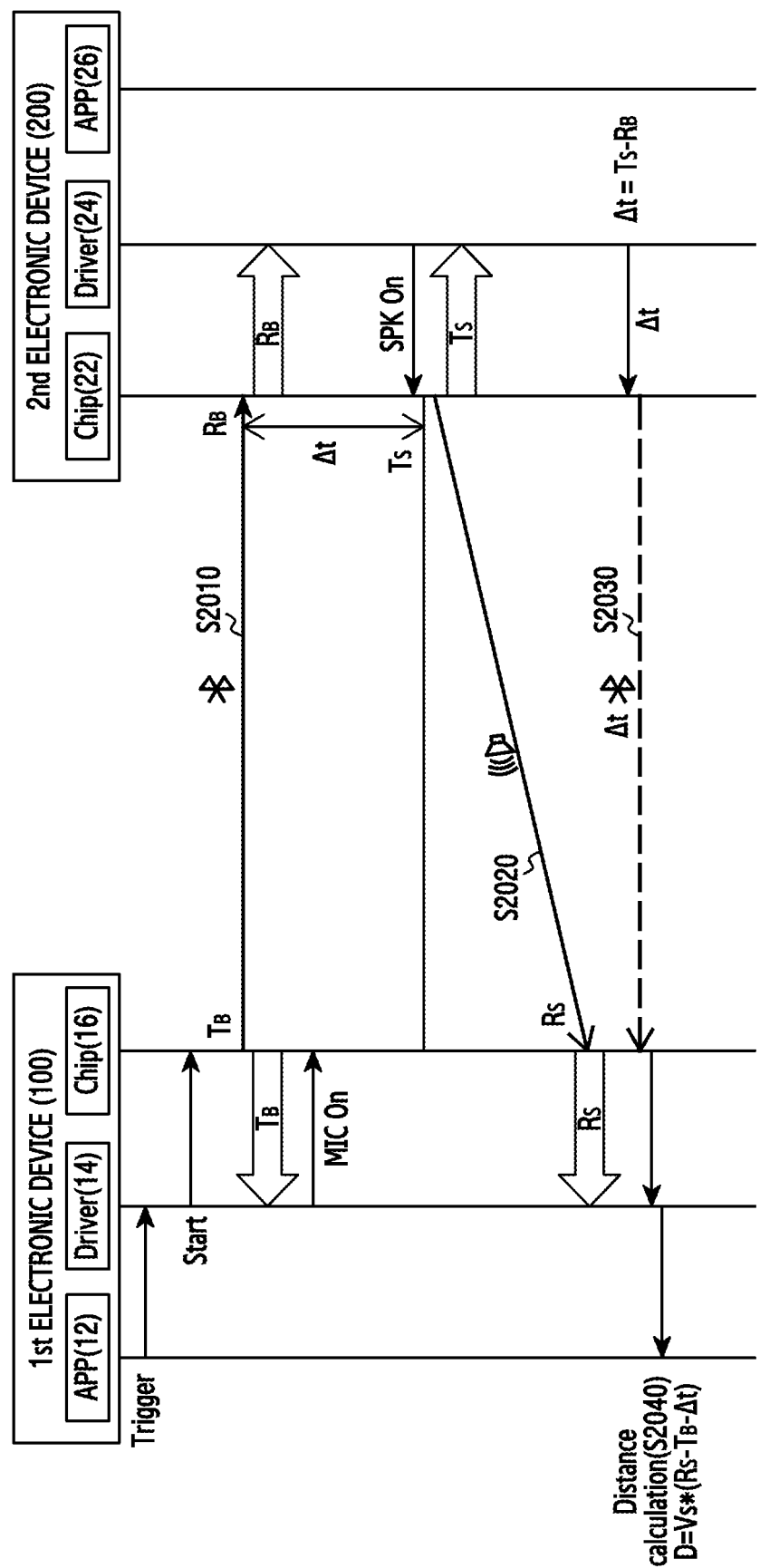
FIG. 13A illustrates a fourth example of a processing flow for a scanning operation according to an embodiment of the present disclosure.

FIG. 13A illustrates a fourth example of a processing flow for a scanning operation according to an embodiment of the present disclosure.

This processing flow corresponds to a processing flow of a wireless distance measurement scheme according to the DualSeq ES scheme. The illustrated substance is just an example for describing the present disclosure and allows modified embodiments thereof, and thus should not be construed to limit the scope of the present disclosure.

Referring to FIG. 13A, the first electronic device 100 includes an application 12, a driver 14, and a chip 16. The second electronic device 200 includes a chip 22, a driver 24, and an application 26. The chips 16 and 26 are elements for generation of a wireless signal or voice signal. For example, the chip 16 or 22 includes a module (e.g., communication module 520 or BLE module 527 of FIG. 5) for generation of a wireless signal, such as a BLE signal. As another example, the chip 16 or 22 includes a module (e.g., audio module 580 of FIG. 5) for generation of a voice signal. The applications 12 and 22 are elements for execution of a service by the electronic device. The drivers 14 and 24 are elements for controlling the driving of the chips 16 and 26. The first electronic device 100 has a microphone and the second electronic device 200 has a speaker.

The application 12 of the first electronic device 100 generates a trigger signal for distance measurement and the driver 14 thereof generates a distance measurement start signal in response to the trigger signal. At time point $T_B$, the chip 16 generates a wireless signal (e.g., BLE signal) in response to the distance measurement start signal in operation S2010. The first electronic device 100 activates the microphone after passage of a predetermined time interval (e.g., $\Delta T$) from time point $T_B$. Then, the microphone connected to the chip 16 starts to record sound. Thereafter, since the first electronic device 100 does not know when the voice signal transmitted from the second electronic device 200 is received, the recording of the sound through the microphone is performed for a predetermined time interval from time point $(T_B+\Delta T)$. The predetermined time interval may be configured as a sufficient and proper time interval after the time point at which the voice signal is expected to be received. For example, the predetermined time interval may be determined in consideration of the time gap $(\Delta t=T_S-R_B)$ from time point $R_B$ to time point $T_S$ in the first electronic device 100 and a time interval taken while the voice signal transmitted from the second electronic device 200 arrives at the first electronic device 100. In an embodiment, a negotiation process may be performed in response to the trigger signal, and the distance measurement start signal may be generated after the negotiation process is completed.

The second electronic device 200 receives the wireless signal from the first electronic device 100 at time point $R_B$.

When receiving the wireless signal, the second electronic device 200 activates the speaker and generates a voice signal at time point $T_S$ after time point $R_B$ in operation S2020.

The first electronic device 100 receives the voice signal from the second electronic device 200 through the microphone at time point $R_S$. The microphone of the first electronic device 100 performs sound recording for a predetermined time interval from time point $(T_B+\Delta T)$, and receives the voice signal from the first electronic device 100 during the sound recording.

The second electronic device 200 transfers information on the time gap $(\Delta t=T_S-R_B)$ from time point $R_B$ to time point $T_S$ to the first electronic device 100 in operation S2030.

The first electronic device 100 calculates the distance D between the first electronic device 100 and the second electronic device 200 based on the information on the time gap $(\Delta t=T_S-R_B)$ from time point $R_B$ to time point $T_S$ received from the second electronic device 200 and the time gap from the transmission time point $T_B$ of the wireless signal to the reception time point $R_S$ of the wireless signal in operation S2040. The distance D between the first electronic device 100 and the second electronic device 200 is calculated by Equation 5 below. The application 12 of the first electronic device 100 derives the reception time point $R_S$ of the voice signal, using substance obtained as a result of recording through the microphone. That is, since the application 12 knows time point $T_B$ at which the wireless signal is transmitted from the second electronic device 200, time point $(T_B+\Delta T)$ at which recording through the microphone is started, and a time interval for which the recording is performed from time point $(T_B+\Delta T)$, the application 12 can derive time point $R_S$ at which the voice signal is received.

$$D=V_S*(R_S-T_B-\Delta t) \quad \text{Equation 5}$$

In Equation 5, $V_S$ indicates the transmission speed (340 m/s) of the voice signal, $R_S$ indicates the time point at which the first electronic device 100 receives the voice signal, $T_B$ indicates the time point at which the first electronic device 100 transmits the wireless signal, and $\Delta t$ indicates the time gap from time point $T_S$ at which the second electronic device 200 transmits the voice signal to time point $R_B$ at which the second electronic device 200 receives the wireless signal.

The information on the distance D between the first electronic device 100 and the second electronic device 200, which has been measured by the first electronic device 100, may be fed back to the second electronic device 200.

As an embodiment, in place of the first electronic device 100, the second electronic device 200 may calculate the distance D between the first electronic device 100 and the second electronic device 200. In this instance, the second electronic device 200 calculates the distance D by receiving, from the first electronic device 100, information on the time gap from time point $R_S$ at which the voice signal is received to time point $T_B$ at which the wireless signal is transmitted.

Figure 13B:
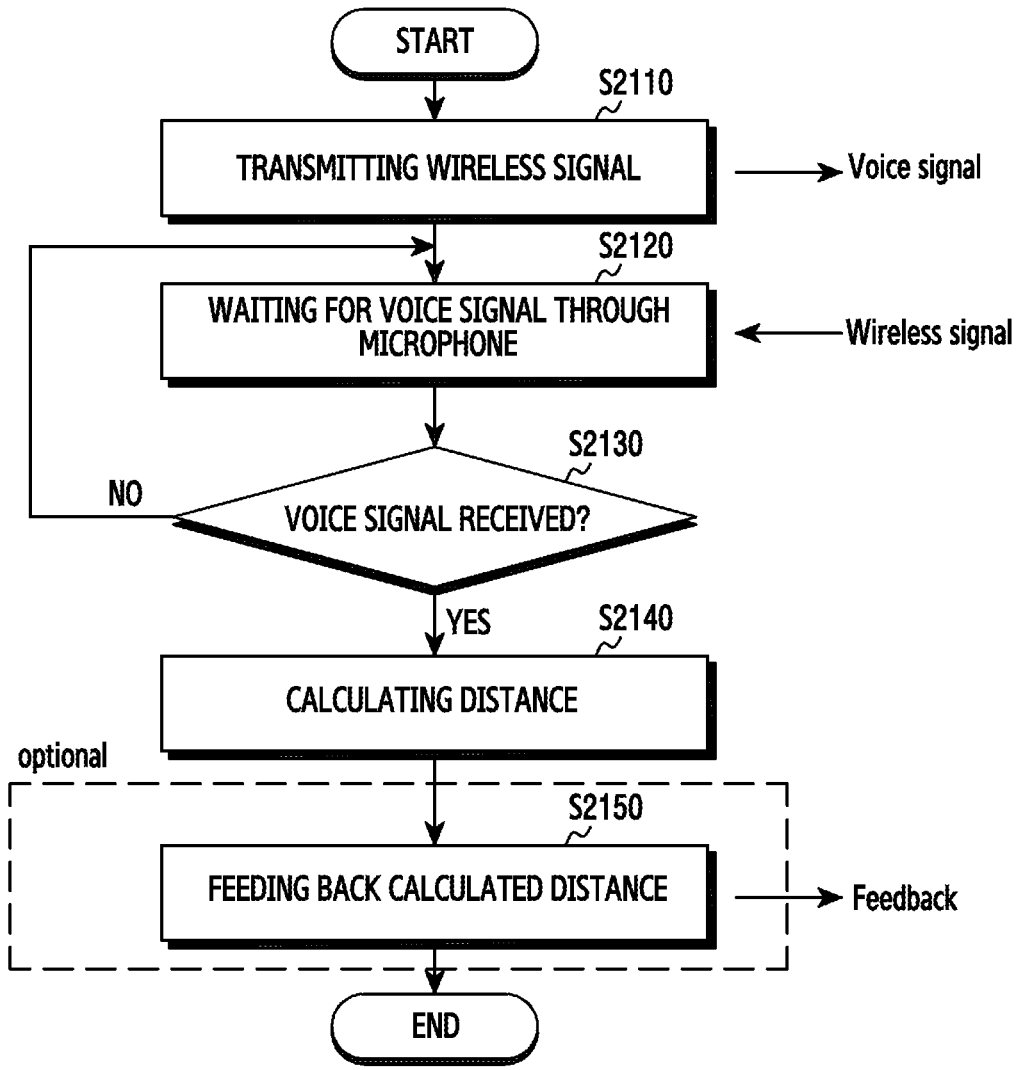
FIG. 13B illustrates a processing flow of a first electronic device for a fourth example of a scanning operation according to an embodiment of the present disclosure.

FIG. 13B illustrates a processing flow of a first electronic device for a fourth example of a scanning operation according to an embodiment of the present disclosure.

This processing flow may be performed by the first electronic device 100 illustrated in FIG. 13A. The illustrated substance is just an example for describing the present disclosure and allows modified embodiments thereof, and thus should not be construed to limit the scope of the present disclosure.

Referring to FIG. 13B, in operation S2110, the first electronic device 100 transmits a wireless signal. In operation S2120, the first electronic device 100 waits to receive a voice signal through a microphone. In operation S2130, the first electronic device 100 determines whether a wireless signal is received.

When it is determined that a voice signal has been received, the first electronic device 100 calculates the distance between the first electronic device 100 and the second electronic device 200 in operation S2140. The first electronic device 100 calculates the distance D between the first electronic device 100 and the second electronic device 200 based on the information on the time gap ($\Delta t = T_S - R_B$) from time point $R_B$ to time point $T_S$ received from the second electronic device 200 and the time gap from the transmission time point $T_B$ of the wireless signal to the reception time point $R_S$ of the wireless signal.

In operation S2150, the first electronic device 100 feeds back, to the second electronic device 200, the calculated distance between the first electronic device 100 and the second electronic device 200. The operation of operation S2150 may be selectively performed.

As an embodiment, the first electronic device 100 may determine, in operation S2130, whether a pre-configured timer expires, and may proceed to operation S2140 when the timer expires.

Figure 13C:
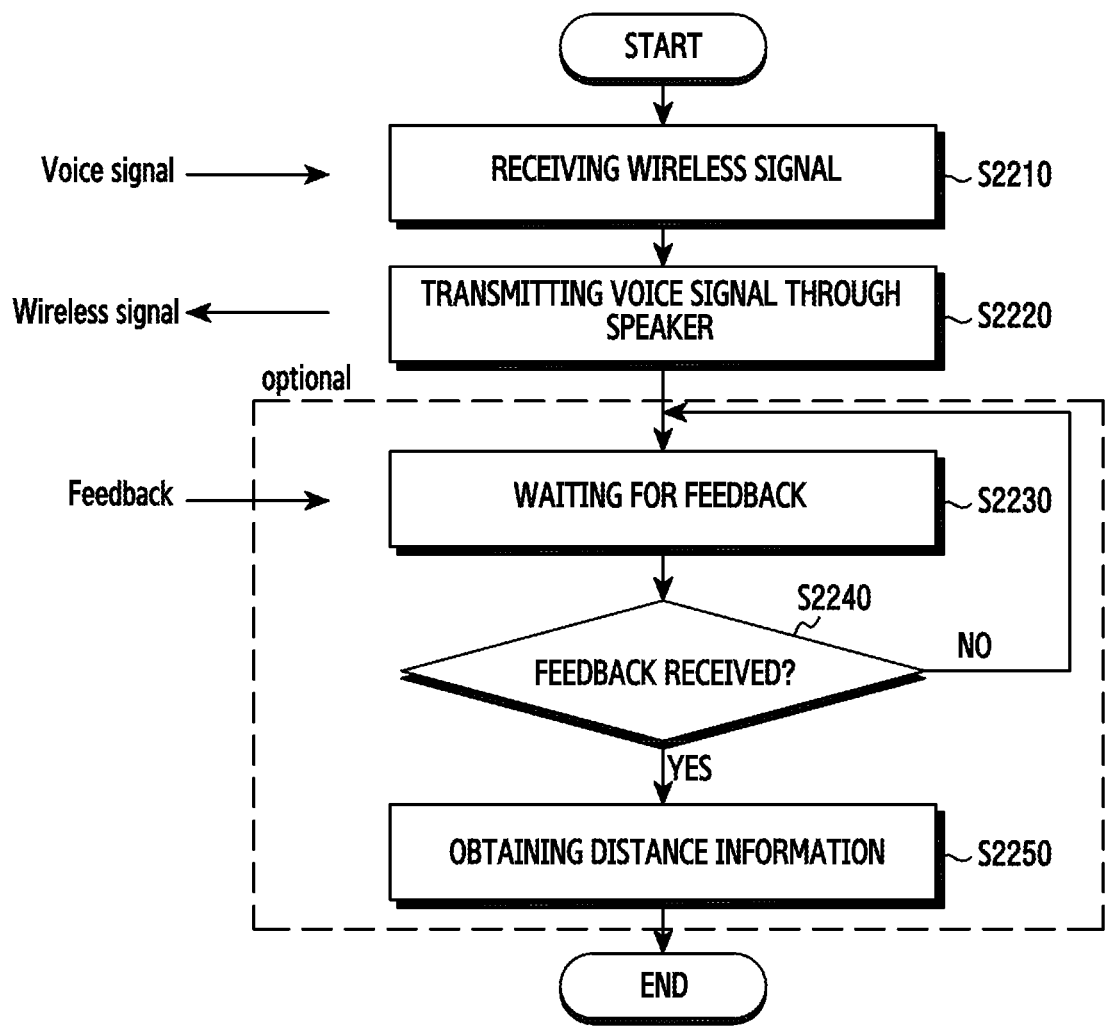
FIG. 13C illustrates a processing flow of a second electronic device for the fourth example of a scanning operation according to an embodiment of the present disclosure.

FIG. 13C illustrates a processing flow of a second electronic device for the fourth example of a scanning operation according to an embodiment of the present disclosure.

This processing flow may be performed by the second electronic device 200 illustrated in FIG. 13A. The illustrated substance is just an example for describing the present disclosure and allows modified embodiments thereof, and thus should not be construed to limit the scope of the present disclosure.

Referring to FIG. 13C, in operation S2210, the second electronic device 200 receives a wireless signal from the first electronic device 100.

When the wireless signal is received, the second electronic device 200 transmits a voice signal through a speaker in operation S2220.

In operation S2230, the second electronic device 200 waits for a feedback from the first electronic device 100. In operation S2240, the second electronic device 200 determines whether a feedback is received from the first electronic device 100.

When a feedback is received from the first electronic device 100, the second electronic device 200 acquires information on the distance between the first electronic device 100 and the second electronic device 200 from the received feedback information in operation S2250.

The operations in operation S2230 to S2250 may be selectively performed.

As an embodiment, the second electronic device 200 may determine, in operation S2240, whether a pre-configured timer expires, and may proceed to operation S2250 when the timer expires.

Figure 14A:
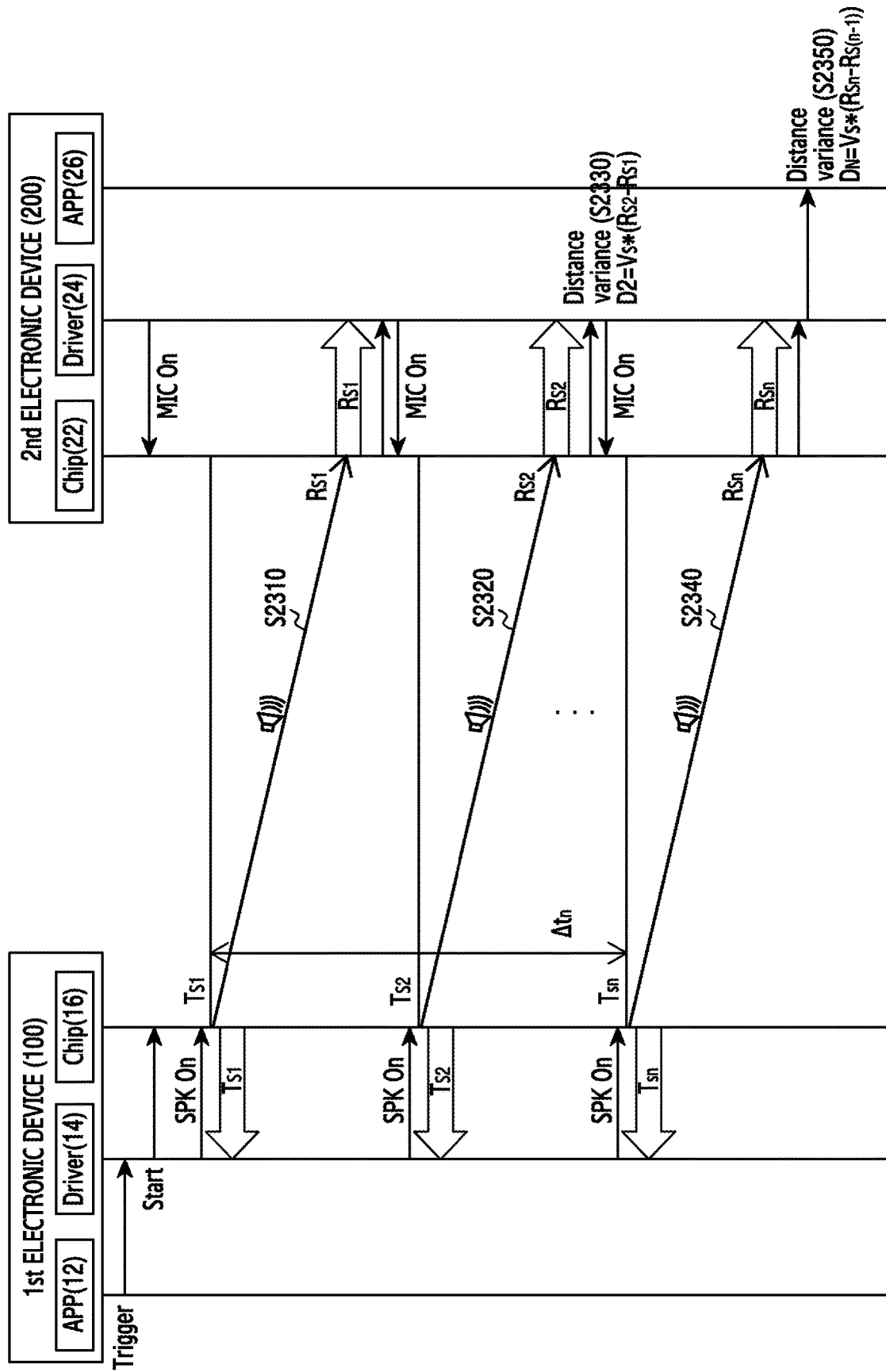
FIG. 14A illustrates a fifth example of a processing flow for a scanning operation according to an embodiment of the present disclosure.

FIG. 14A illustrates a fifth example of a processing flow for a scanning operation according to an embodiment of the present disclosure.

This processing flow corresponds to a processing flow of a wireless distance measurement scheme according to the asynchronous sound (ASyncSound) scheme. The illustrated substance is just an example for describing the present disclosure and allows modified embodiments thereof, and thus should not be construed to limit the scope of the present disclosure.

Referring to FIG. 14A, the first electronic device 100 includes an application 12, a driver 14, and a chip 16. The second electronic device 200 includes a chip 22, a driver 24, and an application 26. The chips 16 and 22 are elements for generation of a wireless signal or voice signal. For example, the chip 16 or 22 includes a module (e.g., communication module 520 or BLE module 527 of FIG. 5) for generation of a wireless signal, such as a BLE signal. As another example, the chip 16 or 22 includes a module (e.g., audio module 580 of FIG. 5) for generation of a voice signal. The applications 12 and 22 are elements for execution of a service by the electronic device. The drivers 14 and 24 are elements for controlling the driving of the chips 16 and 26. The first electronic device 100 has a speaker and the second electronic device 200 has a microphone.

The application 12 of the first electronic device 100 generates a trigger signal for distance measurement and the driver 14 thereof generates a distance measurement start signal in response to the trigger signal. In response to the distance measurement start signal, the chip 16 periodically generates a voice signal. In an embodiment, a negotiation process may be performed in response to the trigger signal, and the distance measurement start signal may be generated after the negotiation process is completed.

The first electronic device 100 activates a speaker and generates a voice signal at time point $T_{S1}$ in operation S2310, activates a speaker and generates a voice signal at time point $T_{S2}$ in operation S2320, and activates a speaker and generates a voice signal at time point $T_{Sn}$ in operation S2340.

The second electronic device 200 activates a microphone at a predetermined time point after the negotiation with the first electronic device 100. Then, the microphone connected to the chip 22 starts to record sound. The second electronic device 200 receives the voice signal from the first electronic device 100 through the microphone at time point $R_{S1}$ in operation S2310. The microphone of the second electronic device 200 performs sound recording for a predetermined time interval from the time point at which the microphone is activated, and receives the voice signal from the first electronic device 100 during the sound recording.

Then, the second electronic device 200 activates a microphone and receives the voice signal from the first electronic device 100 through the microphone at time point $R_{S2}$ in operation S2320. The microphone of the second electronic device 200 performs sound recording for a predetermined time interval from the time point at which the microphone is activated, and receives the voice signal from the first electronic device 100 during the sound recording.

Based on the information on time point $R_{S1}$ at which the voice signal is firstly received and time point $R_{S2}$ at which the voice signal is secondarily received, the second electronic device 200 calculates a variance D2 in the relative distance between the first electronic device 100 and the second electronic device 200 in operation S2330. The variance D2 in the relative distance between the first electronic device 100 and the second electronic device 200 is calculated by Equation 6 below. The application 26 of the second electronic device 200 derives the reception time point $R_{S1}$ and the reception time point $R_{S2}$ of the voice signal, using substance obtained as a result of recording through the microphone. That is, since the application 26 knows the time point of microphone-on at which the recording through the microphone is started, and the time interval for which the recording is performed from the time point of microphone-on, the application 26 can derive the reception time point $R_{S1}$ and the reception time point $R_{S2}$ of the voice signal.

$$D2 = V_S * (R_{S2} - R_{S2}) \qquad \text{Equation 6}$$

In Equation 6, $V_S$ indicates the transmission speed (340 m/s) of the voice signal, and $R_{S1}$ and $R_{S2}$ indicate the time points at which the second electronic device 200 receives the voice signal.

Then, the second electronic device 200 activates a microphone and receives the voice signal from the first electronic device 100 through the microphone at time point $R_{Sn}$ in operation S2340. The microphone of the second electronic device 200 performs sound recording for a predetermined time interval from the time point at which the microphone is activated, and receives the voice signal from the first electronic device 100 during the sound recording.

Based on the information on time point $R_{S(n-1)}$ at which the (n−1)-th voice signal is received and time point $R_{Sn}$ at which the n-th voice signal is received, the second electronic device 200 calculates a variance Dn in the relative distance between the first electronic device 100 and the second electronic device 200 in operation S2350. The variance Dn in the relative distance between the first electronic device 100 and the second electronic device 200 is calculated by Equation 7 below. The application 26 of the second electronic device 200 derives the reception time point $R_{S(n-1)}$ and the reception time point $R_{Sn}$ of the voice signal, using the substance obtained as a result of recording through the microphone. That is, since the application 26 knows the time point of microphone-on at which the recording through the microphone is started, and the time interval for which the recording is performed from the time point of microphone-on, the application 26 can derive the reception time point $R_{S(n-1)}$ and the reception time point $R_{Sn}$ of the voice signal.

$$Dn = V_S * (R_{Sn} - R_{S(n-1)}) \qquad \text{Equation 7}$$

In Equation 7, $V_S$ indicates the transmission speed (340 m/s) of the voice signal, and $R_{S(n-1)}$ and $R_{Sn}$ indicate the time points at which the second electronic device 200 receives the voice signal.

The information on the variance D in the relative distance between the first electronic device 100 and the second electronic device 200 calculated by the second electronic device 200 may be fed back to the first electronic device 100.

Figure 14B:
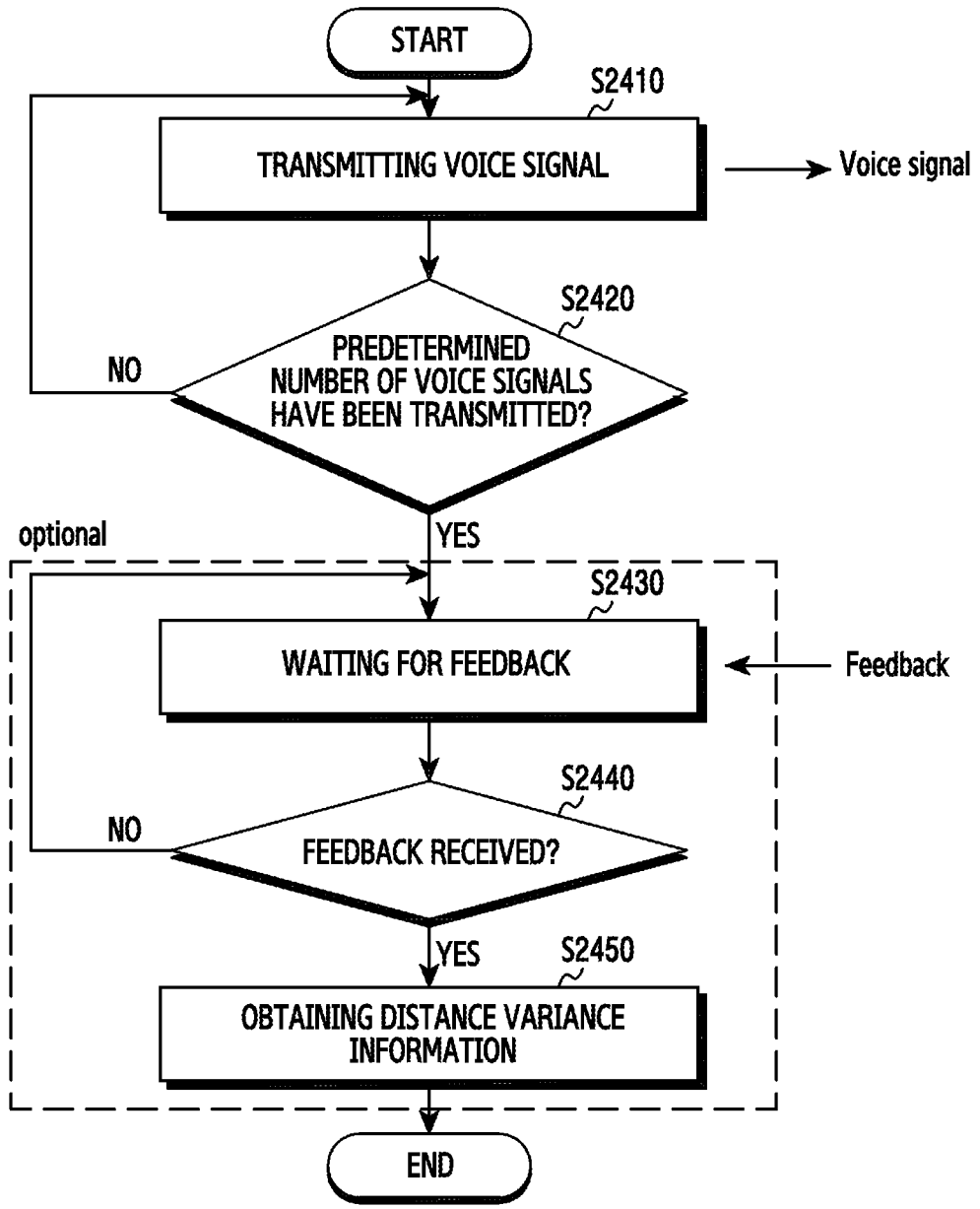
FIG. 14B illustrates a processing flow of a first electronic device for a fifth example of a scanning operation according to an embodiment of the present disclosure.

FIG. 14B illustrates a processing flow of a first electronic device for a fifth example of a scanning operation according to an embodiment of the present disclosure.

This processing flow may be performed by the first electronic device 100 illustrated in FIG. 14A. The illustrated substance is just an example for describing the present disclosure and allows modified embodiments thereof, and thus should not be construed to limit the scope of the present disclosure.

Referring to FIG. 14B, in operation S2410, the first electronic device 100 transmits a voice signal through a speaker. The transmission of the voice signal through the speaker continues until it is determined in operation S2420 that a predetermined number of voice signals have been transmitted.

In operation S2430, the first electronic device 100 waits for a feedback from the second electronic device 200. In operation S2440, the first electronic device 100 determines whether a feedback is received from the second electronic device 200.

When a feedback is received from the second electronic device 200, the first electronic device 100 acquires information on the variance in the distance between the first electronic device 100 and the second electronic device 200 from the received feedback information in operation S2450. The operations in operations S2430 to S2450 may be selectively performed.

As an embodiment, the first electronic device 100 may determine, in operation S2420, whether a pre-configured timer expires, and may proceed to operation S2430 when the timer expires. Further, the first electronic device 100 may determine, in operation S2440, whether a pre-configured timer expires, and may proceed to operation S2450 when the timer expires.

Figure 14C:
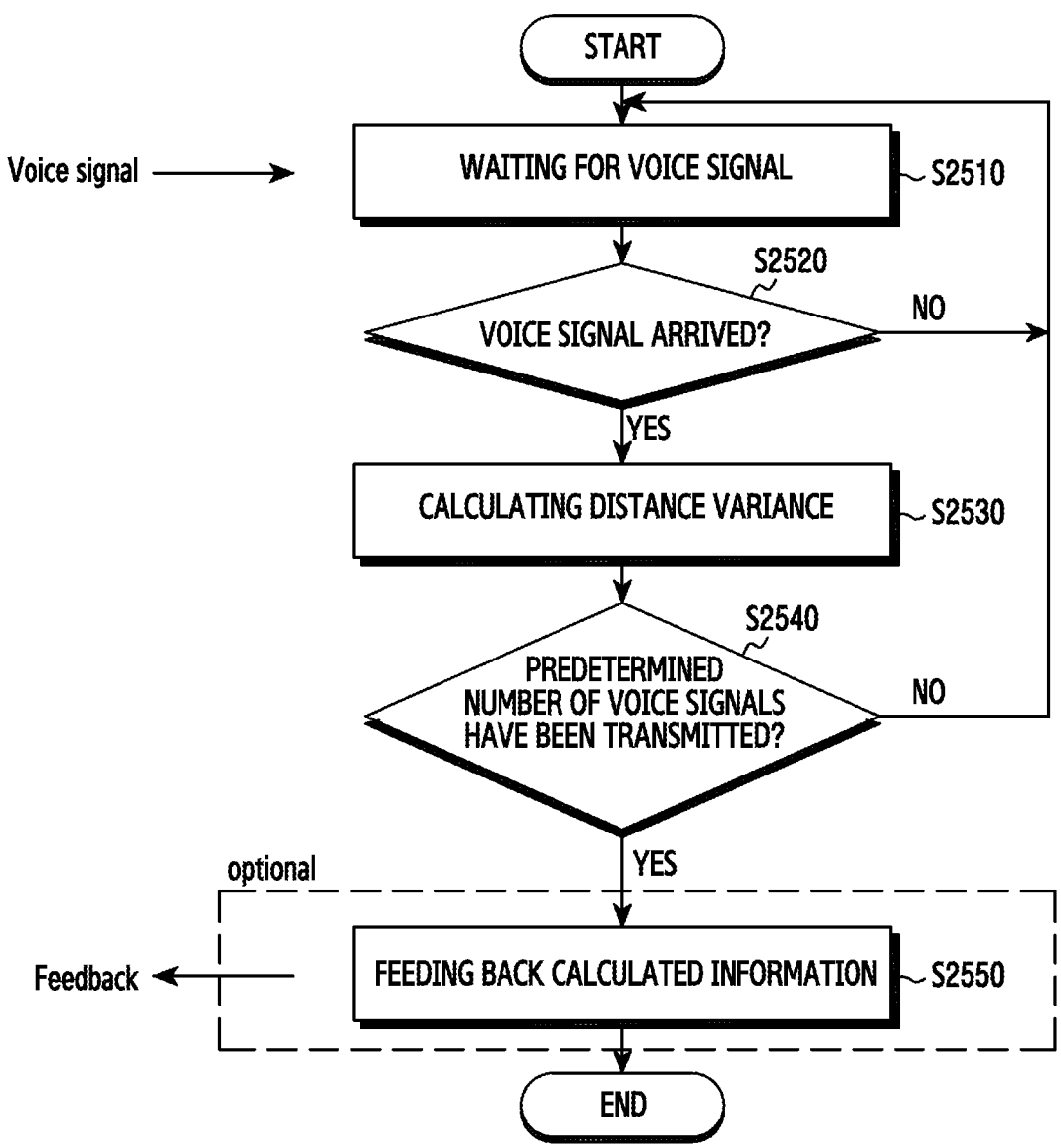
FIG. 14C illustrates a processing flow of a second electronic device for the fifth example of a scanning operation according to an embodiment of the present disclosure.

FIG. 14C illustrates a processing flow of a second electronic device for the fifth example of a scanning operation according to an embodiment of the present disclosure.

This processing flow may be performed by the second electronic device 200 illustrated in FIG. 14A. The illustrated substance is just an example for describing the present disclosure and allows modified embodiments thereof, and thus should not be construed to limit the scope of the present disclosure.

Referring to FIG. 14C, in operation S2510, the second electronic device 200 waits to receive a voice signal from the first electronic device 100 through a microphone. In operation S2520, the second electronic device 200 determines whether a voice signal is received from the first electronic device 100 through a microphone.

When a voice signal is received through a microphone, the second electronic device 200 calculates a variance in the relative distance between the first electronic device 100 and the second electronic device 100 based on the reception time points of the voice signal in operation S2530. The second electronic device 200 calculates the variance in the relative distance between the first electronic device 100 and the second electronic device 200 according to Equations 6 and 7.

The operation of calculating the variance in the distances between the first electronic device 100 and the second electronic device 200 may be repeatedly performed until it is determined in operation S2540 that a predetermined number of voice signals have been received.

In operation S2550, the second electronic device 200 feeds back, to the first electronic device 100, information on the calculated variance in the relative distance between the first electronic device 100 and the second electronic device 200. The operation of operation S2550 may be selectively performed.

As an embodiment, the second electronic device 200 may determine, in operation S2520, whether a pre-configured timer expires, and may proceed to operation S2530 when the timer expires. Further, the second electronic device 200 may determine, in operation S2540, whether a pre-configured timer expires, and may proceed to operation S2550 when the timer expires.

Figure 15A:
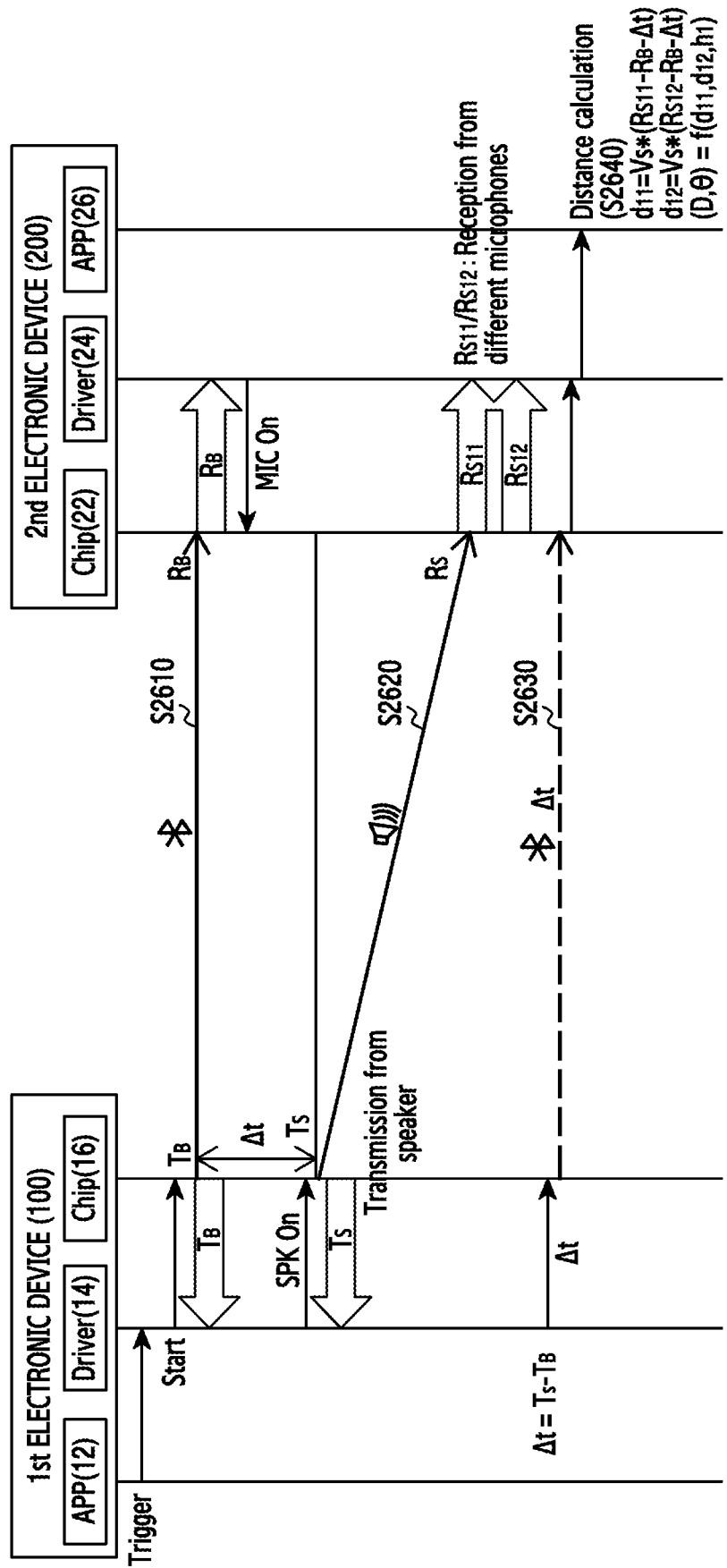
FIG. 15A illustrates a sixth example of a processing flow for a scanning operation according to an embodiment of the present disclosure.

FIG. 15A illustrates a sixth example of a processing flow for a scanning operation according to an embodiment of the present disclosure.

This processing flow corresponds to a processing flow of a wireless distance measurement scheme according to the DualSync scheme. According to this processing flow, the distance and direction (or angle) between the first electronic device 100 and the second electronic device 200 are measured. To this end, the first electronic device 100 has a speaker and the second electronic device 200 has a plurality of (e.g., two) microphones. The illustrated substance is just an example for describing the present disclosure and allows modified embodiments thereof, and thus should not be construed to limit the scope of the present disclosure.

Referring to FIG. 15A, the first electronic device 100 includes an application 12, a driver 14, and a chip 16. The second electronic device 200 includes a chip 22, a driver 24, and an application 26. The chips 16 and 22 are elements for generation of a wireless signal or voice signal. For example, the chip 16 or 22 includes a module (e.g., communication module 520 or BLE module 527 of FIG. 5) for generation of a wireless signal, such as a BLE signal. As another example, the chip 16 or 22 includes a module (e.g., audio module 580 of FIG. 5) for generation of a voice signal. The applications 12 and 22 are elements for execution of a service by the electronic device. The drivers 14 and 24 are elements for controlling the driving of the chips 16 and 26.

The application 12 of the first electronic device 100 generates a trigger signal for distance measurement and the driver 14 thereof generates a distance measurement start signal in response to the trigger signal. At time point $T_B$, the chip 16 generates a wireless signal (e.g., BLE signal) in response to the distance measurement start signal in operation S2610. In an embodiment, a negotiation process may be performed in response to the trigger signal, and the distance measurement start signal may be generated after the negotiation process is completed.

The second electronic device 200 receives the wireless signal from the first electronic device 100 at time point $R_B$, and activates the microphone in response thereto. The driver 24 of the second electronic device 200 activates the microphone after passage of a predetermined time interval (e.g., $\Delta T$) from time point $R_B$. Then, the microphone connected to the chip 22 starts to record sound. Thereafter, since the second electronic device 200 does not know when the voice signal transmitted from the first electronic device 100 is received, the recording of the sound by the microphone is performed for a predetermined time interval from time point $(R_B+\Delta T)$. The predetermined time interval may be configured as a sufficient and proper time interval after the time point at which the voice signal is expected to be received. For example, the predetermined time interval may be determined in consideration of the time gap $(\Delta t1=T_S-T_B)$ from time point $T_B$ to time point $T_S$ and a time interval taken while the voice signal transmitted from the first electronic device 100 arrives at the second electronic device 200.

The driver 14 of the first electronic device 100 activates a speaker at time point $T_S$ after time point $T_B$ to generate a voice signal through the speaker connected to the chip 16 in operation S2620. The generated voice signal is transmitted through the speaker.

The second electronic device 200 receives the voice signal from the first electronic device 100 through a plurality of (e.g., two) microphones at time point $R_S$ in operation S2620. If two microphones are used, the first microphone and the second microphone of the second electronic device 200 perform sound recording for a predetermined time interval from time point $(R_B+\Delta T)$, and receive the voice signal from the first electronic device 100 through the first microphone and the second microphone during the sound recording. The first electronic device 100 transfers information on the time gap $(\Delta t=T_S-T_B)$ from time point $T_B$ to time point $T_S$ to the second electronic device 200 in operation S2630.

The second electronic device 200 calculates the distance d11 between the first electronic device 100 and the first microphone of the second electronic device 200 based on the information on the time gap $(\Delta t=T_S-T_B)$ from time point $T_B$ to time point $T_S$ received from the first electronic device 100 and the time gap from the reception time point $R_B$ of the wireless signal to the reception time point $R_{S11}$ of the voice signal through the first microphone in operation S2640. The distance d11 between the first electronic device 100 and the first microphone of the second electronic device 200 is calculated by Equation 8 below. The application 26 of the second electronic device 200 derives the reception time point $R_{S11}$ of the voice signal through the first microphone, using the substance obtained as a result of recording through the microphone. That is, since the application 26 knows time point $R_B$ at which the wireless signal is received from the first electronic device 100, time point $(R_B+\Delta T)$ at which recording through the microphone is started, and a time interval for which the recording is performed from time point $(R_B+\Delta T)$, the application 26 can derive time point $R_{S11}$ at which the voice signal is received through the first microphone.

$$d11=V_S*(R_{S11}-R_B-\Delta t) \quad \text{Equation 8}$$

In Equation 8, $V_S$ indicates the transmission speed (340 m/s) of the voice signal, $R_{S11}$ indicates the time point at which the second electronic device 200 receives the voice signal through the first microphone, $R_B$ indicates the time point at which the second electronic device 200 receives the wireless signal, and $\Delta t$ indicates the time gap from time point $T_B$ at which the first electronic device 100 transmits the wireless signal to time point $T_S$ at which the first electronic device 100 transmits the voice signal.

The second electronic device 200 calculates the distance d12 between the first electronic device 100 and the second microphone of the second electronic device 200 based on the information on the time gap $(\Delta t=T_S-T_B)$ from time point $T_B$ to time point $T_S$ received from the first electronic device 100 and the time gap from the reception time point $R_B$ of the wireless signal to the reception time point $R_{S12}$ of the voice signal through the second microphone in operation S2640. The distance d12 between the first electronic device 100 and the second microphone of the second electronic device 200 is calculated by Equation 9 below. The application 26 of the second electronic device 200 derives the reception time point $R_{S12}$ of the voice signal through the second microphone, using the substance obtained as a result of recording through the microphone. That is, since the application 26 knows time point $R_B$ at which the wireless signal is received from the first electronic device 100, time point ($R_B+\Delta T$) at which recording through the microphone is started, and a time interval for which the recording is performed from time point ($R_B+\Delta T$), the application 26 can derive time point $R_{S12}$ at which the voice signal is received through the second microphone.

$$d12=V_S*(R_{S2}-R_B-\Delta t) \quad \text{Equation 9}$$

In Equation 8, $V_S$ indicates the transmission speed (340 m/s) of the voice signal, $R_{S2}$ indicates the time point at which the second electronic device 200 receives the voice signal through the second microphone, $R_B$ indicates the time point at which the second electronic device 200 receives the wireless signal, and $\Delta t$ indicates the time gap from time point $T_B$ at which the first electronic device 100 transmits the wireless signal to time point $T_S$ at which the first electronic device 100 transmits the voice signal.

Based on the distance d11 between the first electronic device 100 and the first microphone of the second electronic device 200, the distance d12 between the first electronic device 100 and the second microphone of the second electronic device 200, and the distance h1 between the microphones, the second electronic device 200 calculates the distance D and direction (angle) θ between the first electronic device 100 and the second electronic device 200. The distance D and direction (angle) θ between the first electronic device 100 and the second electronic device 200 are calculated by Equation 10 below.

$$(D,\theta)=f(d_{11},d_{12},h_1)$$

$$D=1/2*\text{sqrt}(2d_{12}^2+2d_{11}^2-h_1^2)$$

$$\cos(\pi/2-\theta)=1/(2Dh_1/2)*(D^2+h_1^2/4-d^2)$$

$$d=\min(d_{11},d_{12}) \quad \text{Equation 10}$$

In Equation 10, d11 indicates a measured distance between the first electronic device 100 and the first microphone of the second electronic device 200, d12 indicates a measured distance between the first electronic device 100 and the second microphone of the second electronic device 200, h1 indicates the distance between the first microphone and the second microphone, and θ indicates an angle between the first electronic device 100 and the second electronic device 200 with reference to the first electronic device 100.

The information on the distance D and direction θ between the first electronic device 100 and the second electronic device 200 measured by the second electronic device 200 may be fed back to the first electronic device 100.

Figure 15B:
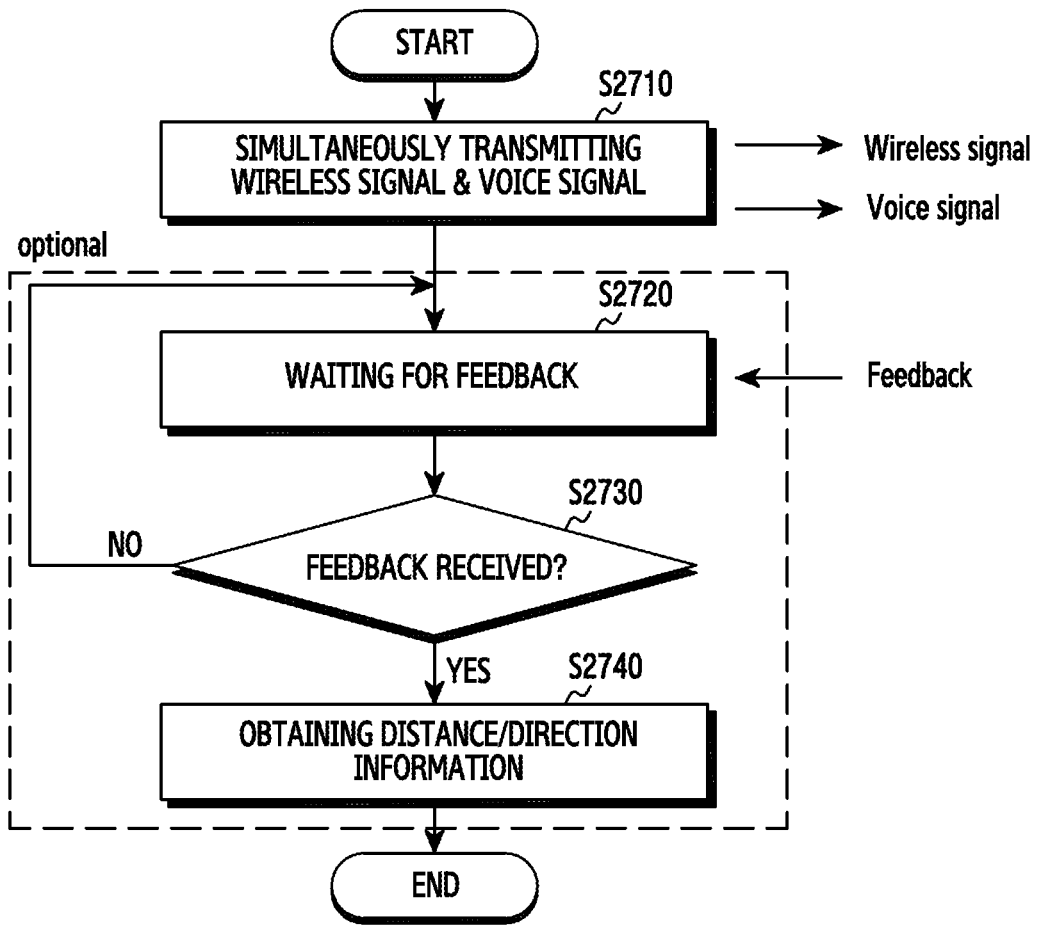
FIG. 15B illustrates a processing flow of a first electronic device for the sixth example of a scanning operation according to an embodiment of the present disclosure.

FIG. 15B illustrates a processing flow of a first electronic device for the sixth example of a scanning operation according to an embodiment of the present disclosure.

This processing flow may be performed by the first electronic device 100 illustrated in FIG. 15A. The illustrated substance is just an example for describing the present disclosure and allows modified embodiments thereof, and thus should not be construed to limit the scope of the present disclosure.

Referring to FIG. 15B, in operation S2710, the first electronic device 100 simultaneously transmits a wireless signal and a voice signal. A wireless signal first arrives at the second electronic devices 200 to trigger the reception side operation of the second electronic device 200. Thereafter, a voice signal arrives at the second electronic device 200.

In operation S2720, the first electronic device 100 waits for a feedback from the second electronic device 200. In operation S2730, the first electronic device 100 determines whether a feedback is received from the second electronic device 200.

When a feedback is received from the second electronic device 200, the first electronic device 100 acquires information on the distance/direction between the first electronic device 100 and the second electronic device 200 from the received feedback information in operation S2740.

The operations in operations S2720 to S2740 may be selectively performed.

As an embodiment, the first electronic device 100 may determine, in operation S2730, whether a pre-configured timer expires, and may proceed to operation S2740 when the timer expires.

Figure 15C:
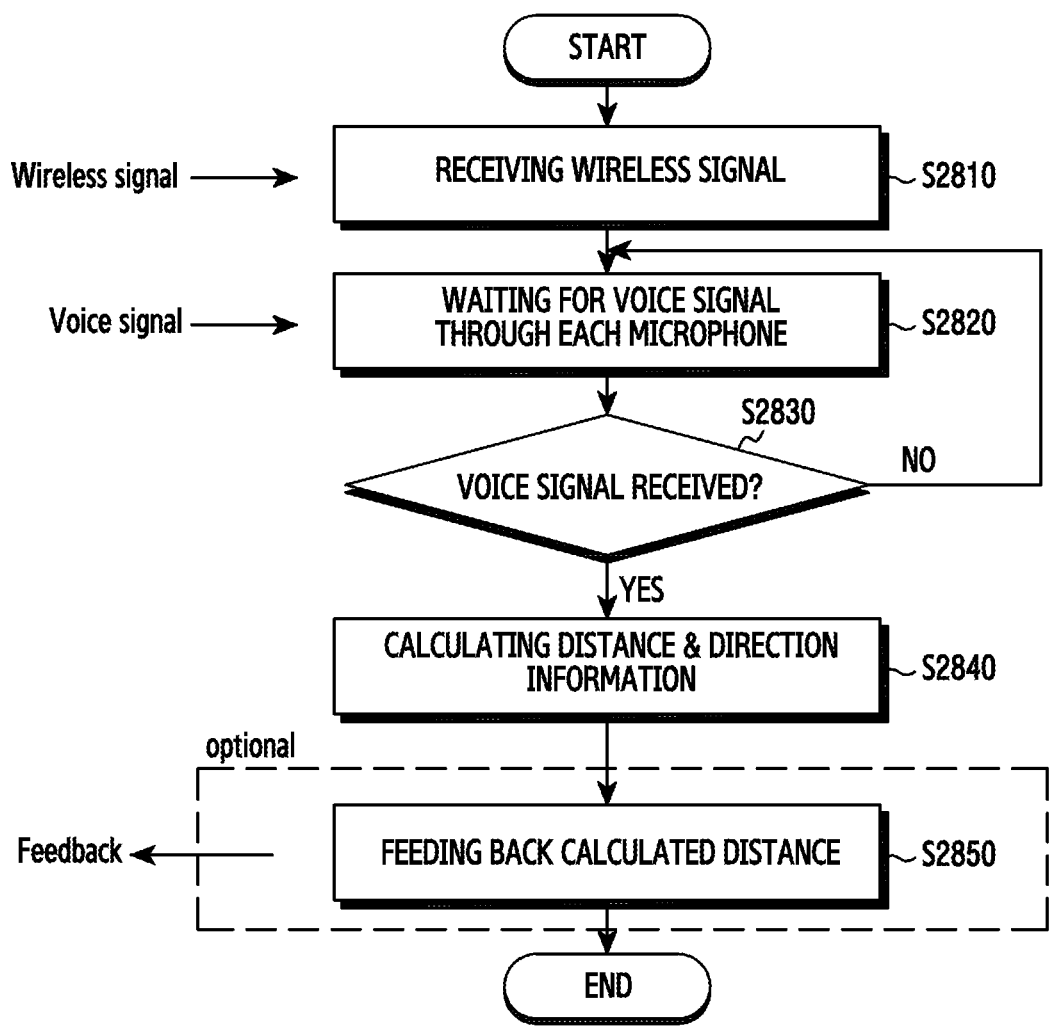
FIG. 15C illustrates a processing flow of a second electronic device for the sixth example of a scanning operation according to an embodiment of the present disclosure.

FIG. 15C illustrates a processing flow of a second electronic device for the sixth example of a scanning operation according to an embodiment of the present disclosure.

This processing flow may be performed by the second electronic device 200 illustrated in FIG. 15A. The illustrated substance is just an example for describing the present disclosure and allows modified embodiments thereof, and thus should not be construed to limit the scope of the present disclosure.

Referring to FIG. 15C, in operation S2810, the second electronic device 200 receives a wireless signal from the first electronic device 100. In operation S2820, the second electronic device 200 waits to receive a voice signal from the first electronic device 100 through each of a plurality of microphones. In operation S2830, the second electronic device 200 determines whether a voice signal is received from the first electronic device 100 through a microphone.

When a voice signal is received through each microphone, the second electronic device 200 calculates the distance and direction between the first electronic device 100 and the second electronic device 200 based on the reception time point of the wireless signal and the reception time point of the voice signal in operation S2840. The second electronic device 200 calculates the distance and direction between the first electronic device 100 and the second electronic device 200 according to Equations 8 to 10.

In operation S2850, the second electronic device 200 feeds back, to the first electronic device 100, information on the calculated distance/direction between the first electronic device 100 and the second electronic device 200. The operation of operation S2850 may be selectively performed.

As an embodiment, the second electronic device 200 may determine, in operation S2830, whether a pre-configured timer expires, and may proceed to operation S2840 when the timer expires.

Figure 16A:
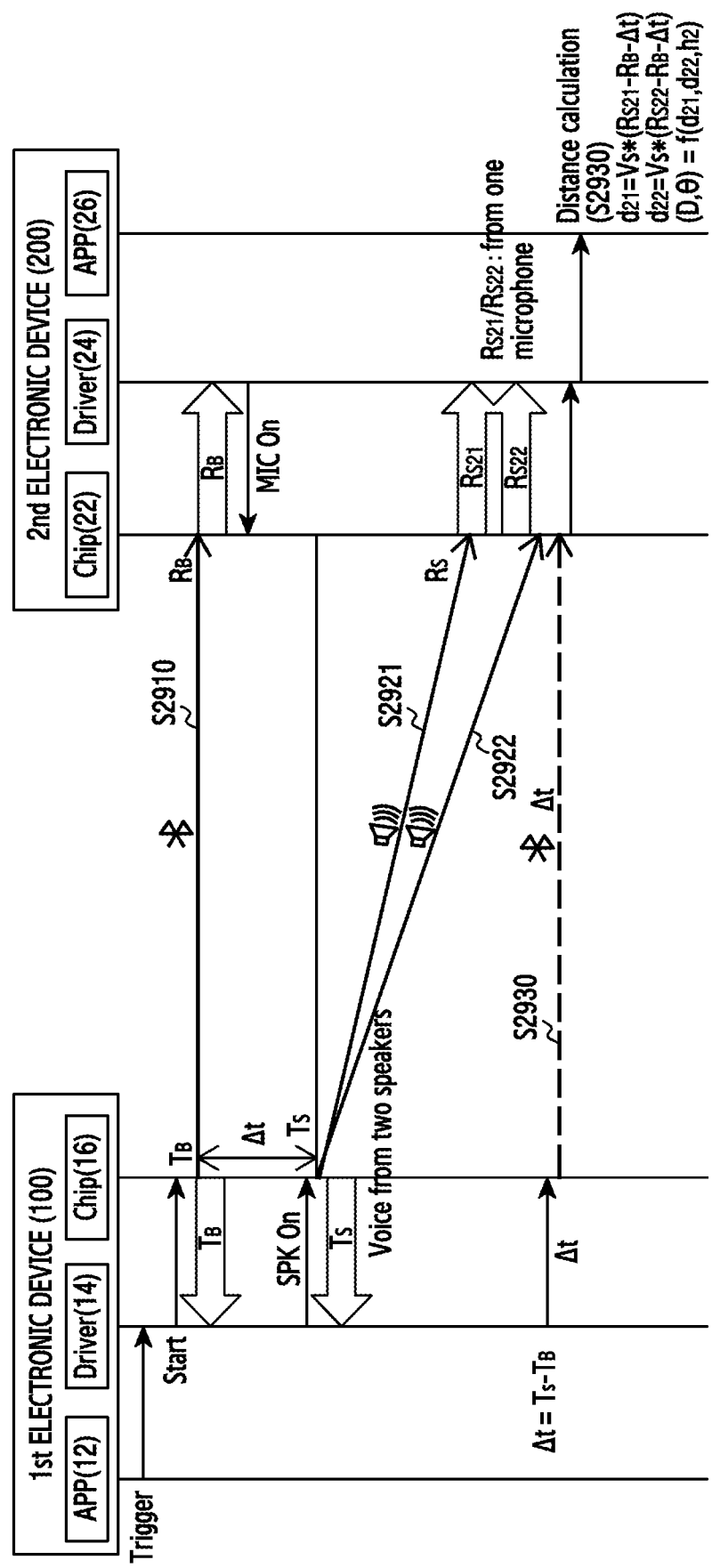
FIG. 16A illustrates a seventh example of a processing flow for a scanning operation according to an embodiment of the present disclosure.

FIG. 16A illustrates a seventh example of a processing flow for a scanning operation according to an embodiment of the present disclosure.

This processing flow corresponds to a processing flow of a wireless distance measurement scheme according to the DualSync scheme. According to this processing flow, the distance and direction (or angle) between the first electronic device 100 and the second electronic device 200 are measured. To this end, the first electronic device 100 has a plurality of (e.g., two) speakers and the second electronic device 200 has a microphone. The illustrated substance is just an example for describing the present disclosure and allows modified embodiments thereof, and thus should not be construed to limit the scope of the present disclosure.

Referring to FIG. 16A, the first electronic device 100 includes an application 12, a driver 14, and a chip 16. The second electronic device 200 includes a chip 22, a driver 24, and an application 26. The chips 16 and 22 are elements for generation of a wireless signal or voice signal. For example, the chip 16 or 22 includes a module (e.g., communication module 520 or BLE module 527 of FIG. 5) for generation of a wireless signal, such as a BLE signal. As another example, the chip 16 or 22 includes a module (e.g., audio module 580 of FIG. 5) for generation of a voice signal. The applications 12 and 22 are elements for execution of a service by the electronic device. The drivers 14 and 24 are elements for controlling the driving of the chips 16 and 26.

The application 12 of the first electronic device 100 generates a trigger signal for distance measurement and the driver 14 thereof generates a distance measurement start signal in response to the trigger signal. At time point $T_B$, the chip 16 generates a wireless signal (e.g., BLE signal) in response to the distance measurement start signal in operation S2910. In an embodiment, a negotiation process may be performed in response to the trigger signal, and the distance measurement start signal may be generated after the negotiation process is completed.

The second electronic device 200 receives the wireless signal from the first electronic device 100 at time point $R_B$, and activates the microphone in response thereto. The driver 24 of the second electronic device 200 activates the microphone after passage of a predetermined time interval (e.g., $\Delta T$) from time point $R_B$. Then, the microphone connected to the chip 22 starts to record sound. Thereafter, since the second electronic device 200 does not know when the voice signal transmitted from the first electronic device 100 is received, the recording of the sound by the microphone is performed for a predetermined time interval from time point $(R_B+\Delta T)$. The predetermined time interval may be configured as a sufficient and proper time interval after the time point at which the voice signal is expected to be received. For example, the predetermined time interval may be determined in consideration of the time gap $(\Delta t=T_S-T_B)$ from time point $T_B$ to time point $T_S$ and a time interval taken while the voice signal transmitted from the first electronic device 100 arrives at the second electronic device 200.

The driver 14 of the first electronic device 100 activates a speaker at time point $T_S$ after time point $T_B$ to make a voice signal be generated through the speaker connected to the chip 16. The generated voice signal is transmitted through the plurality of (e.g., two) speakers in operations S2921 and S2922.

The second electronic device 200 receives the voice signals transmitted through the speakers of the first electronic device 100, at time points $R_{S21}$ and $R_{S22}$. The second electronic device 200 receives the voice signal transmitted through the first speaker of the first electronic device 100 at time point $R_{S21}$ and receives the voice signal transmitted through the second speaker of the first electronic device 100 at time point $R_{S22}$ in operation S2922. The microphone of the second electronic device 200 performs sound recording for a predetermined time interval from time point $(R_B+\Delta T)$, and receives the voice signals transmitted through the plurality of speakers of the first electronic device 100 during the sound recording.

The first electronic device 100 transfers information on the time gap $(\Delta t=T_S-T_B)$ from time point $T_B$ to time point $T_S$ to the second electronic device 200 in operation S2930.

The second electronic device 200 calculates the distance d21 between the first speaker of the first electronic device 100 and the second electronic device 200 based on the information on the time gap $(\Delta t=T_S-T_B)$ from time point $T_B$ to time point $T_S$ received from the first electronic device 100 and the time gap from the reception time point $R_B$ of the wireless signal to the reception time point $R_{S21}$ of the voice signal transmitted through the first speaker of the first electronic device 100 in operation S2940. The distance between the first speaker of the first electronic device 100 and the second electronic device 200 is calculated by Equation 11 below. The application 26 of the second electronic device 200 derives the reception time point $R_{S21}$ of the voice signal, using the substance obtained as a result of recording through the microphone. That is, since the application 26 knows time point $R_B$ at which the wireless signal is received from the first speaker of the first electronic device 100, time point $(R_B+\Delta T)$ at which recording through the microphone is started, and a time interval for which the recording is performed from time point $(R_B+\Delta T)$, the application 26 can derive time point $R_{S11}$ at which the voice signal is received.

$$d21=V_S*(R_{S21}-R_B-\Delta t) \quad \text{Equation 11}$$

In Equation 11, $V_S$ indicates the transmission speed (340 m/s) of the voice signal, $R_{S21}$ indicates the time point at which the second electronic device 200 receives the voice signal transmitted through the first speaker of the first electronic device 100, $R_B$ indicates the time point at which the second electronic device 200 receives the wireless signal, and $\Delta t$ indicates the time gap from time point $T_B$ at which the first electronic device 100 transmits the wireless signal to time point $T_S$ at which the first electronic device 100 transmits the voice signal.

The second electronic device 200 calculates the distance d22 between the second speaker of the first electronic device 100 and the second electronic device 200 based on the information on the time gap $(\Delta t=T_S-T_B)$ from time point $T_B$ to time point $T_S$ received from the first electronic device 100 and the time gap from the reception time point $R_B$ of the wireless signal to the reception time point $R_{S22}$ of the voice signal transmitted through the second speaker of the first electronic device 100 in operation S2940. The distance between the second speaker of the first electronic device 100 and the second electronic device 200 is calculated by Equation 12 below. The application 26 of the second electronic device 200 derives the reception time point $R_{S22}$ of the voice signal, using the substance obtained as a result of recording through the microphone. That is, since the application 26 knows time point $R_B$ at which the wireless signal is received from the first speaker of the first electronic device 100, time point $(R_B+\Delta T)$ at which recording through the microphone is started, and a time interval for which the recording is performed from time point $(R_B+\Delta T)$, the application 26 can derive time point $R_{S22}$ at which the voice signal is received.

$$d22=V_S*(R_{S22}-R_B-\Delta t) \quad \text{Equation 12}$$

In Equation 12, $V_S$ indicates the transmission speed (340 m/s) of the voice signal, $R_{S22}$ indicates the time point at which the second electronic device 200 receives the voice signal transmitted through the second speaker of the first electronic device 100, $R_B$ indicates the time point at which the second electronic device 200 receives the wireless signal, and $\Delta t$ indicates the time gap from time point $T_B$ at which the first electronic device 100 transmits the wireless signal to time point $T_S$ at which the first electronic device 100 transmits the voice signal.

Based on the distance d21 between the first speaker of the first electronic device 100 and the second electronic device 200, the distance d22 between the second speaker of the first electronic device 100 and the second electronic device 200, and the distance h2 between the speakers, the second electronic device 200 calculates the distance D and direction (angle) θ between the first electronic device 100 and the second electronic device 200. The distance D and direction (angle) θ between the first electronic device 100 and the second electronic device 200 are calculated by Equation 13 below.

$$(D,\theta)=f(d_{21},d_{22},h_2)$$

$$D=1/2*\text{sqrt}(2d_{22}^2+2d_{21}^2-h_2^2)$$

$$\cos(\pi/2-\theta)=1/(2Dh_2/2)*(D^2+h_2^2/4-d^2)$$

$$d=\min(d_{11},d_{12}) \qquad \text{Equation 13}$$

In Equation 13, d21 indicates a measured distance between the first speaker of the first electronic device 100 and the second electronic device 200, d22 indicates a measured distance between the second speaker of the first electronic device 100 and the second electronic device 200, h2 indicates the distance between the first speaker and the second speaker, and θ indicates an angle between the first electronic device 100 and the second electronic device 200 with reference to the first electronic device 100.

The information on the distance D and direction θ between the first electronic device 100 and the second electronic device 200 measured by the second electronic device 200 may be fed back to the first electronic device 100.

Figure 16B:
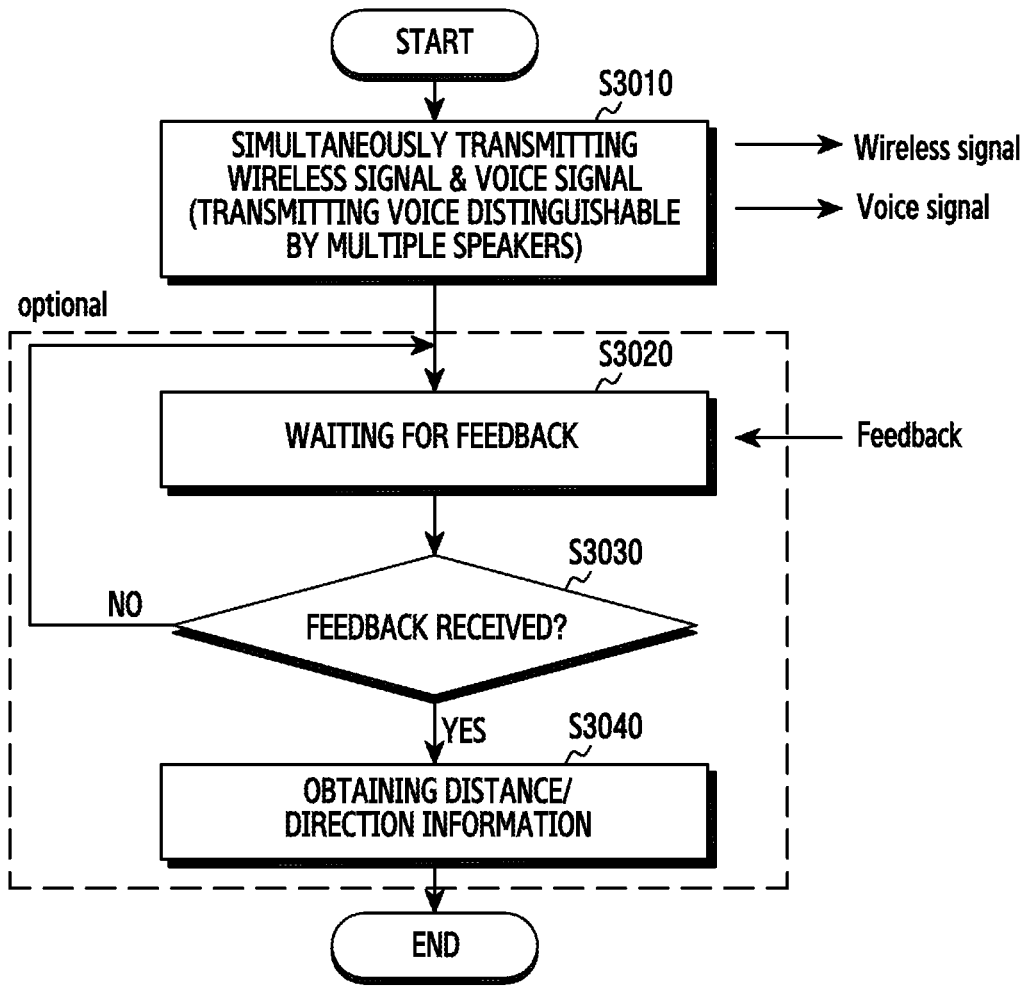
FIG. 16B illustrates a processing flow of a first electronic device for the seventh example of a scanning operation according to an embodiment of the present disclosure.

FIG. 16B illustrates a processing flow of a first electronic device for the seventh example of a scanning operation according to an embodiment of the present disclosure.

This processing flow may be performed by the first electronic device 100 illustrated in FIG. 16A. The illustrated substance is just an example for describing the present disclosure and allows modified embodiments thereof, and thus should not be construed to limit the scope of the present disclosure.

Referring to FIG. 16B, in operation S3010, the first electronic device 100 simultaneously transmits a wireless signal and a voice signal. In this event, distinguishable voice signals may be transmitted through multiple speakers. A wireless signal first arrives at the second electronic devices 200 to trigger the reception side operation of the second electronic device 200. Thereafter, a voice signal arrives at the second electronic device 200.

In operation S3020, the first electronic device 100 waits for a feedback from the second electronic device 200. In operation S3030, the first electronic device 100 determines whether a feedback is received from the second electronic device 200.

When a feedback is received from the second electronic device 200, the first electronic device 100 acquires information on the distance/direction between the first electronic device 100 and the second electronic device 200 from the received feedback information in operation S3040.

The operations in operations S3020 to S3040 may be selectively performed.

As an embodiment, the first electronic device 100 may determine, in operation S3030, whether a pre-configured timer expires, and may proceed to operation S3040 when the timer expires.

Figure 16C:
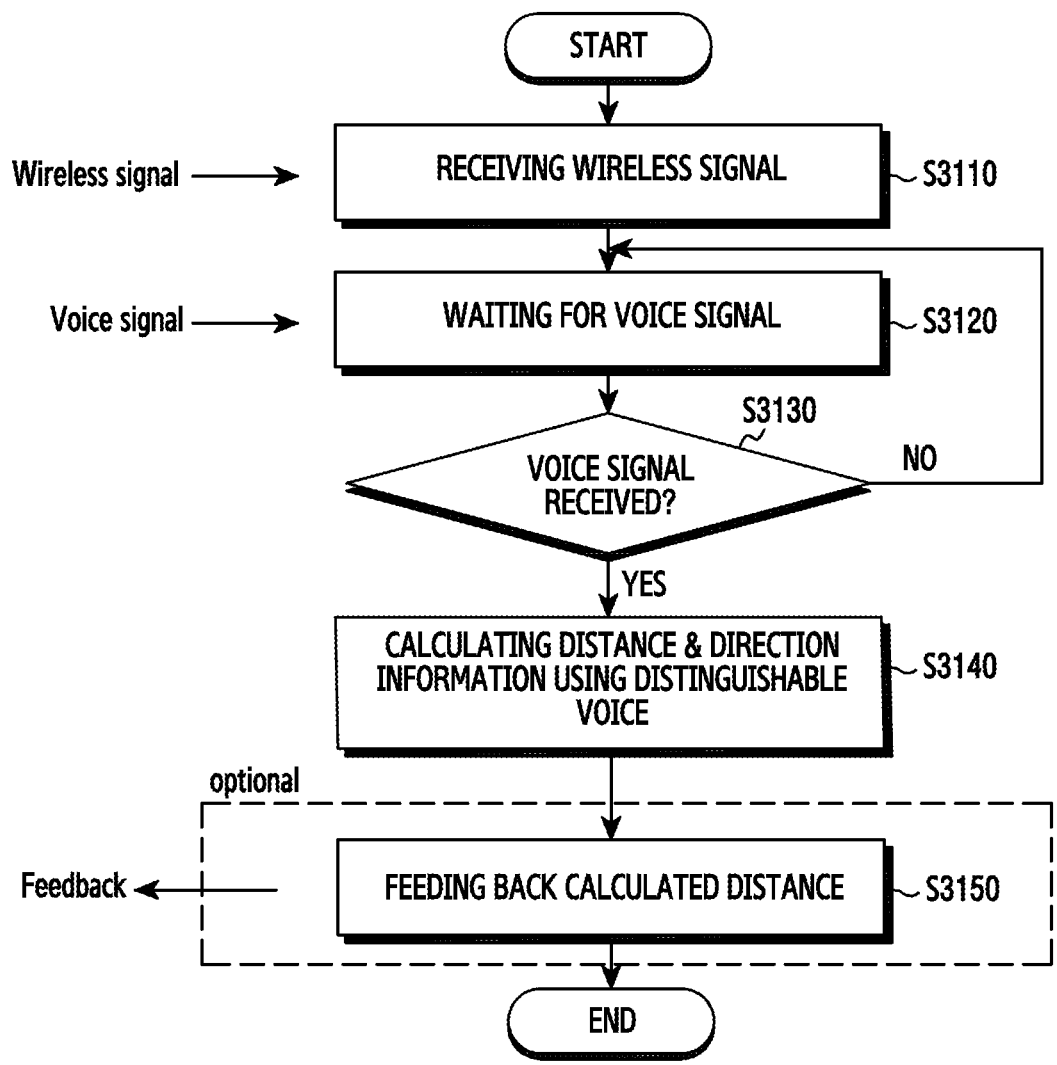
FIG. 16C illustrates a processing flow of a second electronic device for the seventh example of a scanning operation according to an embodiment of the present disclosure.

FIG. 16C illustrates a processing flow of a second electronic device for the seventh example of a scanning operation according to an embodiment of the present disclosure.

This processing flow may be performed by the second electronic device 200 illustrated in FIG. 16A. The illustrated substance is just an example for describing the present disclosure and allows modified embodiments thereof, and thus should not be construed to limit the scope of the present disclosure.

Referring to FIG. 16C, in operation S3110, the second electronic device 200 receives a wireless signal from the first electronic device 100. In operation S3120, the second electronic device 200 waits to receive voice signals transmitted through the speakers of the first electronic device 100. In operation S3130, the second electronic device 200 determines whether voice signals transmitted from the speakers of the first electronic device 100 are received through a microphone.

When receiving a voice signal, the second electronic device 200 calculates the distance and direction between the first electronic device 100 and the second electronic device 200 based on the reception time point of the wireless signal and the reception time point of the voice signal in operation S3140. The second electronic device 200 calculates the distance and direction between the first electronic device 100 and the second electronic device 200 according to Equations 11 to 13.

In operation S3150, the second electronic device 200 feeds back, to the first electronic device 100, information on the calculated distance/direction between the first electronic device 100 and the second electronic device 200. The operation of operation S3150 may be selectively performed.

As an embodiment, the second electronic device 200 may determine, in operation S3130, whether a pre-configured timer expires, and may proceed to operation S3140 when the timer expires.

In various embodiments of the present disclosure, which are described below with reference to FIGS. 17 to 26, a distance having a resolution of several centimeters is estimated using an exchange of signals through a wireless device or an electronic device in a wireless communication system, and a location of a wireless device is estimated based on the estimated distance. The information of the location estimated as described above may be used for handover between wireless devices and adjustment of the power of a transmitted or received signal.

Figure 17:
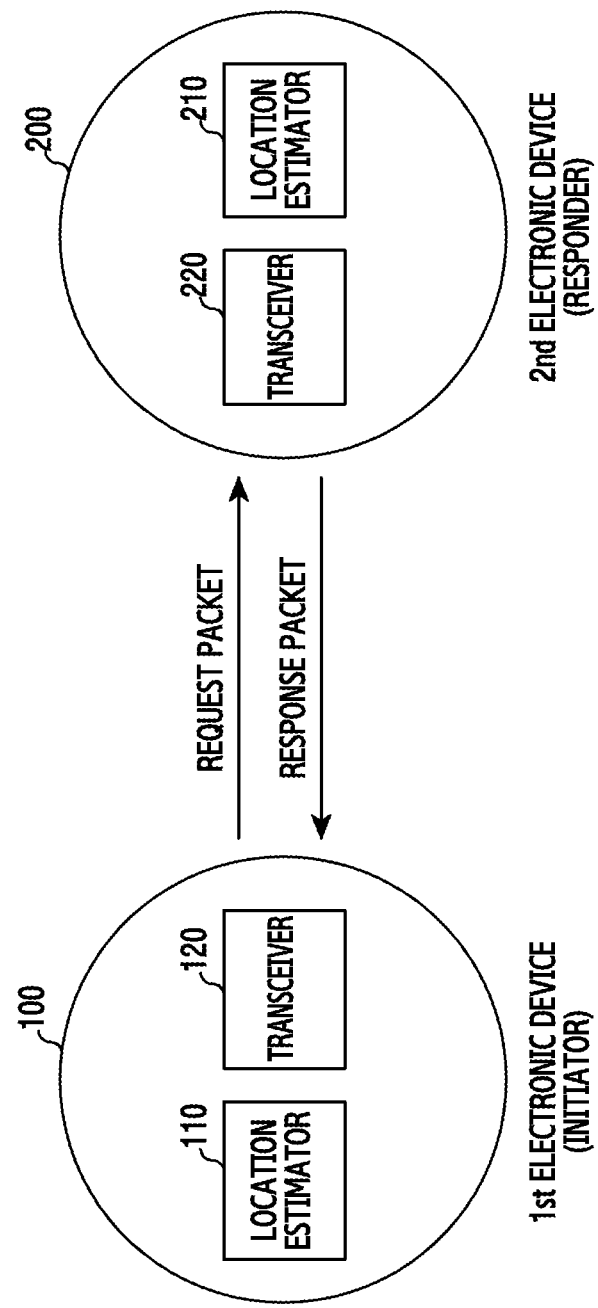
FIG. 17 illustrates a scanning operation between electronic devices according to an embodiment of the present disclosure.

FIG. 17 illustrates a scanning operation between electronic devices according to an embodiment of the present disclosure.

Referring to FIG. 17, the first electronic device 100 is an initiator defined as a wireless device that performs the location estimation, and includes a location estimator 110 and a transceiver 120. The second electronic device 200 is a responder defined as a wireless device, the location of which is estimated by the first electronic device 100, and includes a location estimator 210 and a transceiver 220. The following description is based on an example in which the first electronic device 100 estimates the location, i.e., distance and direction, of the second electronic device 200. However, it is natural that the second electronic device 200 may estimate the location, i.e., distance and direction, of the first electronic device 100.

The transceiver 120 transmits a request signal (e.g., request range packet) for location estimation to the second electronic device 200, and receives a response signal (e.g., response range packet) responding to the request signal from the second electronic device 200. The transceiver 220 receives the request signal from the first electronic device 100 and transmits the response signal to the first electronic device 100.

The location estimator 110 estimates the location of the second electronic device 200 by estimating the distance and direction between the first electronic device 100 and the second electronic device 200. In an embodiment, the location estimator 110 estimates the distance between the first electronic device 100 and the second electronic device 200, based on a first time gap (Ti) from a time point at which a request range packet is transmitted to a time point at which reception of a response range packet is detected, a second time gap (Tr) from a time point at which reception of the request range packet by the location estimator 210 is detected to a time point at which a response range packet is transmitted, and internal delay circuits of the first electronic device 100 and the second electronic device 200.

Further, the location estimator 110 may further reflect, in the estimation of the distance between the first electronic device 100 and the second electronic device 200, a transmission circuit delay, a reception circuit delay, and a processing delay for estimation of detection of the reception of a range packet in the first electronic device 100 and the second electronic device 200. Further, the location estimator 110 and the location estimator 210 may further reflect a predefined sample timing offset (STO) in the estimation of the distance between the first electronic device 100 and the second electronic device 200.

In an embodiment, the transmission circuit delay in the first electronic device 100 and the second electronic device 200 may include a delay between an antenna and a digital/analog converter included in each transmitter. In an embodiment, the reception circuit delay in the first electronic device 100 and the second electronic device 200 may include a delay between an antenna and a digital/analog converter included in each receiver. In an embodiment, the processing delay for estimation of detection of the reception of a range packet in the first electronic device 100 and the second electronic device 200 may include a delay between a range estimator and an analog/digital converter included in each receiver.

Figure 18:
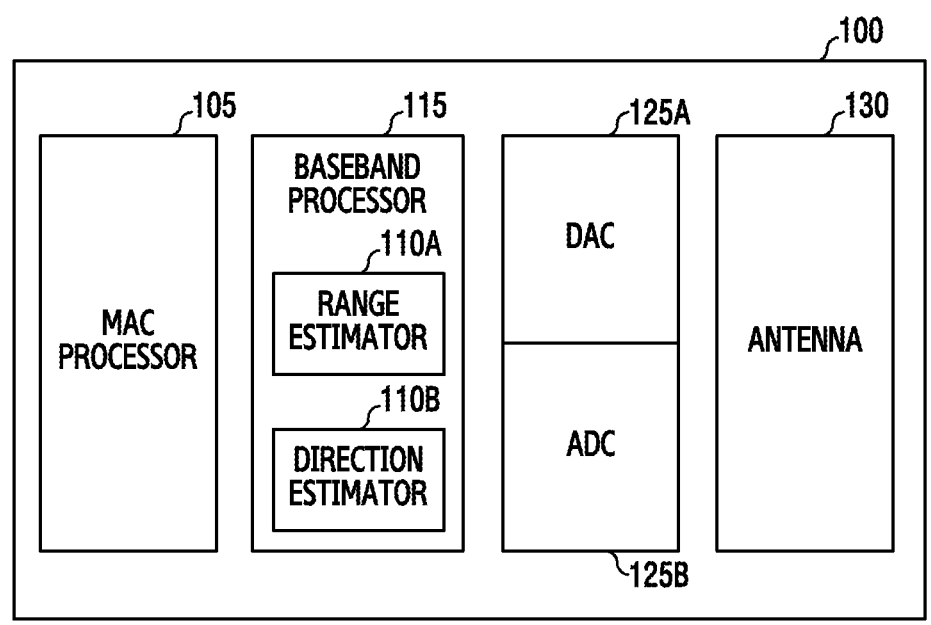
FIG. 18 illustrates a configuration of a first electronic device for a scanning operation according to an embodiment of the present disclosure.

FIG. 18 illustrates a configuration of a first electronic device for a scanning operation according to an embodiment of the present disclosure.

Referring to FIG. 18, the first electronic device 100 includes a medium access control (MAC) processor 105, a baseband processor 115, a digital-to-analog converter (DAC) 125A, an analog-to-digital converter (ADC) 125B, and an antenna 130. The baseband processor 115 includes a ranging estimator 110A and a direction estimator 110B. The MAC processor 105, the DAC 125A, the ADC 125B, and the antenna 130 configure the transceiver 120 of FIG. 17.

The MAC processor 105 generates information for distance estimation and direction estimation. For example, for the distance estimation, the MAC processor 105 generates a range start signal in a ranging estimation section. As another example, for the distance estimation, the MAC processor 105 generates, in a capability negotiation section, a directional multigigabit (DMG) beacon including a DMG range element, a probe request, a probe response, an information request, or an information response. The baseband processor 115 inputs the information generated by the MAC processor 105 and processes the information in a baseband. For example, the baseband processor 115 receives and processes the range start signal, and then generates a request range packet. The DAC 125A converts a digital signal provided by the baseband processor 115 to an analog signal. The antenna 130 transmits the analog signal converted by the DAC 125A to the second electronic device 200.

The antenna 130 receives a signal from the second electronic device 200. The ADC 125B converts the analog signal received through the antenna 130 from the second electronic device 200 into a digital signal. The baseband processor 115 processes the digital signal converted by the ADC 125B in a baseband. For example, the baseband processor 115 processes the received response range packet and outputs the packet to the MAC processor 105.

The range estimator 110A estimates the distance between the first electronic device 100 and the second electronic device 200. In an embodiment, the range estimator 110A estimates the distance between the first electronic device 100 and the second electronic device 200, based on a first time gap (Ti) from a time point at which a request range packet is transmitted to a time point at which reception of a response range packet is detected, a second time gap (Tr) from a time point at which reception of the request range packet by the location estimator 210 is detected to a time point at which a response range packet is transmitted, and internal delay circuits of the first electronic device 100 and the second electronic device 200. In the estimation of the distance between the first electronic device 100 and the second electronic device 200, the range estimator 110A may further reflect a DAC delay (A), a transmission circuit delay (B), a reception circuit delay (D), an ADC delay (E), and a processing delay (F) for estimation of detection of the reception of a request range packet or response range packet in the first electronic device 100 and the second electronic device 200. Further, the range estimator 110A and the location estimator 100 may further reflect a predefined STO in the estimation of the distance between the first electronic device 100 and the second electronic device 200.

The direction estimator 110B estimates the direction of the second electronic device 200 by transmitting a request signal for estimating the direction of the second electronic device 200 to the second electronic device 200 and receiving a response signal for estimation of the direction from the second electronic device 200. In an embodiment, the direction estimator 110B measures the intensity of a signal transmitted to or received from the second electronic device 200 in one or more beam directions, and estimates the direction of the second electronic device 200 based on the measured signal intensity. In this example, the direction estimator 110B of the first electronic device 100 estimates the direction of the second electronic device 200.

Figure 19:
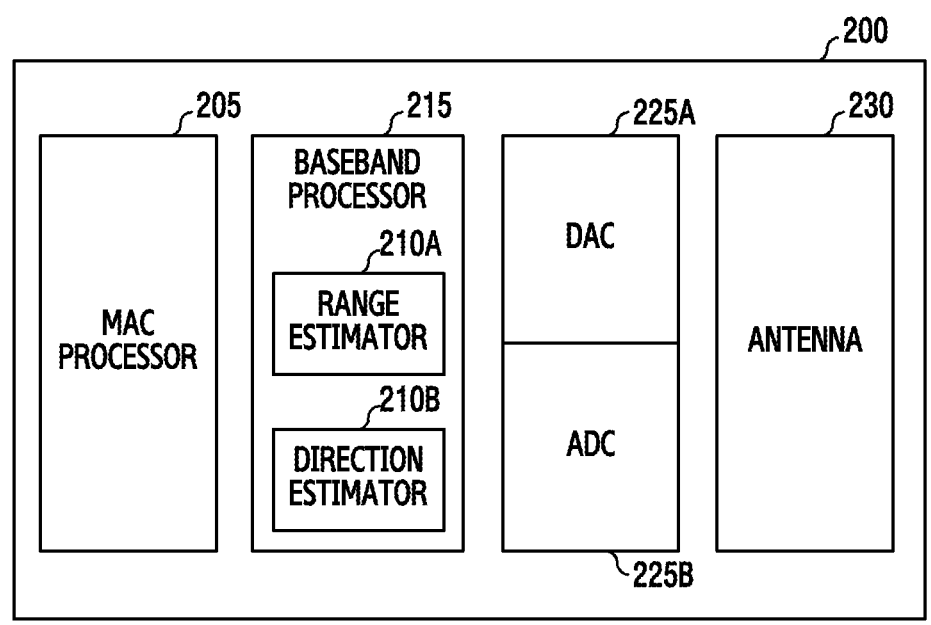
FIG. 19 illustrates a configuration of a second electronic device for a scanning operation according to an embodiment of the present disclosure.

FIG. 19 illustrates a configuration of a second electronic device for a scanning operation according to an embodiment of the present disclosure.

Referring to FIG. 19, the second electronic device 200 includes a MAC processor 205, a baseband processor 215, a DAC 225A, an ADC 225B, and an antenna 230. The baseband processor 215 includes a ranging estimator 210A and a direction estimator 210B. The MAC processor 205, the DAC 225A, the ADC 225B, and the antenna 230 configure the transceiver 220 of FIG. 17.

The antenna 230 receives a signal from the first electronic device 100. For example, the antenna 230 receives a signal for location estimation, including a request range packet and a signal for direction estimation, from the first electronic device 100. The ADC 125B converts an analog signal received through the antenna 230 from the first electronic device 100 into a digital signal. The baseband processor 215 processes the digital signal converted by the ADC 225B in a baseband. For example, the baseband processor 215 processes the received request range packet and outputs the packet to the MAC processor 205.

The MAC processor 205 receives information for distance estimation and direction estimation. For example, for distance estimation, the MAC processor 205 receives a DMG beacon including a DMG range element, a probe request, a probe response, an information request, or an information response from the baseband processor 215.

The MAC processor 205 generates response information for distance estimation. For example, for distance estimation, the MAC processor 205 generates a DMG beacon including a DMG range element corresponding to the received DMG range element, a probe request, a probe response, an information request, or an information response.

The baseband processor 215 inputs the information generated by the MAC processor 205 and processes the information in a baseband. For example, for distance estimation, the baseband processor 215 generates a response range packet corresponding to the received request range packet. The DAC 225A converts a digital signal provided by the baseband processor 215 to an analog signal. The antenna 230 transmits the analog signal provided by the DAC 225A to the first electronic device 100.

The range estimator 210A obtains a second time gap (Tr) from a time point at which reception of the request range packet is detected to a time point at which the response range packet is transmitted. Information on the obtained second time gap (Tr) is transmitted to the first electronic device 100 to be used for distance estimation by the range estimator 110A.

The direction estimator 210B receives a signal transmitted from the first electronic device 100 for direction estimation and transmits a response signal to this received signal to the first electronic device 100. In this example, the direction estimator 110B of the first electronic device 100 estimates the direction of the second electronic device 200. However, the direction estimator 210B of the second electronic device 200 may estimate the direction of the first electronic device 100 in the same manner.

FIGS. 20A to 20D are views illustrating processing flows for a scanning operation according to an embodiment of the present disclosure.

Figure 20A:
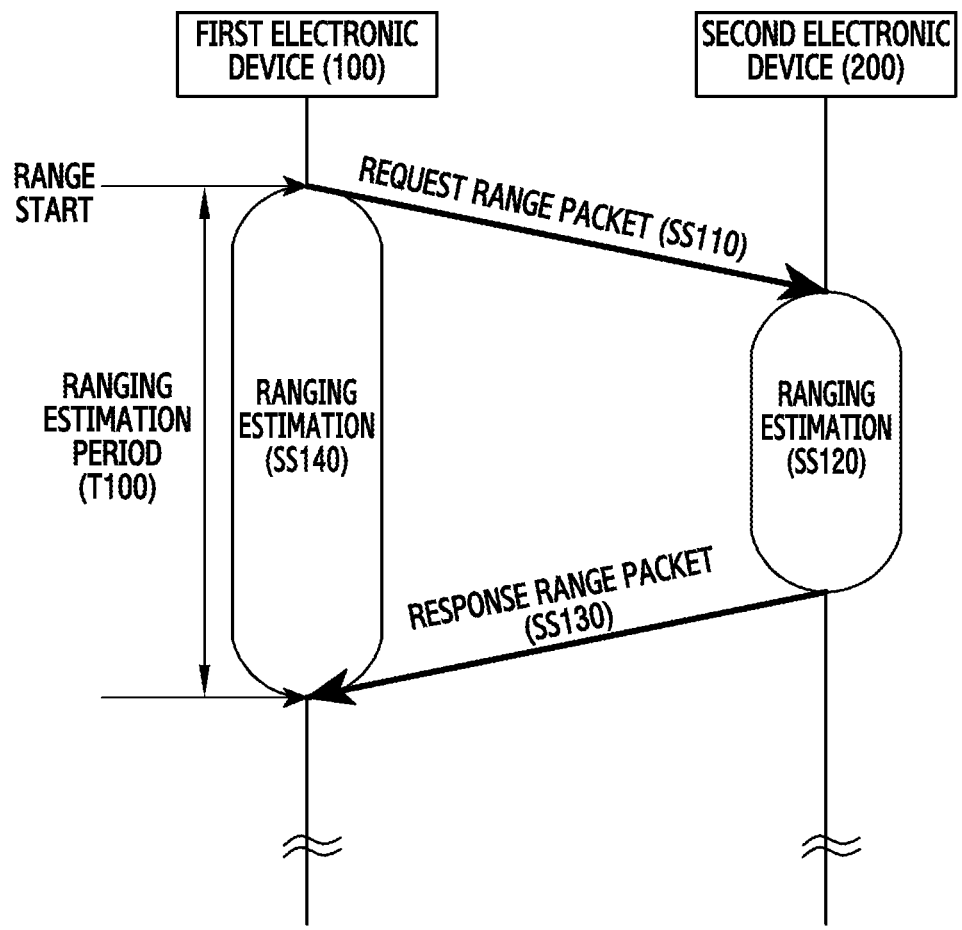
FIGS. 20A to 20D are views illustrating processing flows for a scanning operation according to an embodiment of the present disclosure.
Figure 20B:
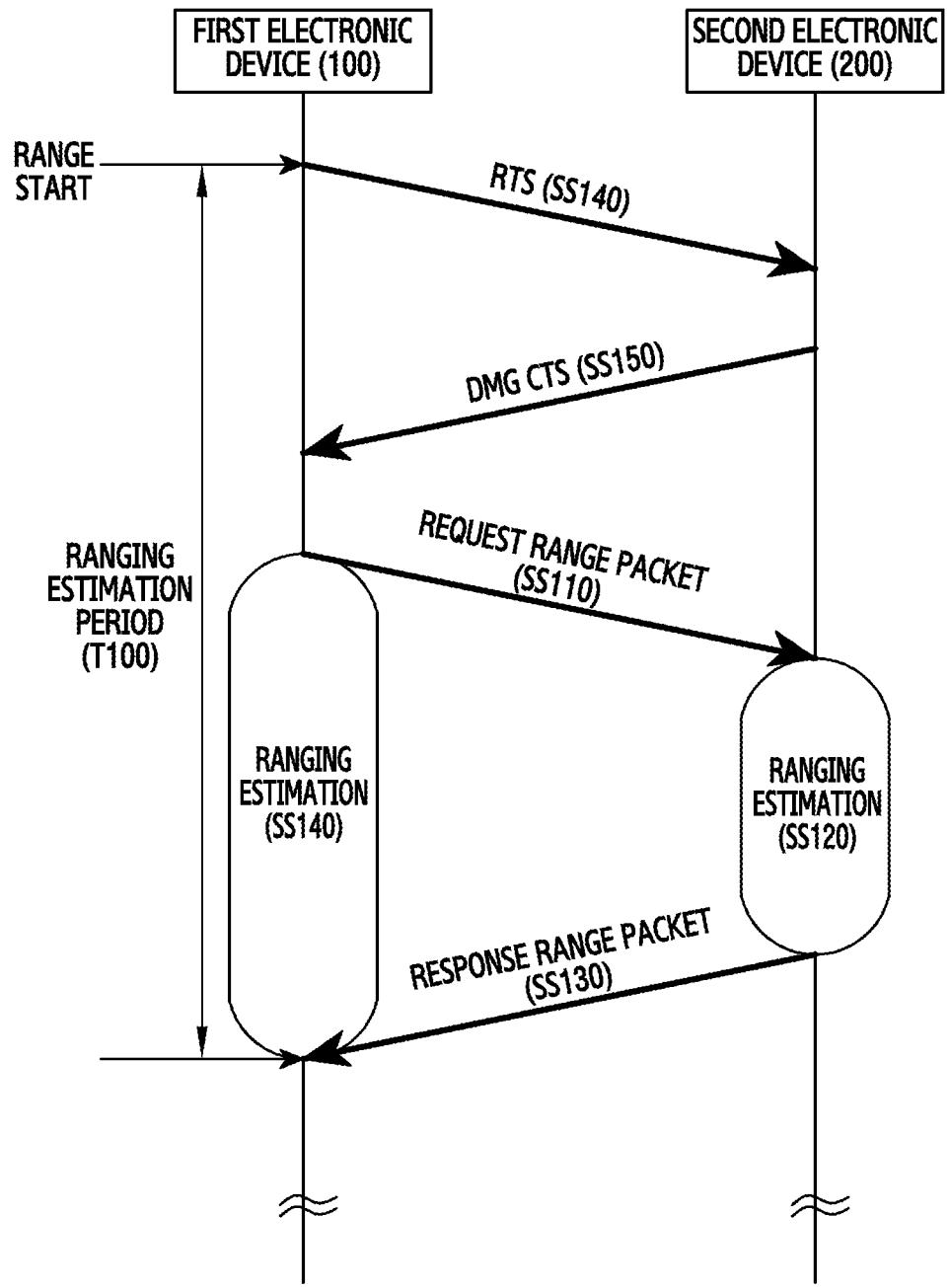
Figure 20C:
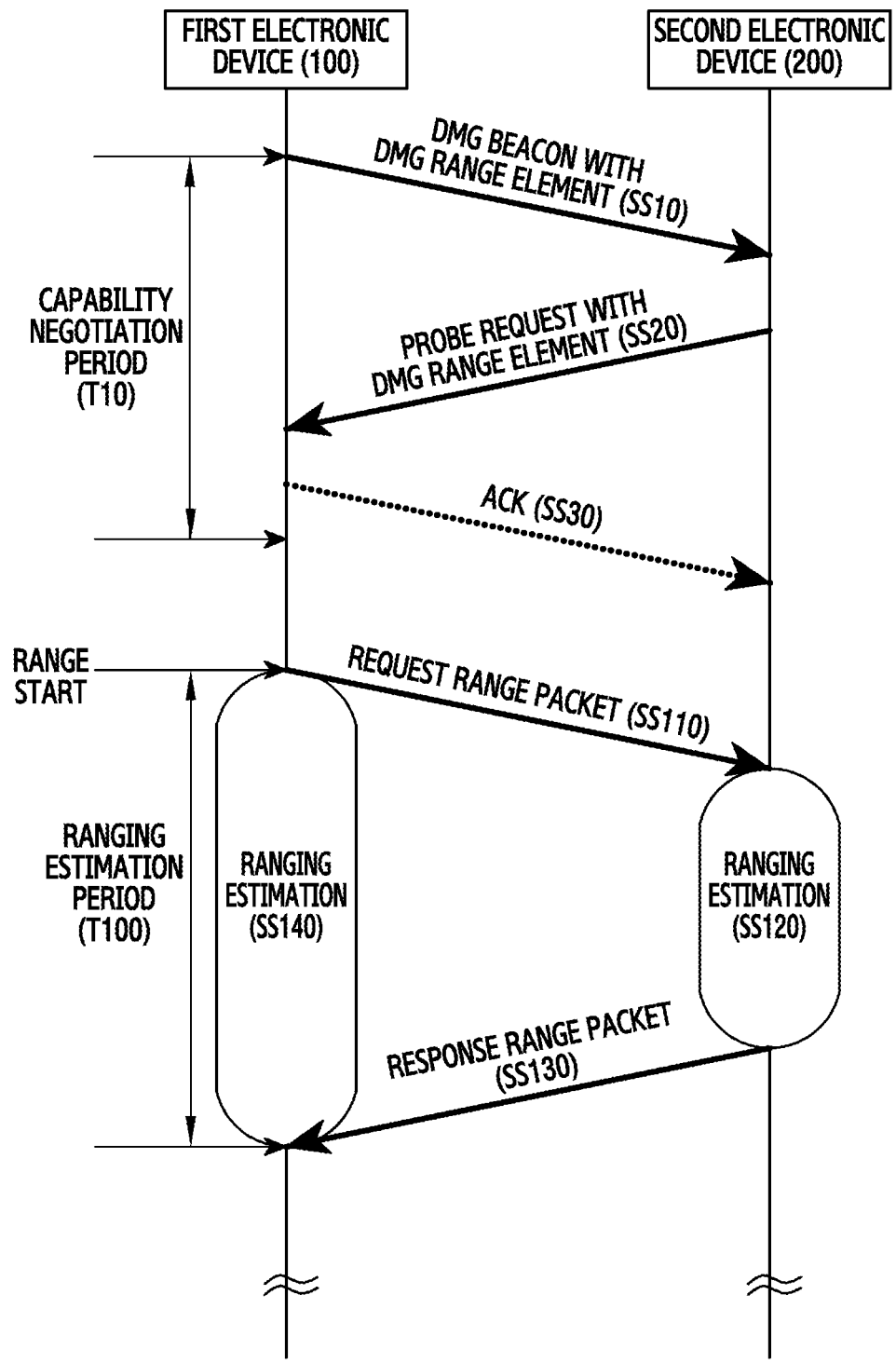
Figure 20D:
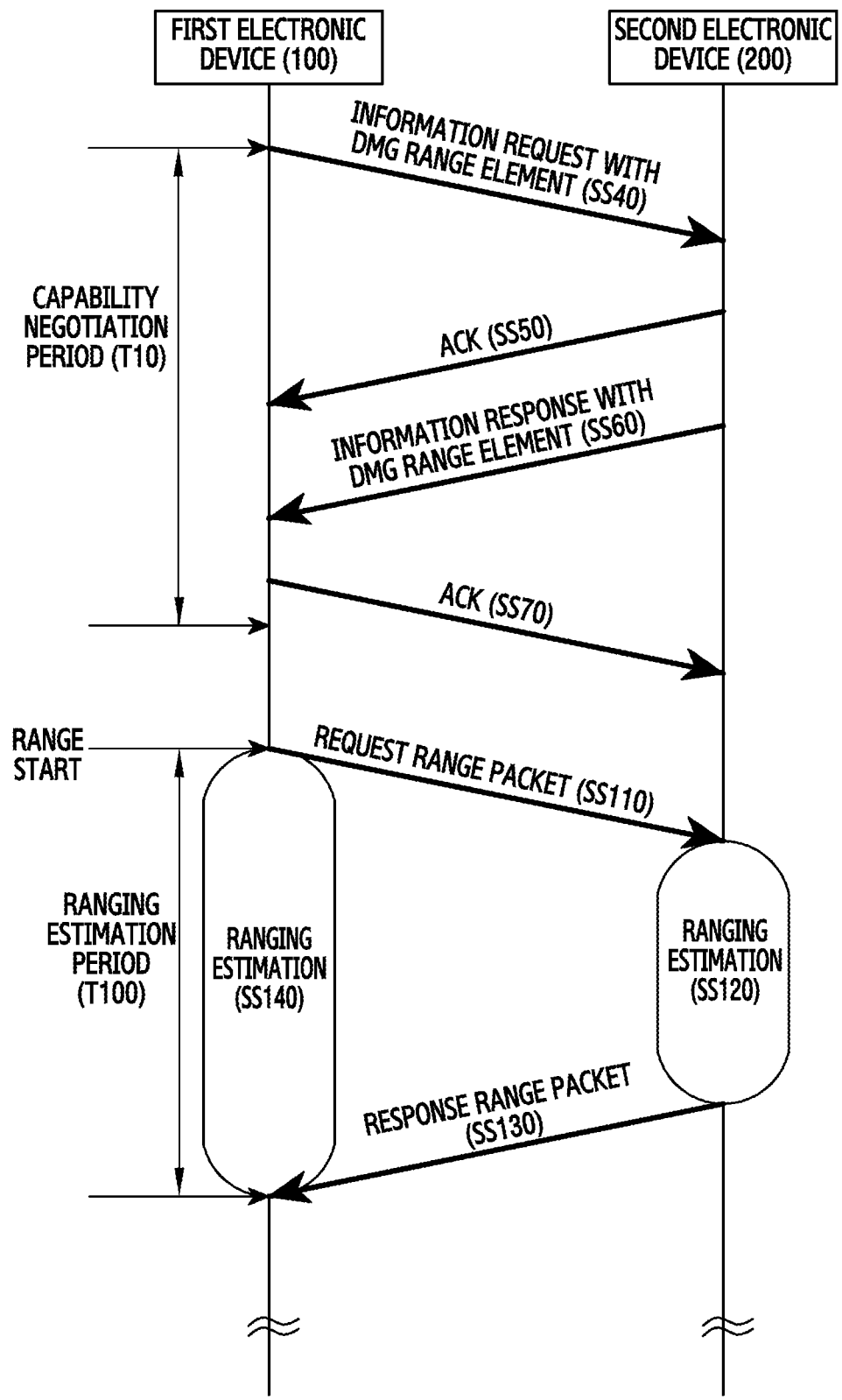

FIGS. 20A and 20B illustrate processing flows of a distance measurement operation by a wireless device according to an embodiment of the present disclosure, which include one section, i.e., a ranging estimation period T100 for estimating a distance. FIGS. 20C and 20D illustrate processing flows of a distance measurement operation by a wireless device according to an embodiment of the present disclosure, which include two sections, including a capability negotiation period T10 for exchanging of distance measurement capabilities and a ranging estimation period T100 for estimating a distance. It should be noted that, as shown in FIGS. 20A and 20B, only a ranging estimation period T100 without a capability negotiation period T10 may be performed.

Referring to FIG. 20A, based on a range start signal, a first wireless device 100 transmits a request range packet to the second electronic device 200 in operation SS110, and the second electronic device 200 having received the request range packet transmits a response range packet to the first wireless device 100 in operation SS130. This method may be used when a packet having destination information data is used as the request range packet. Then, the first wireless device 100 performs a ranging estimation in operation SS140, and the second electronic device 200 performs a ranging estimation in operation SS120.

Referring to FIG. 20B, based on a range start signal, the first wireless device 100 transmits a transmission request (request to send (RTS)) signal to the second electronic device 200 in operation SS140, and the second electronic device 200 having received the RTS signal transmits a DMG transmission confirmation (clear to send (CTS)) signal to the first wireless device 100 in operation SS150 to confirm that the destination of the request range packet to be transmitted by the first wireless device 100 is the second electronic device 200. This method may be used when a null data packet (NDP) as shown in FIG. 21C is used as the request range packet.

Thereafter, the first wireless device 100 transmits a request range packet to the identified destination second electronic device 200 in operation SS110, and the second electronic device 200 having received the request range packet transmits a response range packet to the first wireless device 100 in operation SS130. Then, the first wireless device 100 performs a ranging estimation in operation SS140, and the second electronic device 200 performs a ranging estimation in operation SS120.

Referring to FIGS. 20C and 20D, the distance measurement operation is divided into a capability negotiation period T10 in which the first electronic device 100 and the second electronic device 200 can exchange distance measurement capabilities with each other, and a distance estimation period T100 in which the distance is measured.

The flows illustrated in FIGS. 20C and 20D include the processing flow illustrated in FIG. 20A, so the following description discusses only the capability negotiation period T10, which is additionally included in FIGS. 20C and 20D, in describing the distance measurement operation. Referring to FIGS. 20C and 20D, in the capability negotiation period T10, the first electronic device 100 and the second electronic device 200 exchange their own distance measurement capabilities with each other. For example, the first electronic device 100 and the second electronic device 200 exchange their distance measurement capabilities with each other through a DMG beacon including a DMG range element defined in FIG. 21A, a probe request or probe response, or information request or information response.

FIG. 21A illustrates the configuration of a DMG range element for a scanning operation according to an embodiment of the present disclosure.

Referring to FIG. 21A, a DMG range element includes an element ID field 10, a length field 20, and a range capability information field 30. For example, the element identifier field 10, the length field 20, and the range capability information field 30 may be configured by one octet, one octet, and two octets, respectively. The DMG range element may be defined as an element included in the DMG beacon, the probe request, the probe response, the information request, or the information response to advertise the range capability. As another example, the DMG range element may be defined as an element for advertising the range capability in an association request/response, a re-association request/response, etc. also.

Figure 21B:
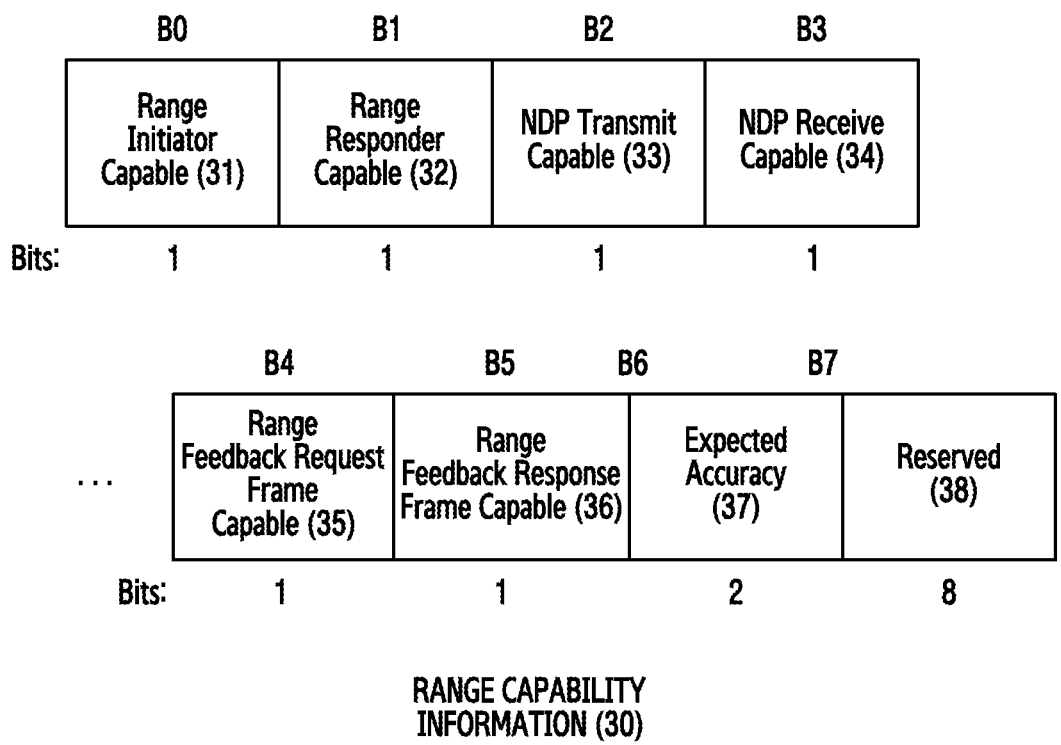
FIG. 21B illustrates the configuration of a range capability field for a scanning operation according to an embodiment of the present disclosure.
Figure 21C:
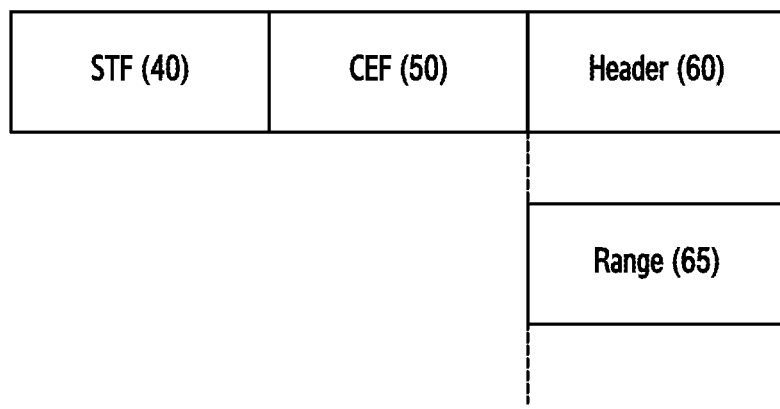
FIG. 21C illustrates the configuration of a request range packet for a scanning operation according to an embodiment of the present disclosure.

FIG. 21B illustrates the configuration of a range capability information field for a scanning operation according to an embodiment of the present disclosure.

For example, the range capability information field may be the range capability information field 30 illustrated in FIG. 21A.

Referring to FIG. 21B, the range capability information field 30 illustrated in FIG. 21A includes a range initiator capable sub-field 31, a range responder capable sub-field 32, an NDP transmission capable sub-field 33, an NDP reception capable sub-field 34, a range feedback request frame capable sub-field 35, a range feedback response frame capable sub-field 36, an expected accuracy capable sub-field 37, and a reserved sub-field 38 reserved for an additional operation. In an embodiment, each of the range initiator capable sub-field 31, the range responder capable sub-field 32, the NDP transmission capable sub-field 33, the NDP reception capable sub-field 34, the range feedback request frame capable sub-field 35, and the range feedback response frame capable sub-field 36 may be configured by one bit, the expected accuracy capable sub-field 37 may be configured by two bits, and the reserved sub-field 38 may be configured by eight bits. Table 1 below shows the definition and encoding of the sub-fields.

TABLE 1

| Subfield | Definition | Encoding |
| --- | --- | --- |
| Range Initiator Capable | Whether an STA is able to operate as an initiator | 0: Impossible<br>1: Possible |
| Range Initiator Capable | Whether an STA is able to operate as a responder | 0: Impossible<br>1: Possible |
| NDP Transmission Capable | Whether an STA is able to transmit a null data packet | 0: Impossible<br>1: Possible |
| NDP Reception Capable | Whether an STA is able to receive a null data packet | 0: Impossible<br>1: Possible |
| Range Feedback Request Frame Capable | Whether STA can use a range feedback request frame | 0: Impossible<br>1: Possible |
| Range Feedback Response Frame Capable | Whether STA can use a range feedback response frame | 0: Impossible<br>1: Possible |
| Expected Accuracy | Expected accuracy of the distance measurement | 0: Not supported<br>1: 1 cm<br>2: 10 cm<br>3: 1 m |

For example, the range initiator capable sub-field 31 indicates that the wireless device or station (STA) is unable to operate as an initiator for distance measurement when the sub-field has a value of 0, and indicates that the wireless device is able to operate as an initiator when the sub-field has a value of 1. The range initiator capable sub-field 32 indicates that the wireless device is unable to operate as a responder for distance measurement when the sub-field has a value of 0, and indicates that the wireless device is able to operate as a responder when the sub-field has a value of 1. The NDP transmission capable sub-field 33 indicates that the wireless device is able to transmit a null data packet when the sub-field has a value of 1, and indicates that the wireless device is unable to transmit a null data packet when the sub-field has a value of 0. The NDP reception capable sub-field 34 indicates that the wireless device is able to receive a null data packet when the sub-field has a value of 1, and indicates that the wireless device is unable to receive a null data packet when the sub-field has a value of 0. The range feedback request frame capable sub-field 35 indicates that the wireless device is able to use a range feedback request frame when the sub-field has a value of 1, and indicates that the wireless device is unable to use a range feedback request frame when the sub-field has a value of 0. The range feedback response frame capable sub-field 36 indicates that the wireless device is able to use a range feedback response frame when the sub-field has a value of 1, and indicates that the wireless device is unable to use a range feedback response frame when the sub-field has a value of 0. The expected accuracy sub-field 37 indicates that an expected accuracy of distance measurement provided by the wireless device is 1 cm when the sub-field has a value of 1, indicates that an expected accuracy of distance measurement provided by the wireless device is 10 cm when the sub-field has a value of 2, indicates that an expected accuracy of distance measurement provided by the wireless device is 1 m when the sub-field has a value of 3, and indicates that the wireless device does not support distance measurement when the sub-field has a value of 0.

Referring to FIG. 20C, the first electronic device 100 as the initiator and the second electronic device 200 as the responder exchange information on whether a station is able to use a range feedback request/response frame, whether a station is able to receive/transmit an NDP, and whether a station is able to operate as an initiator/responder through a range capability information field in the DMG range element, while exchanging a probe request signal and a DMG beacon for scanning in the capability negotiation period T10.

The first wireless device 100 sends a DMG beacon including a DMG range element including its own capability information to the second electronic device 200 in operation SS10. Upon receiving the DMG beacon including the DMG range element, the second electronic device 200 transmits a probe request including a DMG range element to the first wireless device 100 in operation SS20. Upon receiving the probe request including the DMG range element, the first wireless device 100 transmits an affirmative response (acknowledgement (ACK)) signal to the second electronic device 200 in operation SS30.

Referring to FIG. 20D, the first electronic device 100 as the initiator and the second electronic device 200 as the responder exchange information on whether a station is able to use a range feedback request/response frame, whether a station is able to receive/transmit an NDP, and whether a station is able to operate as an initiator/responder through a range capability information field in the DMG range element, while exchanging an information request signal and an information response signal in the capability negotiation period T10.

The first wireless device 100 sends an information request including a DMG range element including its own capability information to the second electronic device 200 in operation SS40. Upon receiving the information request including the DMG range element, the initiator 200 transmits an ACK to the first wireless device 100 in operation SS50. Upon receiving the information request including the DMG range element, the second electronic device 200 transmits an information response including a DMG range element to the first wireless device 100 in operation SS60. Upon receiving the information response including the DMG range element, the first wireless device 100 transmits an ACK to the second electronic device 200 in operation SS70.

As described above, the first wireless device 100 and the second electronic device 200 can exchange information of their capabilities with each other in the capability negotiation period T10. Therefore, the ranging estimation period T100 can be quickly started suitably for the capabilities of the first wireless device 100 and the second electronic device 200 without a separate operation.

FIG. 21C illustrates the configuration of a request range packet for a scanning operation according to an embodiment of the present disclosure.

Referring to FIG. 21C, the request range packet is a packet transmitted by a station (or wireless device) in order to measure a distance. The request range packet may have a format as shown in FIG. 21C. The request range packet corresponds to all packets including only a short training field (STF) 40 and a channel estimation field (CEF) 50.

Due to an oscillator error between the first wireless device 100 and the second electronic device 200, signal processing through a packet having long data may have difficulty in achieving an accuracy of several centimeters. In this event, for distance measurement having an accuracy of a high resolution, it is proper to use an NDP including no data, such as the header 60 as shown in FIG. 21C, as the request range packet.

Meanwhile, since it is not true that all wireless devices can transmit or receive an NDP, it may be determined whether each device can use an NDP range packet according to the range capability information defined in Table 1. Further, even when a wireless device is unable to use an NDP range packet, a range field as shown in Table 2 may arranged in the header 60 as shown in FIG. 21C, to reduce the signal processing time of the wireless device for the packet including long data, thereby enhancing the accuracy.

TABLE 2

| Field | Definition | Encoding |
| --- | --- | --- |
| Range | Whether a packet is a range packet | 0; No Range Packet<br>1; Range Packet |

For example, in the case where the header 60 illustrated in FIG. 21C includes a range field 65, the range field 65 of the header 60 indicates a range packet when the range field has a value of 1 and indicates that it is not the range packet when the field has a value of 0.

Referring to FIG. 20A, a distance measurement operation is started by a range start signal in the ranging estimation period T100. The first electronic device 100 as the initiator transmits a request range packet to the second electronic device 200 in operation SS110, and the second electronic device 200 transmits a response range packet as a response to the request range packet to the first electronic device 100 in operation SS130. This corresponds to a case where the first electronic device 100 uses a packet having data without using a null data packet as the request range packet, and all packets allowing the second electronic device 200 to send a response after passage of a pre-configured time interval, for example, a short interframe space (SIFS), can be used as the request range packet. For example, an RTS, a probe response, and a request action frame may be used as the request range packet, while correspondingly using a DMG CTS, an ACK, and a response action frame as the response range packet, respectively.

Referring to FIG. 20B, a distance measurement operation is started by a range start signal in the ranging estimation period T100. The first electronic device 100 as an initiator and the second electronic device 200 may exchange an RTS and a DMG CTS to identify that the destination of the request range packet to be transmitted by the first electronic device 100 is the second electronic device 200 in operations SS140 and SS150, and the first electronic device 100 may transmit a null data packet as the request range packet to the second electronic device 200 in operation SS110. Since the destination of the null data packet is unclear, it is necessary to perform operations SS140 and SS150. As a response to the null data packet, the second electronic device 200 transmits a response range packet to the first electronic device 100. As the response range packet, an ACK or response action frame may be used in operation SS130.

Figure 22A:
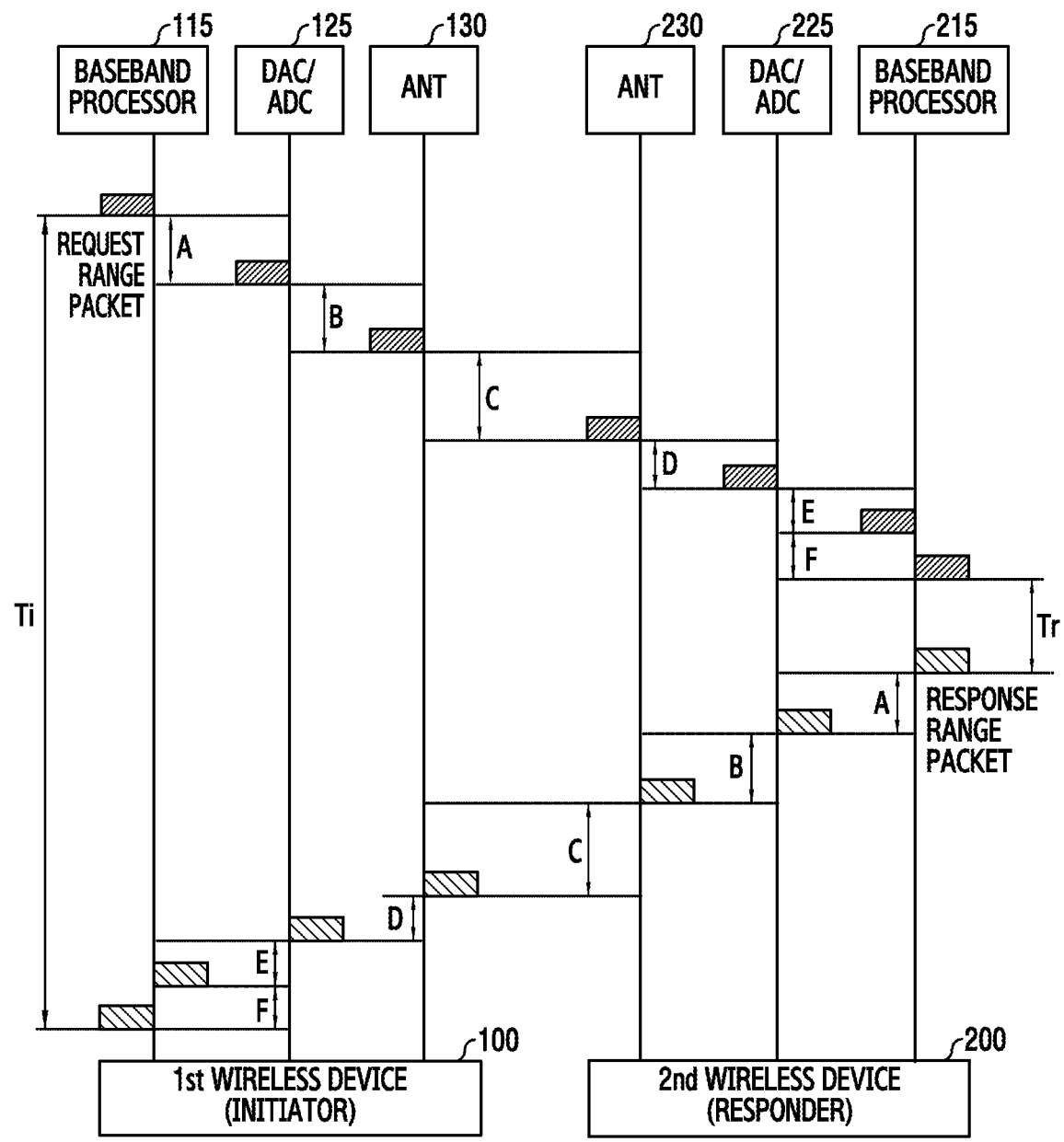
FIGS. 22A and 22B illustrate a distance estimation operation between wireless devices by a range estimator for a scanning operation according to various embodiments of the present disclosure.
Figure 22B:
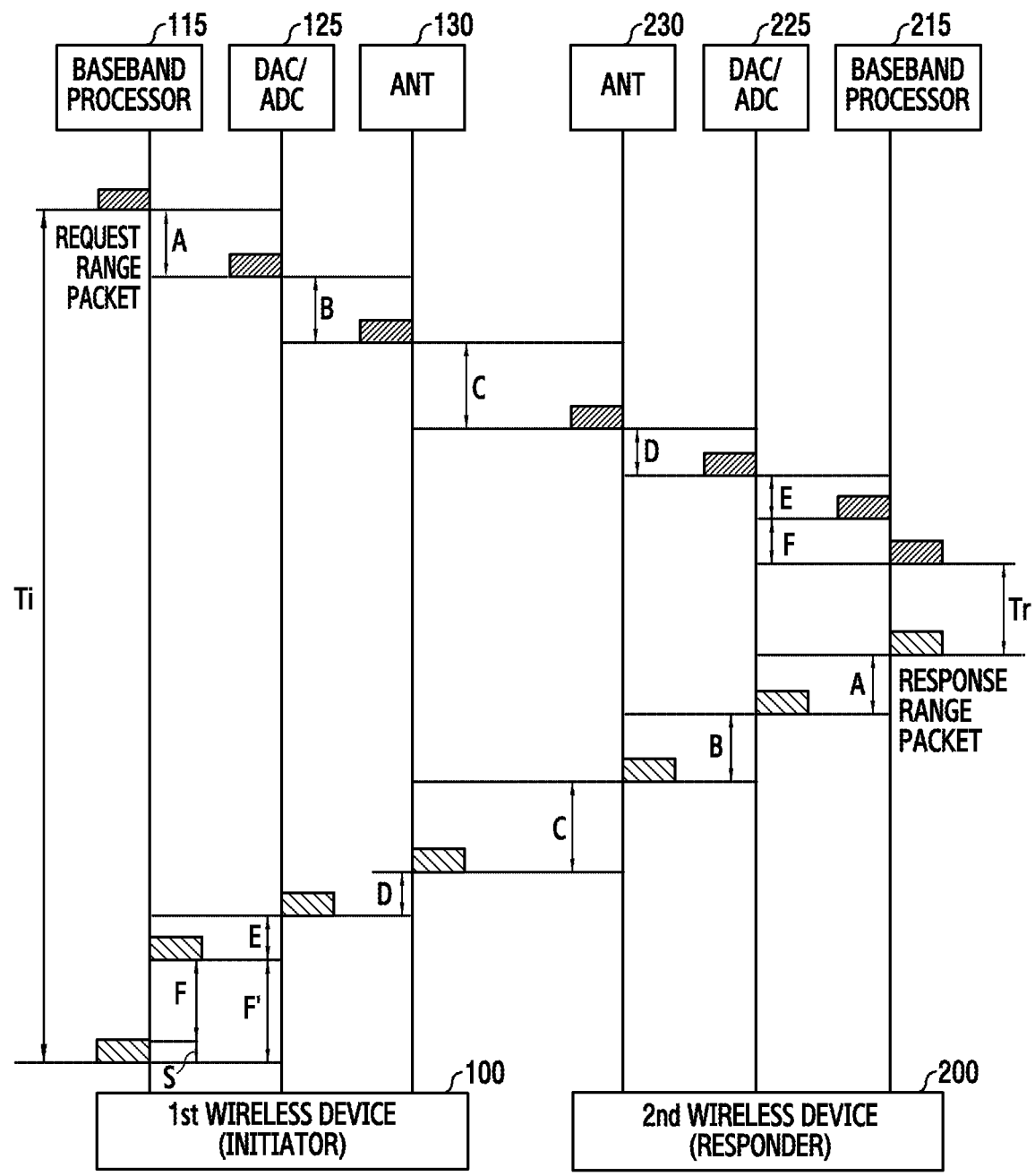

FIGS. 22A and 22B illustrate a distance estimation operation between wireless devices by a range estimator for a scanning operation according to various embodiments of the present disclosure.

Referring to FIG. 22A, a distance estimation operation may be performed by the range estimator 110A of FIG. 18 and the range estimator 210A of FIG. 19. The range estimator 110A of the first electronic device 100 counts from a time point when the request range packet is transmitted through the DAC 125A to a time point when reception of the response range packet by the baseband processor 115 is detected. This time interval is Ti. The range estimator 210A of the second electronic device 200 counts from a time point when reception of the request range packet by the baseband processor 215 is detected to a time point when the response range packet is transmitted through the DAC 225. This time interval is Tr.

In Table 3 below, A indicates a delay of the DAC 125A of the first wireless device 100 and a delay of the DAC 225A of the second electronic device 200. B indicates a transmission circuit delay between the DAC 125A and the antenna 130 and a transmission circuit delay between the DAC 225A and the antenna 230. C indicates a propagation delay between the first wireless device 100 and the second electronic device 200. D indicates a reception circuit delay between the ADC 225B and the antenna 230 of the second electronic device 200 and a reception circuit delay between the ADC 125B and the antenna 130 of the first wireless device 100. E indicates a delay of the ADC 225B of the second electronic device 200 and the ADC 125B of the first wireless device 100. F indicates a reception detection processing delay of the baseband processor 215 of the second electronic device 200 and a reception detection processing delay of the baseband processor 115 of the first wireless device 100.

TABLE 3

| Symbol | Description |
| --- | --- |
| Ti | Time for Clock Counter of Initiator |
| Tr | Time for Clock Counter of Responder |
| A | DAC Delay |
| B | Transmit Circuit Delay |
| C | Propagation Delay |
| D | Receive Circuit Delay |
| E | ADC Delay |
| F | Processing Delay of BB |

As noted from the above, the first electronic device 100 and the second electronic device 200 can identify F and can identify A, B, D, and E. Therefore, Equations 14 and 15 can be derived.

$$Ti = Tr + 2(A+B+C+D+E+F) \quad \text{Equation 14}$$

$$C = (Ti-Tr)/2 - (A+B+C+D+E+F) \quad \text{Equation 15}$$

A propagation delay C can be obtained from Equation 15. In the equations, A, B, D, E, and F are constants, Ti value can be obtained through measurement, and Tr value can be measured and provided by the second electronic device 200. Therefore, the first electronic device 100 can estimate the distance between the first electronic device 100 and the second electronic device 200.

Referring to FIG. 22B, in contrast to FIG. 22A, the first wireless device 100 and the second electronic device 200 use an STO in the processing flow. The STO is used in order to achieve more accurate distance estimation by correcting an error, which may be caused in obtaining a correlation result value in units of samples for received signals, as in Equation 16 below.

Figure 23A:
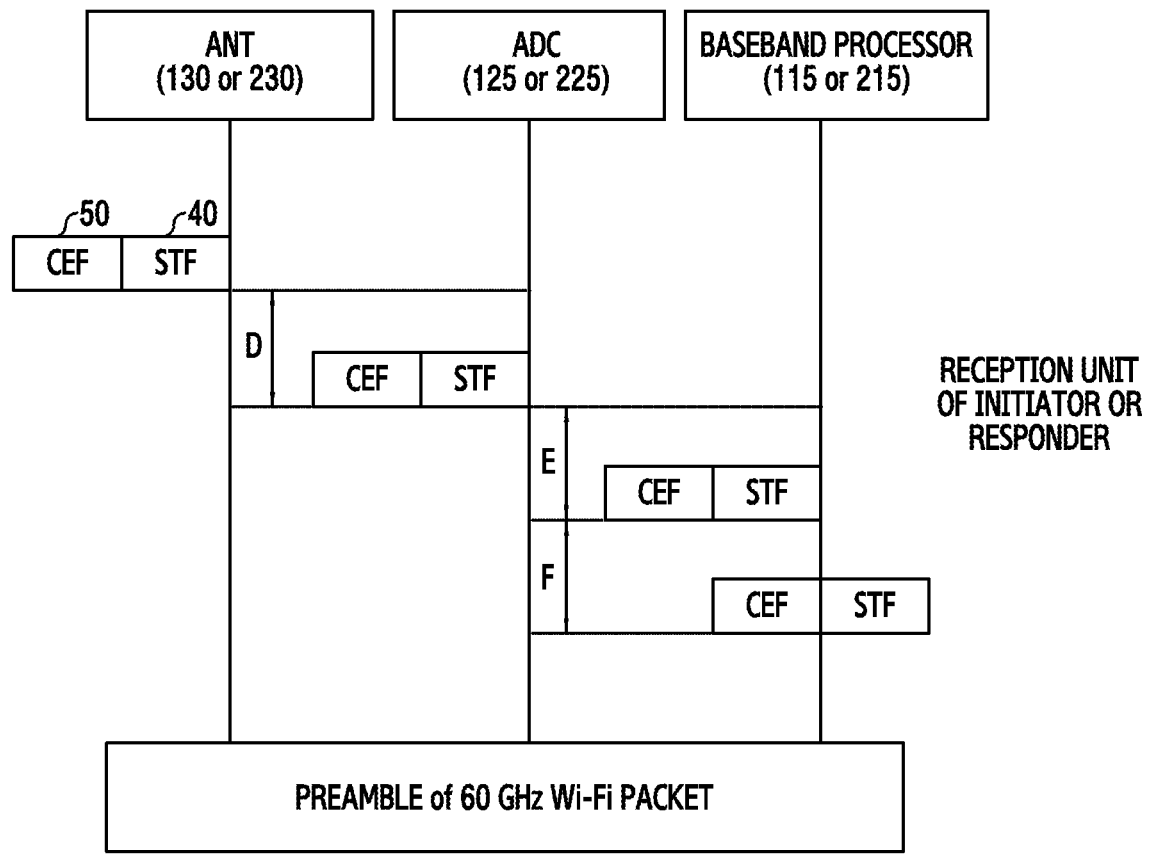
FIGS. 23A to 23C are views for describing an operation of detecting a reception symbol for distance estimation according to an embodiment of the present disclosure.
Figure 23B:
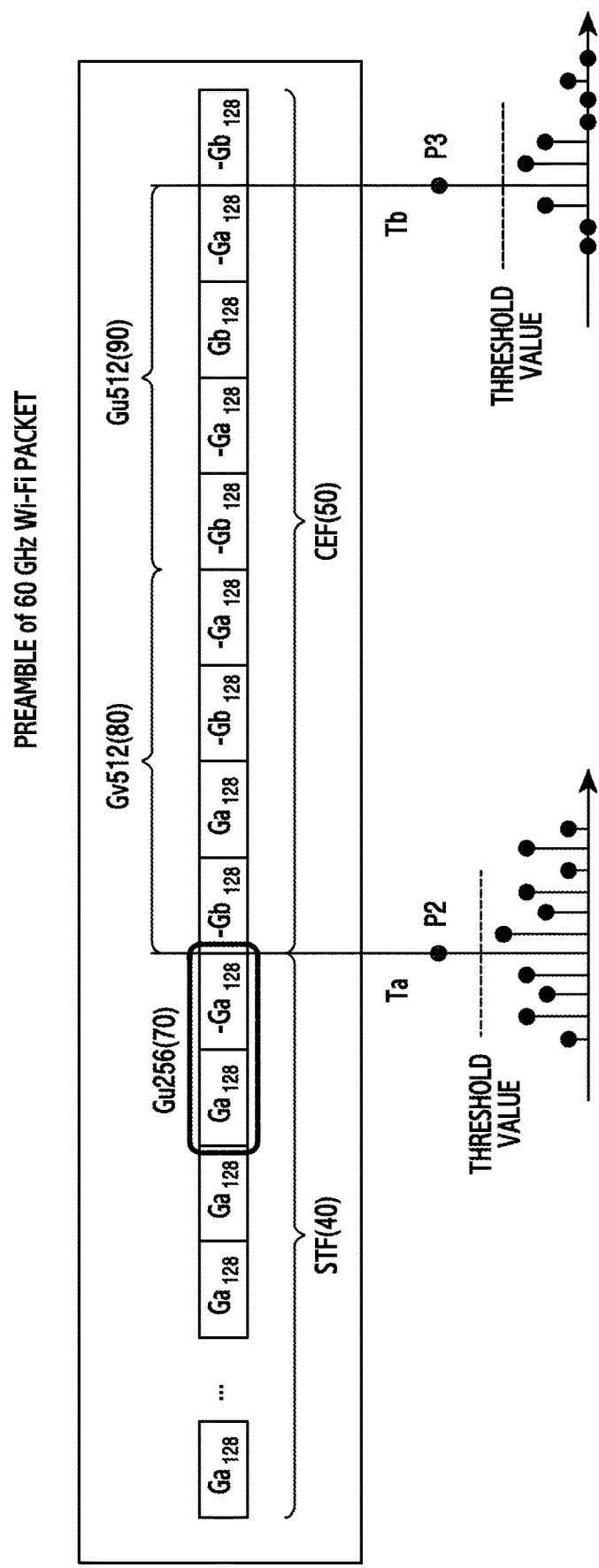
Figure 23C:
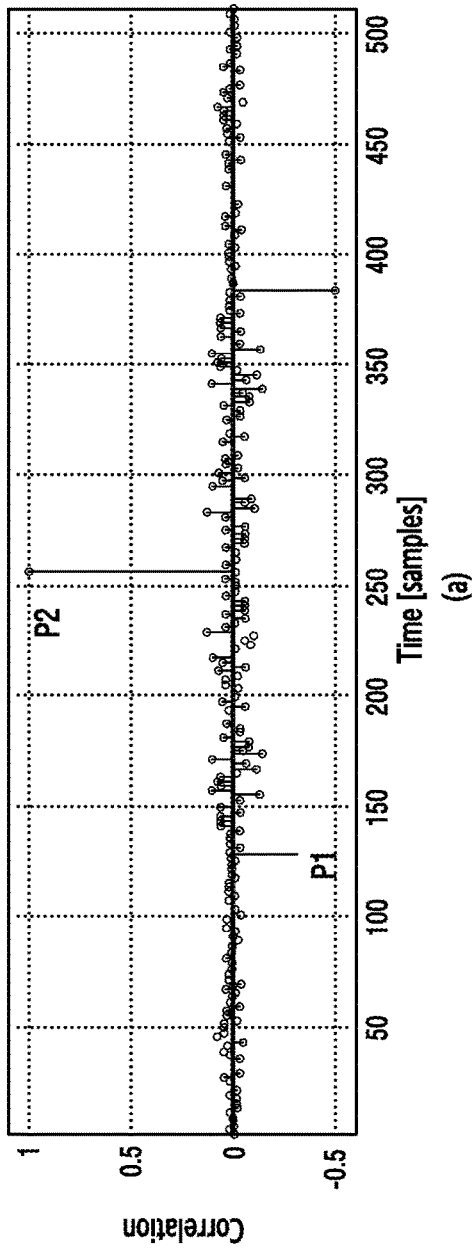
Figure 23C:
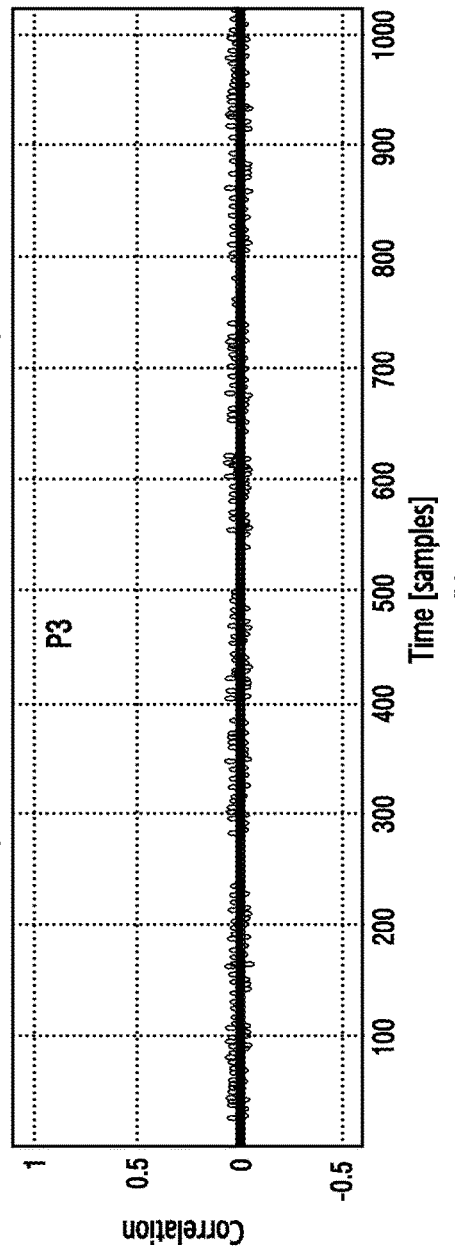

FIGS. 23A to 23C are views for describing an operation of detecting a reception symbol performed by wireless devices for distance estimation according to an embodiment of the present disclosure.

Referring to FIG. 23A, the first electronic device 100 and the second electronic device 200 detect a received symbol, using a Golay sequence used in a preamble of a 60 GHz or a WiGig Wi-Fi packet. It is important to obtain a propagation delay C in the distance estimation. Since wireless devices 100 and 200 cannot directly know the time point at which a packet enters the antenna 130 or 230, the baseband processor 115 of the first wireless device 100 or the baseband processor 215 of the second electronic device 200 estimates detection of reception, and obtains, based on the estimation, information on the time point at which the packet enters the antenna 130 or 230. A preamble enters the antenna 130 or 230 and is then transferred to the ADC 125B or 225B (time delay D), and the start point of the preamble is transferred to the baseband processor 115 or 215 (time delay E). The baseband processor 115 or 215 can estimate the detection of reception based on the time point at which the start point of the preamble enters the baseband processor 115 or 215. For more accurate detection of reception, the characteristics of the Golay sequence of the preamble may be used for the reception detection estimation (time delay F).

Referring to FIGS. 23B and 23C, a correlation characteristics is illustrated of a Golay sequence and a reception detection estimation operation for a Golay sequence used in a preamble of a 60 GHz Wi-Fi or a WiGig packet.

Referring to FIG. 23B, the preamble of a 60 GHz Wi-Fi packet includes an STF 40 and a CEF 50, the STF 40 and the CEF 50 include a Ga128 and a Gb128, each of which has a length of 128 samples, and a Gu256 70, a Gv512 80, and a Gu512 90, each of which is a combination of the Ga128 or Gb128.

Referring to FIG. 23C, in the correlation characteristics of the Gu256 70, peak P2 can be expected at the end point of the STF 40 as in FIG. 9B, and reception can be detected by comparing P2 with a predetermined threshold value. Further, the detection of reception can be performed using a phase difference between P1 and P2 of the correlation characteristics of the Gv256 80 illustrated in graph (a) of FIG. 23C. Referring to the characteristics of the sum of the correlation of the Gu512 90 and the correlation of the Gv512 80 illustrated in FIG. 23C, peak P3 can be expected at the end point of the Gu512 90 as shown in FIG. 23B, and reception can be detected by comparing P3 with a predetermined threshold value. Although the present embodiment discusses a reception detection estimation operation using a particular correlation characteristic of a Golay sequence, the present disclosure includes a similar modified embodiment. For example, correlation characteristics of the Ga128 or Gb128 may be used for the reception detection estimation operation, and a signal having an excellent automatic correlation property, for example, a pseudo random code, may be used.

Meanwhile, in the reception detection estimation by the baseband processor 115 of the first wireless device 100 or the baseband processor 215 of the second electronic device 200, the measurement is performed in units of digital sampling, which may cause more reception detection estimation errors. Thus, as in Equation 16 below, an STO may be used to obtain a more accurate reception detection processing delay of the baseband processor 215 of the second electronic device 200 and a more accurate reception detection processing delay F' of the baseband processor 115 of the first wireless device 100.

$$F'=F+S \qquad \text{Equation 16}$$

In Equation 16, F indicates a processing delay of the baseband processor 215 of the second electronic device 200 and a processing delay of the baseband processor 115 of the first wireless device 100 in reception detection in units of samples, and S indicates an STO and has a delay smaller than one sample.

Figure 24:
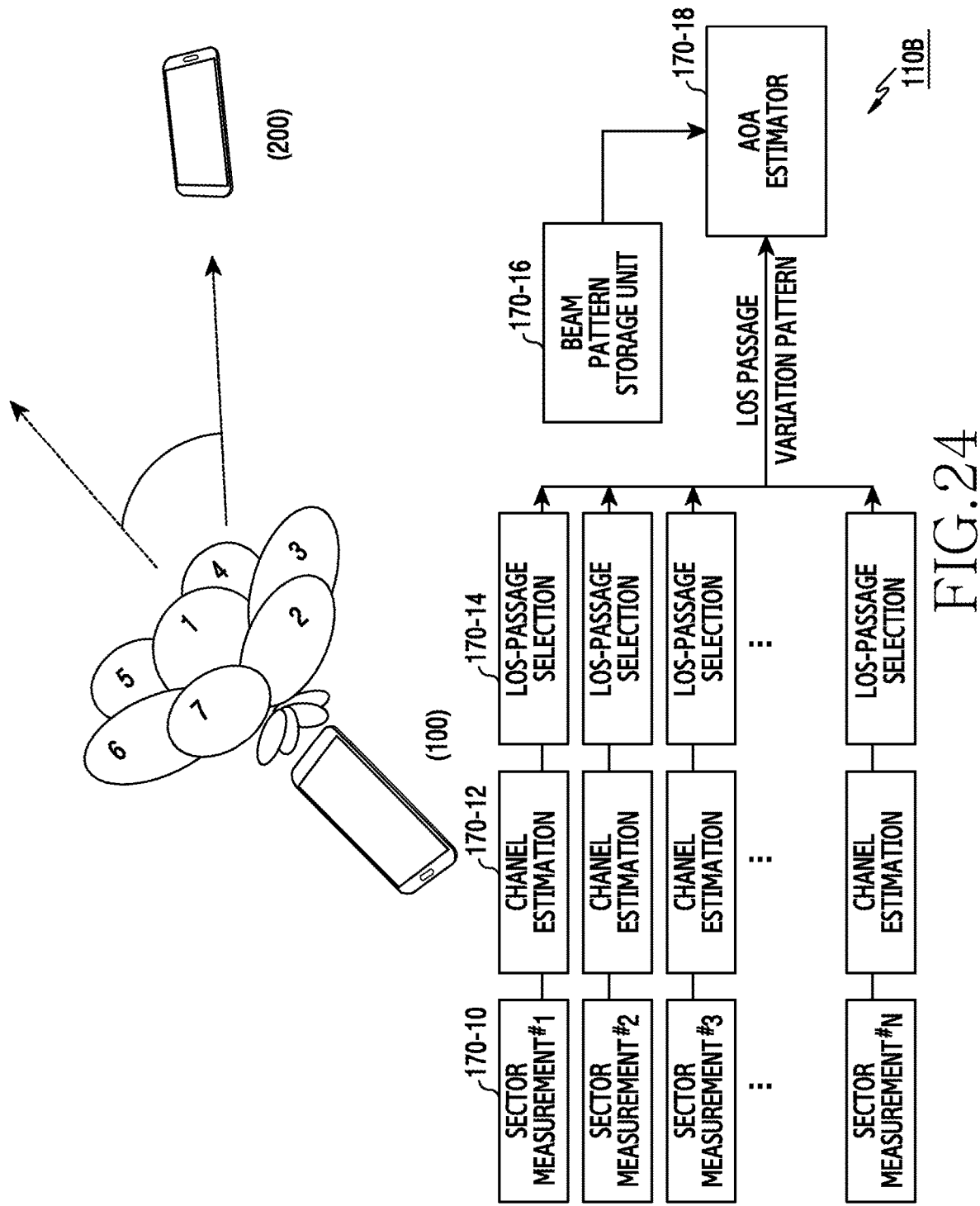
FIGS. 24 and 25 are views for describing a direction estimation operation according to an embodiment of the present disclosure.
Figure 25:
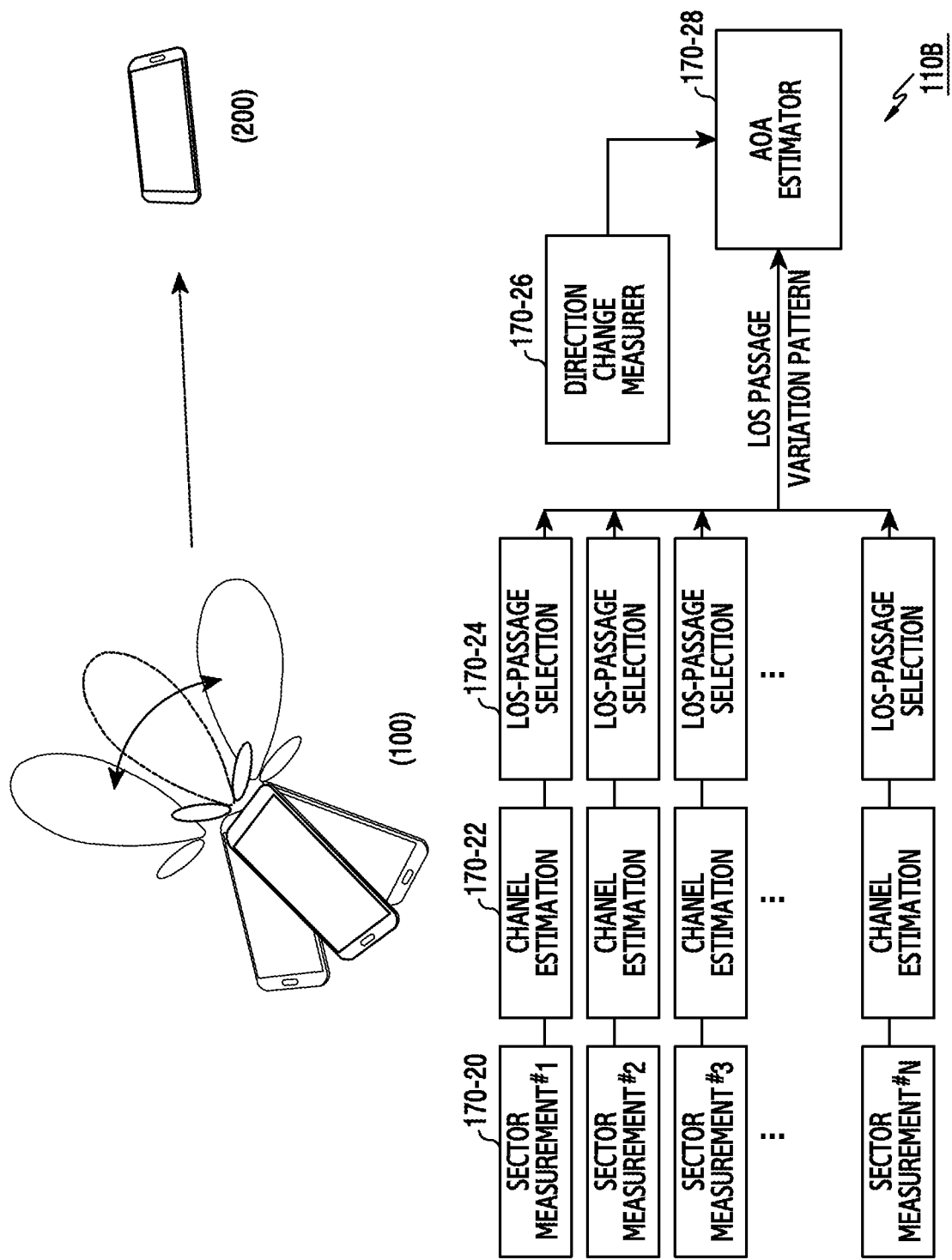

FIGS. 24 and 25 are views for describing a direction estimation operation according to an embodiment of the present disclosure.

Referring to FIGS. 24 and 25, a method of scanning for a direction of the second electronic device 200 according to various embodiments of the present disclosure includes an electric beam-sweep method as shown in FIG. 24 and a manual beam-sweep method as shown in FIG. 25. Such a direction estimation operation may be performed by the direction estimator 110B of FIG. 18. In this example, the first electronic device 100 estimates the direction of the second electronic device 200 as a responder. On the contrary, the direction estimator 210B of the second electronic device 200 illustrated in FIG. 19 may estimate the direction of the first electronic device 100.

Referring to FIG. 24, for the electric beam-sweep method, the direction estimator 110B of the first wireless device 100 includes a plurality of sector measurers 170-10, a plurality of channel estimators 170-12, a plurality of line-of-sight (LOS) passage selectors 170-14, a beam pattern storage unit 170-16, and an angle of arrival (AOA) estimator 170-18. The plurality of sector measurers 170-10 measure the intensity of a signal at the time of communication of a signal with a reception device while changing the antenna beam direction through antenna beam forming. The plurality of channel estimators 170-12 correspond to the plurality of sector measurers 170-10, respectively, and estimate corresponding channels. The plurality of LOS passage selectors 170-14 correspond to the plurality of channel estimators 170-12, respectively. Each of the selectors selects an LOS passage by scanning for a peak in an estimated channel. The AOA estimator 170-18 compares an LOS passage variation pattern output from the plurality of LOS passage selectors 170-14 and a beam pattern pre-stored in the beam pattern storage unit 170-16 and estimates an AOA according to a result of the comparison. As a result, the direction of the second electronic device 200 is estimated.

Referring to FIG. 25, for the manual beam-sweep method, the direction estimator 110B of the first wireless device 100 includes a plurality of sector measurers 170-20, a plurality of channel estimators 170-22, a plurality of LOS passage selectors 170-24, a direction change measurer 170-26, and an AOA estimator 170-28. The plurality of sector measurers 170-20 measure the intensity of a signal at the time of communication of a signal with a reception device while changing the antenna beam direction by a user's hand in a state in which the antenna beam of the transmission device 100 is fixed to the frontward. The plurality of channel estimators 170-22 correspond to the plurality of sector measurers 170-20, respectively, and estimate corresponding channels. The plurality of LOS passage selectors 170-24 correspond to the plurality of channel estimators 170-22, respectively. Each of the selectors selects an LOS passage by scanning for a peak in an estimated channel. The AOA estimator 170-28 compares an LOS passage variation pattern output from the plurality of LOS passage selectors 170-24 and a beam pattern measured by the direction change measurer 170-26, which can be implemented by a gyroscope, and estimates an AOA according to a result of the comparison. As a result, the direction of the second electronic device 200 is estimated.

Figure 26:
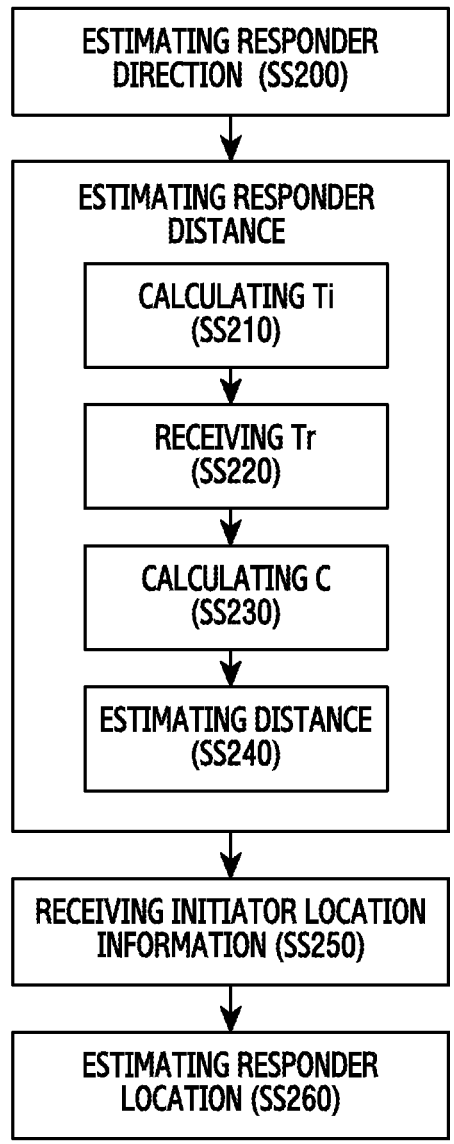
FIG. 26 is a diagram showing a processing flow of a location estimation operation according to an embodiment of the present disclosure.

FIG. 26 is a diagram showing a processing flow of a location estimation operation according to an embodiment of the present disclosure.

This processing flow may be performed by, for example, the location estimator 110 of the first wireless device 100 illustrated in FIG. 17. The operation of estimating the distance and direction of the second electronic device 200 by the first wireless device 100 may be performed by the range estimator 110A and the direction estimator 110B included in the baseband processor 115 of the first wireless device 100 illustrated in FIG. 18. The distance estimation operation by the range estimator 110A may be performed according to the flow illustrated in FIGS. 20A to 22B described above, and the direction estimation operation by the direction estimator 110B may be performed according to the flow illustrated in FIG. 23 or 24 described above.

Referring to FIG. 26, in order to estimate the location of the second electronic device 200, the direction estimator 110B of the first wireless device 100 estimates the direction, i.e., angle, of the second electronic device 200 in operation SS200.

Next, the first wireless device 100 estimates the distance between the initiator and the second electronic device 200 in operations SS210 to SS240. To this end, the initiator should know the time for which the request range packet and the response range packet stay in the air. That is, the initiator should know the propagation delay C defined in Table 3. In order to obtain C, the range estimator 110A of the first wireless device 100 calculates a time interval Ti from a time point when the request range packet is generated and transmitted to a time point when the response range packet transmitted from the second electronic device 200 is detected. In operation SS220, the range estimator 110A of the first wireless device 100 receives a time interval Tr calculated by the range estimator 210A of the second electronic device 200. In operation SS230, the range estimator 110A of the first wireless device 100 calculates a propagation delay C through Equation 15 from the obtained Ti and Tr. In operation SS240, the range estimator 110A of the first wireless device 100 estimates the distance between the first wireless device 100 and the second electronic device 200 by applying C obtained by Equations 15 to 17.

$$\text{Distance} = C * \text{speed of light} \quad \text{Equation 17}$$

Although the distance between the first wireless device 100 and the second electronic device 200 is estimated once in the present example, the distance may be estimated multiple times and averaging or filtering of the estimations may be performed to achieve a more accurate distance estimation in an embodiment.

In operation SS250, the location estimator 110 of the first wireless device 100 receives location information of the first wireless device 100. For example, global positioning system (GPS) information or access point (AP) may be used to recognize the location of the first wireless device 100. In operation SS260, the location estimator 110 of the first wireless device 100 can estimate the location of the second electronic device 200 within a resolution of several centimeters based on the location information of the first wireless device 100.

The location of the second electronic device 200 estimated by the first wireless device 100 as described above may be externally displayed to allow a user to identify the location. For example, the location of the first wireless device 100 and the location of the second electronic device 200 may be displayed on a map.

Further, the first wireless device 100 may perform a handover and signal power adjusting operation based on the estimated location of the second electronic device 200. For example, the shorter the distance, the higher the probability of a smooth communication, even with a small signal power. Therefore, the first wireless device 100 can adjust the signal power using a relational equation between the distance and the signal power using this property. As another example, the first wireless device 100 may compare the location of a wireless device and locations of base stations and use the comparison in handover for communication with a nearest base station.

FIGS. 27A to 27C illustrate a specific flow of signals transmitted or received between electronic devices for a scanning operation according to an embodiment of the present disclosure.

Referring to FIG. 27A, the illustrated flow corresponds to a form of the flow illustrated in FIG. 7A extended to a plurality of electronic devices. The flow illustrated in FIG. 7A corresponds to a flow of signals transmitted or received between the first electronic device 100 as a controller device or a user device and the second electronic device 200 as a target device or second electronic device. In contrast, the flow illustrated in FIG. 27A corresponds to a flow of signals transmitted or received between the first electronic device 100 as a controller device or a user device and a plurality of (e.g., three) first electronic devices or second electronic devices 200-1 to 200-3. In an embodiment, the plurality of target devices may be devices scanned within a particular area (e.g., a conference room, a classroom, an office, or a museum). In an embodiment, the plurality of target devices may be devices, which are located within a particular area and form a group.

This processing flow may be applied to various embodiments of the present disclosure.

Figure 48:
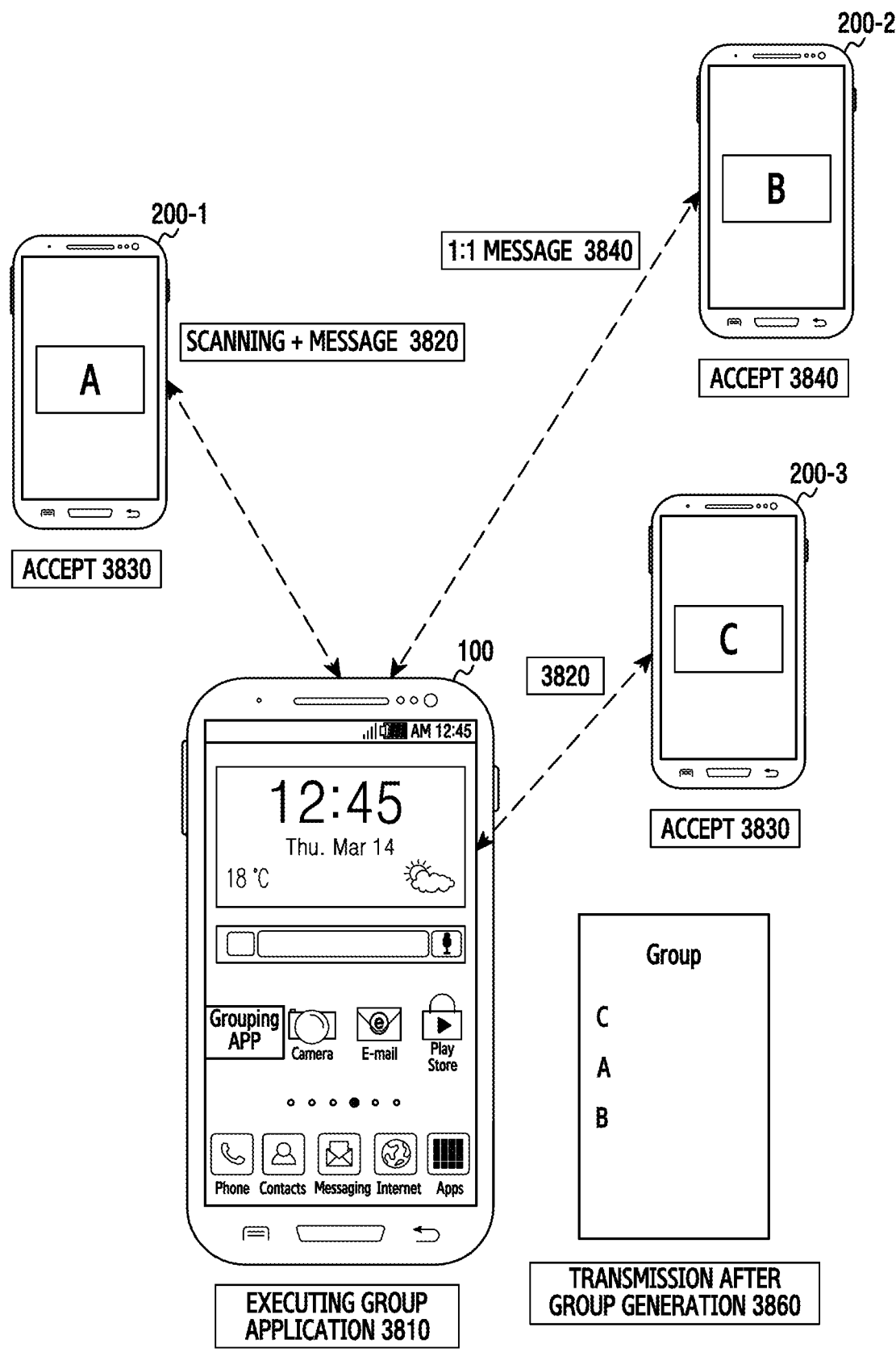

In an embodiment, the first electronic device 100 may execute a grouping application in a conference room to form a group including the second electronic devices 200-1 to 200-3 and enable the target devices to share conference materials in the formed group (FIG. 48).

Figure 49:
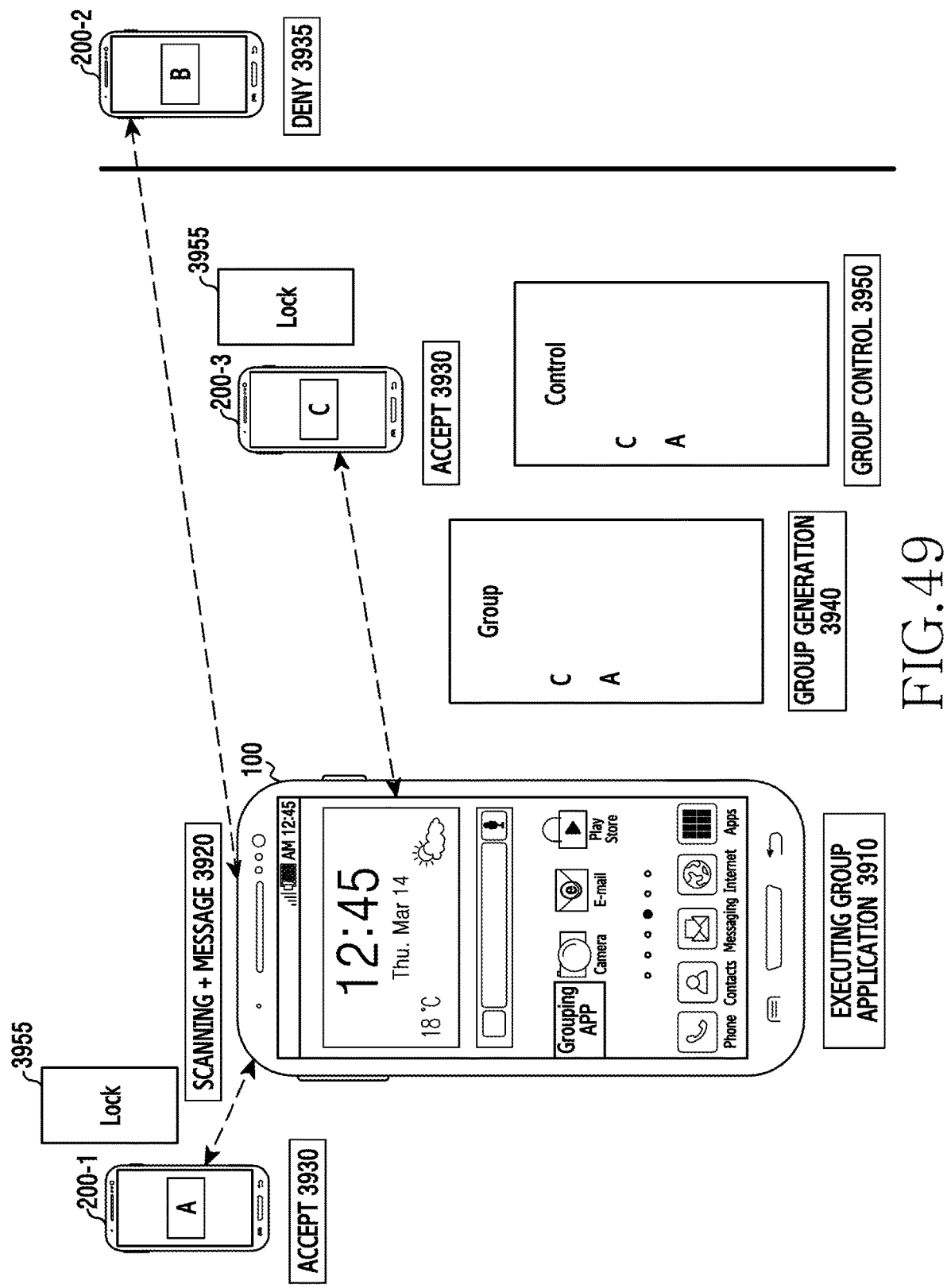

In an embodiment, the first electronic device 100 may execute a grouping application in a classroom to form a group including the second electronic devices 200-1 to 200-3 and acquire an authority to control the formed group to control the target devices (e.g., screen lock) (FIG. 49).

Figure 50:
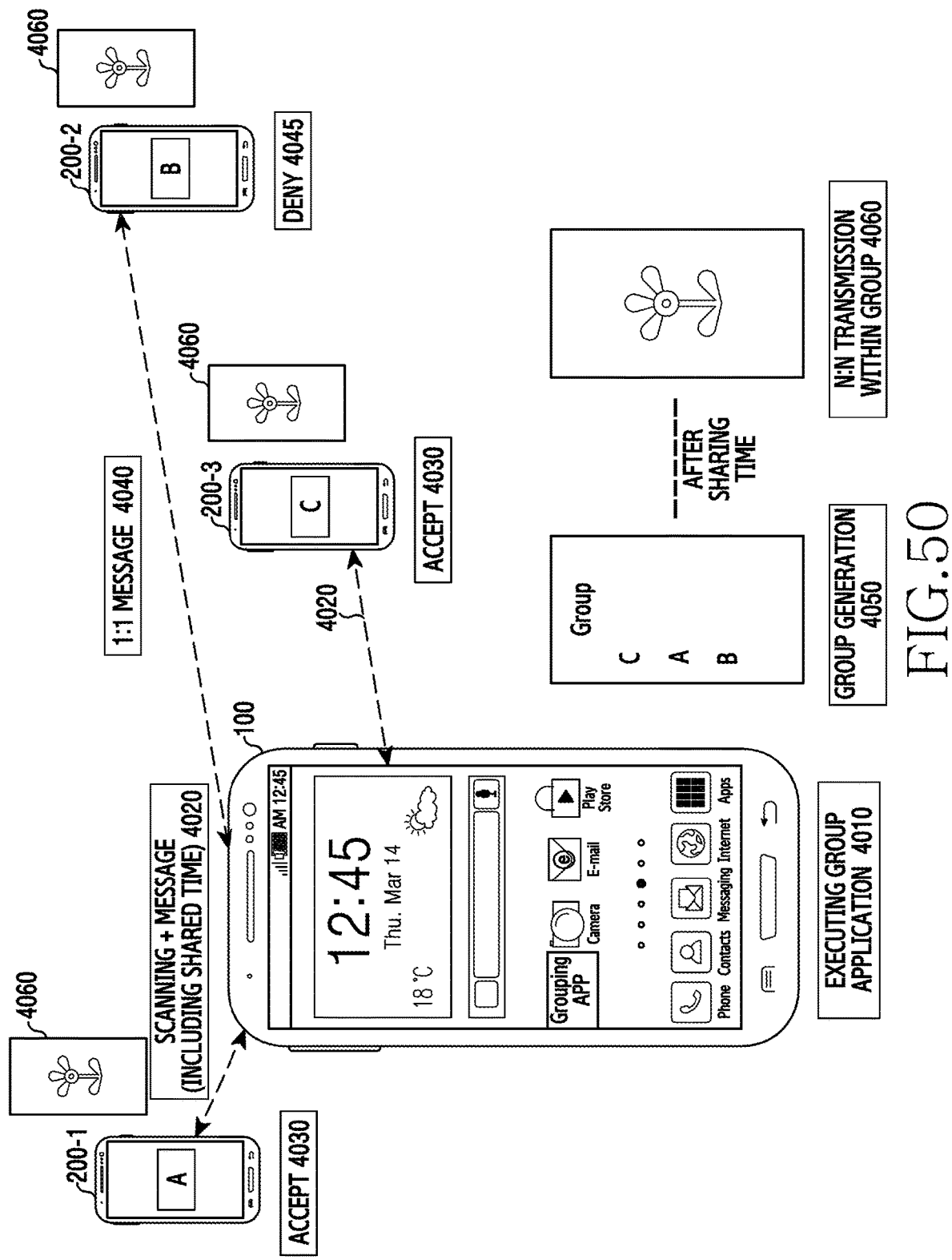

In an embodiment, the first electronic device 100 may execute a grouping application in a small meeting to form a group including the second electronic devices 200-1 to 200-3 and enable the target devices to share photographs in the formed group (FIG. 50).

Figure 51:
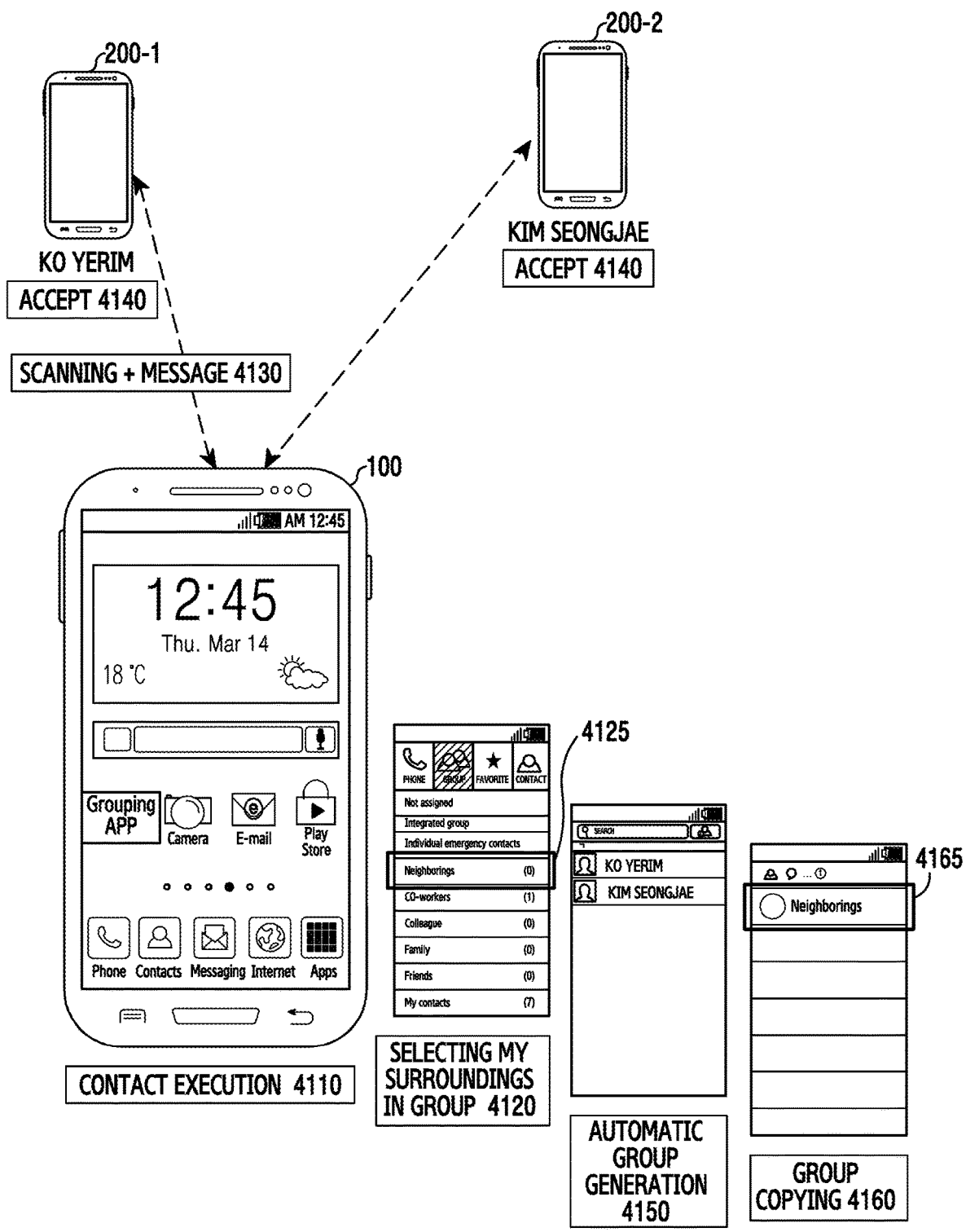

In an embodiment, the first electronic device 100 executes a contact list application, and selects some groups in the contact list to form a group including the second electronic devices 200-1 to 200-3. The first electronic device 100 may use the formed group to enable surrounding people to share contents or may copy the formed group to facilitate generation of an on-line group (FIG. 51).

In an embodiment, the first electronic device 100 may perform a service sharing operation using a mobile messenger. In an example, when the first electronic device 100 approaches target devices located nearby, a particular group (e.g., group chat room) may be automatically generated. In another example, for sharing of contents, a uniform resource locator (URL), and a contact list, automatic connection (e.g., Wi-Fi direct connection) may be established when the first electronic device 100 is located adjacent to target devices. When the target devices are remote users, service sharing may be achieved through connection schemes of 3G, LTE, and Wi-Fi. Even target devices belonging to the same group chat room may have different connection schemes according to the locations of the target devices. For example, when a target device is located adjacent to the controller device, the target device may be connected to the controller device through a Wi-Fi direct scheme. When a target device is located remotely from the controller device, the target device may be connected to the controller device through a 3G, LTE, or Wi-Fi scheme.

Referring to FIG. 27A, first electronic device 100 starts scanning in operation 1710. Then, second electronic devices 200-1 and 200-2 in an ultra low (UL) range 1705, which is a pre-configured user area, start an active scanning.

In operation 1715, the first electronic device 100 transmits an advertising packet ADV_IND(D1) to the second electronic devices 200-1 and 200-2. After receiving the advertising packet, the second electronic devices 200-1 and 200-2 transmit a scan request message SCAN_REQ to the first electronic device 100. As a response to the scan request message, the first electronic device 100 transmits a scan response message SCAN_RSP to the second electronic devices 200-1 and 200-2.

In operation 1720, when a response condition included in the received advertising packet ADV_IND(D1) allows interworking with the first electronic device 100, the second electronic device 200-1 transmits an advertising packet ADV_IND(D2) to the first electronic device 100. The first electronic device 100 receives an advertising packet ADV_IND(D2) from the second electronic device 200-1.

The operations of transmission or reception of the advertising packets between the first electronic device 100 and the second electronic devices 200-1 and 200-2 in operations 1715 and 1720 are performed by a low-power communication unit, such as a BLE module (e.g., BLE module 527 of FIG. 5). By using a UL scanning signal, the first electronic device 100 can scan for the second electronic devices 200-1 and 200-2 within a UL range 1705. In operation 1725, the first electronic device 100 transmits a low-power scanning request signal DL1 to the second electronic devices 200-1 and 200-2, and receives a low-power scanning response signal DL2 from the second electronic devices 200-1 and 200-2.

Thereafter, the first electronic device 100 transmits a scanning signal by a changed power. That is, the first electronic device 100 scans for second electronic devices, using a scanning signal of a high power (H). By using a scanning signal of such a high power, the user device can scan for not only the second electronic devices 200-1 and 200-2 within the UL range 1705 but also a second electronic device 200-3 outside of the UL range 1705. In operation 1730, the first electronic device 100 transmits a high-power scanning request signal DH1 to the second electronic devices 200-2 and 200-3, and receives a high-power scanning response signal DH2 from the second electronic devices 200-2 and 200-3.

In operation 1735, the first electronic device 100 lists the second electronic devices in the sequence of arrival and the values of the received signal intensity (received signal strength indicator (RSSI)) of the scanning response signals received from the second electronic devices 200-1 to 200-3. A result of the listing may be externally displayed. In an embodiment, the result of the listing may be externally displayed as visual information in the form of a list. For example, a list of the second electronic devices 200-1 to 200-3 arranged in a sequence in which a device having a scanning response signal of a larger reception signal intensity value (RSSI) precedes the other devices, in a sequence in which a device having a scanning response signal which arrived earlier precedes the other devices, or in a sequence in which a device nearer to the user device precedes the other devices may be displayed.

In an embodiment, the result of the listing may be externally displayed as visual information in the form of a map. For example, the second electronic devices 200-1 to 200-3 may be displayed in a form in which a device having a scanning response signal of a larger reception signal intensity value (RSSI) is arranged nearer to the first electronic device 100 than the other devices, in a form in which a device having a scanning response signal which arrived earlier is arranged nearer to the first electronic device 100 than the other devices, or in a form in which a device nearer to the user device is arranged nearer to the first electronic device 100 than the other devices.

In an embodiment, the result of the listing may be externally displayed as auditory information.

In operation 1740, the user may select, from the result of the listing, one or more second electronic devices or second electronic devices of a particular group. When a particular second electronic device or group is selected, the first electronic device 100 transmits an advertising packet ADV_IND(N1) to the selected second electronic device or a second electronic device 200-1 of the selected group.

In operation 1745, the second electronic device 200-1 receives an advertising packet ADV_IND(N1) and transmits a scan request message SCAN_REQ to the first electronic device 100. As a response to the scan request message SCAN_REQ, the first electronic device 100 transmits a scan response message SCAN_RSP to the second electronic device 200-1.

In operation 1750, the second electronic device 200-1 receives the advertising packet ADV_IND(N1) and then notifies the user of a request for connection through a main connection scheme (e.g., Wi-Fi direct) from the first electronic device 100. For example, the second electronic device 200-1 may display a UI, which inquires of the user whether to connect with the first electronic device 100. When there is an input approving the connection through the main connection scheme from the user, the second electronic device 200-1 transmits an advertising packet ADV_IND (N2) to the first electronic device 100. The advertising packet ADV_IND(N2) may include a message notifying that the second electronic device 200-1 has approved the connection through a main connection scheme with the first electronic device 100. The first electronic device 100 receives the advertising packet ADV_IND(N2) and transmits a scan request message SCAN_REQ to the second electronic device 200-1. As a response to the scan request message SCAN_REQ, the second electronic device 200-1 transmits a scan response message SCAN_RSP to the first electronic device 100.

Operations 1745 and 1750 may be identically performed between the first electronic device 100 and the second electronic device 200-2 also.

As a result of the performance of operations 1745 and 1750, when an intention of service sharing between the first electronic device 100 and the second electronic device 200-1 is identified, the first electronic device 100 and the second electronic device 200-1 are connected by wireless through a main connection scheme (e.g., Wi-Fi direct) in operation 1760. Also, in operation 1765, the first electronic device 100 and the second electronic device 200-2 may be connected by wireless through a main connection scheme (e.g., Wi-Fi direct).

The flow illustrated in FIG. 27A corresponds to an example in which the first electronic device 100 scans for second electronic devices while changing the power of scanning signals. That is, the first electronic device 100 scans for second electronic devices using scanning signals having power of two levels (ultra low or high). The various embodiments of the present disclosure described above are just for exemplification and may be thus modified in various ways. For example, the first electronic device 100 may scan for a plurality of second electronic devices using a scanning signal having power of a single level. As another example, the first electronic device 100 may scan for a plurality of second electronic devices using a scanning signal having power of multiple (e.g., three or more) levels. The number of the scanning signals may be properly determined according to the environments or situations.

Referring to FIG. 27B, the user device or first electronic device 100 scans for a plurality of second electronic devices or second electronic devices 200-1 to 200-4. For the scanning operation, the first electronic device 100 transmits an advertising packet ADV_IND(D) as a scanning request signal to a plurality of second electronic devices 200-1 to 200-4.

Scanned target devices may change according to the distance between the first electronic device 100 and the second electronic devices 200-1 to 200-4. For example, when the first electronic device 100 transmits a low-power scanning signal, the second electronic devices 200-1 and 200-2 are scanned for. When the first electronic device 100 transmits a high-power scanning signal, the second electronic devices 200-3 and 200-4 are scanned for. By transmitting the advertising packet ADV_IND(D) while changing the power of the packet according to the transmission power control (TPC) scheme, the first electronic device 100 can scan for all of the second electronic devices 200-1 to 200-4.

The first electronic device 100 receives an advertising packet ADV_IND(D) as a scanning response signal from the plurality of second electronic devices 200-1 to 200-4. The first electronic device 100 may classify the advertising packets ADV_IND(D) transmitted by the plurality of second electronic devices 200-1 to 200-4. For example, the first electronic device 100 may classify (sort) the advertising packets ADV_IND(D) transmitted by the plurality of second electronic devices 200-1 to 200-4 according to the reception signal intensity (RSSI) or the sequence of arrival.

Referring to FIG. 27C, the first electronic device 100 determines the distance based on the RSSI value of the discovered target devices according to the power levels (e.g., ultra low/high). The first electronic device 100 may divide a scanned area into zones according to the power levels. For example, the first electronic device 100 may divide a scanned area into two zones including zones 1 and 2. The first electronic device 100 classifies and lists target devices using the reception sequence and RSSI values of the scanning response signals. For example, the first electronic device 100 may properly determine a weight value for the reception sequence of the scanning response signal and a weight value for the RSSI value according to the environment or situation. For example, the weight value for the reception sequence and the weight value for the RSSI value may be determined to be the same, i.e., 1:1, or the weight value for the reception sequence or the weight value for the RSSI value may be determined to be larger than the other.

The first electronic device 100 may determine the power level and the number of divided zones according to the situation. For example, the first electronic device 100 may determine an ultra near zone based on the RSSI value, and determine zones 1 and 2 based on a combination of TPC and RSSI. As a result, the controller device can divide the scanning area into a total of three scanning zones. As another example, the first electronic device 100 may divide a scanning area into four scanning zones based on the TPC, and may further divide each zone based on the RSSI value.

Figure 28B:
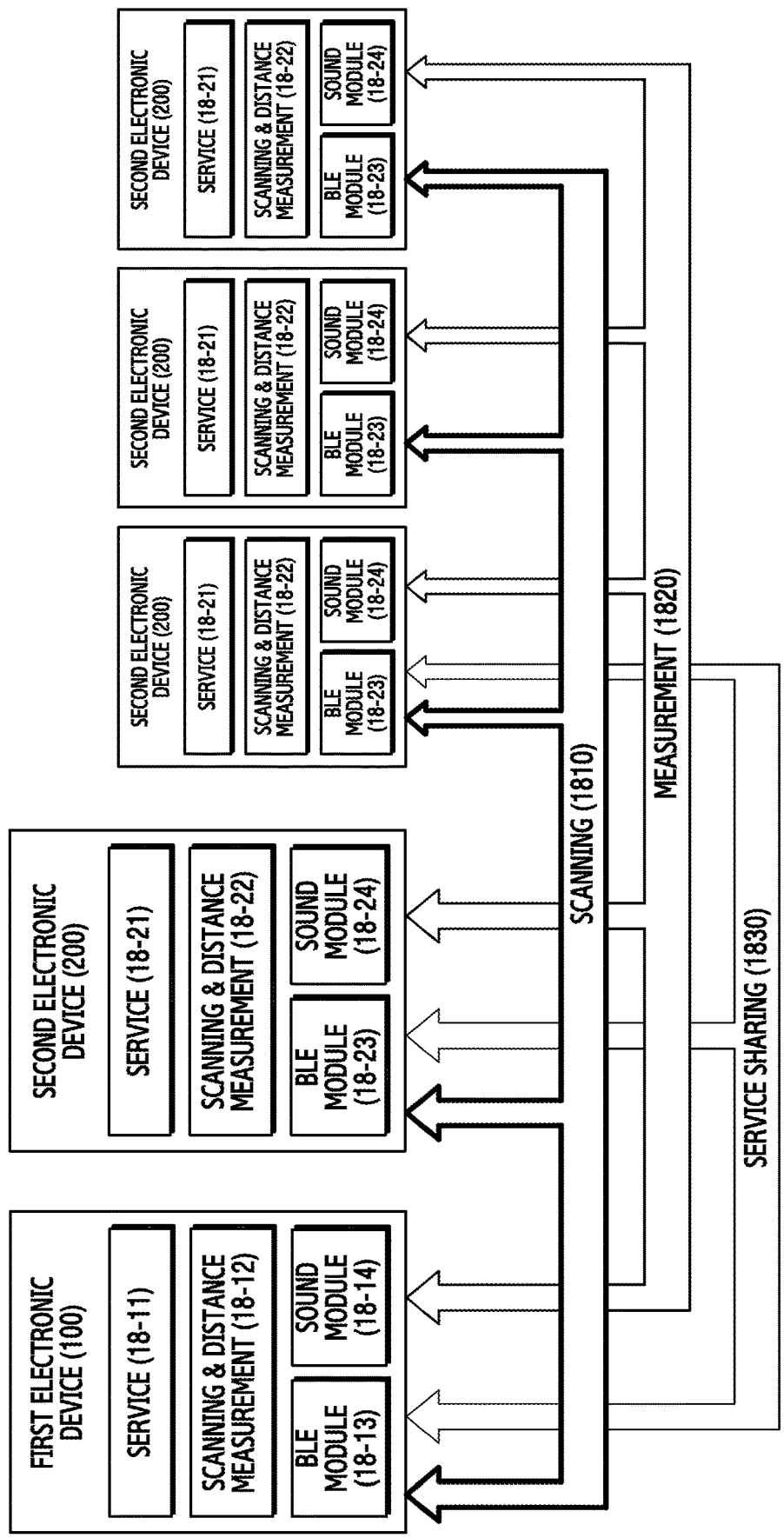

FIGS. 28A and 28B illustrate system block diagrams for a service sharing operation according to various embodiments of the present disclosure.

FIG. 28A is a system block diagram for a service sharing operation between two electronic devices including a first electronic device 100 and a second electronic device 200. FIG. 28B is a system block diagram for a service sharing operation between a first electronic device 100 and a plurality of (e.g., four) second electronic devices 200-1 to 200-4. The illustrated substance is just an example for describing the present disclosure and allows modified embodiments thereof, and thus should not be construed to limit the scope of the present disclosure.

Referring to FIG. 28A, the first electronic device 100 includes a service execution module 18-11, a scanning and distance measurement module 18-12, a BLE module 18-13, and a sound (voice or sound) module 18-14. The second electronic device 200 includes a service execution module 18-21, a scanning and distance measurement module 18-22, a BLE module 18-23, and a sound module 18-24.

In operation 1810, the scanning and distance measurement module 18-12 of the first electronic device 100 scans for the second electronic device 200. In operation 1820, the scanning and distance measurement module 18-12 of the first electronic device 100 measures the distance between the user device and the second electronic device 200 based on a result of the scanning. In an embodiment, the scanning and distance measurement module 18-12 scans for the second electronic device 200 using the BLE module 18-13 (FIGS. 6A to 7C, FIG. 27A, and FIG. 27C). In an embodiment, the scanning and distance measurement module 18-12 scans for the second electronic device 200 using the BLE module 18-13 and the sound module 18-14 (FIGS. 8 to 16C). In operation 1830, the service execution module 18-11 of the first electronic device 100 perform an operation for service sharing with the second electronic device 200. The operation for service sharing is described in more detail below with reference to FIGS. 31A to 51.

The service execution module 18-21, the scanning and distance measurement module 18-22, the BLE module 18-23, and the sound module 18-24 of the second electronic device 200 inter-work with the service execution module 18-11, the scanning and distance measurement module 18-12, the BLE module 18-13, and the sound (voice or sound) module 18-14 of the first electronic device 100, respectively, to perform a service sharing operation according to the embodiments of the present disclosure.

Referring to FIG. 28B, the first electronic device 100 includes a service execution module 18-11, a scanning and distance measurement module 18-12, a BLE module 18-13, and a sound (voice or sound) module 18-14. Similarly, each of a plurality of second electronic devices 200-1 to 200-4 includes a service execution module 18-21, a scanning and distance measurement module 18-22, a BLE module 18-23, and a sound module 18-24.

Figure 29:
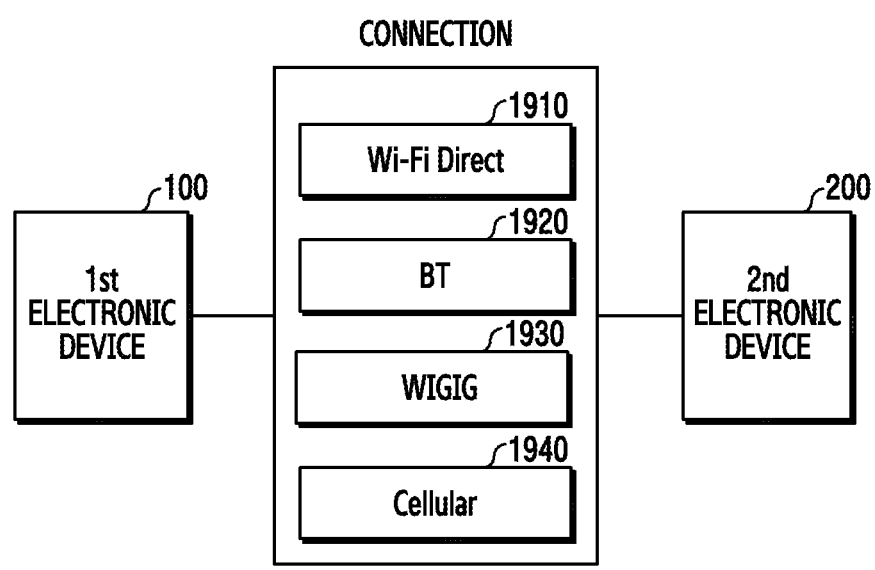
FIG. 29 is a view for describing a connection operation according to various embodiments of the present disclosure.

FIG. 29 is a view for describing a connection operation according to various embodiments of the present disclosure.

The illustrated substance is just an example for describing the present disclosure and allows modified embodiments thereof, and thus should not be construed to limit the scope of the present disclosure.

Referring to FIG. 29, the first electronic device 100 and the second electronic device 200 are connected through one scheme selected from various communication connection schemes. For example, the various communication connection schemes include a Wi-Fi direct scheme 1910, a Bluetooth scheme 1920, a 60 GHz or WiGig scheme 1930, and a cellular scheme (e.g., LTE, 3G (CDMA and GSM)) 1940. In addition to the connection schemes listed above, the various communication connection schemes may include one scheme among a BLE scheme, an NFC scheme, Wi-Fi scheme, a ZigBee scheme, a UWB scheme, an IrDA scheme, a VLC scheme, and an EDGE scheme.

In an embodiment, the connection between the first electronic device 100 and the second electronic device 200 may be established in consideration of the attribute and/or capacity of the service to be shared. For example, in the case of requiring a wide bandwidth, like a video, the Wi-Fi direct may be selected while the Bluetooth is selected for the sound source. In an embodiment, the connection between the first electronic device 100 and the second electronic device 200 may be established in consideration of the distance (or the degree of proximity) between the first electronic device 100 and the second electronic device 200. For example, the Wi-Fi direct may be selected when the distance between the first electronic device 100 and the second electronic device 200 is a short distance, and the Wi-Fi or cellular (e.g., 3G or LTE) may be selected when the distance is a long distance.

Figure 30A:
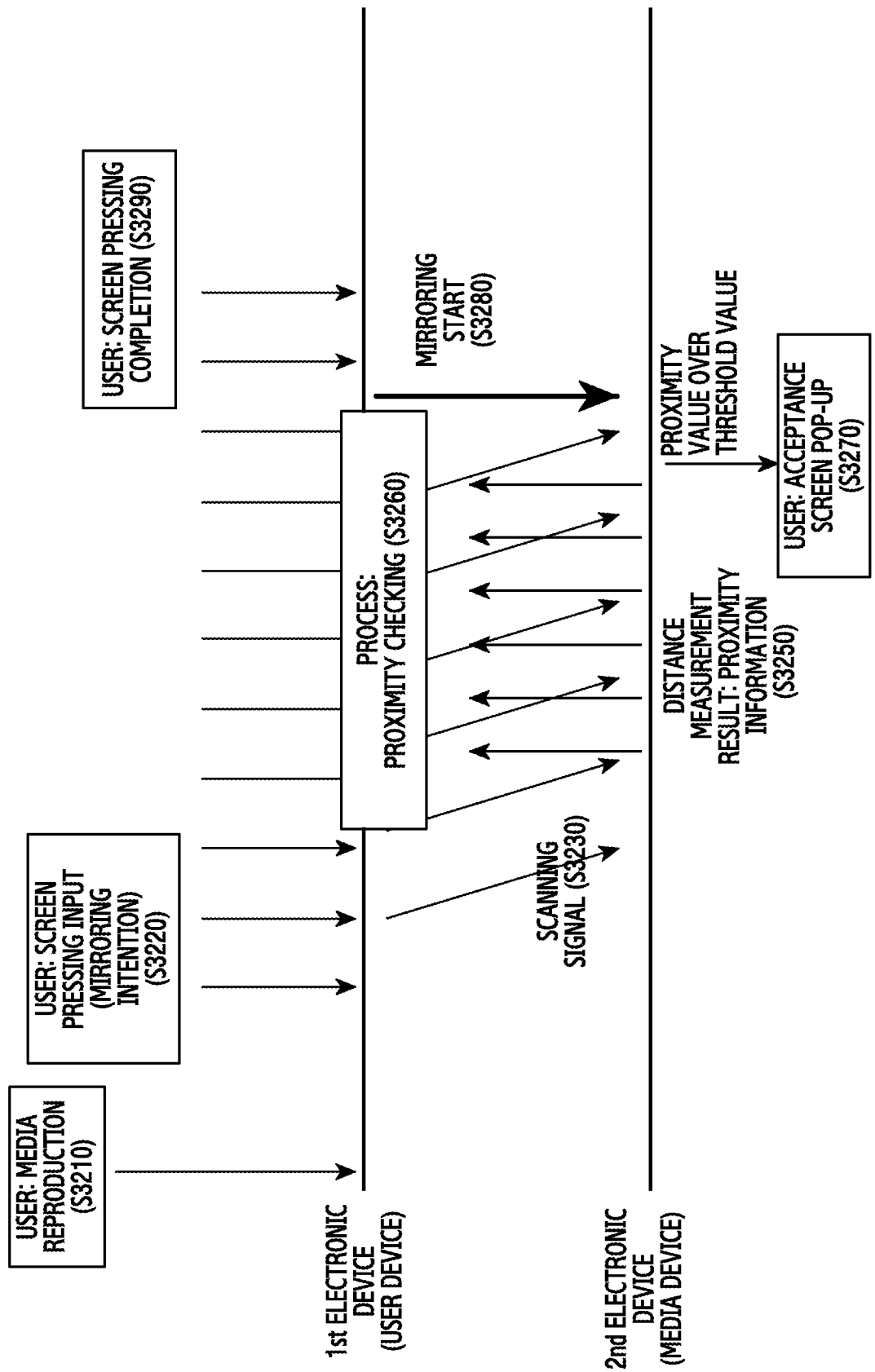
FIGS. 30A and 30B illustrate examples of sharing of media contents between electronic devices by a service sharing operation according to various embodiments of the present disclosure.
Figure 30B:
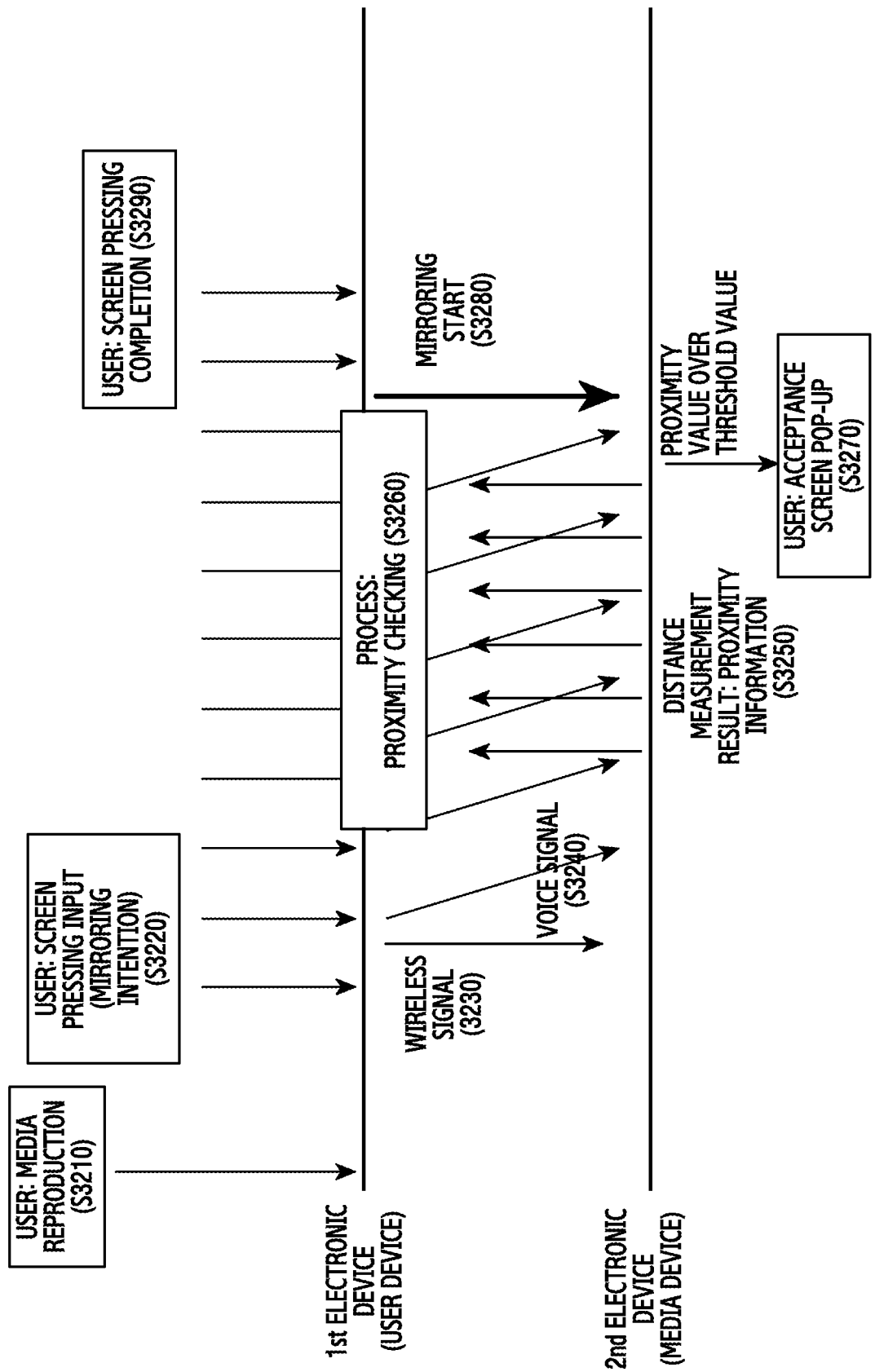

FIGS. 30A and 30B illustrate examples of sharing of media contents between electronic devices by a service sharing operation according to various embodiments of the present disclosure.

These embodiments correspond to examples in which a first electronic device as a user device (e.g., smart phone) and a second electronic device as a media device (e.g., TV) perform mirroring of media contents. FIG. 30A corresponds to an example of using a scanning signal (e.g., BLE signal) to scan for the second electronic device, and FIG. 30B corresponds to an example of using a wireless signal (e.g., BLE signal) and a voice signal to scan for the second electronic device. In the examples described below, the second electronic device measures the distance and distance variance between the first electronic device and the second electronic device. However, various embodiments of the present disclosure are not limited thereto, and the first electronic device may measure the distance and distance variance between the first electronic device and the second electronic device.

Referring to FIG. 30A, in a state where a user reproduces media through the first electronic device in operation S3210, if the user makes a particular gesture (e.g., presses a screen) with an intention of video mirroring in operation S3220, the first electronic device transmits a scanning signal in operation S3230.

Upon receiving a scanning signal periodically transmitted from the first electronic device, the second electronic device measures the distance and distance variance between the first electronic device and the second electronic device and reports a result of the distance measurement to the first electronic device in operation S3250. By receiving the result of the distance measurement, the first electronic device checks the proximity between the first electronic device and the second electronic device in operation S3260.

When a proximity having a value higher than or equal to a reference value is checked, an acceptance screen is popped up in the second electronic device in operation S3270. If the user inputs acceptance through the popped up acceptance screen in the second electronic device, the first electronic device starts mirroring of the media contents being reproduced in operation S3280. When the mirroring is started, the user may interrupt the particular gesture. For example, the user may complete the operation of pressing the screen of the first electronic device in operation S3290.

Referring to FIG. 30B, in a state where a user reproduces media through the first electronic device in operation S3210, if the user makes a particular gesture (e.g., presses a screen) with an intention of video mirroring in operation S3220, the first electronic device transmits a wireless signal in operation S3230. Further, the first electronic device periodically transmits a voice signal in operation S3240. The SyncSound scheme illustrated in FIG. 9B is used as the scheme for measuring the distances between the first electronic device and the second electronic device by transmitting a wireless signal and periodically transmitting a voice signal.

In response to the reception of the wireless signal from the first electronic device, the first electronic device and the second electronic device are synchronized. Thereafter, upon receiving a voice signal periodically transmitted from the first electronic device, the second electronic device measures the distance and distance variance between the first electronic device and the second electronic device and reports a result of the distance measurement to the first electronic device in operation S3250. By receiving the result of the distance measurement, the first electronic device checks the proximity between the first electronic device and the second electronic device in operation S3260.

When a proximity having a value higher than or equal to a reference value is checked, an acceptance screen is popped up in the second electronic device in operation S3270. If the user inputs acceptance through the popped up acceptance screen in the second electronic device, the first electronic device starts mirroring of the media contents being reproduced in operation S32080. When the mirroring is started, the user may interrupt the particular gesture. For example, the user may complete the operation of pressing the screen of the first electronic device in operation S2090.

FIGS. 31A to 37C illustrate, in view of a user interface, examples of a service sharing operation according to various embodiments of the present disclosure.

Hereinafter, examples of a service sharing operation performed according to embodiments of the present disclosure are described together with user interfaces with reference to FIGS. 31A to 37C. A service sharing operation according to embodiments of the present disclosure is performed in the sequence of the following procedures.

Figure 31A:
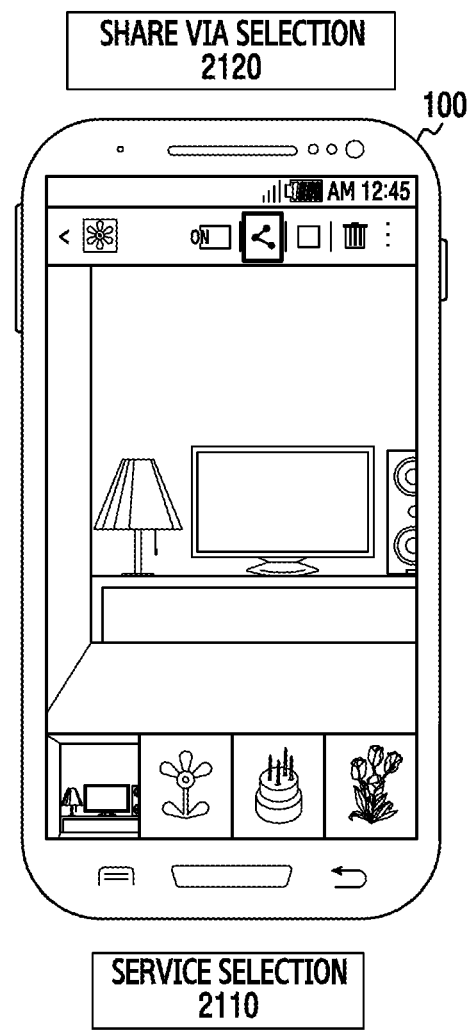
FIGS. 31A to 37C illustrate examples of a service sharing operation performed according to various embodiments of the present disclosure together with user interfaces.

(Procedure 1) a controller device selects a service to be shared (FIG. 31A)

(Procedure 2) the controller device inputs a sharing intention (FIG. 31A)

Figure 31B:
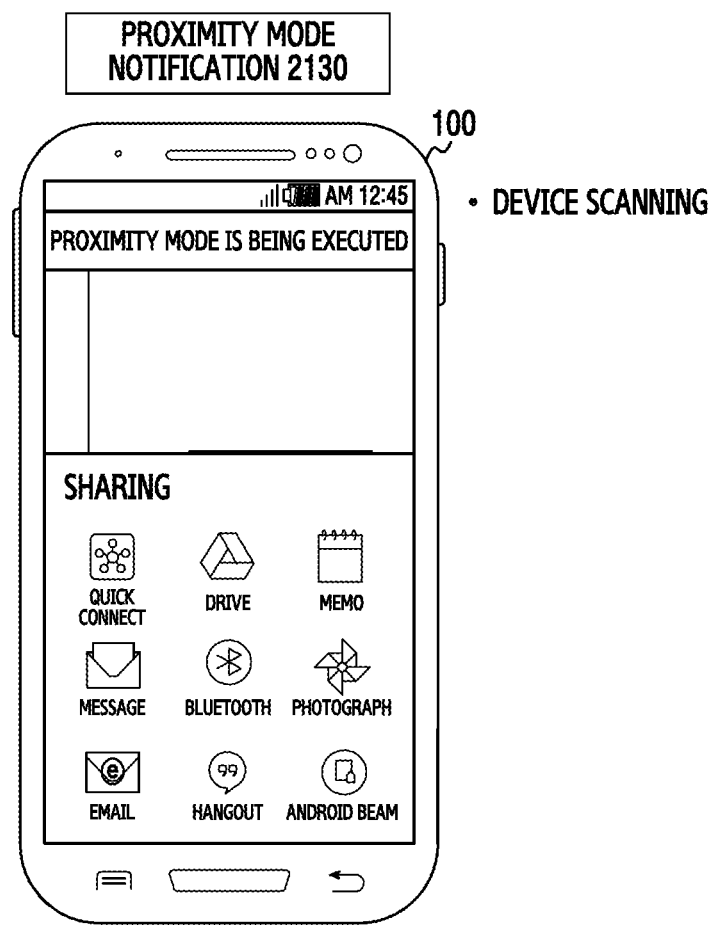

(Procedure 3) notifying of a proximity mode operation (FIG. 31B)

Figure 31C:
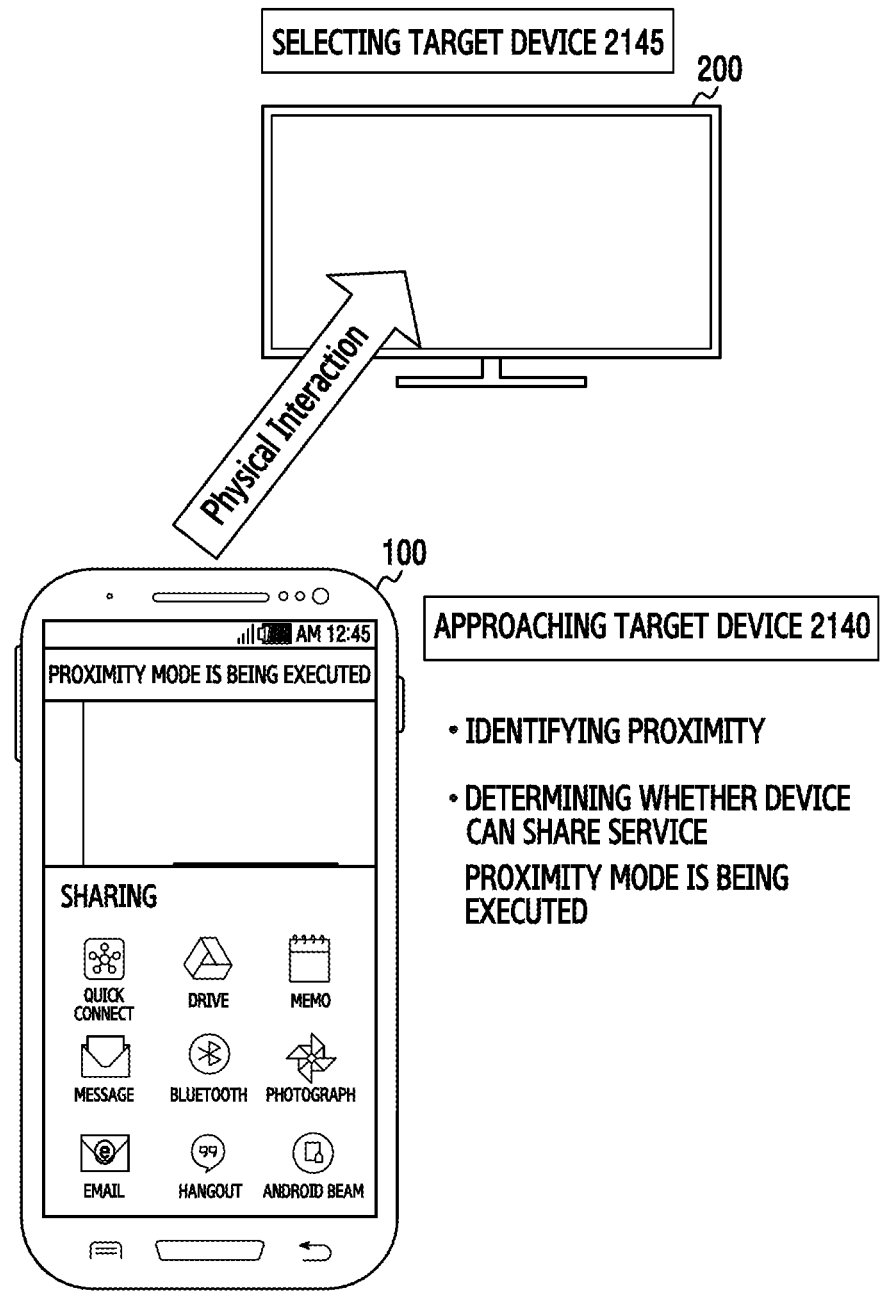

(Procedure 4) selecting a target device (FIG. 31C)

Figure 31D:
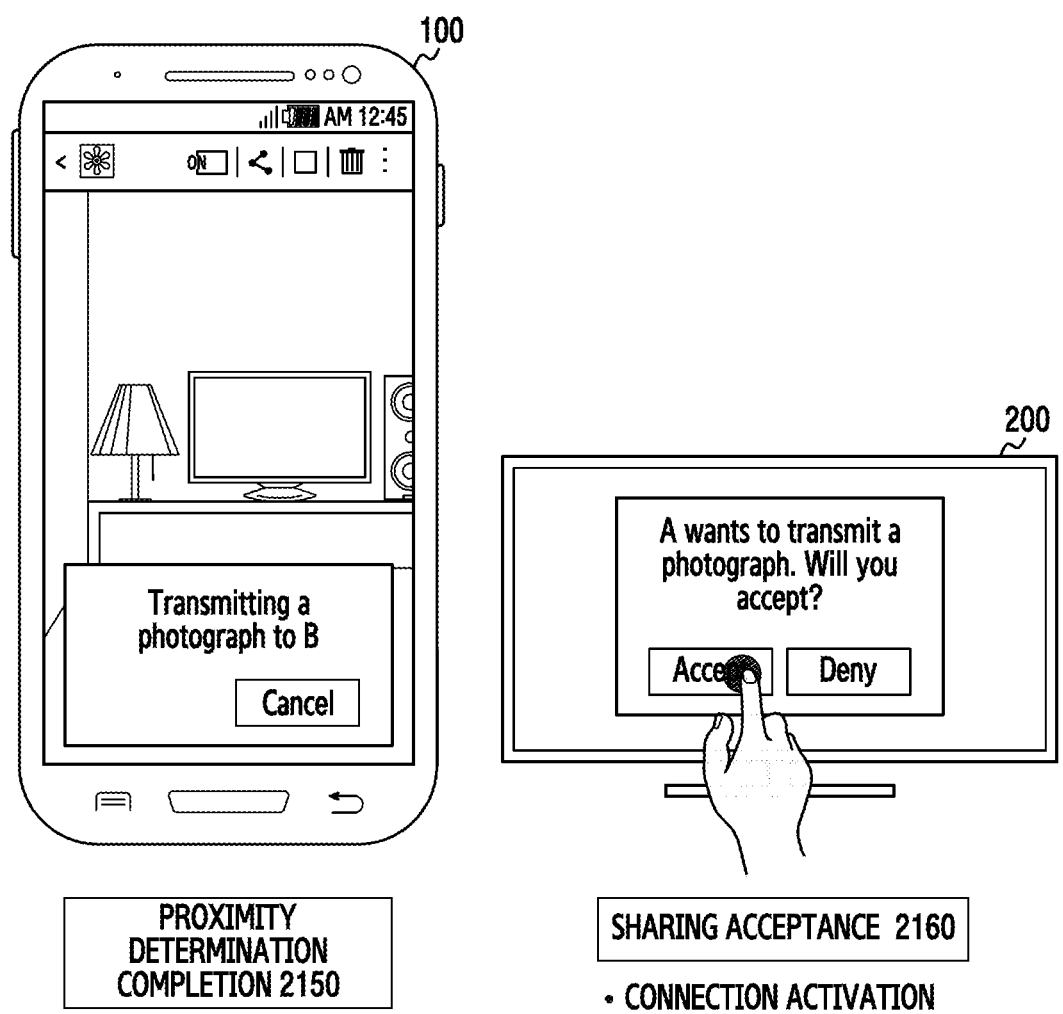

(Procedure 5) notifying of proximity determination completion (FIG. 31D)

(Procedure 6) selecting acceptance/denial of service sharing (FIG. 31D)

Figure 31E:
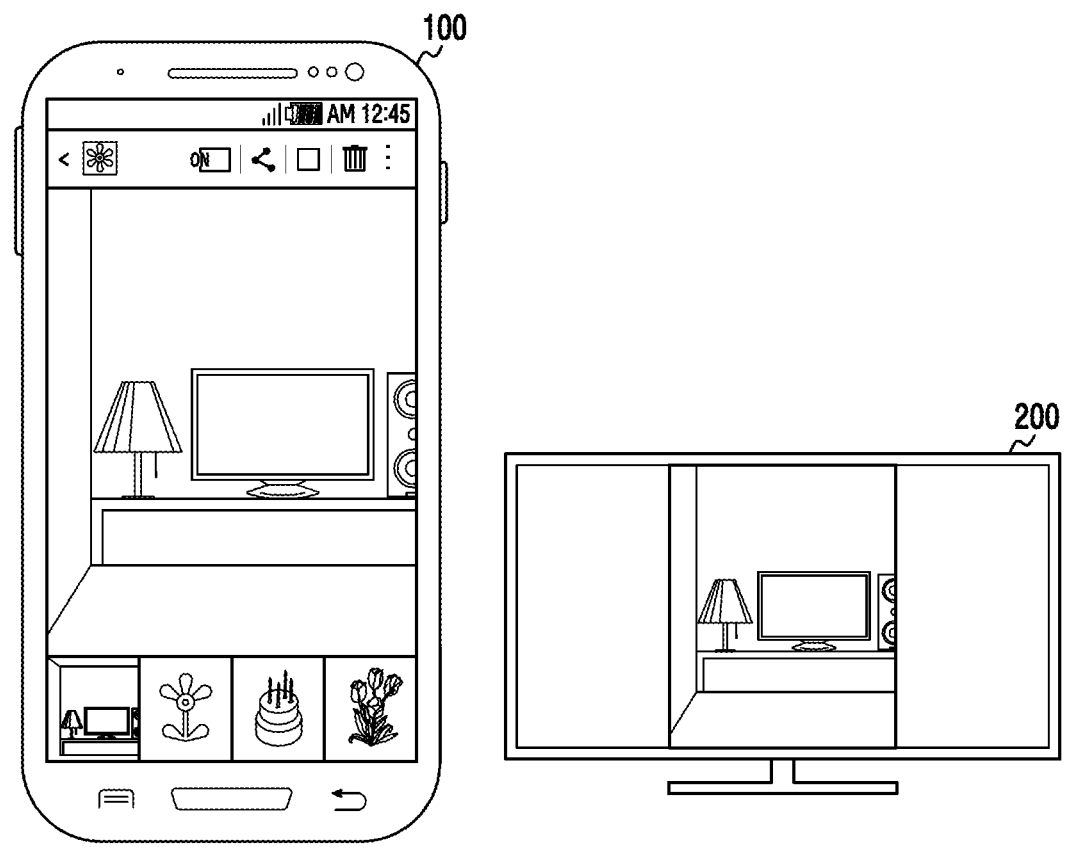

(Procedure 7) service sharing (FIG. 31E)

Referring to FIG. 31A, a user selects a service to be shared with a second electronic device 200 by a first electronic device 100 in operation 2110. In an embodiment, the service to be shared includes a video, music, a file, a photograph, an address book, or a messenger.

Next, the user inputs a sharing intention to share the service selected by the first electronic device 100 with the second electronic device 200 in operation 2120. In an embodiment, the sharing intention may be input by selecting a so-called Share via button on a display of the first electronic device 100. According to the selection of the Share via, a proximity mode operation is performed. The proximity mode operation may operate compatibly with an existing Share via APP list. The sharing scheme according to the proximity mode operation may be changed. For example, the sharing scheme may be changed using an application (e.g., BLE app) in a Share via APP list. As another example, the sharing scheme may be changed by changing an application by a user configuration. As another example, the sharing scheme may be changed by changing an application according to a service provision environment or situation. In an embodiment, the sharing intention may be input through a predetermined icon or button, or through a voice input.

Referring to FIG. 31B, the practicability of the proximity mode operation is notified of to the outside of the first electronic device 100 in operation 2130. The practicability of the proximity mode operation may be notified of through a UI, such as a notification bar or a notification message. Through the notification, the user can identify that the service can be shared through a physical interaction.

Figure 32A:
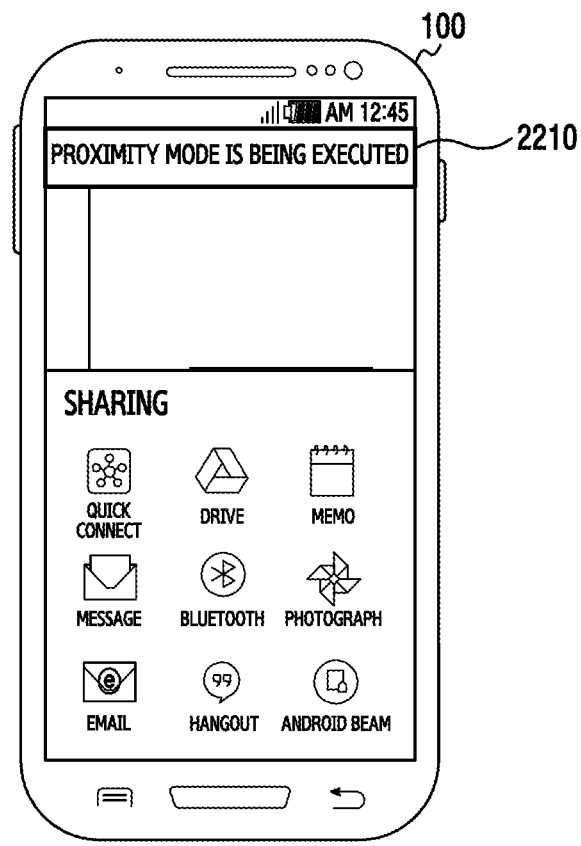
Figure 32B:
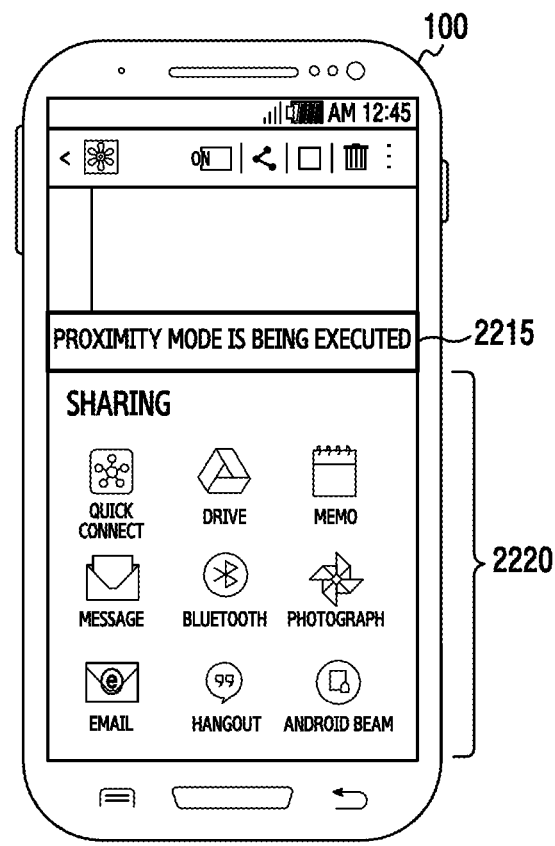
Figure 32C:
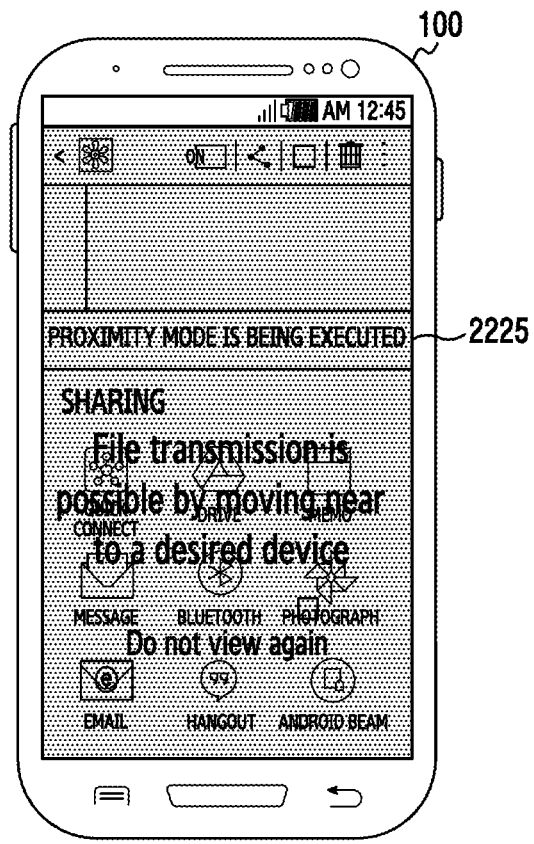

In an embodiment, the notification message may be displayed on a notification bar 2210 on a display of the first electronic device 100 (FIG. 32A). As a result, the user can understand an entry-or-not into the proximity mode. In an embodiment, the notification message may be displayed on a peripheral area 2215 of a sharing application list window 2220 of the first electronic device 100 (FIG. 32B). As a result, the user can recognize an entry-or-not into the proximity mode. In an embodiment, at the time of initial execution, an operation describing screen 2225 may be displayed (FIG. 32C). Then, the user can know the function of the proximity mode at the time of initial execution. When "Do not view again" is selected at the time of initial execution, the proximity mode operation may be performed without any notification thereafter.

A device scanning operation is performed together with the notification of the practicability of the proximity mode operation (or scanning operation) to the outside of the first electronic device 100. The scanning operation may be performed through all connection schemes which the first electronic device 100 has. In an embodiment, the scanning operation may be performed through one scheme among schemes of BLE, Bluetooth, Wi-Fi, and WiGig. In an embodiment, the scanning may be performed through a turn-on connection scheme, i.e., an activated connection scheme. In an embodiment, a connection scheme, which is turned off according to the sharing application configuration, that is, a deactivated connection scheme, may be activated.

In the scanning operation, the first electronic device 100 may transmit a scanning signal by including a reference threshold value, by which it is possible to identify the proximity-or-not, in the format of the scanning signal. In an embodiment, since RSSI values are different according to devices, the transmitted scanning signal may carry a reference threshold value for a distance, by which the proximity can be determined, or a predetermined distance (e.g., one meter) for each device. In an embodiment, it is possible to change and transfer the threshold value according to the service or contents.

When a target device is not scanned within a predetermined limit time, the first electronic device 100 interrupts the proximity mode operation. In an embodiment, the interruption of the proximity mode operation may be notified of through a UI, such as a notification bar or a notification message.

Referring to FIG. 31C, the second electronic device 200 is selected through physical interaction between the first electronic device 100 and the target device (e.g., TV) 200 in a state where the proximity mode is being executed. For example, when the user of the first electronic device 100 approaches the second electronic device 200 or the first electronic device 100 and the second electronic device 200 approach each other within a particular range in operation 2140, the second electronic device 200 is selected in operation 2145.

In an embodiment, the second electronic device 200 may be a previously configured device. For example, the second electronic device 200 may be previously configured according to a scheme of previous device registration, phone book registration, or previous connection history.

In an embodiment, the second electronic device 200 may be selected through identifying of a proximity value according to a result of the scanning. For example, the proximity value may be obtained as a result of identifying of a proximity value of the connection itself. As another example, the proximity value may be identified through comparison with a reference threshold value. The reference threshold value may be included in a signal transmitted to the first electronic device 100 from the second electronic device 200 according to the result of the scanning or may use a threshold value determined for each device.

The first electronic device 100 may recommend an exclusive device using one or more of the methods of selecting a target device as described above. The exclusive target device may be one target device or a plurality of target devices.

In an embodiment, in a 1:1 scenario, there are two target devices and the two target devices may be located within a particular range. In this instance, the first electronic device 100 may recommend one target device only when there is a difference over a predetermined range.

In an embodiment, the first electronic device 100 may check both the target device and the controller device and recommend a target device when both devices belong to a particular range.

Figure 33A:
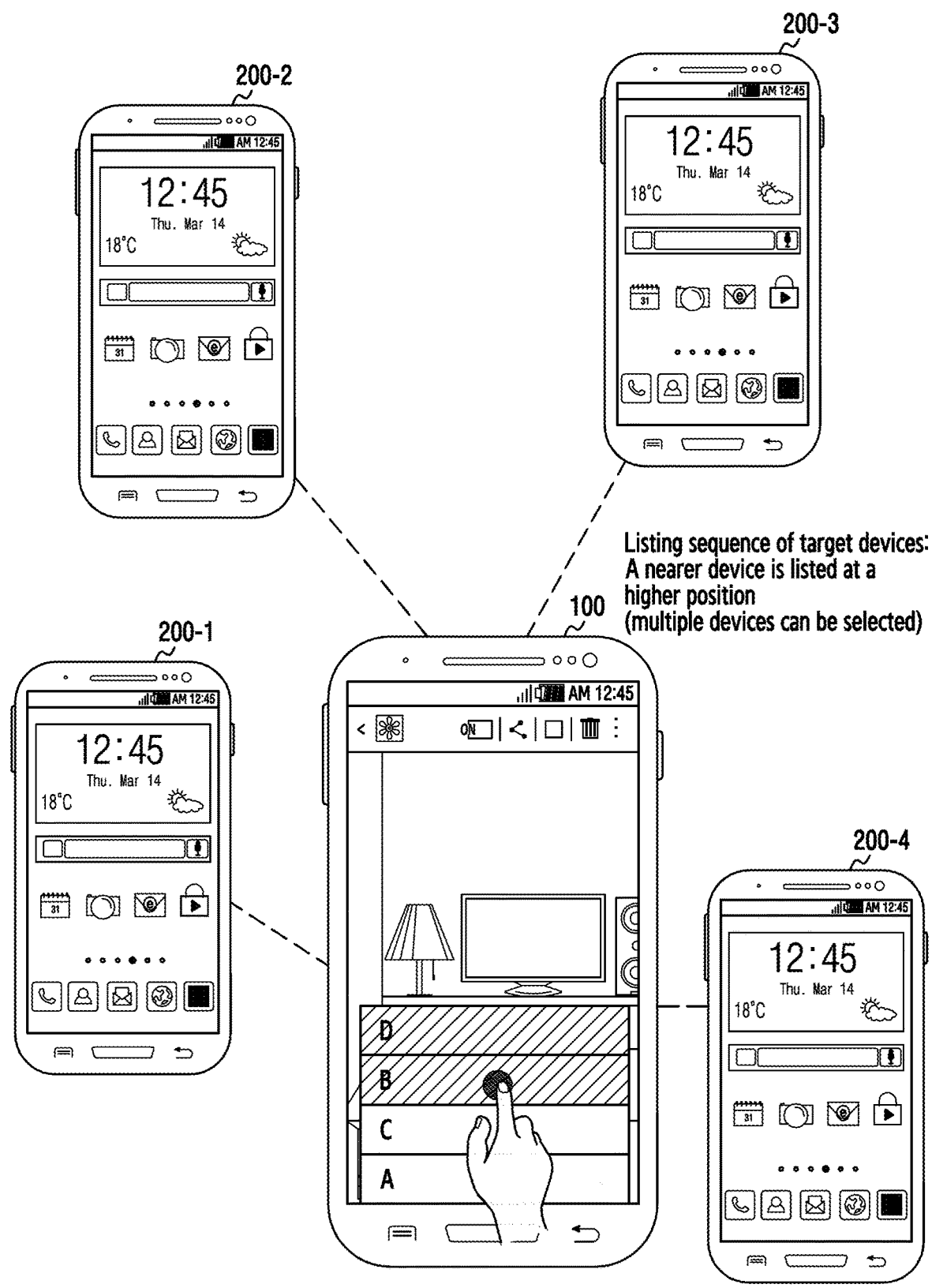
Figure 33B:
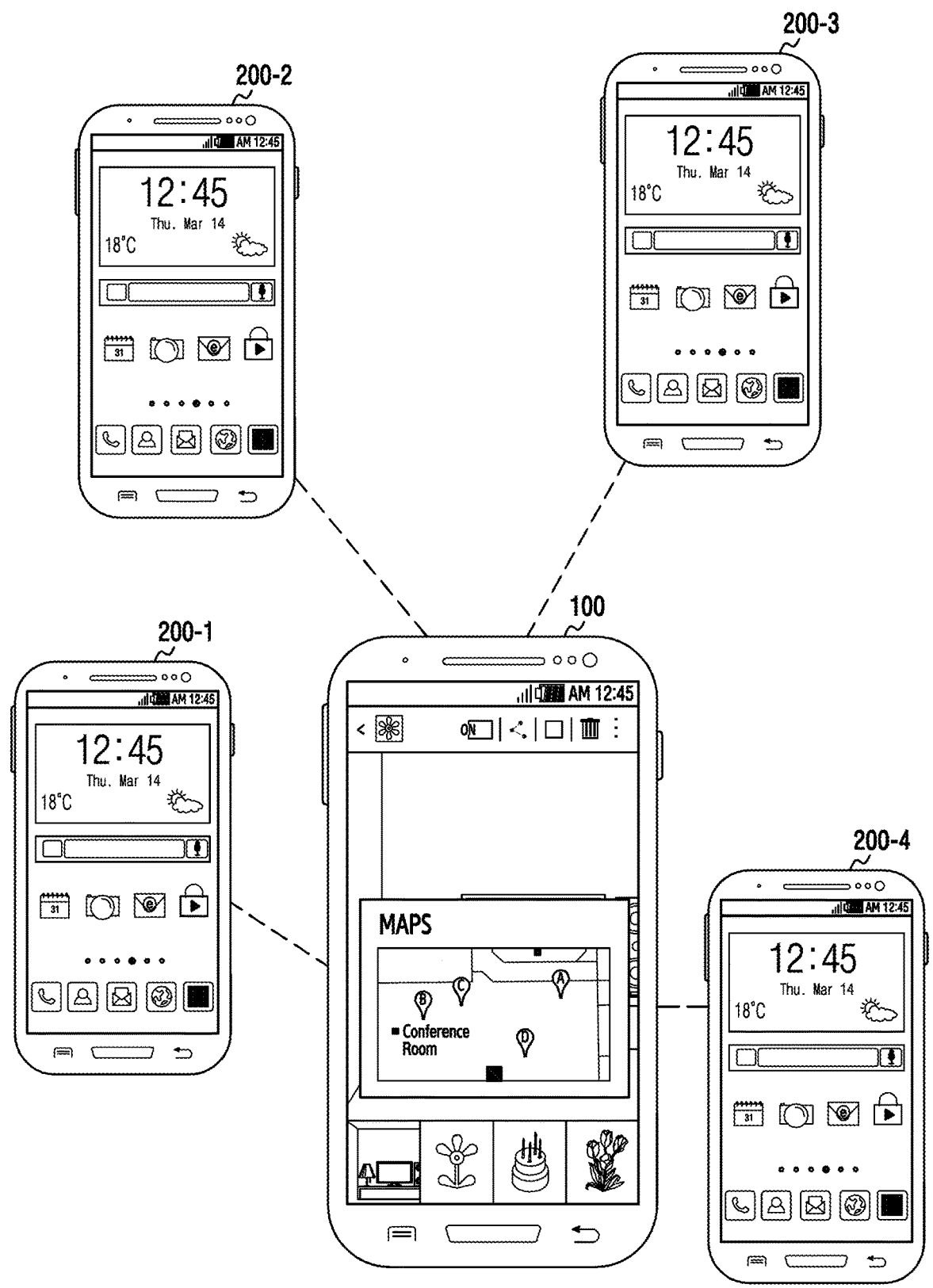
Figure 33C:
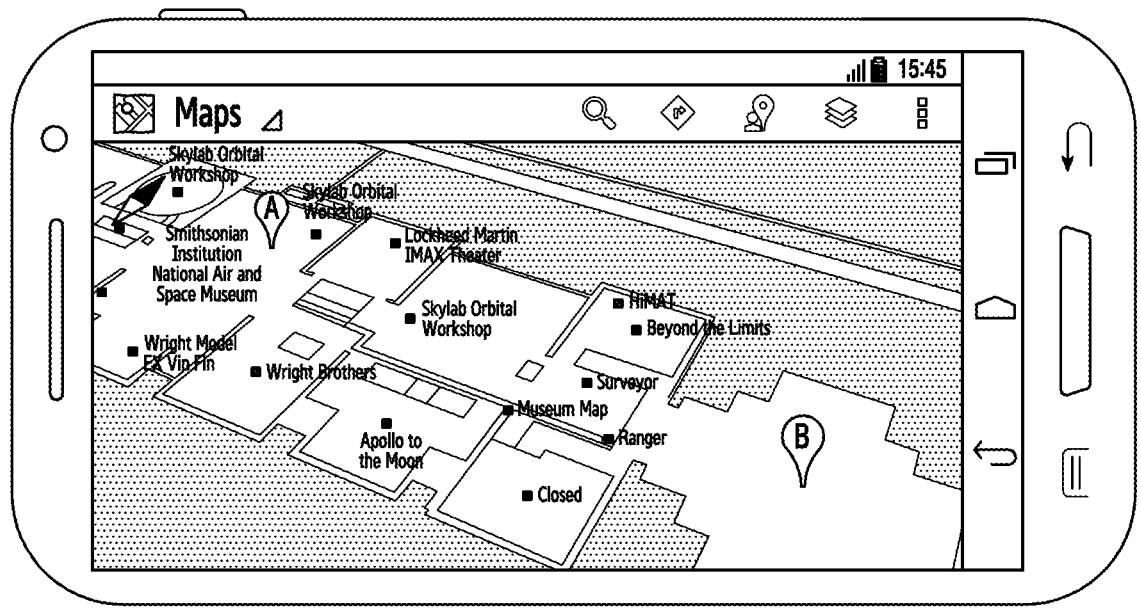

In an embodiment, when a plurality of target devices are discovered (i.e., in the case of 1:N), the first electronic device 100 may recommend another target device excluding target devices sharing the same service in response to an input of a service sharing intention. In this instance, the user may select a target device by approaching the target device. As another example, all target devices located within the same space (e.g., conference room, classroom, office, or museum) may be selected once. As another example, based on information on a plurality of externally displayed target devices, the controller device may select target devices with which the user wants to share a service (FIGS. 33A to 33C). The information on the plurality of discovered target devices may be displayed as visual information in the form of a list or map. The information on the plurality of discovered target devices may be displayed as auditory information.

As another example, when groups of target devices have been previously configured, the controller device may select a group of target devices.

Figure 34A:
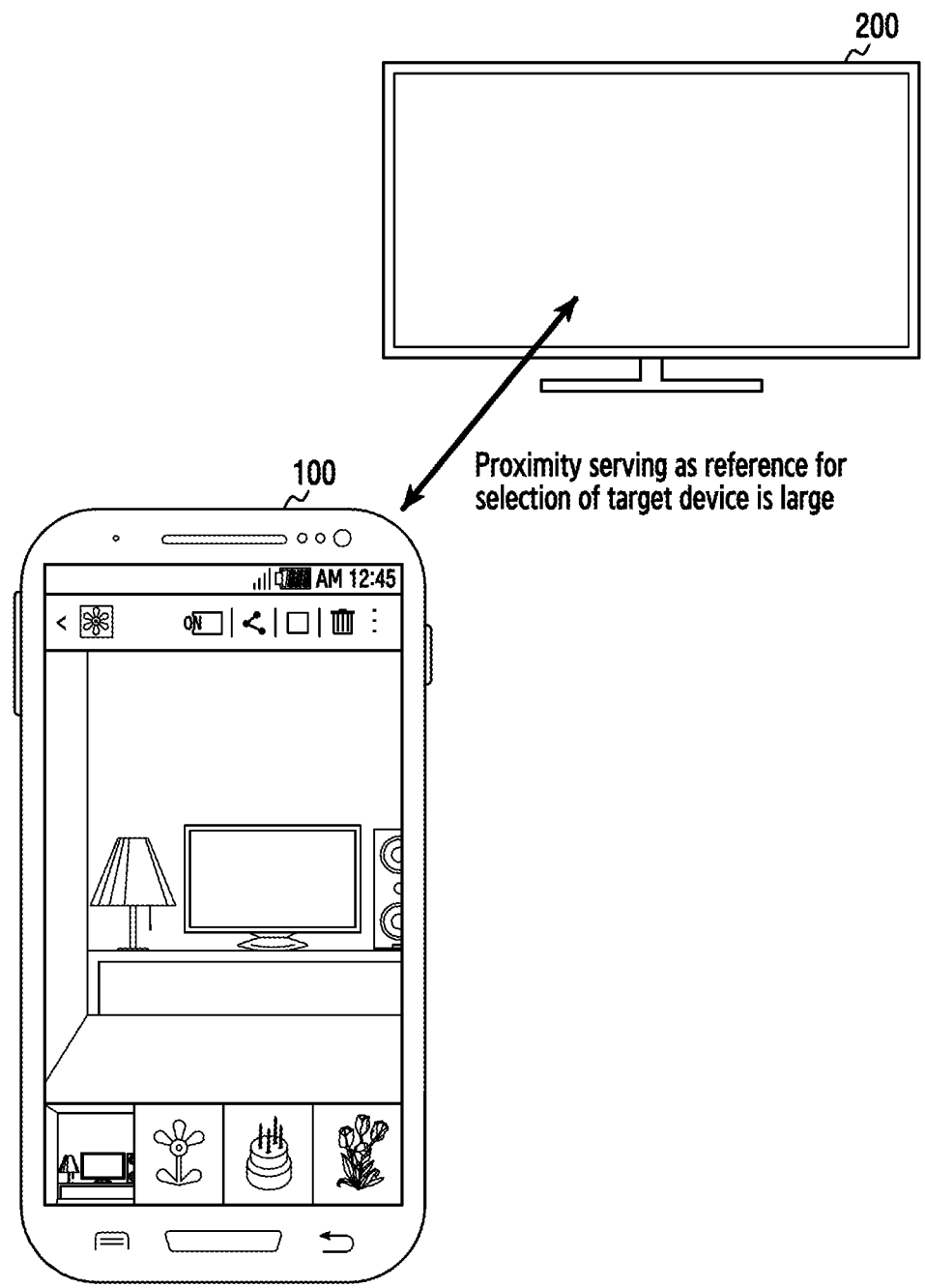
Figure 34B:
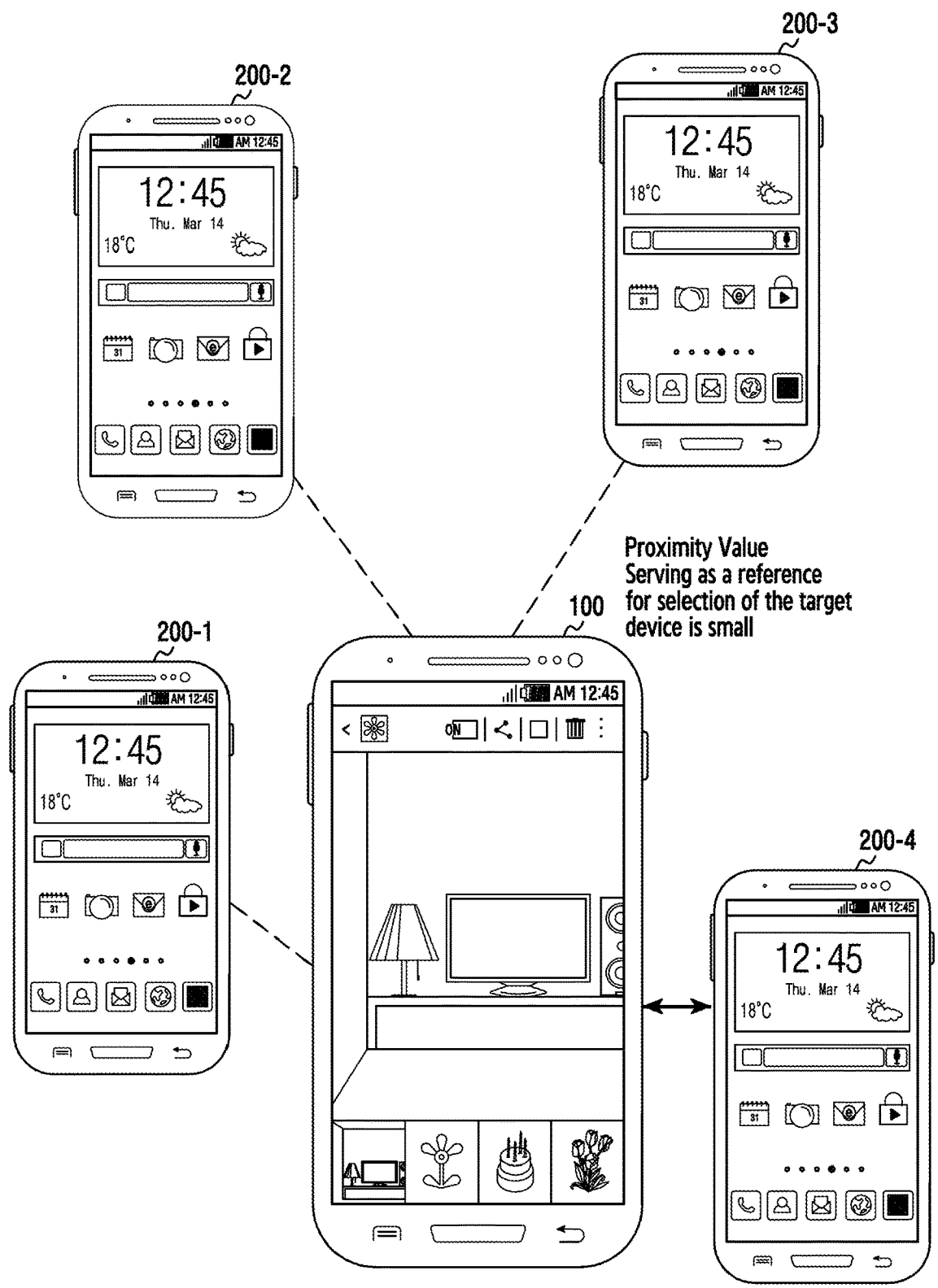

In an embodiment, the reference proximity value of each device may be changed through previous configuration (FIGS. 34A and 34B). For example, in a situation including a limited number of devices, for example, in a house, a target device may be selected from a remote place. As another example, in a situation having many competing devices within a narrow range, the controller device may select a target device only at a very close distance. As yet another example, a combination of a BLE signal and a sound signal may be used for precise proximity measurement.

In an embodiment, when the user does not select a target device for a predetermined time or longer, the selecting operation is terminated. In this instance, even when a recommended device has been displayed, this display is removed from the screen of the first electronic device 100 and the recommended device is exempt from the notification state.

FIGS. 33A to 33C illustrate examples of externally displaying target devices discovered according to various embodiments of the present disclosure, as visual information recognizable by a user.

In an embodiment, information of all discovered target devices may be displayed. In an embodiment, only a part of the discovered target devices may be displayed.

In an embodiment, information on the discovered target devices may be displayed in the form of a list (FIG. 33A).

In an embodiment, information on the discovered target devices may be displayed in the form of a map (FIG. 33B or 33C). From the display information relating to the target devices according to a result of the scanning, the user may select at least one target device for service sharing. Although information on the discovered target devices is externally displayed as visual information in the example described below, it should be noted that the information may be externally displayed as auditory information.

Referring to FIG. 33A, information on a plurality of second electronic devices 200-1 to 200-4 is displayed on a display of the first electronic device 100 in the form of a list. In an embodiment, according to a listing sequence, a target device nearer to the first electronic device 100 may be listed at a higher position on the display. For example, the target devices are close to the first electronic device 100 in the sequence of the second electronic device 200-4 (D)→the second electronic device 200-1 (B)→the second electronic device 200-2 (C)→the second electronic device 200-3 (A). From this list, the user may select the second electronic device 200-4 (D) and the second electronic device 200-1 (B).

Referring to FIG. 33B, information on the controller device as an initiator and a plurality of target devices A to D as responders is displayed on a display of the controller device in the form of a map. Since a result of the scanning enables estimation of the location and direction of the target devices, the information on the target devices can be displayed in the form of a map, based on the estimated location and direction. In this example, information on target devices A to D located in the proximity (e.g., conference room) is displayed. From the information on the displayed target devices, the user may select target devices (e.g., D and B) for service sharing.

Referring to FIG. 33C, information on the controller device A as an initiator and a target device B as a responder is displayed on a display of the controller device in the form of a map. Since a result of the scanning enables estimation of the location and direction of the target device B, the information on the target device B can be displayed in the form of a map, based on the estimated location and direction. In this example, information on the target devices A and B located within a predetermined distance (e.g., in a museum) is displayed.

Referring to FIGS. 34A and 34B, the value of the proximity changes according to the environment of the device. For example, in an environment including a small number of competing devices, the proximity value serving as a reference for selection of the second electronic device 200 may be configured to be large (FIG. 34A). In this instance, the second electronic device 200 may be selected even when the distance between the first electronic device 100 and the second electronic device 200 is far. As another example, in an environment including many competing devices, the proximity value serving as a reference for selection of the second electronic device 200 may be configured to be small (FIG. 34B). In this instance, the second electronic device 200-4 may be selected only when the distance between the first electronic device 100 and the second electronic device 200-4 is very near.

Referring to FIG. 31D, when the proximity determination is completed in operation 2150, a device connection notification operation, a connection information notification operation, and a connection selection operation are performed. In operation 2160, a user may accept the sharing service with the first electronic device 100.

In the connection information notification operation, various pieces of information may be externally displayed visually or audibly. In an embodiment, in the connection information notification operation, information on the selected target device may be externally displayed through a UI, such as a notification pop-up, LED, or vibration. In an embodiment, in the connection information notification operation, information on the connection between the controller device and the target device may be externally displayed through a UI, such as a connection image or a notification pop-up.

In an embodiment, in the connection information notification operation, information on an object to be connected, and information on a selected service may be displayed. For example, the information on the object to be connected may include information, such as a photograph or name. If there is no information on the object to be connected, it may be replaced by information on a counterpart device. For example, the connection service information may include information relating to a title of music or the volume of a photograph or image. This connection service information may be differently provided according to the connected service or device. For example, a title of music may be important in a music file, while the volume is important in a photograph or image.

Referring to FIG. 41E, in operation 2170, the connection information notification operation may be omitted in the case of user configuration or automatic acceptance/denial.

Referring to FIG. 31D, a connection scheme for service sharing may be selected in consideration of the service attribute and capability.

In an embodiment, in the case of requiring a wide bandwidth, like a video, the Wi-Fi direct may be selected while the Bluetooth is selected for the sound source. In an embodiment, the connection scheme may be selected according to the distance. In this instance, different services may be provided according to the sections. In an embodiment, a scheme of using a communication network by transferring a server address may be used as well as the device to device (D2D) communication scheme. In an embodiment, even a deactivated connection scheme may be activated and used according to the situation or environment.

Figure 35A:
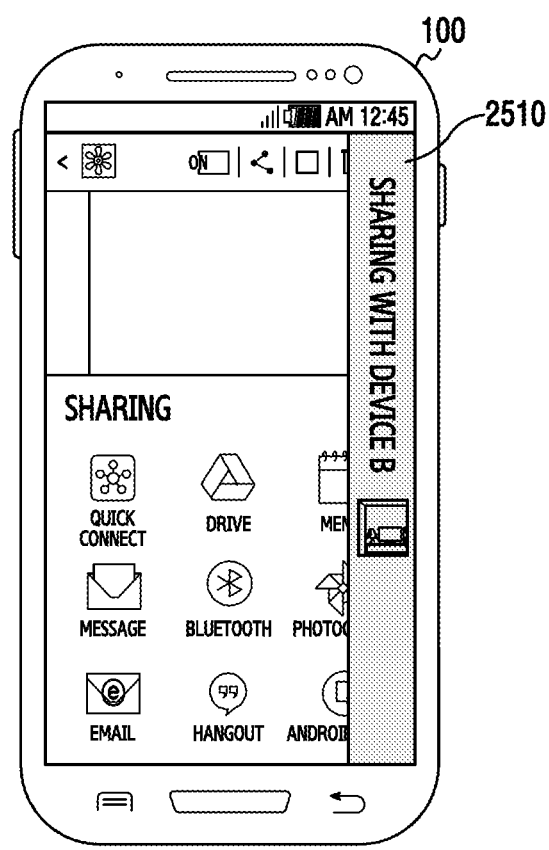
Figure 35B:
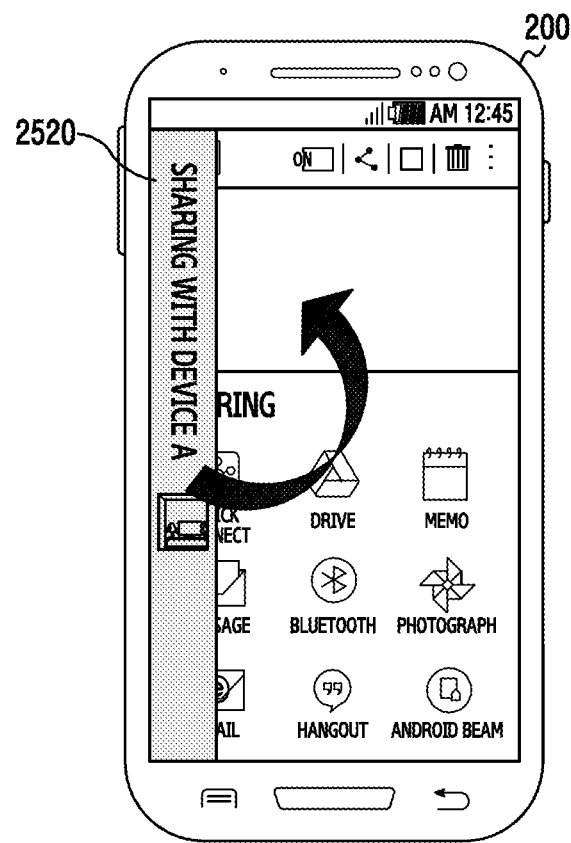
Figure 35C:
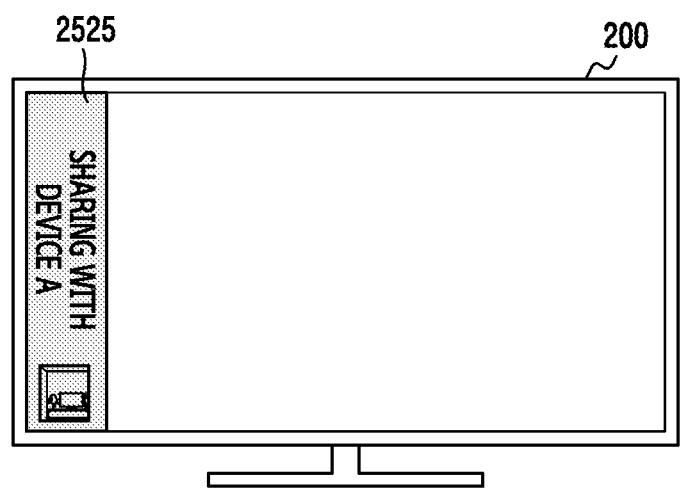

FIGS. 35A to 35C illustrate examples of a UI for notification of connection information. Through information notification, the user can know the sharing of a service.

In an embodiment, the connection information notification may be displayed through a pop-up window.

In an embodiment, the connection information notification may be displayed through generation of a sharing space (FIGS. 35A to 35C). A file expressed by an icon or a reduced document image 2510, 2520, or 2525 may be added.

Figure 36A:
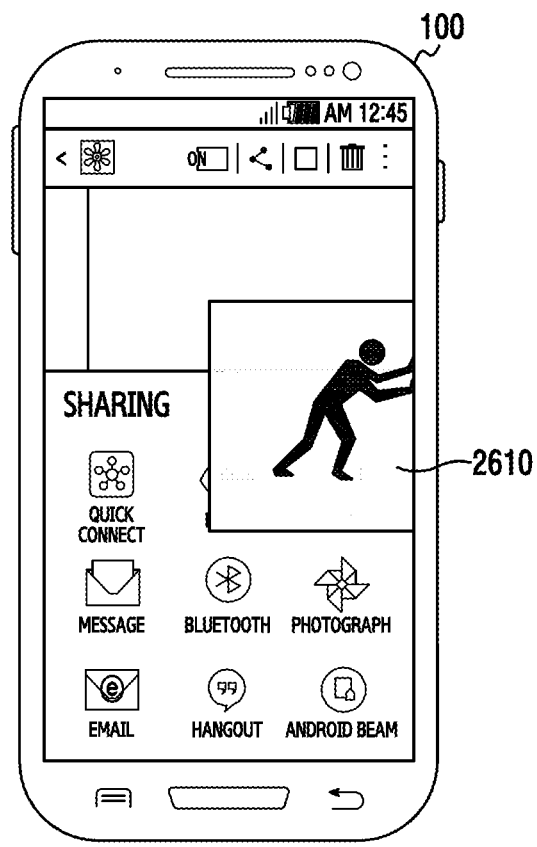
Figure 36B:
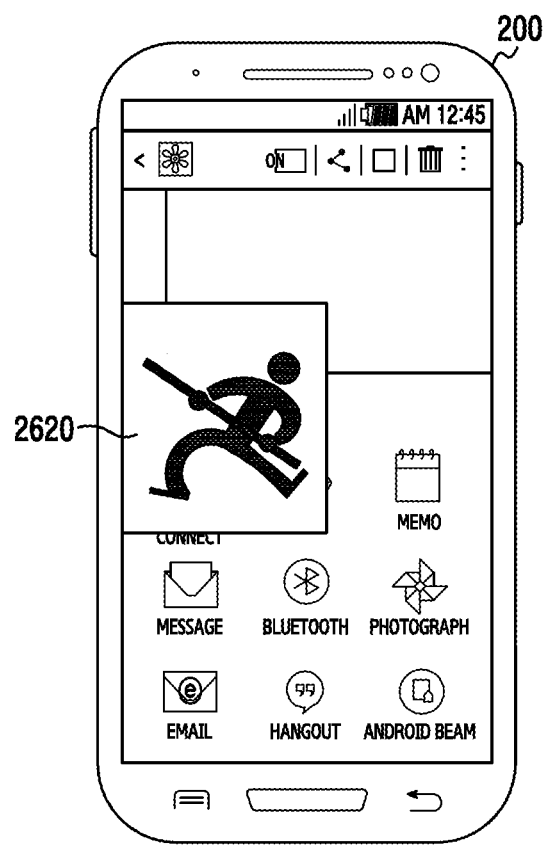
Figure 36C:
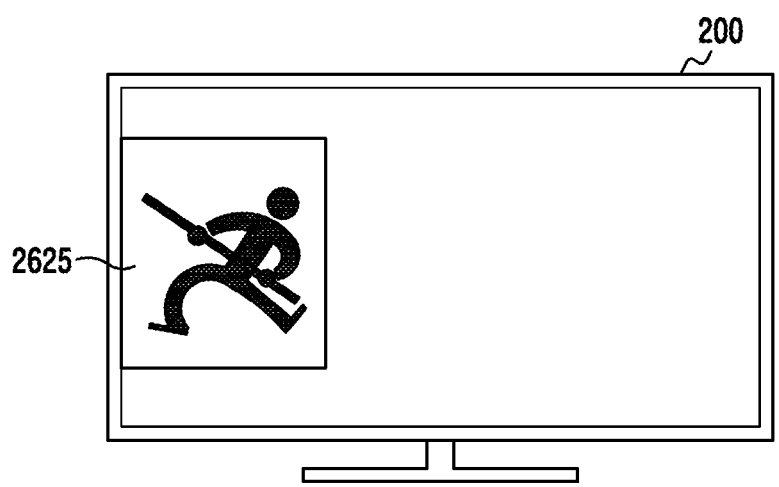

In an embodiment, the connection information notification may be displayed using a connection image (FIGS. 36A to 36C). For example, the connection image includes images 2620 and 2625 of pulling and an image 2610 of pushing.

In an embodiment, the connection information notification may be performed using an LED, vibration, a notification sound, or a voice guidance.

Referring to FIG. 31D again, a UI for selection of acceptance/denial is displayed in a target device in order to process acceptance/denial of service sharing. The displaying of such a UI may be omitted by automatic acceptance or user configuration.

The service sharing configuration of the target device includes automatic configuration and previous user configuration. In an embodiment, a device (e.g., speaker) having no display may be configured as automatic acceptance.

In an embodiment, acceptance/denial may be configured for each device by previous user configuration. For example, when a selected device is finally determined, the selected device is automatically connected if the selected device has been already registered in the controller device. Devices already registered in the controller device include a device having been shared with at least once, a device set by a user as a user's device, and a device located in a user's space (e.g., home or office). As another example, a device may be automatically denied using a black list. As another example, the acceptance or denial may be configured to be always checked.

Figure 37A:
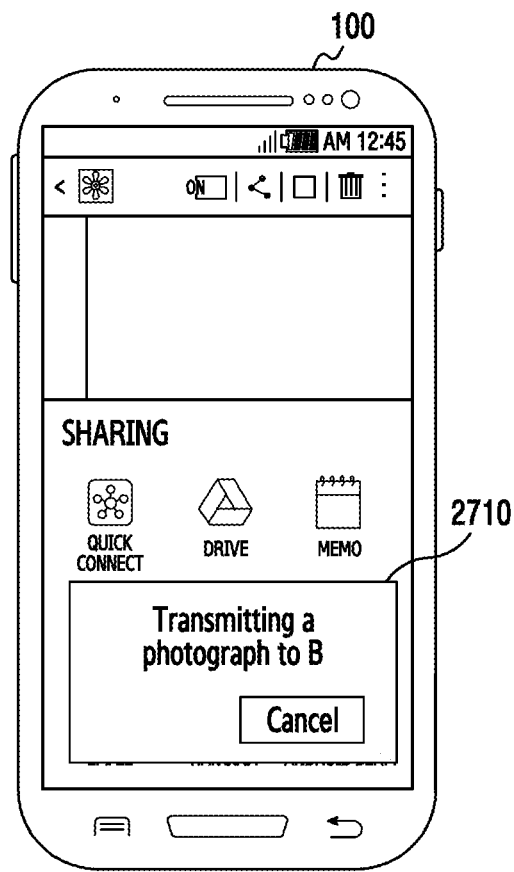
Figure 37B:
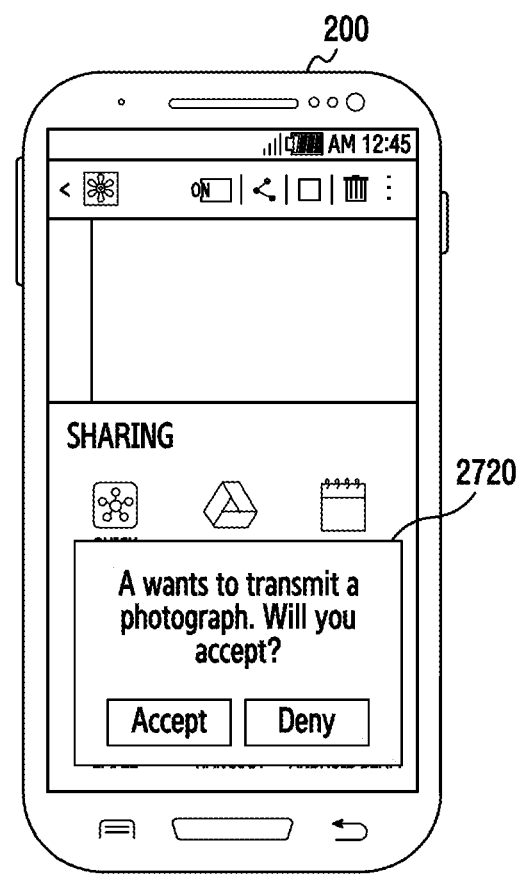
Figure 37C:
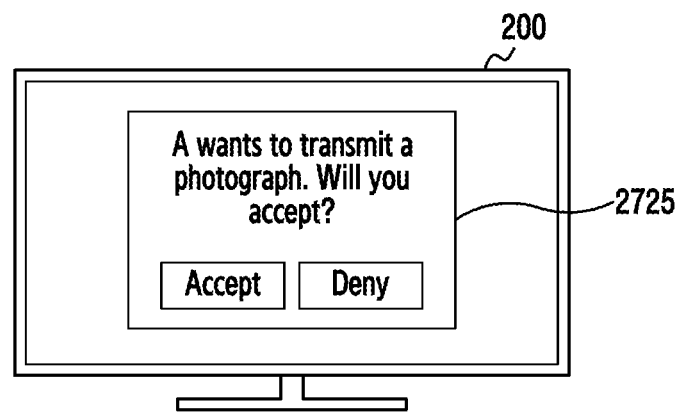

FIGS. 37A to 37C illustrate examples of displaying a UI for selecting service sharing acceptance/denial. In these examples, a UI for selecting service sharing acceptance/denial is displayed using pop-up windows 2710, 2720, and 2725. In an embodiment, the service sharing acceptance/denial may be performed using a button installed outside of a target device. In an embodiment, the service sharing acceptance/denial may be performed using an LED, sound, vibration, or a voice recognition.

Referring to FIGS. 31D and 32E, when service sharing is accepted by a target device, the service is shared in response to the acceptance. A connection scheme selected when the sharing is accepted is activated, and the first electronic device 100 and the second electronic device 200 are connected by the activated connection scheme. In an embodiment, when the selected connection scheme is in a deactivated state, the scheme may be activated.

Next, the service selected by the first electronic device 100 is transmitted to the second electronic device 200. In an embodiment, when the connection scheme used for transmission of the service is different from the connection scheme used for device scanning, the device scanning may be started again after the transmission is started. In this event, the time period for device scanning is configured again. This operation may be used in the case of 1:M device scanning. For example, when a Wi-Fi module is used for transmission after device scanning using a BLE module, the BLE module enters again into a device scanning mode once the transmission operation is started. That is, the BLE module re-starts the proximity mode operation.

As the service selected by the first electronic device 100 is transmitted to the second electronic device 200, the first electronic device 100 and the second electronic device 200 share a service. For example, a photograph selected by the first electronic device 100 may be transferred to the TV 200, which is the target device, to be displayed on a screen of the TV 200.

In relation to a result of the service sharing, a UI may be implemented in the second electronic device 200. The UI implemented in relation to the result of the service sharing includes a UI implemented when the service sharing is accepted, a UI implemented when the service sharing is denied, and a UI implemented when the service sharing is completed.

In an embodiment, when the service sharing is accepted, the result of the service sharing may be provided through a visual UI or an auditory UI. For example, the transmission state may be identified using a state progress bar. As another example, the transmission state may be identified using an image indicating a connected state or an in-transmission state. As another example, the transmission state may be identified using a flickering LED, sound, or vibration. As another example, the transmission may be notified of through a voice.

In an embodiment, when the service sharing is denied, the result of denial of the service sharing may be provided through a visual UI or an auditory UI. For example, the window notifying of the proximity, such as a pop-up/notification window, may disappear. As another example, the counterpart's intention of denial may be expressed on a notification bar. As another example, the counterpart's intention of denial may be expressed through a pop-up window. As another example, the counterpart's intention of denial may be expressed through voice. As another example, the counterpart's intention of denial may be expressed through LED, sound, or vibration.

In an embodiment, when the service sharing is completed, a UI for notifying the user of the result of the service sharing may be provided. For example, success or failure of the service sharing and shared contents may be provided through the UI. A UI, such as notification bar, a top notification list, or a pop-up window, may be used.

The shared service may be automatically executed or may be executed according to a previous user setting in the target device. In contrast, only the fact of sharing may be notified of without execution of the shared service.

Figure 38:
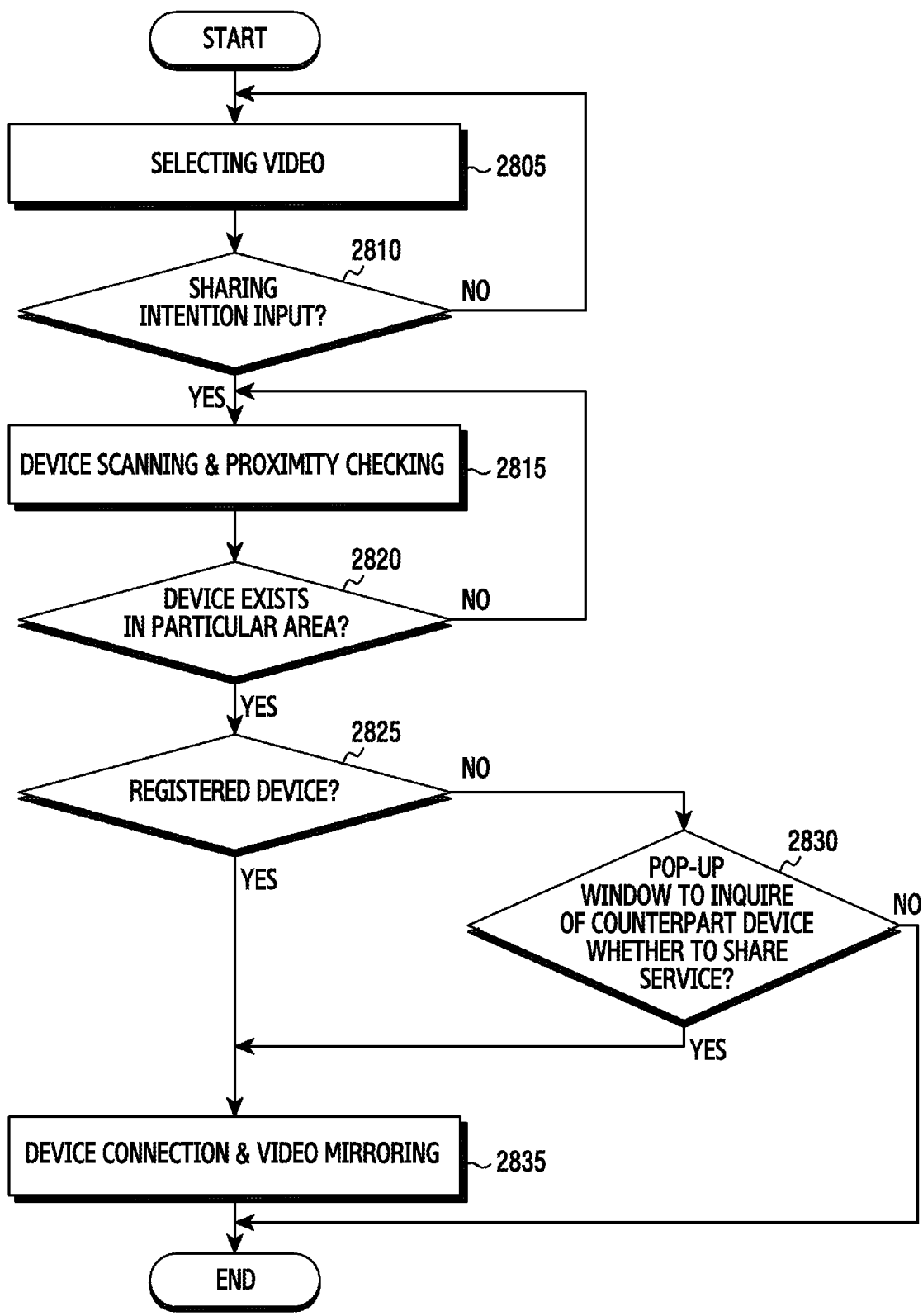
FIG. 38 illustrates a processing flow in a first electronic device when a video is shared by a service sharing operation according to various embodiments of the present disclosure.

FIG. 38 illustrates a processing flow performed by a first electronic device as a controller device when a video is shared by a service sharing operation according to various embodiments of the present disclosure.

This processing flow may be performed by the first electronic device 100 illustrated in FIG. 1A. However, this flow is just an example and may be modified within the scope of the present disclosure.

Referring to FIG. 38, in operation 2805, the controller device selects a video for service sharing selected by a user. In operation 2810, the controller device determines whether a sharing intention (e.g., particular icon, button, or voice recognition) is input from a user. When a sharing intention is input from the user, the controller device scans for a target device and checks the proximity thereof in operation 2815. In operation 2820, the controller device determines whether a target device exists in a particular area, based on a result of the scanning. When the result of the scanning shows that a target device exists in the particular area, the controller device determines in operation 2825 whether the discovered target device is a registered device. When it is determined that the discovered target device is not a registered device, the controller device provides a pop-up window to inquire of a counterpart device whether to share the service, in operation 2830. When the counterpart device accepts the service sharing through the pop-up window, the controller device connects to the target device and mirrors a video in operation 2835. In contrast, when the counterpart device denies the service sharing through the pop-up window, the controller device terminates its operation.

Figure 39:
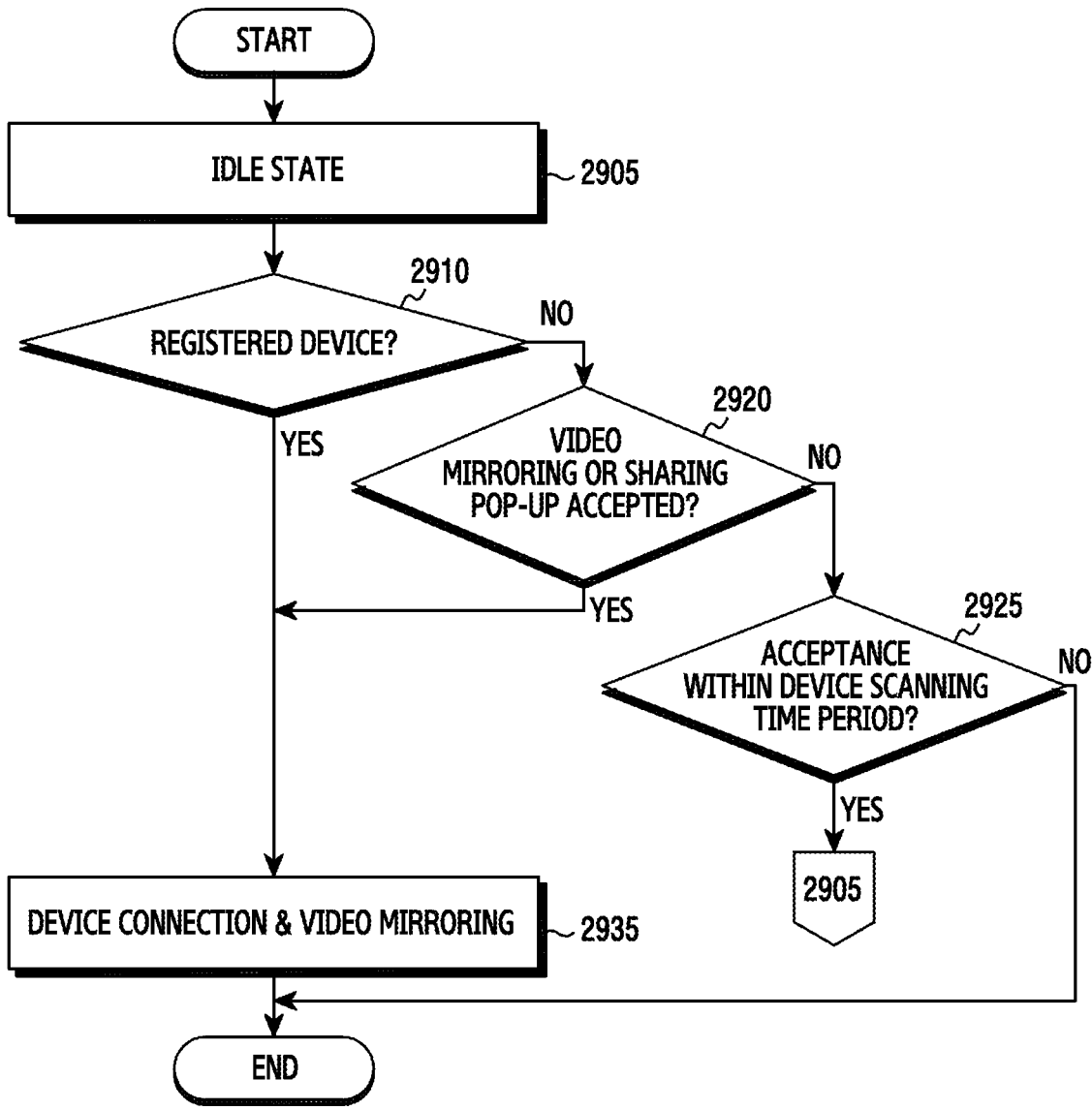
FIG. 39 illustrates a processing flow in a second electronic device when a video is shared by a service sharing operation according to various embodiments of the present disclosure.

FIG. 39 illustrates a processing flow performed by a second electronic device as a target device when a video is shared by a service sharing operation according to various embodiments of the present disclosure.

This processing flow may be performed by the second electronic device 200 illustrated in FIG. 1A. However, this flow is just an example and may be modified within the scope of the present disclosure.

Referring to FIG. 39, in operation 2905, the target device is in an idle state. In operation 2910, the target device determines whether the target device is a registered device. When it is determined that the target device is a registered device, the target device connects to the controller device and receives the video mirrored by the controller device in operation 2935. When it is determined that the discovered target device is not a registered device, the target device determines whether video mirroring or sharing pop-up is accepted, in operation 2920. When it is determined that video mirroring or sharing pop-up is accepted, the target device proceeds to operation 2935. When it is determined that video mirroring or sharing pop-up is not accepted, the target device proceeds to operation 2925. In operation 2925, the target device determines whether video mirroring or sharing pop-up has been accepted within a device scanning time period. When it is determined that video mirroring or sharing pop-up has been accepted within the device scanning time period, the target device proceeds to operation 2905. When it is determined that video mirroring or sharing pop-up has not been accepted until the device scanning time period expires, the target device terminates the process.

Figure 40:
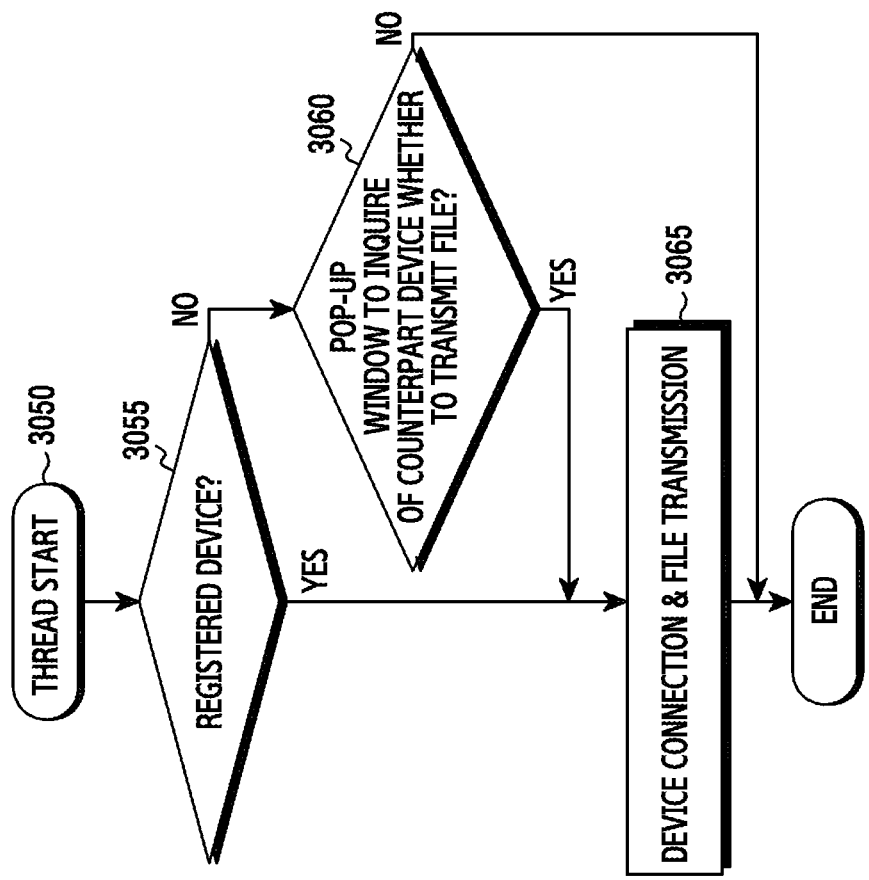
FIG. 40 illustrates a processing flow in a first electronic device when a file is shared by a service sharing operation according to various embodiments of the present disclosure.
Figure 40:
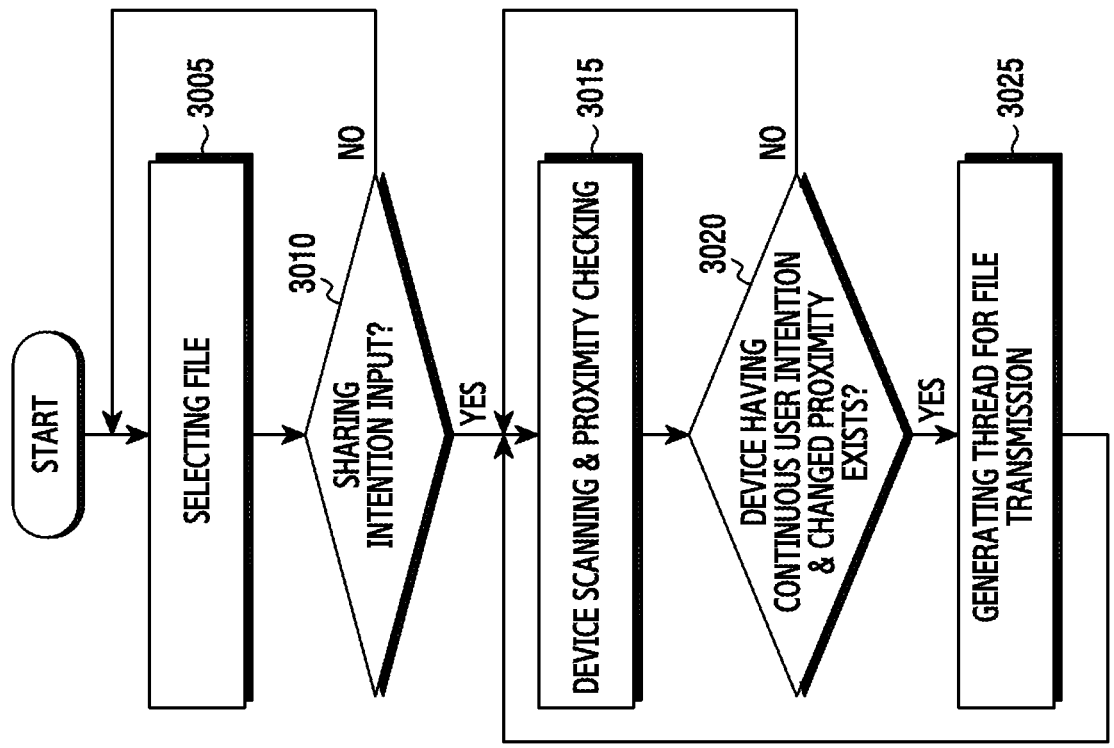

FIG. 40 illustrates a processing flow performed by a first electronic device as a controller device when a file is shared by a service sharing operation according to various embodiments of the present disclosure.

This processing flow may be performed by the first electronic device 100 illustrated in FIG. 1A. However, this flow is just an example and may be modified within the scope of the present disclosure.

Referring to FIG. 40, in operation 3005, the controller device selects a video for service sharing selected by a user. In operation 3010, the controller device determines whether a sharing intention (e.g., particular icon, button, or voice recognition) is input from a user. When a sharing intention is input from the user, the controller device scans for a target device and checks the proximity thereof in operation 3015. In operation 3020, the controller device determines whether a target device having a continuous user intention and having a changed proximity exists, based on a result of the scanning. When it is determined in operation 3020 that a corresponding target device does not exist, the controller device proceeds to operation 3015. When it is determined in operation 3020 that a corresponding target device exists, the controller device generates (spawns) a thread for file transmission in operation 3025.

In operation 3050, the controller device starts the thread. In operation 3055, the controller device determines whether the discovered target device is a registered device. When it is determined that the discovered target device is not a registered device, the controller device provides a pop-up window to inquire of a counterpart device whether to transmit a file, in operation 3060. When the counterpart device accepts the file transmission through the pop-up window, the controller device connects to the target device and transmits the file in operation 3065. In contrast, when the counterpart device denies the file transmission through the pop-up window, the controller device terminates its operation.

Figure 41:
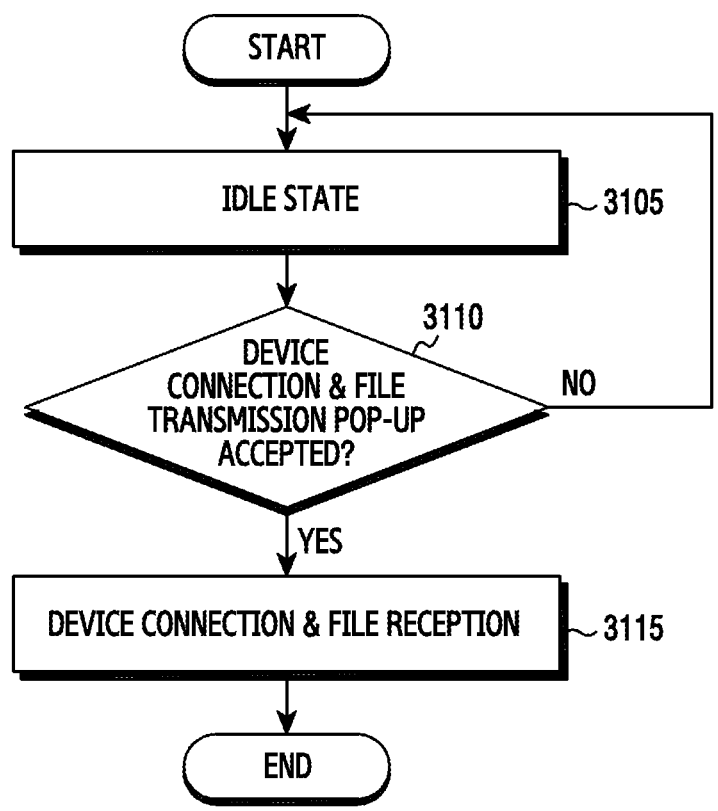
FIG. 41 illustrates a processing flow in a second electronic device when a file is shared by a service sharing operation according to various embodiments of the present disclosure.

FIG. 41 illustrates a processing flow performed by a second electronic device as a target device when a file is shared by a service sharing operation according to various embodiments of the present disclosure.

This processing flow may be performed by the second electronic device 200 illustrated in FIG. 1B. However, this flow is just an example and may be modified within the scope of the present disclosure.

Referring to FIG. 41, in operation 3105, the target device is in an idle state. In operation 3110, the target device determines whether the device connection and file transmission pop-up is accepted. When it is determined that the device connection and file transmission pop-up is accepted, the target device connects to the controller device and receives the file in operation 3115. When it is determined that the device connection and file transmission pop-up is not accepted, the target device returns to operation 3105.

FIGS. 42 to 51 illustrate examples of a service sharing operation performed between the first electronic device and the second electronic device according to various embodiments of the present disclosure.

The first electronic device 100 is a controller electronic device, which is used by a user and transmits a service to be shared. The second electronic device 200 is a target device, which is to be selected by a user and receives a service to be shared.

Figure 42:
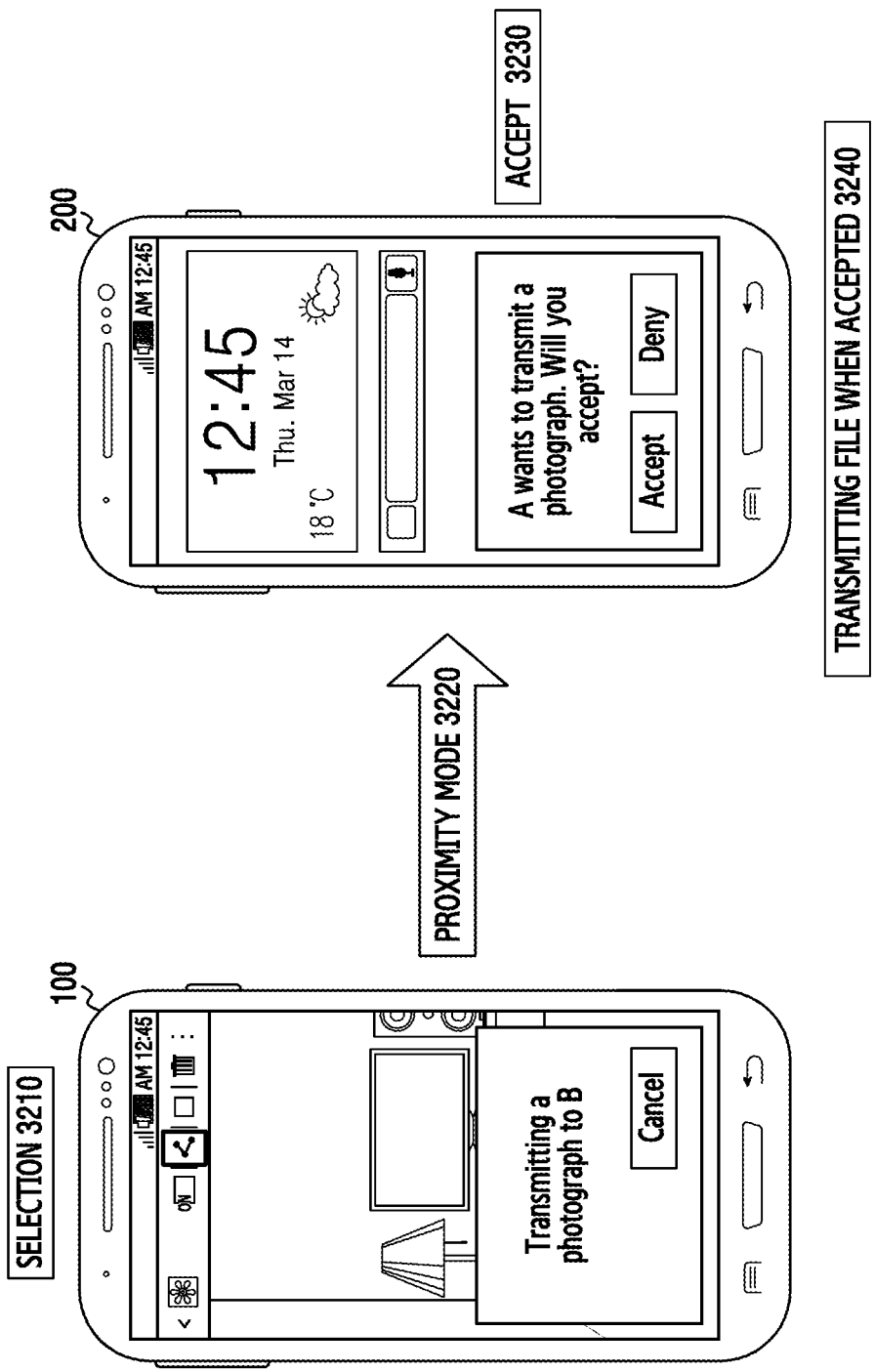
FIGS. 42 to 51 illustrate examples of a service sharing operation performed between the first electronic device and the second electronic device according to various embodiments of the present disclosure.

Referring to FIG. 42, both the first electronic device 100 and the second electronic device 200 are smart phones. A user selects a file to be transmitted in the first electronic device 100 in operation 3210. The user selects an icon for sharing in the first electronic device 100 and approaches the second electronic device 200 in operation 3220. If the selected second electronic device 200 and the first electronic device 100 store mutual information (e.g., phone number), the second electronic device 200 is registered in the list of the first electronic device 100. In contrast, if they do not store mutual information, a service sharing acceptance message is popped up in the second electronic device 200. Then, when the service sharing is accepted in operation 3230, the first electronic device 100 transmits a file to the second electronic device 200 in operation 3240.

Figure 43:
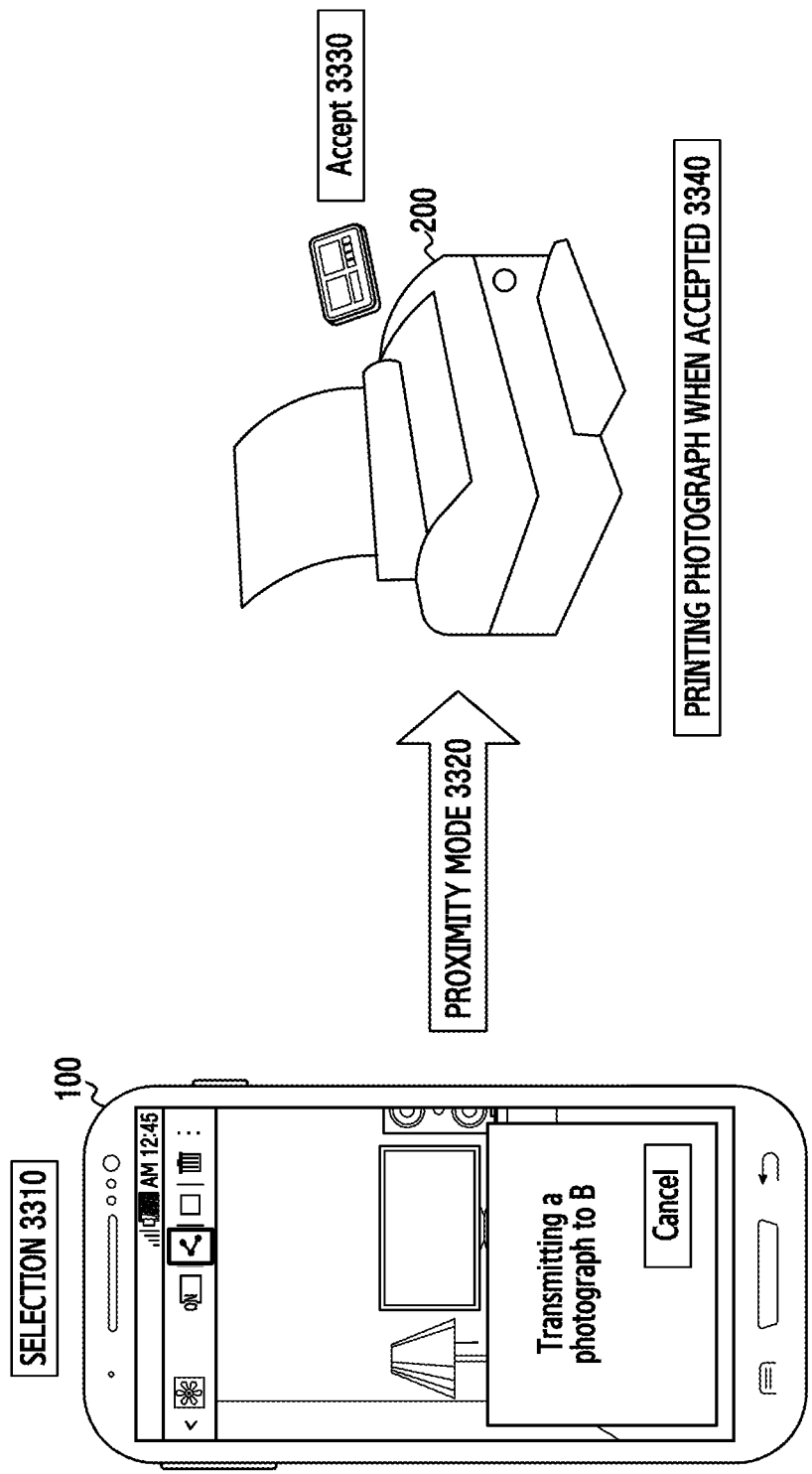

Referring to FIG. 43, the first electronic device 100 is a smart phone and the second electronic device 200 is a printer. A user selects a photograph to be printed in the first electronic device 100 in operation 3310. The user selects an icon for sharing in the first electronic device 100 and approaches the second electronic device 200 in operation 3320. According to the pop-up of the service sharing acceptance message, it may be inquired whether the service is to be shared. When the second electronic device 200 does not have a display, the service sharing may be automatically accepted. When the service sharing is accepted in operation 3330, the first electronic device 100 transmits a photograph to the second electronic device 200, and the second electronic device 200 prints the received photograph in operation 3340.

Figure 44:
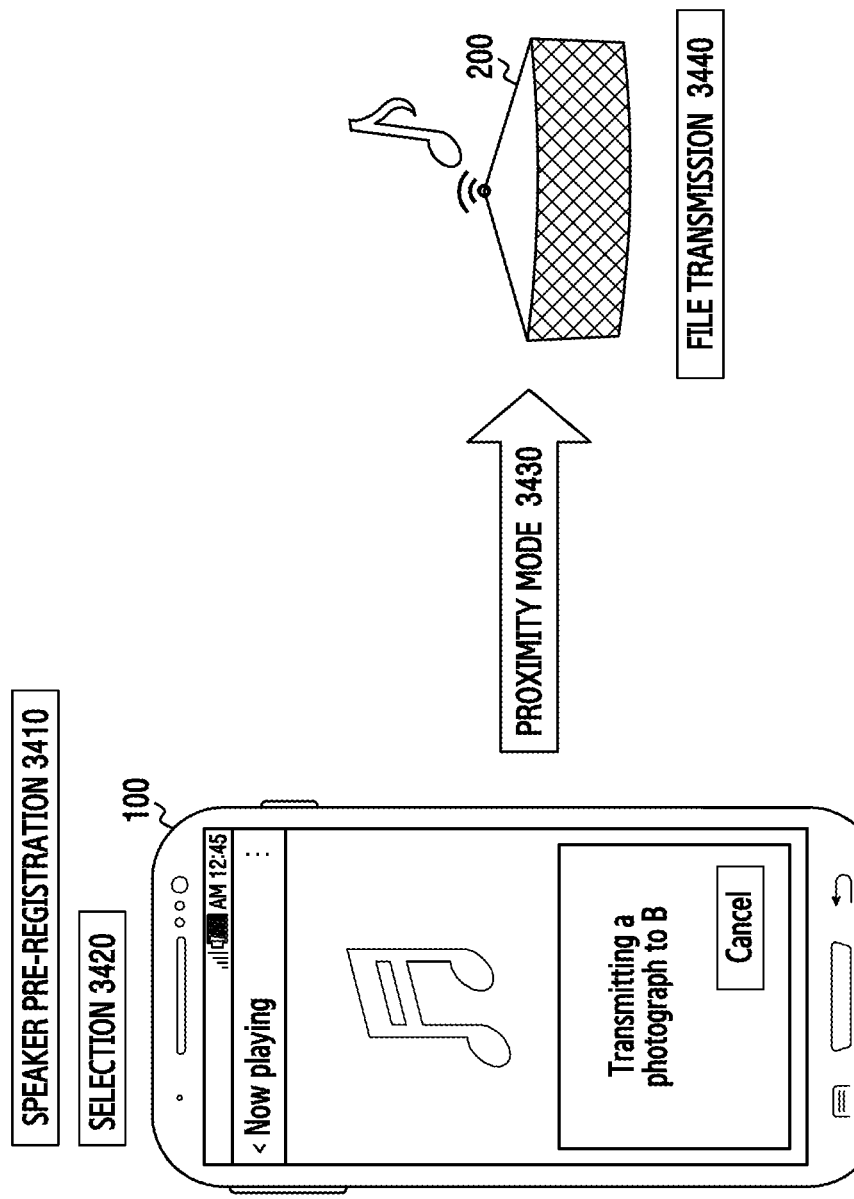

Referring to FIG. 44, the first electronic device 100 is a smart phone and the second electronic device 200 is a speaker. A user previously registers a desired second electronic device 200 in the first electronic device 100 in operation 3410. The user selects a file to be transmitted in the first electronic device 100 in operation 3420. The user selects an icon for sharing in the first electronic device 100 and approaches the second electronic device 200 in operation 3430. When it is identified that the selected second electronic device 200 has been previously registered, a file transmission guidance message is output. The first electronic device 100 transmits a file to the second electronic device 200 in operation 3440.

Figure 45:
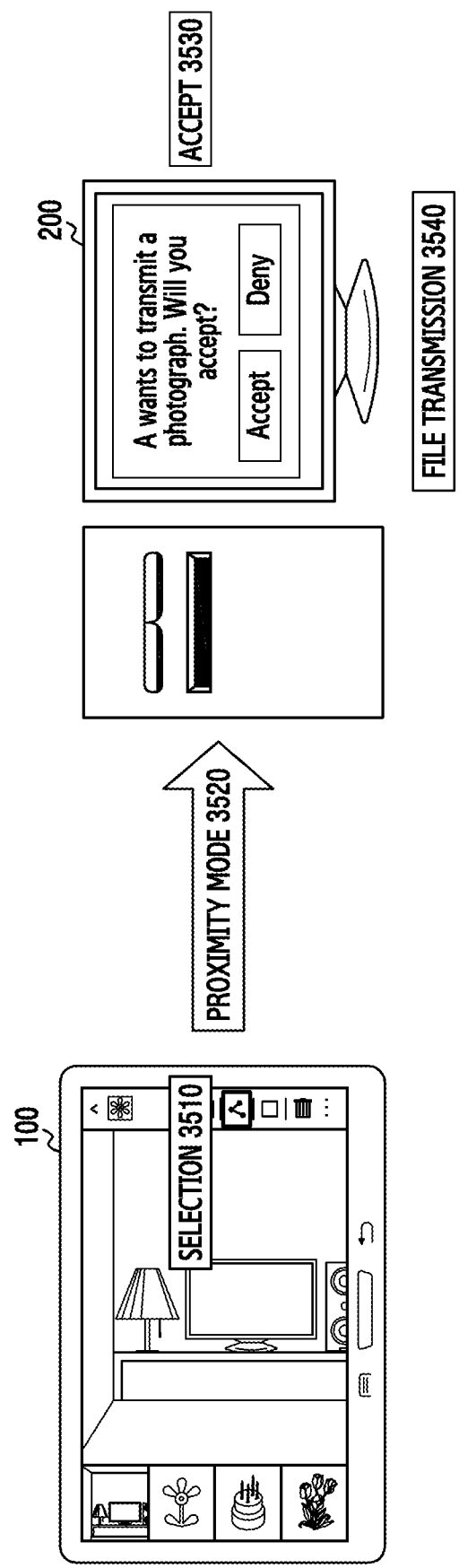

Referring to FIG. 45, the first electronic device 100 is a smart phone and the second electronic device 200 is a computer. The user selects a file to be transmitted in the first electronic device 100 in operation 3510. The user selects an icon for sharing in the first electronic device 100 and approaches the second electronic device 200 in operation 3520. If the selected second electronic device 200 and the first electronic device 100 store mutual information, the second electronic device 200 is registered in the list of the first electronic device 100. In contrast, if they do not store mutual information, a service sharing acceptance message is popped up in the second electronic device 200. Then, when the service sharing is accepted in operation 3530, the first electronic device 100 transmits a file to the second electronic device 200 in operation 3540.

Figure 46:
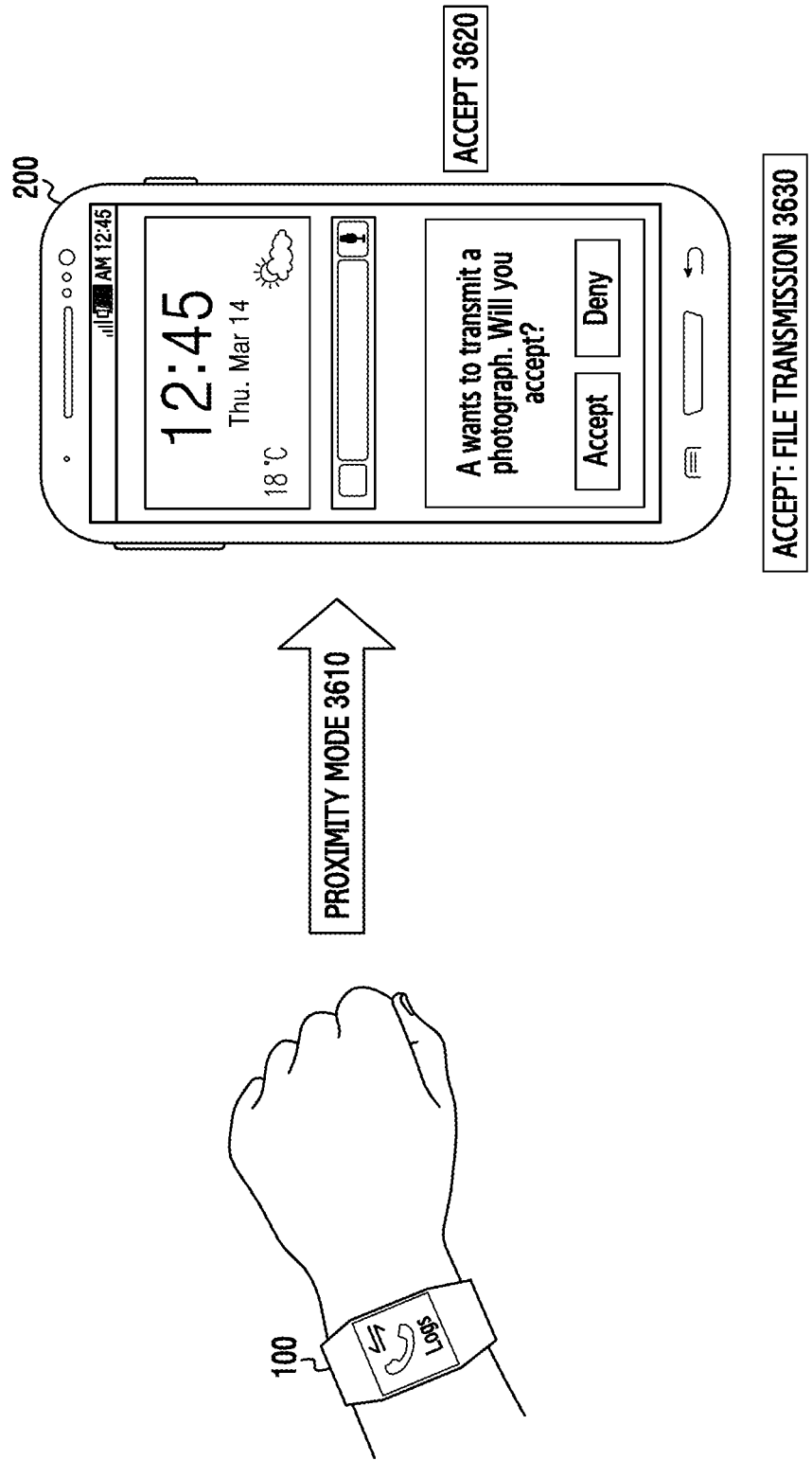

Referring to FIG. 46, the first electronic device 100 is a smart watch and the second electronic device 200 is a smart phone. The user selects a contact number to be transmitted in the first electronic device 100. The user selects an icon for sharing in the first electronic device 100 and approaches the second electronic device 200 in operation 3610. If the selected second electronic device 200 and the first electronic device 100 store mutual information, the second electronic device 200 is registered in the list of the first electronic device 100. In contrast, if they do not store mutual information, a service sharing acceptance message is popped up in the second electronic device 200. Then, when the service sharing is accepted in operation 3620, the first electronic device 100 transmits a contact number to the second electronic device 200 in operation 3630.

Figure 47:
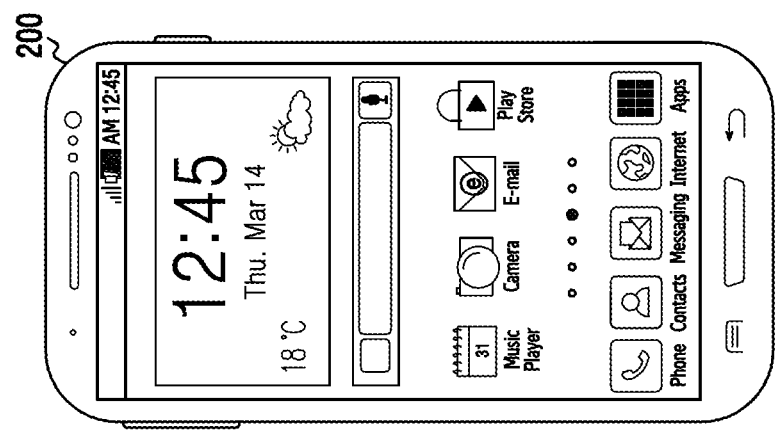
Figure 47:
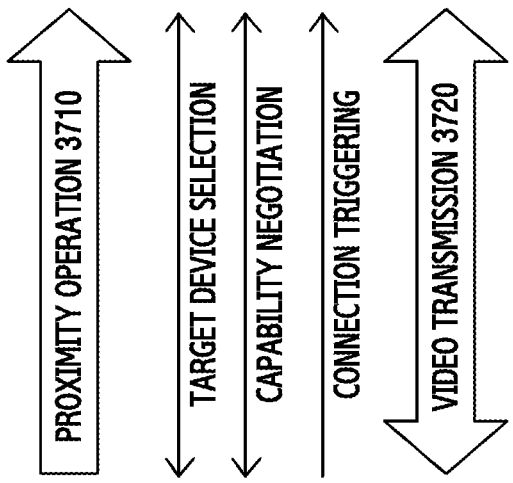
Figure 47:
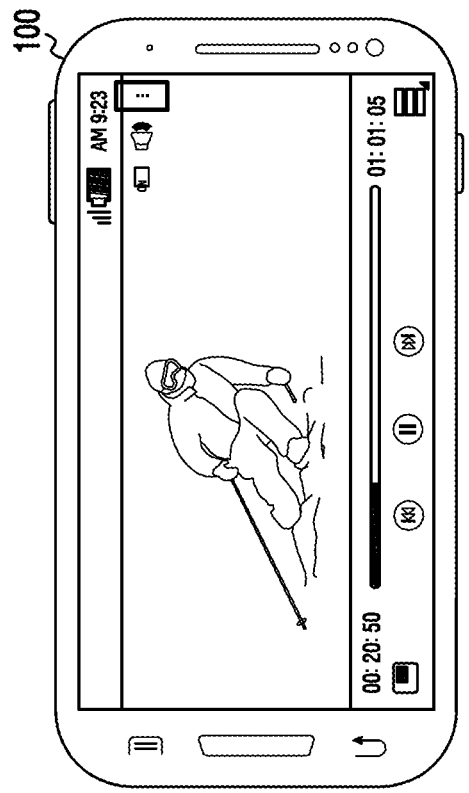

Referring to FIG. 47, both the first electronic device 100 and the second electronic device 200 are smart phones. The user selects an icon for sharing in the first electronic device 100 and approaches the second electronic device 200. Through proximal measurement, the first electronic device 100 selects the second electronic device 200 in operation 3710. Through capability negotiation, the first electronic device 100 identifies the connection state of the selected second electronic device 200 and activates a connection scheme. In an embodiment, when there is no connection scheme (excluding BLE) having been activated in the second electronic device 200, the first electronic device 100 activates a desired connection scheme (e.g., Wi-Fi) using BLE to trigger the connection. Using the activated connection scheme, the first electronic device 100 transmits a video to the second electronic device 200 in operation 3720.

Referring to FIG. 48, both the first electronic device 100 and the second electronic devices 200-1 to 200-3 are smart phones. A user executes a group application of the first electronic device 100 in a conference room in operation 3810. The first electronic device 100 transfers a grouping message to devices scanned by ultra low power in operation 3820. When the second electronic devices 200-1 to 200-3 having received the grouping message accept the grouping, a group including the first electronic device 100 and the second electronic devices 200-1 to 200-3 is generated in operations 3830 to 3850, respectively. If a target device, which is located within the conference room but has failed to receive the grouping message, exists, the first electronic device 100 transmits a 1:1 grouping message to the target device. If the second electronic device 200-2 accepts the grouping, the second electronic device 200-2 is added to the group. After completing the generation of the group, the first electronic device 100 transmits conference materials to the second electronic devices 200-1 to 200-3 to be shared in operation 3860.

Referring to FIG. 49, both the first electronic device 100 and the second electronic devices 200-1 to 200-3 are smart phones. A user executes a group application of the first electronic device 100 in a classroom in operation 3910. The first electronic device 100 transfers a grouping message to devices scanned by ultra low power in operation 3920. When the second electronic devices 200-1 to 200-2 having received the grouping message accept the grouping in operation 3930, a group including the first electronic device 100 and the second electronic devices 200-1 to 200-2 is generated in operation 3940. If a target device, which is located within the classroom but has failed to receive the grouping message, exists, the first electronic device 100 transmits a 1:1 grouping message to the target device. When the target device is located outside of the classroom, the target device can deny the grouping even when receiving the grouping message in operation 3935. If a target device within the classroom has denied the grouping, a target device outside of the classroom may receive the grouping message and join the group. The first electronic device 100 may acquire an authority for controlling the grouped second electronic devices 200-1 and 200-2 to control the target devices (e.g., screen lock) in operations 3950 and 3955.

Referring to FIG. 50, both the first electronic device 100 and the second electronic devices 200-1 to 200-3 are smart phones. A user executes a group application of the first electronic device 100 in a small meeting in operation 4010. The first electronic device 100 performs scanning by ultra low power, and transfers a grouping message including time information (e.g., photographing time desired to be shared) to the discovered devices in operation 4020. When the second electronic devices 200-1 to 200-3 having received the grouping message accept the grouping in operation 4030, a group including the first electronic device 100 and the second electronic devices 200-1 to 200-3 is generated. If a target device, which is located on the same table but has failed to receive the grouping message, exists, the first electronic device 100 transmits a 1:1 grouping message to the target device in operation 4040. If the second electronic device 200-2 accepts the grouping in operation 4045, the second electronic device 200-2 is added to the group in operation 4050. Photographs shot within a configured time by the first electronic device 100 and the second electronic devices 200-1 to 200-3 included in the group are shared N:N in the generated group album in operation 4060.

Referring to FIG. 51, both the first electronic device 100 and the second electronic devices 200-1 and 200-2 are smart phones. A user executes a contact application of the first electronic device 100 in operation 4110 and selects a group named "My Surroundings" in the address book in operation 4120. The first electronic device 100 transfers a grouping message to devices scanned by ultra low power in operation 4130. When the second electronic devices 200-1 to 200-2 having received the grouping message accept the grouping in operation 4140, a group 4125 including the first electronic device 100 and the second electronic devices 200-1 to 200-2 is generated in operation 4150. If a second electronic device, which is located in the vicinity but has failed to receive the grouping message, exists, the first electronic device 100 transmits a 1:1 grouping message to the second electronic device. When the first electronic device 100 copies the group folder and applies the copied folder to another application, an on-line group 4165 is automatically generated in operation 4160.

As described above, according to various embodiments of the present disclosure, when a user just inputs a sharing intention for a particular service in an electronic device, the service is automatically shared with another electronic device. In these embodiments, even when a user inputs only a sharing intention, an application (App) for sharing of a service is automatically selected and a second electronic device, which can provide the service while being located adjacent thereto, is automatically selected. Therefore, various embodiments of the present disclosure provide convenience which enables a user to transfer a service while viewing only the service (through App or UI) without recognizing a process of connection between devices. That is, various embodiments of the present disclosure enable wireless connection or service transfer without selection of a shared App or a device to be shared.

Although the present disclosure has been described by the restricted embodiments and the drawings as described above, the present disclosure is not limited to the aforementioned embodiments, and various modifications and alterations can be made from the descriptions by those skilled in the art to which the present disclosure pertains. The operations of embodiments of the present disclosure may be implemented by a single processor. In this instance, a program command for executing operations implemented by various computers may be recorded in a computer readable medium. The computer readable medium may include a program command, a data file, a data structure, and the like independently or in combination. The program command may be things specially designed and configured for the present disclosure, or things that are well known to and can be used by those skilled in the related art. For example, the computer readable recoding medium includes magnetic media such as a hard disk, a floppy disk, and a magnetic tape, optical media such as a compact disc ROM (CD-ROM) and a digital versatile disc (DVD), magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When all or a part of a base station or relay described in the present disclosure is implemented by a computer program, a computer readable recording medium storing the computer program is also included in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a first electronic device, the method comprising:
displaying a user interface (UI) comprising an object for sharing contents;
in response to an input for the object, transmitting a scanning signal to discover another electronic device for sharing the contents and identifying a threshold corresponding to the contents of the object;
in response to transmitting the scanning signal, receiving, from a second electronic device, a first signal for determining a first distance between the second electronic device and the first electronic device;
in response to receiving the first signal, determining whether the first distance is below the identified threshold; and
transmitting, to the second electronic device, the contents using a radio access technology (RAT) selected among a plurality of RATs based on a type of the contents and the first distance, if the first distance is less than the identified threshold,
wherein the scanning signal includes information for the threshold.

2. The method of claim 1, further comprising:
receiving, from a third electronic device, a second signal for determining a second distance between the third electronic device and the first electronic device; and
determining the second electronic device as a target electronic device, based on the second signal and the first signal.

3. The method of claim 1, wherein the first signal is transmitted in response to determining that the second electronic device shares the contents with the first electronic device.

4. The method of claim 1, further comprising:
displaying at least one of a notification of initiating a mode and a notification of a connection between the first electronic device and the second electronic device.

5. The method of claim 1, further comprising:
displaying information for the second electronic device in at least one of form of a map and a list.

6. The method of the claim 1, further comprising:
transmitting, to the second electronic device, a second signal for determining the first distance between the first electronic device and the second electronic device, before receiving the first signal.

7. The method of claim 6, wherein the first distance is determined based on at least one of a reception strength of the second signal and a reception timing of the second signal.

8. The method of claim 6, wherein the second signal comprises at least one of information for a capability of the first electronic device, information for a capability of the contents, and information for displaying an interface to inquire whether the second electronic device shares the contents or not.

9. The method of claim 6, wherein at least one of the first signal and the second signal comprises an audio signal.

10. The method of claim 2, wherein the determining the second electronic device as the target electronic device comprises:
selecting the second electronic device, if the first distance is less than the second distance.

11. The method of claim 1, wherein, transmitting the contents using the RAT:
transmitting, to the second electronic device, a request message for requesting to receive the contents; and
in response to receiving, from the second electronic device, a response message for the request message, transmitting, to the second electronic device, the contents.

12. A first electronic device comprising:
at least one processor; and
at least one transceiver operatively coupled to the at least one processor,
wherein the at least one processor is configured to:
display a user interface (UI) comprising an object for sharing contents,
in response to an input for the object, transmit a scanning signal to another electronic device for sharing the contents and identify a threshold corresponding to the contents of the object, in response to transmitting the scanning signal, receive, from a second electronic device, a first signal for determining a first distance between the second electronic device and the first electronic device, in response to receiving the first signal, determine whether the first distance is below the identified threshold, and transmit, to the second electronic device, the contents using a radio access technology (RAT) selected among a plurality of RATs based on a type of the contents and the first distance, if the first distance is less than the identified threshold, wherein the scanning signal includes information for the threshold.

13. The first electronic device of claim 12, wherein the at least one processor is further configured to:

receive, from a third electronic device, a second signal for determining a second distance between the third electronic device and the first electronic device, and determine the second electronic device as a target electronic device, based on the second signal and the first signal.

14. The first electronic device of claim 12, wherein the first signal is transmitted in response to determining that the second electronic device shares the contents with the first electronic device.

15. The first electronic device of claim 12, wherein the at least one processor is further configured to:

display at least one of a notification of initiating a mode and a notification of a connection between the first electronic device and the second electronic device.

16. The first electronic device of claim 12, wherein the at least one processor is further configured to:

display information for the second electronic device in at least one of form of a map and a list.

17. The first electronic device of claim 12, wherein the at least one processor is further configured to:

transmit, to the second electronic device, a second signal for determining the first distance between the first electronic device and the second electronic device, before receiving the first signal.

18. The first electronic device of claim 17, wherein the first distance is determined based on at least one of a reception strength of the second signal and a timing of the second signal.

19. The first electronic device of claim 17, wherein the second signal comprises at least one of information for a capability of the first electronic device, information for a capability of the contents, and information for displaying an interface to inquire whether the second electronic device shares the contents or not.

20. The first electronic device of claim 17, wherein at least one of the first signal and the second signal comprises an audio signal.

21. The first electronic device of claim 13, wherein the at least one processor is further configured to:

select the second electronic device, if the first distance is less than the second distance.

22. The first electronic device of claim 12, wherein the at least one processor is further configured to:

transmit, to the second electronic device, a request message for requesting to receive the contents; and in response to receiving, from the second electronic device, a response message for the request message, transmit, to the second electronic device, the contents.

23. A method for operating a first electronic device, the method comprising:

displaying a user interface (UI) comprising an object for sharing contents;

in response to an input for the object, transmitting a scanning signal to discover another electronic device for sharing the contents and identifying a threshold corresponding to the contents of the object;

in response to transmitting the scanning signal, receiving, from a second electronic device, a first signal for determining a first distance between the second electronic device and the first electronic device;

in response to receiving the first signal, determining whether the first distance is below the identified threshold; and transmitting, to the second electronic device, the contents using a radio access technology (RAT) selected among a plurality of RATs based on a type of the contents and the first distance, if the first distance is less than the identified threshold, wherein the scanning signal includes information for the threshold, wherein the identifying of the threshold corresponding to the contents of the object comprises:

identifying a first threshold corresponding to a first object for a first content or a second threshold corresponding to a second object for a second content, and wherein the first threshold is different from the second threshold.

* * * * *